(12) United States Patent
Aschwanden et al.

(10) Patent No.: US 8,699,141 B2
(45) Date of Patent: Apr. 15, 2014

(54) LENS ASSEMBLY APPARATUS AND METHOD

(75) Inventors: Manuel Aschwanden, Zurich (CH); David Niederer, Kuttigen (CH); Thomas Schmidhausler, Pfaffikon (CH); Christoph Romer, Zurich (CH); Thomas Kern, Zurich (CH); Shu-Heng Yang, Hsinchu (TW); Charles King, Chicago, IL (US); Dennis Ray Kirchhoefer, Plainfield, IL (US); Daniel Warren, Geneva, IL (US)

(73) Assignees: Knowles Electronics, LLC, Itasca, IL (US); Optotune AG, Dubendorf (CH)

( * ) Notice: Subject to any disclaimer, the term of this patent is extended or adjusted under 35 U.S.C. 154(b) by 0 days.

(21) Appl. No.: 12/720,093

(22) Filed: Mar. 9, 2010

(65) Prior Publication Data

US 2010/0232161 A1     Sep. 16, 2010

Related U.S. Application Data

(60) Provisional application No. 61/160,041, filed on Mar. 13, 2009, provisional application No. 61/245,438, filed on Sep. 24, 2009.

(51) Int. Cl.
    *G02B 3/14* (2006.01)
(52) U.S. Cl.
    CPC ........................................ *G02B 3/14* (2013.01)
    USPC ........................................................... 359/666
(58) Field of Classification Search
    CPC ........................................................ G02B 3/14
    USPC ........................................... 359/665–667, 824
    See application file for complete search history.

(56) References Cited

U.S. PATENT DOCUMENTS

| 3,942,048 A | 3/1976 | Laude et al. |
| 4,011,009 A | 3/1977 | Lama et al. |
| 4,115,747 A | 9/1978 | Sato et al. |
| 4,373,218 A | 2/1983 | Schachar |
| 4,494,826 A | 1/1985 | Smith |

(Continued)

FOREIGN PATENT DOCUMENTS

| CN | 1776463 | 5/2006 |
| CN | 101000385 A | 7/2007 |

(Continued)

OTHER PUBLICATIONS

Aschwanden, M et al. "Diffractive Transmission Grating Tuned by Dielectric Elastomer Actuator"; IEEE Photonics Technology Letters, vol. 19, No. 14 (Jul. 15, 2007).

(Continued)

*Primary Examiner* — Zachary Wilkes
(74) *Attorney, Agent, or Firm* — Fitch, Even, Tabin & Flannery LLP

(57) ABSTRACT

An optical apparatus includes a first membrane, a second membrane and at least one electromagnetically displaceable component. The first membrane includes an optically active area. The first membrane and the second membrane are coupled by a filler material disposed in a reservoir. At least one electromagnetically displaceable component is coupled to the filler material via the second membrane, such that a displacement of the at least one electromagnetically displaceable component is operative to cause a deformation of the optically active area of the first membrane by movement of the filler material.

53 Claims, 140 Drawing Sheets

(56) References Cited

U.S. PATENT DOCUMENTS

| | | |
|---|---|---|
| 4,529,620 A | 7/1985 | Glenn |
| 4,629,620 A | 12/1986 | Lindahl et al. |
| 4,709,996 A | 12/1987 | Michelson |
| 4,712,882 A | 12/1987 | Baba et al. |
| 4,783,153 A | 11/1988 | Kushibiki et al. |
| 4,783,155 A | 11/1988 | Imataki et al. |
| 4,802,746 A | 2/1989 | Baba et al. |
| 4,850,682 A | 7/1989 | Gerritsen |
| 5,002,360 A | 3/1991 | Colak et al. |
| 5,066,301 A | 11/1991 | Wiley |
| 5,124,834 A | 6/1992 | Cusano et al. |
| 5,233,470 A | 8/1993 | Wu |
| 5,443,506 A | 8/1995 | Garabet |
| 5,459,610 A | 10/1995 | Bloom et al. |
| 5,581,642 A | 12/1996 | Deacon et al. |
| 5,668,620 A | 9/1997 | Kurtin et al. |
| 5,684,637 A | 11/1997 | Floyd |
| 5,699,468 A | 12/1997 | Farries et al. |
| 5,739,959 A | 4/1998 | Quaglia |
| 5,757,536 A | 5/1998 | Rico et al. |
| 5,841,579 A | 11/1998 | Bloom et al. |
| 5,867,301 A | 2/1999 | Engle |
| 5,956,183 A | 9/1999 | Epstein et al. |
| 5,999,319 A | 12/1999 | Castracane |
| 6,081,388 A | 6/2000 | Widl |
| 6,088,160 A | 7/2000 | Nomura et al. |
| 6,188,526 B1 | 2/2001 | Sasaya et al. |
| 6,307,663 B1 | 10/2001 | Kowarz |
| 6,326,936 B1 | 12/2001 | Inganas et al. |
| 6,355,756 B1 | 3/2002 | Hawker et al. |
| 6,376,971 B1 | 4/2002 | Pelrine et al. |
| 6,493,515 B2 | 12/2002 | Nagata |
| 6,542,309 B2 | 4/2003 | Guy |
| 6,574,633 B1 | 6/2003 | Jamalabad et al. |
| 6,583,533 B2 | 6/2003 | Pelrine et al. |
| 6,618,208 B1 | 9/2003 | Silver |
| 6,639,710 B2 | 10/2003 | Kurczynski et al. |
| 6,643,065 B1 | 11/2003 | Silberman |
| 6,715,876 B2 | 4/2004 | Floyd |
| 6,747,806 B2 | 6/2004 | Gelbart |
| 6,753,994 B1 | 6/2004 | Russell |
| 6,833,966 B2 | 12/2004 | Nishioka et al. |
| 6,897,995 B2 | 5/2005 | Malthe-Sorenssen et al. |
| 6,898,021 B1 | 5/2005 | Tang |
| 6,903,872 B2 | 6/2005 | Schrader |
| 6,930,817 B2 | 8/2005 | Srinivasan et al. |
| 6,975,459 B2 | 12/2005 | Barbastathis et al. |
| 7,027,683 B2 | 4/2006 | O'Connor et al. |
| 7,032,411 B2 | 4/2006 | Hebert |
| 7,042,920 B2 | 5/2006 | Belikov et al. |
| 7,054,053 B2 | 5/2006 | Nishioka |
| 7,054,054 B1 | 5/2006 | Srinivasan et al. |
| 7,088,917 B2 | 8/2006 | Butterworth |
| 7,170,832 B2 | 1/2007 | Tukker et al. |
| 7,289,192 B2 | 10/2007 | Otsuka |
| 7,298,562 B2 * | 11/2007 | Sue et al. ............. 359/819 |
| 7,301,708 B2 | 11/2007 | Kuiper et al. |
| 7,359,124 B1 | 4/2008 | Fang et al. |
| 7,369,723 B1 | 5/2008 | Mescher |
| 7,396,126 B2 | 7/2008 | Blum et al. |
| 7,436,598 B2 | 10/2008 | Kuiper et al. |
| 7,453,646 B2 | 11/2008 | Lo |
| 7,697,214 B2 * | 4/2010 | Batchko et al. ............. 359/665 |
| 7,751,134 B2 * | 7/2010 | Sata et al. ............. 359/824 |
| 7,755,840 B2 * | 7/2010 | Batchko et al. ............. 359/665 |
| 7,813,047 B2 * | 10/2010 | Wang et al. ............. 359/665 |
| 2001/0040743 A1 | 11/2001 | Graves et al. |
| 2001/0055147 A1 | 12/2001 | Little et al. |
| 2002/0118464 A1 | 8/2002 | Nishioka et al. |
| 2002/0186928 A1 | 12/2002 | Curtis |
| 2003/0052425 A1 | 3/2003 | Griffith |
| 2003/0141787 A1 | 7/2003 | Pelrine et al. |
| 2003/0184887 A1 | 10/2003 | Greywall et al. |
| 2003/0194179 A1 | 10/2003 | Rumpf et al. |
| 2003/0214695 A1 | 11/2003 | Abramson et al. |
| 2004/0008853 A1 | 1/2004 | Pelrine et al. |
| 2004/0109234 A1 | 6/2004 | Levola |
| 2004/0212869 A1 | 10/2004 | Sriniva |
| 2005/0030438 A1 | 2/2005 | Nishioka |
| 2005/0200983 A1 | 9/2005 | Blum |
| 2005/0218231 A1 | 10/2005 | Massieu |
| 2005/0270664 A1 | 12/2005 | Pauker et al. |
| 2006/0028734 A1 | 2/2006 | Kuiper et al. |
| 2006/0256429 A1 | 11/2006 | Obrebski et al. |
| 2006/0262383 A1 | 11/2006 | Blum et al. |
| 2006/0274425 A1 | 12/2006 | Kuiper et al. |
| 2007/0030573 A1 | 2/2007 | Batchko et al. |
| 2007/0041101 A1 | 2/2007 | Goosey, Jr. et al. |
| 2007/0097515 A1 | 5/2007 | Jung et al. |
| 2007/0104473 A1 | 5/2007 | Lee et al. |
| 2007/0133103 A1 | 6/2007 | Stempel et al. |
| 2007/0139785 A1 | 6/2007 | Kuiper et al. |
| 2007/0195424 A1 | 8/2007 | Ojala |
| 2007/0223118 A1 | 9/2007 | Dupuis |
| 2007/0263293 A1 | 11/2007 | Batchko et al. |
| 2007/0279732 A1 | 12/2007 | Kosaka et al. |
| 2008/0088756 A1 | 4/2008 | Tseng et al. |
| 2008/0088939 A1 | 4/2008 | Jung |
| 2008/0112059 A1 | 5/2008 | Choi et al. |
| 2008/0142820 A1 | 6/2008 | Edmond et al. |
| 2008/0143693 A1 | 6/2008 | Schena |
| 2008/0144185 A1 | 6/2008 | Wang et al. |
| 2008/0144186 A1 | 6/2008 | Feng et al. |
| 2008/0144187 A1 | 6/2008 | Gunasekaran et al. |
| 2008/0157631 A1 | 7/2008 | Heim et al. |
| 2008/0198438 A1 | 8/2008 | Kuiper et al. |
| 2008/0231963 A1 | 9/2008 | Batchko et al. |
| 2008/0239503 A1 | 10/2008 | Conradi et al. |
| 2008/0247019 A1 | 10/2008 | Kuiper et al. |
| 2008/0252769 A1 | 10/2008 | Verstegen et al. |
| 2008/0259463 A1 | 10/2008 | Shepherd |
| 2008/0285143 A1 | 11/2008 | Batchko et al. |

FOREIGN PATENT DOCUMENTS

| | | |
|---|---|---|
| CN | 101501534 A | 8/2009 |
| DE | 19710668 A1 | 9/1998 |
| DE | 102007004080 A1 | 8/2008 |
| EP | 1735644 | 12/2006 |
| EP | 1816493 A1 | 8/2007 |
| EP | 1826591 A1 | 8/2007 |
| EP | 2034338 A1 | 3/2009 |
| FR | 2912514 A1 | 8/2008 |
| JP | 11133210 A1 | 5/1999 |
| JP | 11223735 A | 8/1999 |
| JP | H11276509 A | 10/1999 |
| JP | 2002014307 A | 1/2002 |
| KR | 20050033308 | 4/2005 |
| WO | 91/02991 | 3/1991 |
| WO | 99/48197 | 9/1999 |
| WO | 02/103451 A1 | 12/2002 |
| WO | 2005/073779 A1 | 8/2005 |
| WO | 2005/085930 | 9/2005 |
| WO | 2006/011937 A2 | 2/2006 |
| WO | 2006/088514 A2 | 8/2006 |
| WO | 2007/042602 A1 | 4/2007 |
| WO | 2007/067068 | 6/2007 |
| WO | 2007/067069 | 6/2007 |
| WO | 2007/067070 | 6/2007 |
| WO | 2007/069213 A2 | 6/2007 |
| WO | 2007/069213 A3 | 6/2007 |
| WO | 2007/090842 | 8/2007 |
| WO | 2007/090843 | 8/2007 |
| WO | 2007/096687 | 8/2007 |
| WO | 2008/020356 A1 | 2/2008 |
| WO | 2008/024071 A1 | 2/2008 |
| WO | 2008/035983 A1 | 3/2008 |
| WO | 2008076399 A2 | 6/2008 |
| WO | 2008/078320 A2 | 7/2008 |
| WO | 2008/091859 A1 | 7/2008 |
| WO | 2008/100154 A1 | 8/2008 |
| WO | 2008/138010 A1 | 11/2008 |

(56) References Cited

FOREIGN PATENT DOCUMENTS

| WO | 2009/010559 A1 | 1/2009 |
|----|----------------|--------|
| WO | 2009/021344    | 2/2009 |
| WO | 2010/015093    | 2/2010 |

OTHER PUBLICATIONS

Aschwanden, M et al. "Polymeric, Electrically Tunable Diffraction Grating Based on Artificial"; Optics Letters, vol. 31, No. 17 (Sep. 1, 2006), pp. 2610-2612.

Brady, M.J. "Deformable Rubber Gratings"; IBM Technical Disclosure Bulletin, vol. 23, No. 10 (Mar. 1981), pp. 4761-4762.

Brinker, W. et al. "Deformation Behavior of Thin Viscoelastic Layers Used in an Active-Matrix-Addressed Spatial Light Modulator"; SPIE Electro-Optic and Magneto Materials; vol. 1018, 1988, pp. 79-85.

Carvajal, J.J. et al. "Artificial Muscles Employed to Build Tunable Diffraction Gratings"; MRS Bulletin, vol. 31, Oct. 2006.

Sakarya, S. et al. "Spatial Light Modulators Based on Micromachined Reflective Membranes on Viscoelastic Layers"; Laboratory of Electronic Instrumentation, Delft University of Technology; Sensors and Actuators A 108 (2003), www.sciencedirect.com; pp. 271-275.

Sakarya, S. et al. "Technology of Reflective Membranes for Spatial Light Modulators"; Laboratory of Electronic Instrumentation, Delft University of Technology; Sensors and Actuators A 97-98 (2002), www.sciencedirect.com; pp. 468-472.

Spanner, K. "Survey of the Various Operating Principles of Ultrasonic Piezomotors"; Physik Instrumente GmbH & Co. KG; White Paper for ACTUATOR Conference (2006).

Yan, Dong et al. "Design and Characterization of Slit Variable Microgratings"; IEEE Sensors Journal, vol. 6, No. 2, Apr. 2006. pp. 458-464.

International Search Report for PCT/EP2010/053025 dated, Jun. 8, 2010.

International Search Report dated May 1, 2011 relating to PCT/US2010/026749.

Related International Patent Application No. PCT/EP2010/053025, International Preliminary Report on Patentability and Written Opinion of the International Searching Authority dated Sep. 22, 2011, 5 pages.

Supplemental European Search Report for European Patent Application No. EP10751319, dated Sep. 11, 2012.

* cited by examiner

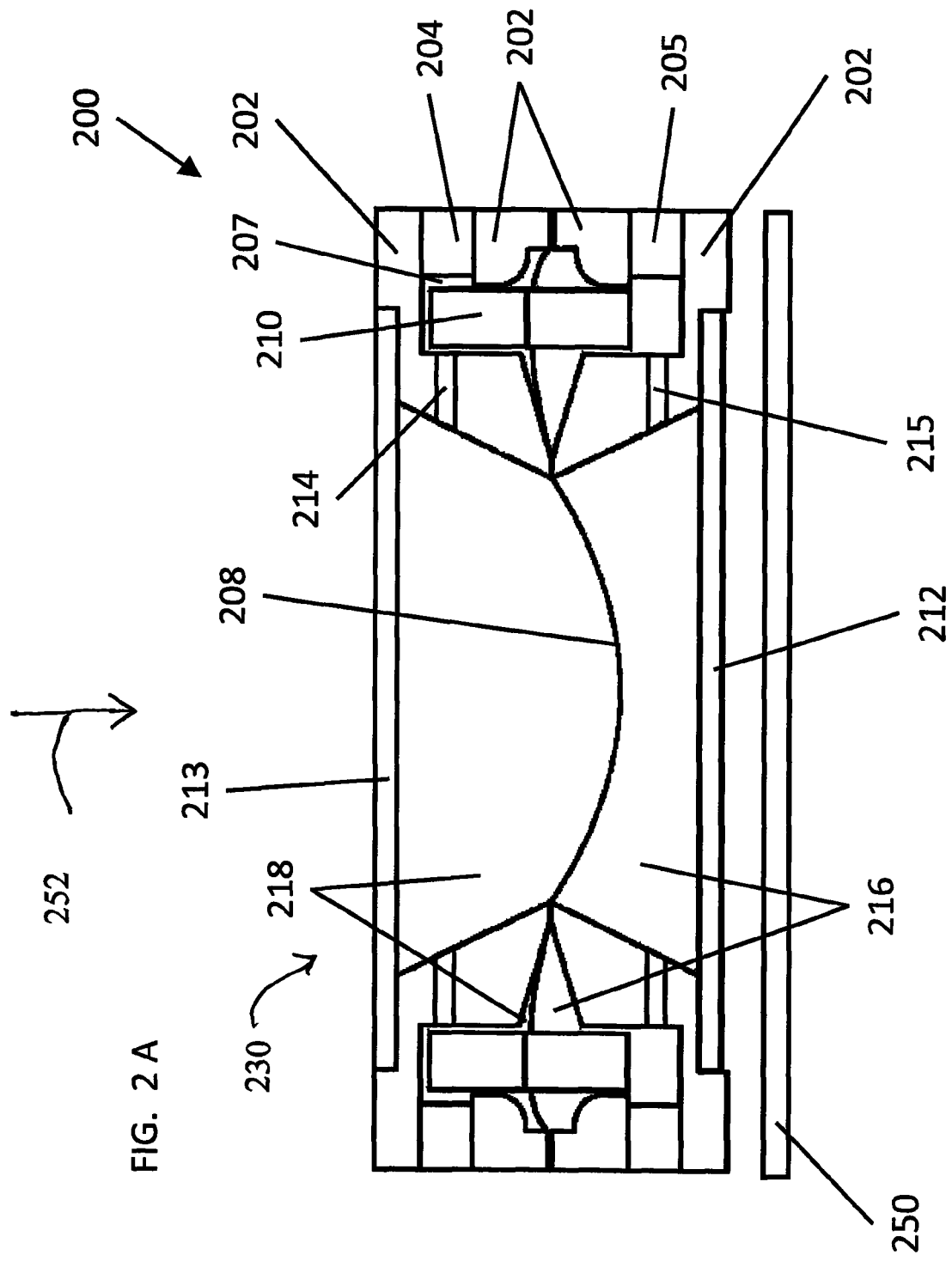

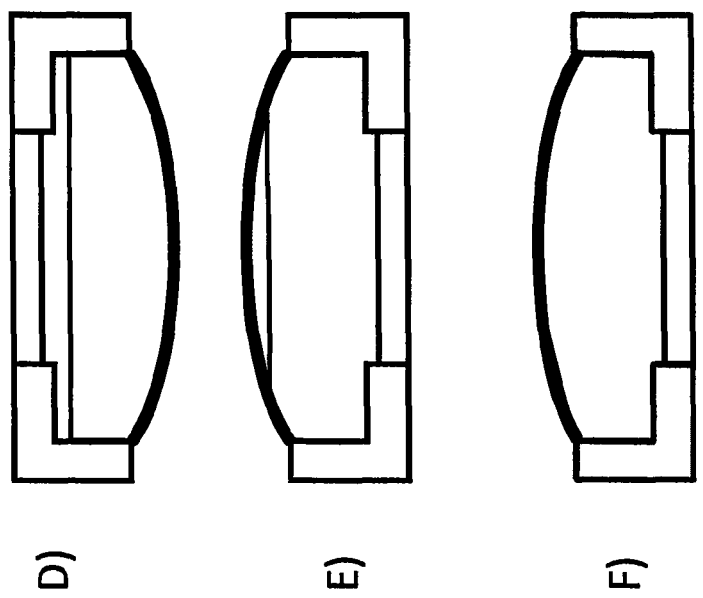
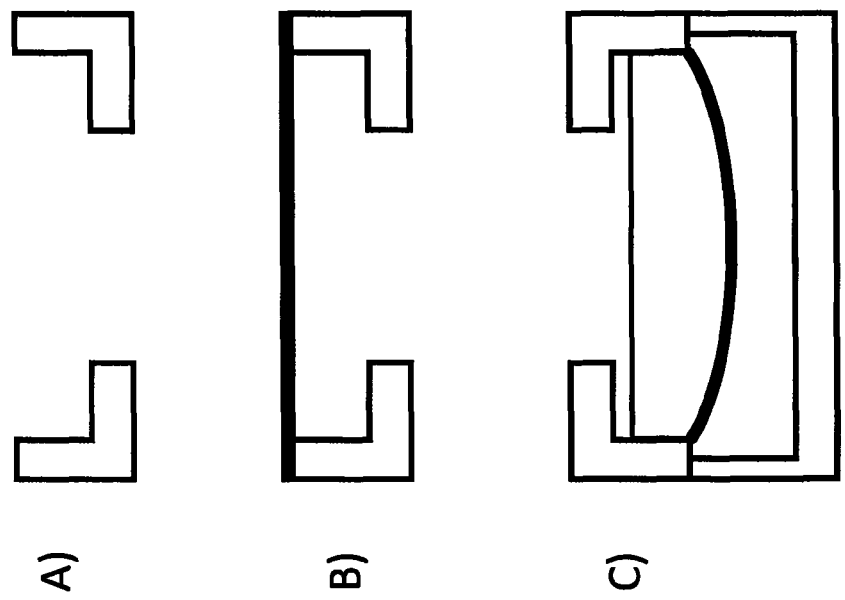
FIG. 4

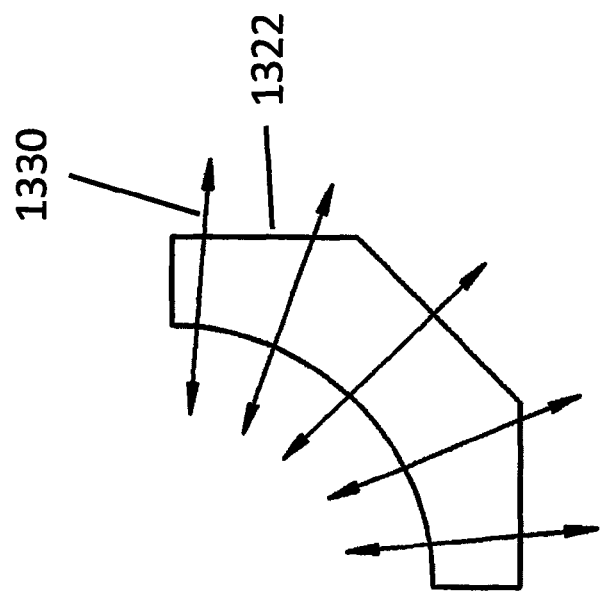
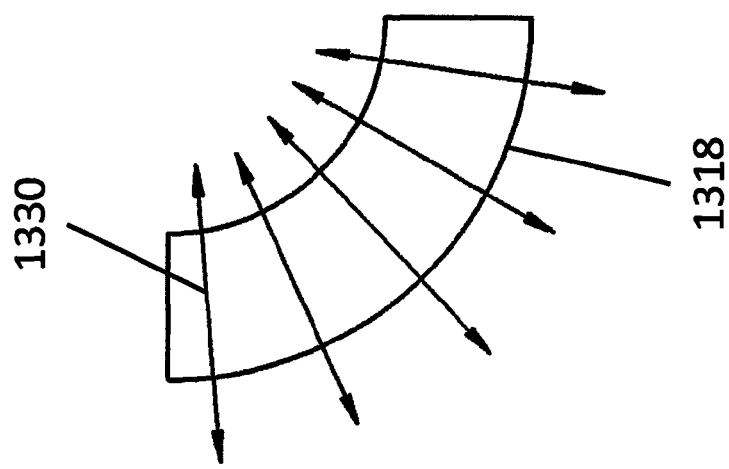
FIG. 13 B

1700

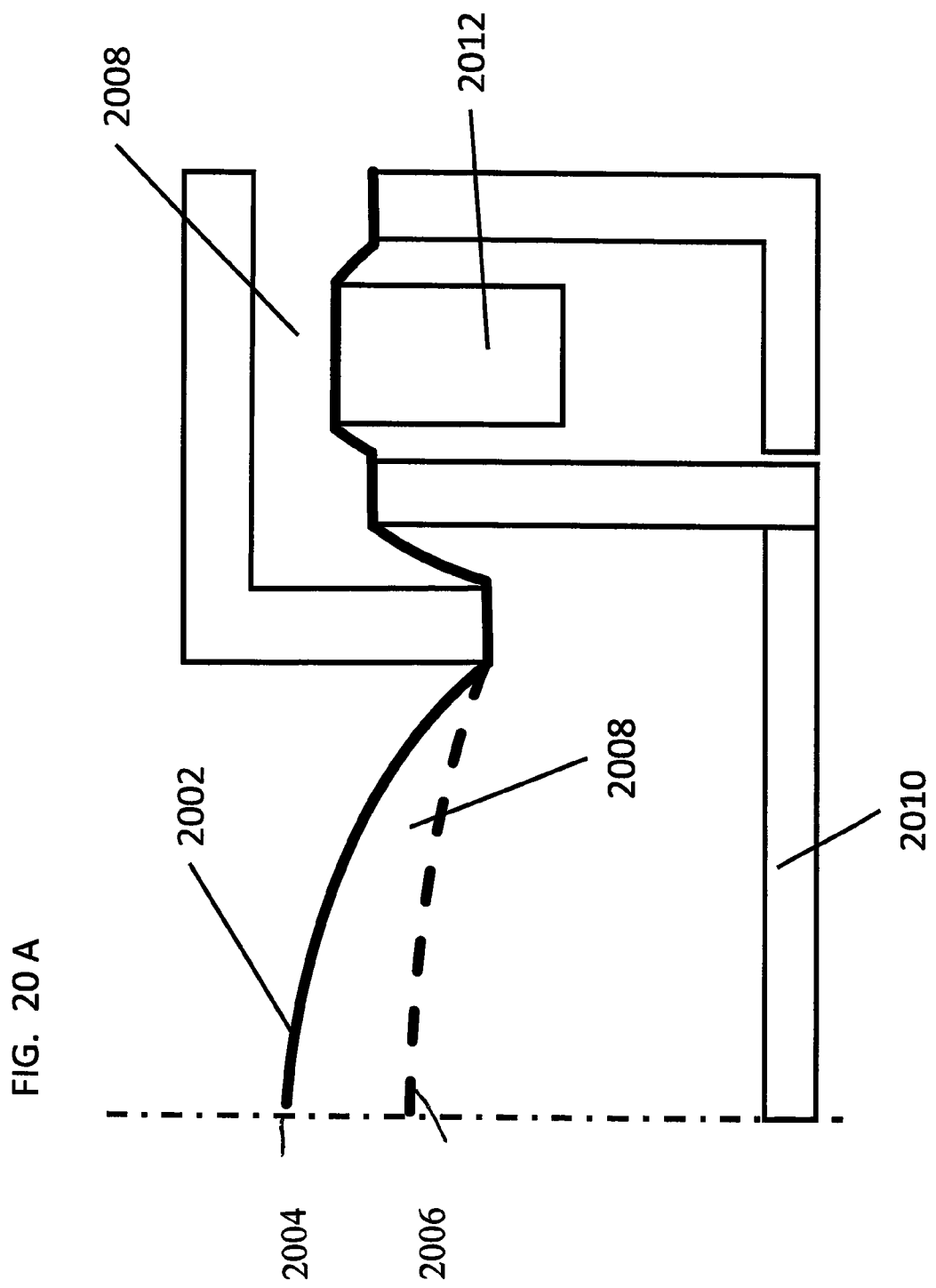

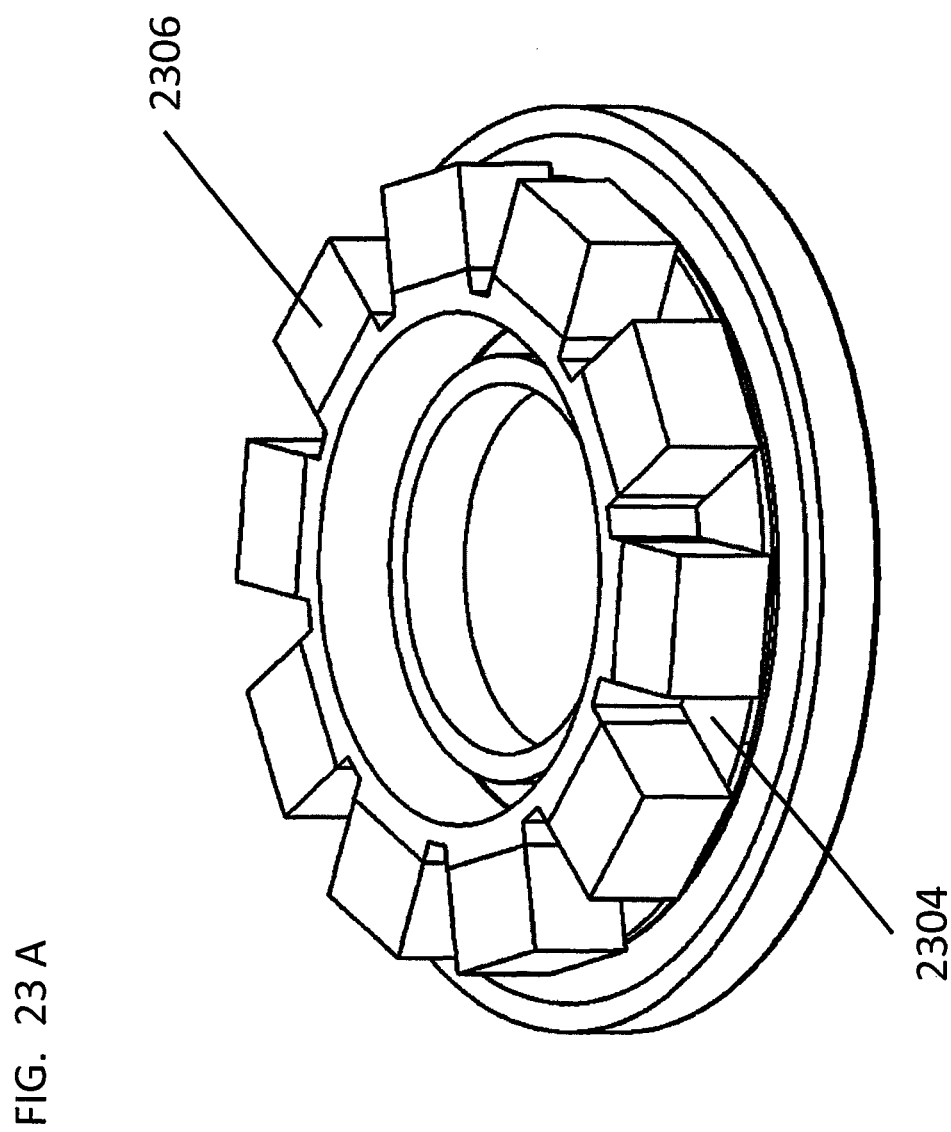

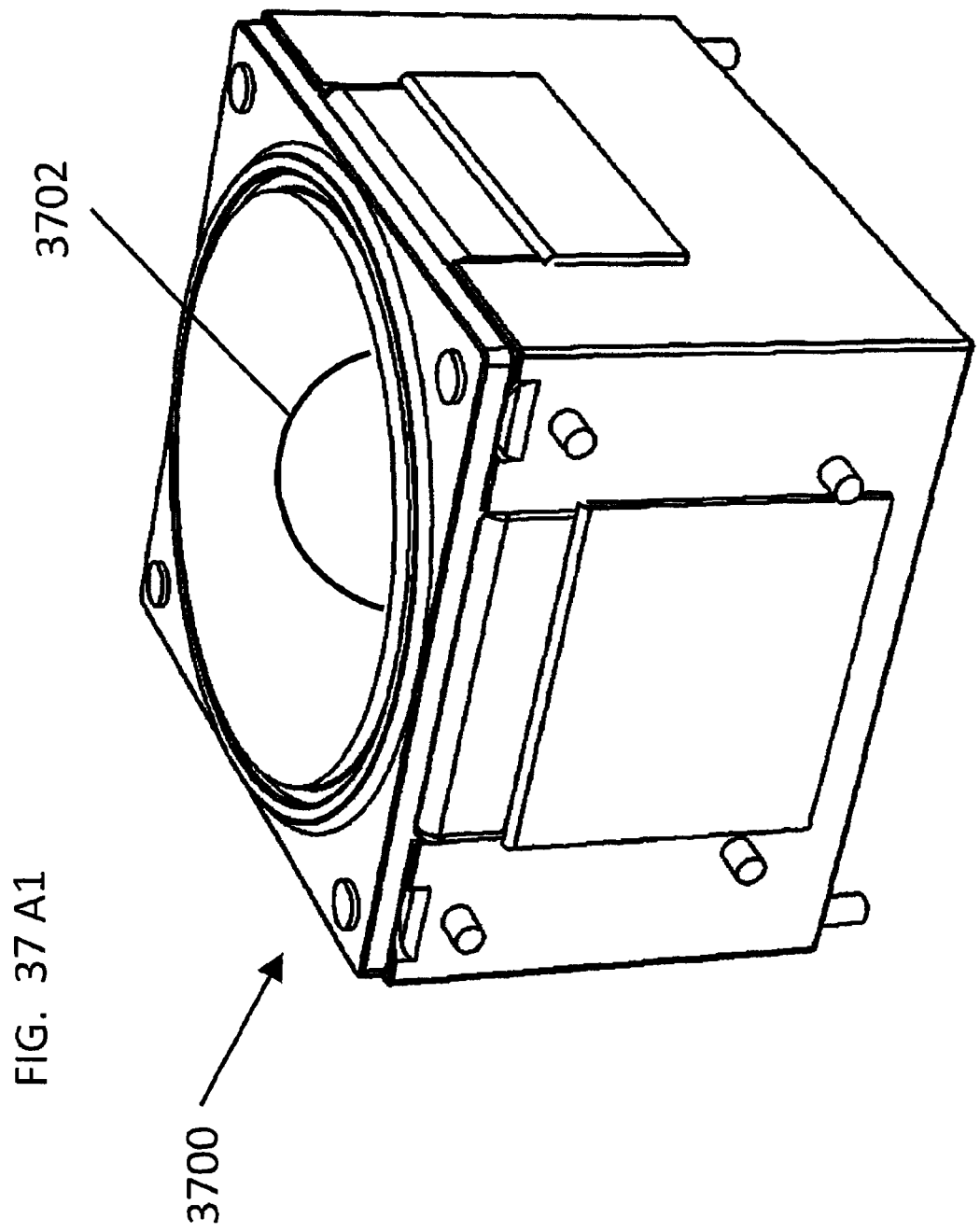
FIG. 37 A1

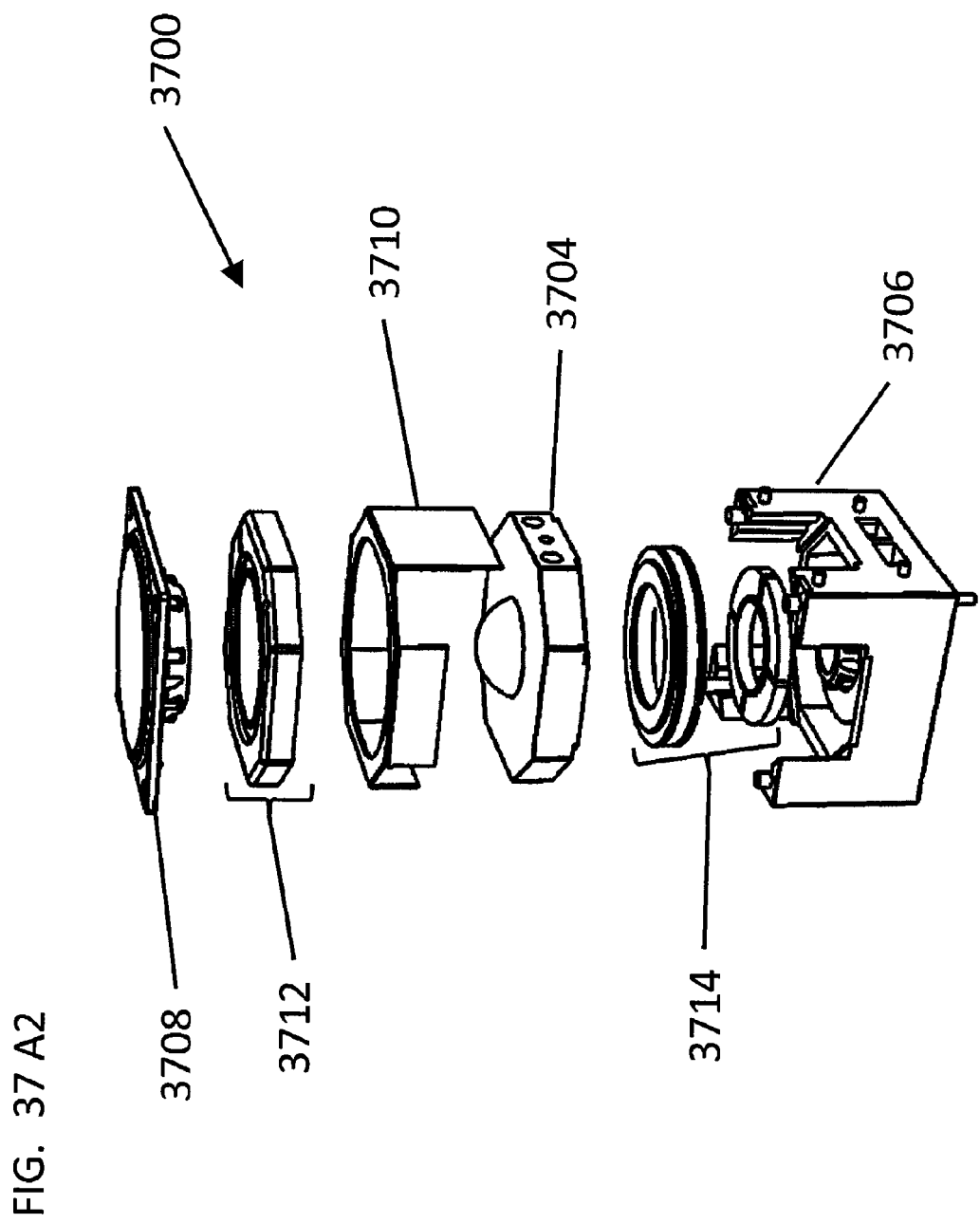
FIG. 37 A2

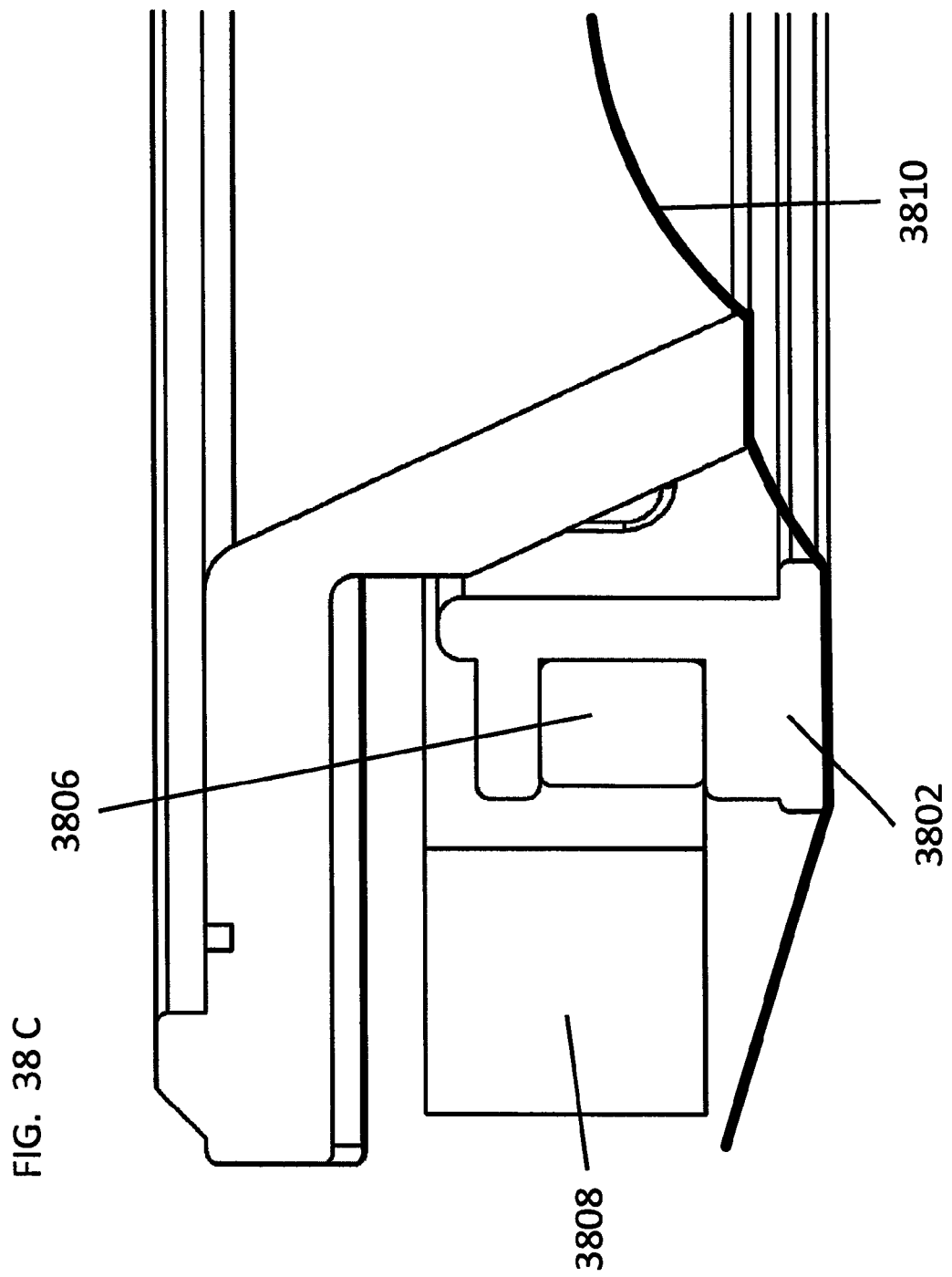

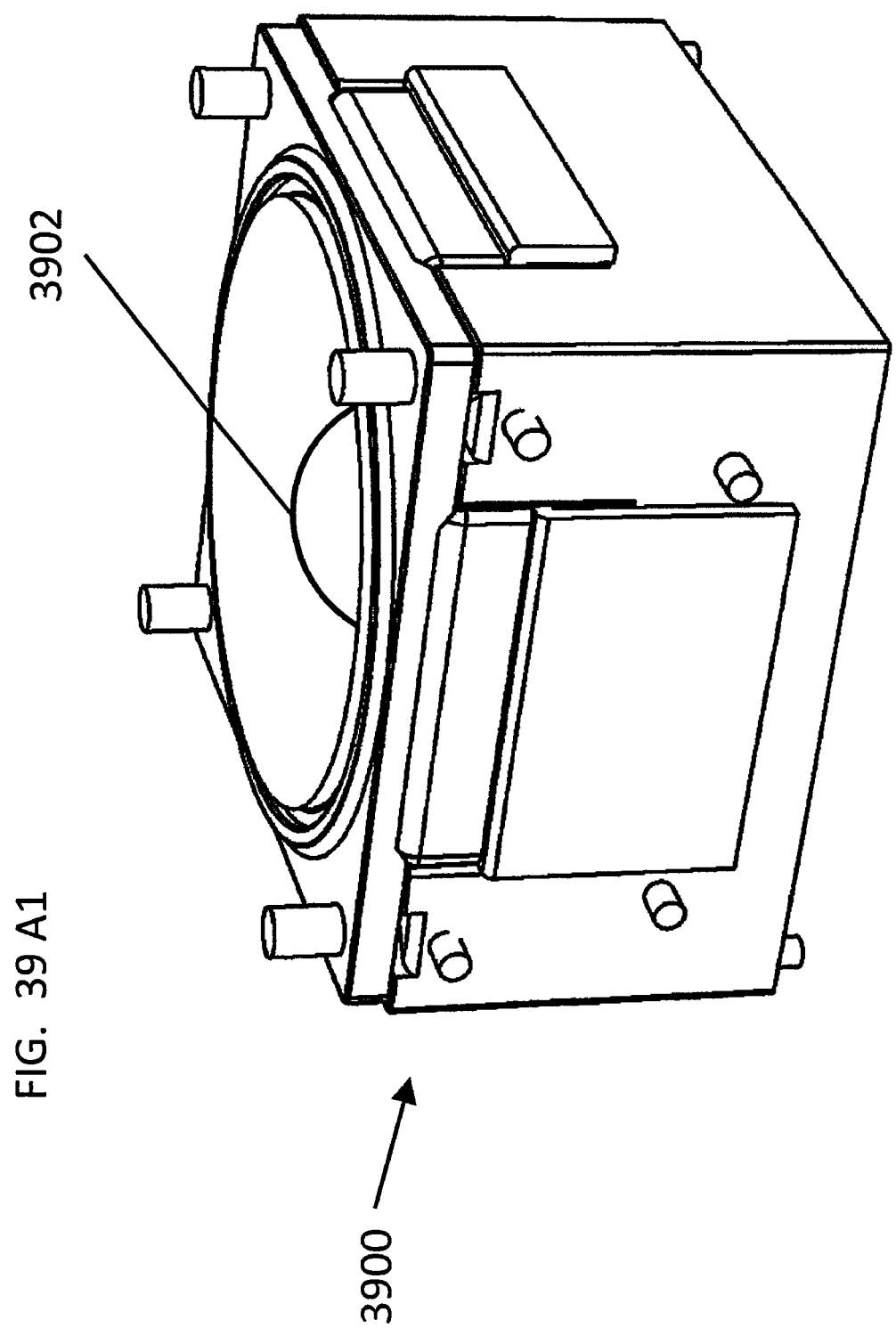
FIG. 39 A1

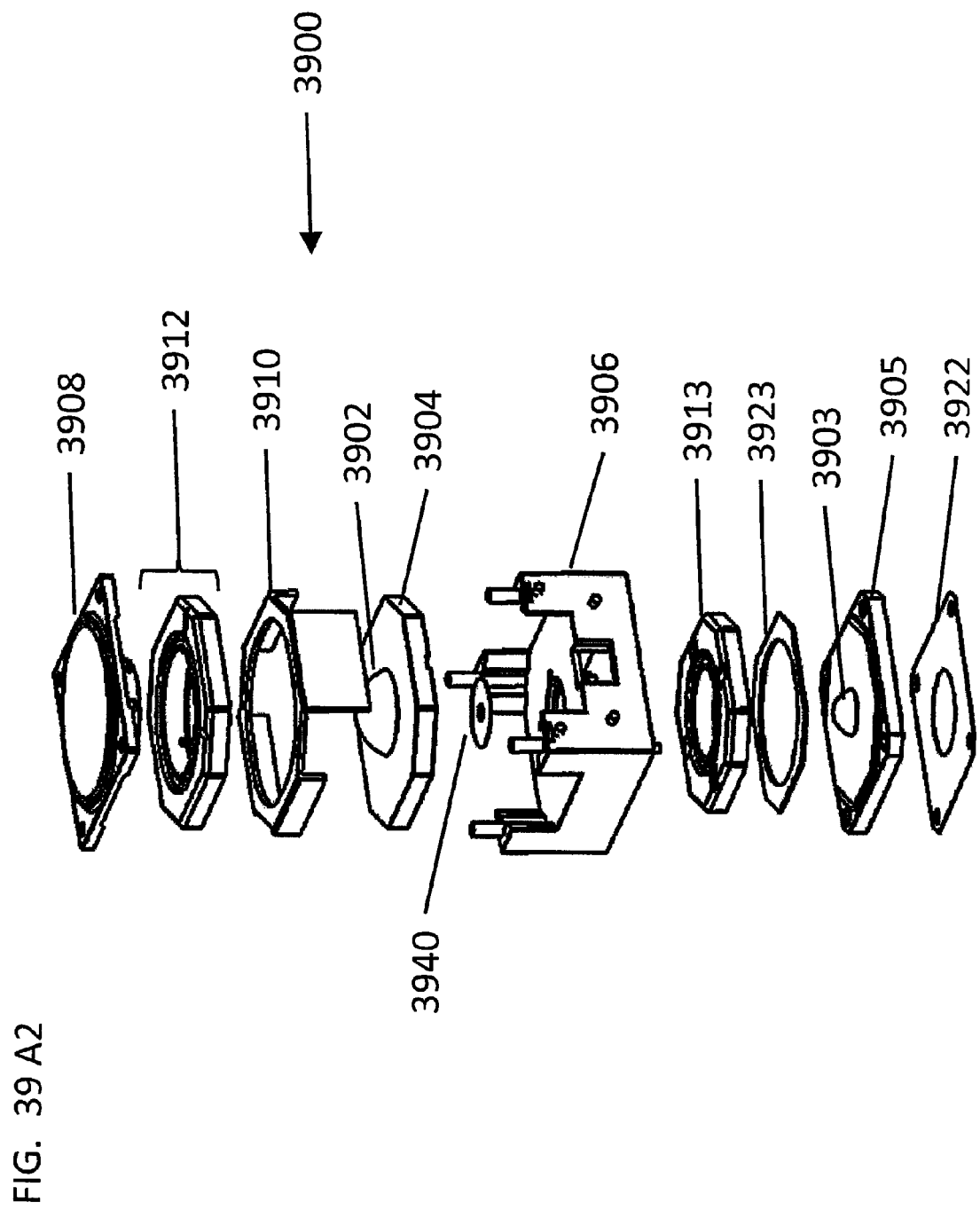
FIG. 39 A2

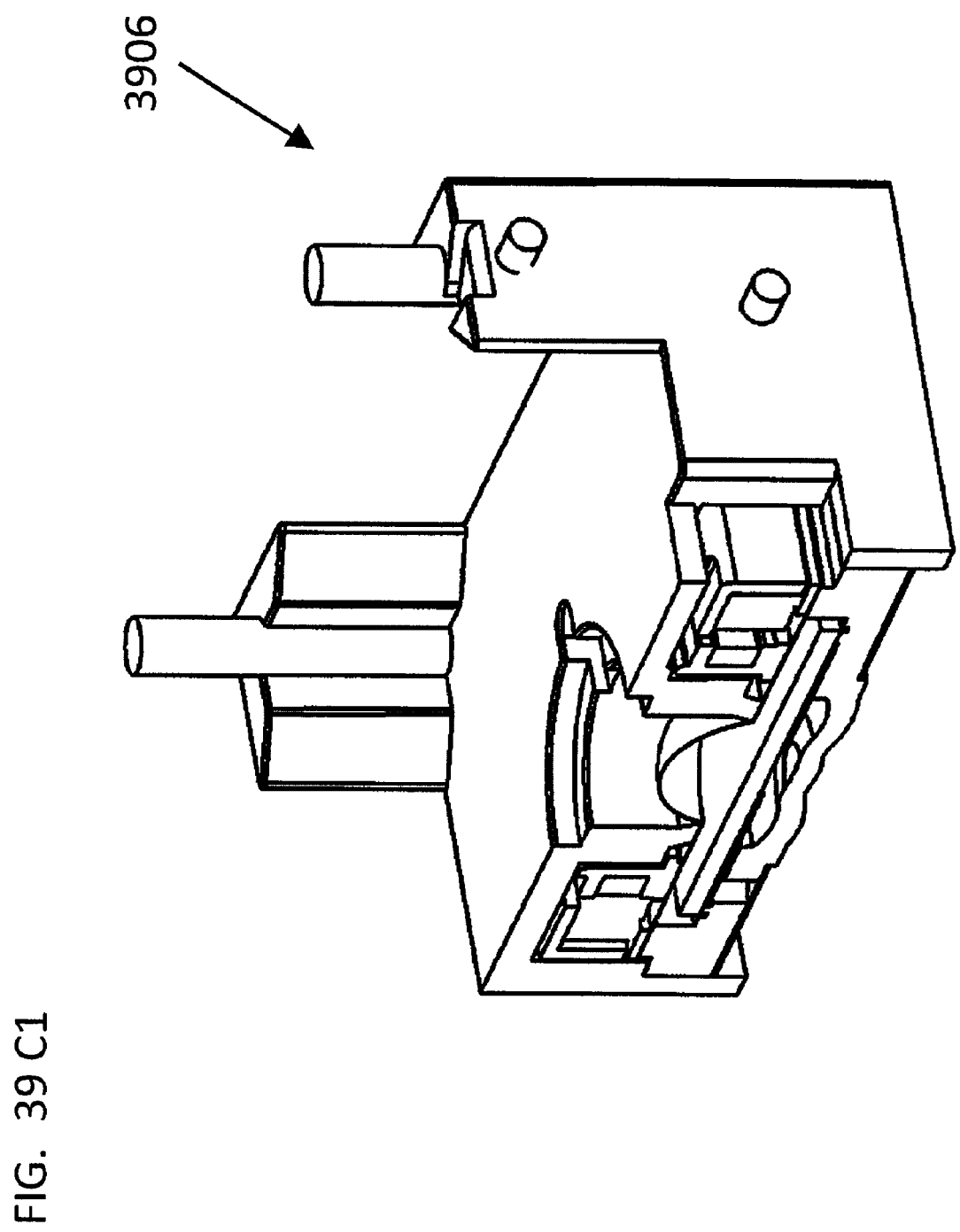
FIG. 39 C1

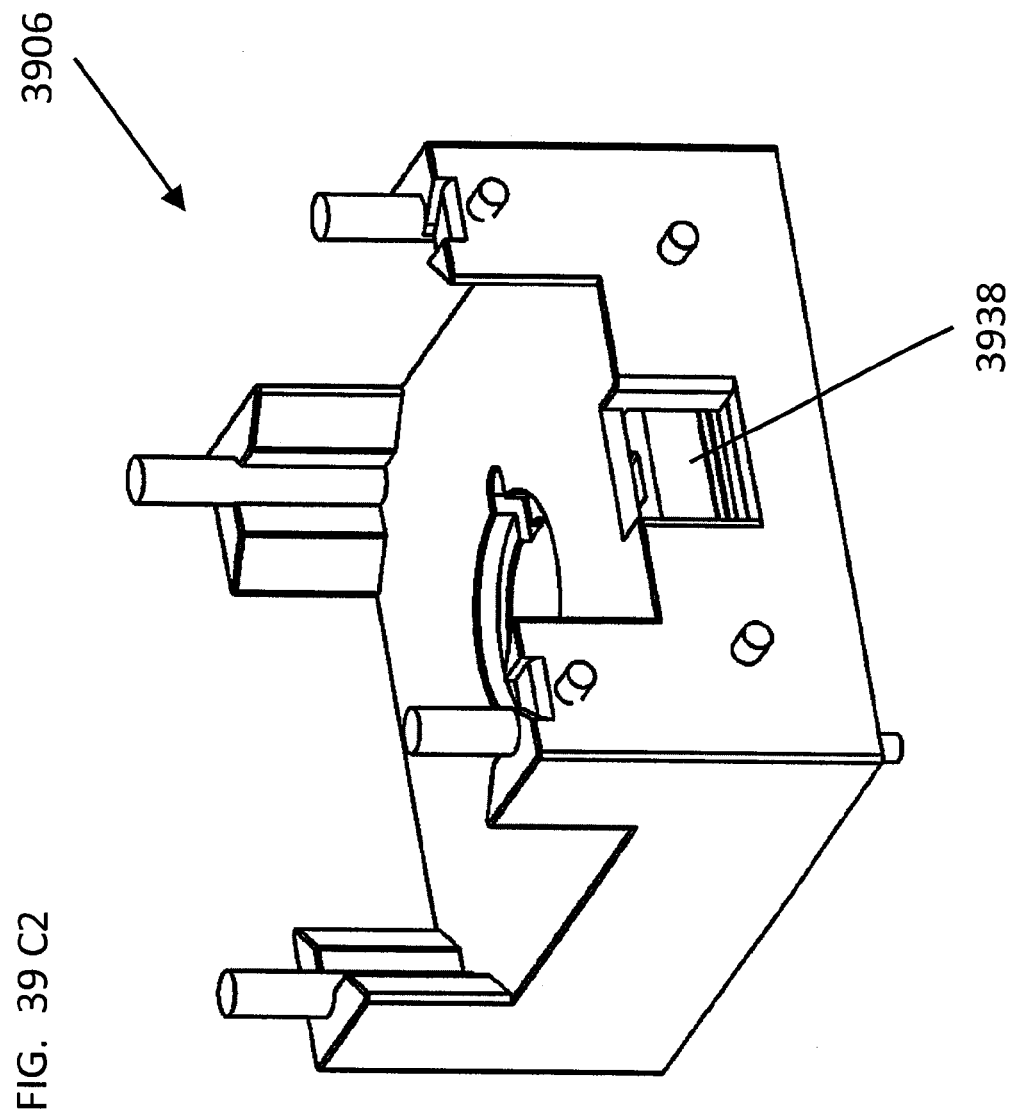
FIG. 39 C2

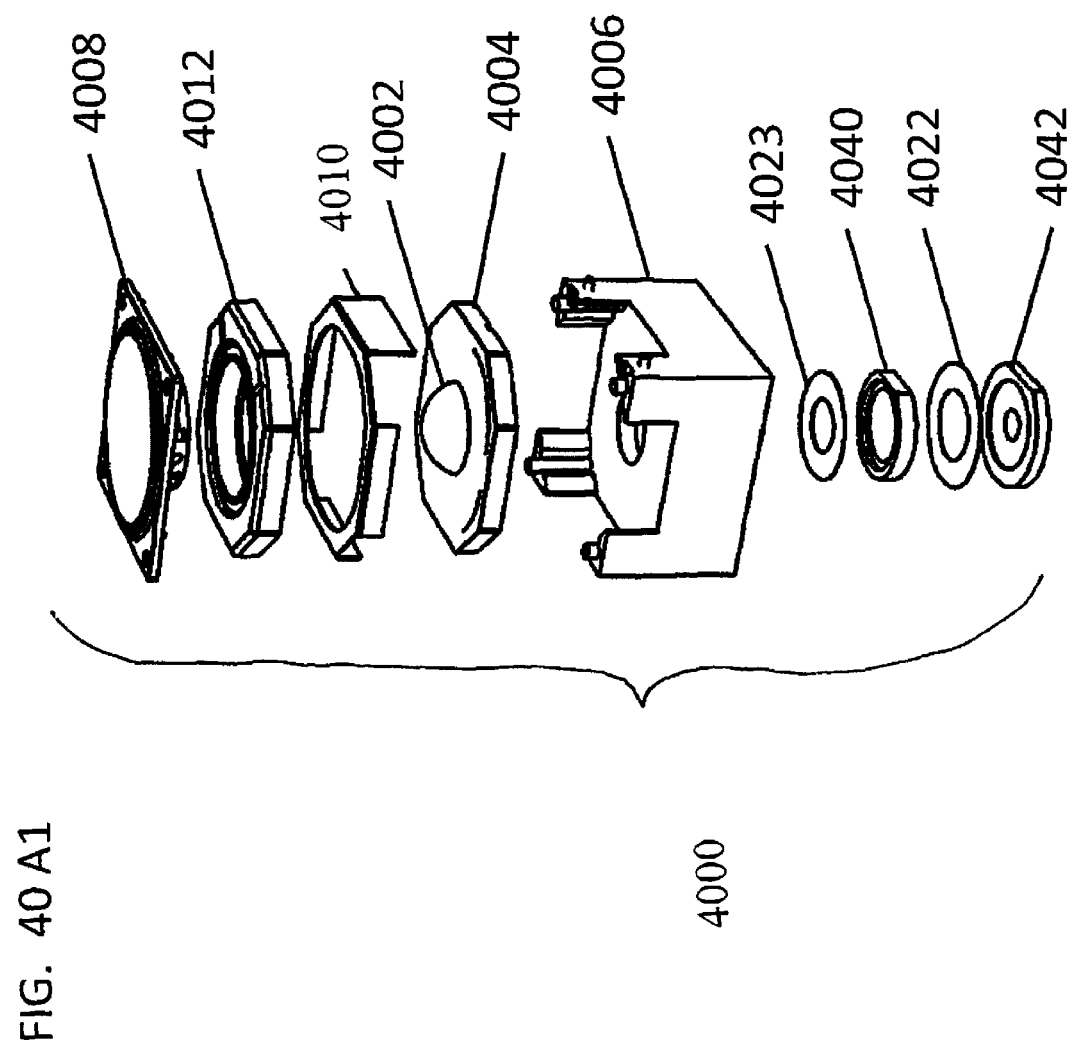
FIG. 40 A1

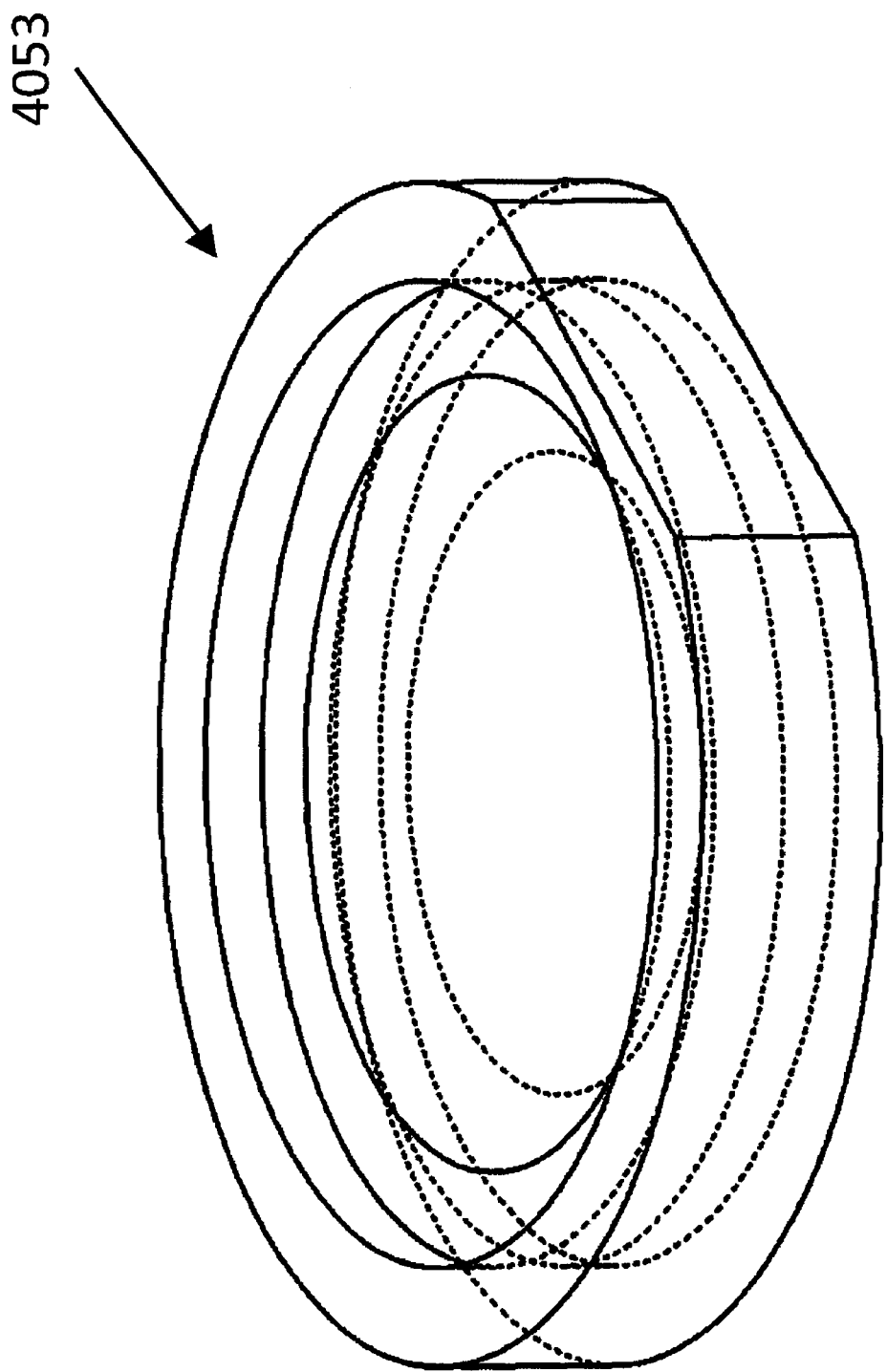
FIG. 40 A2

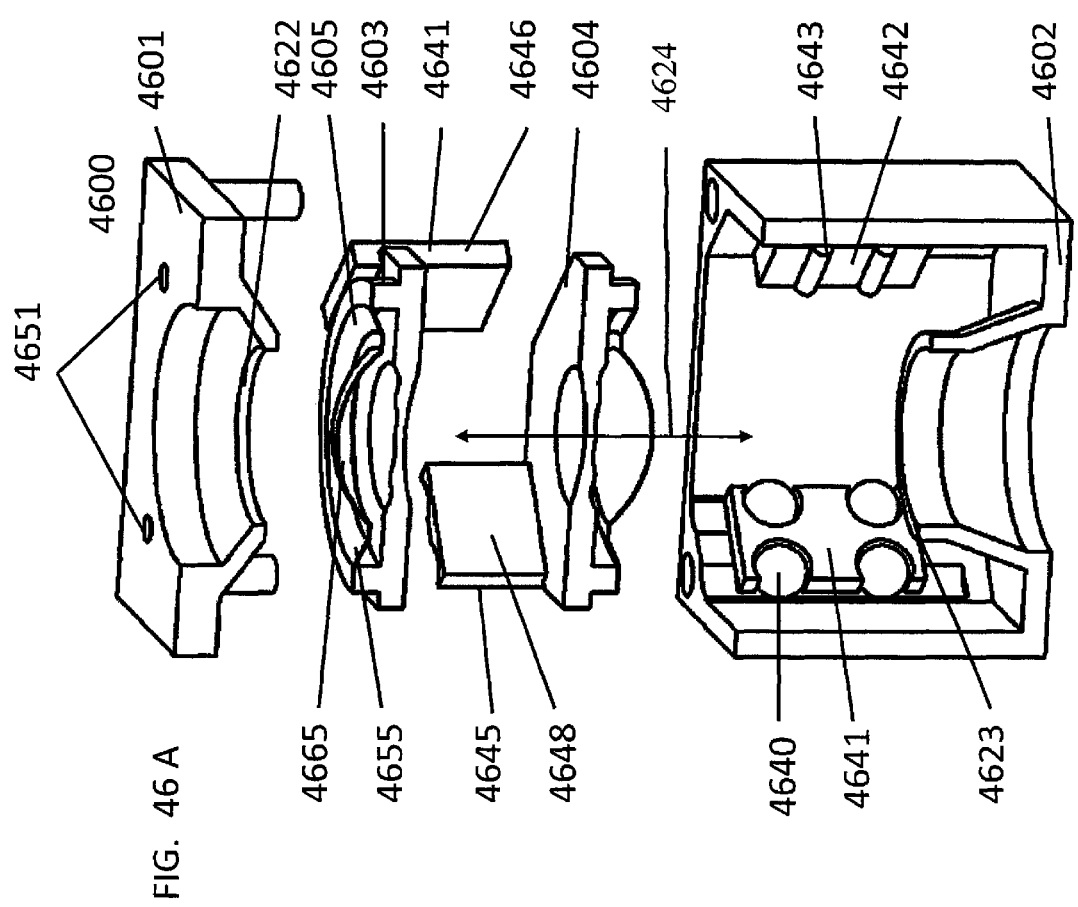

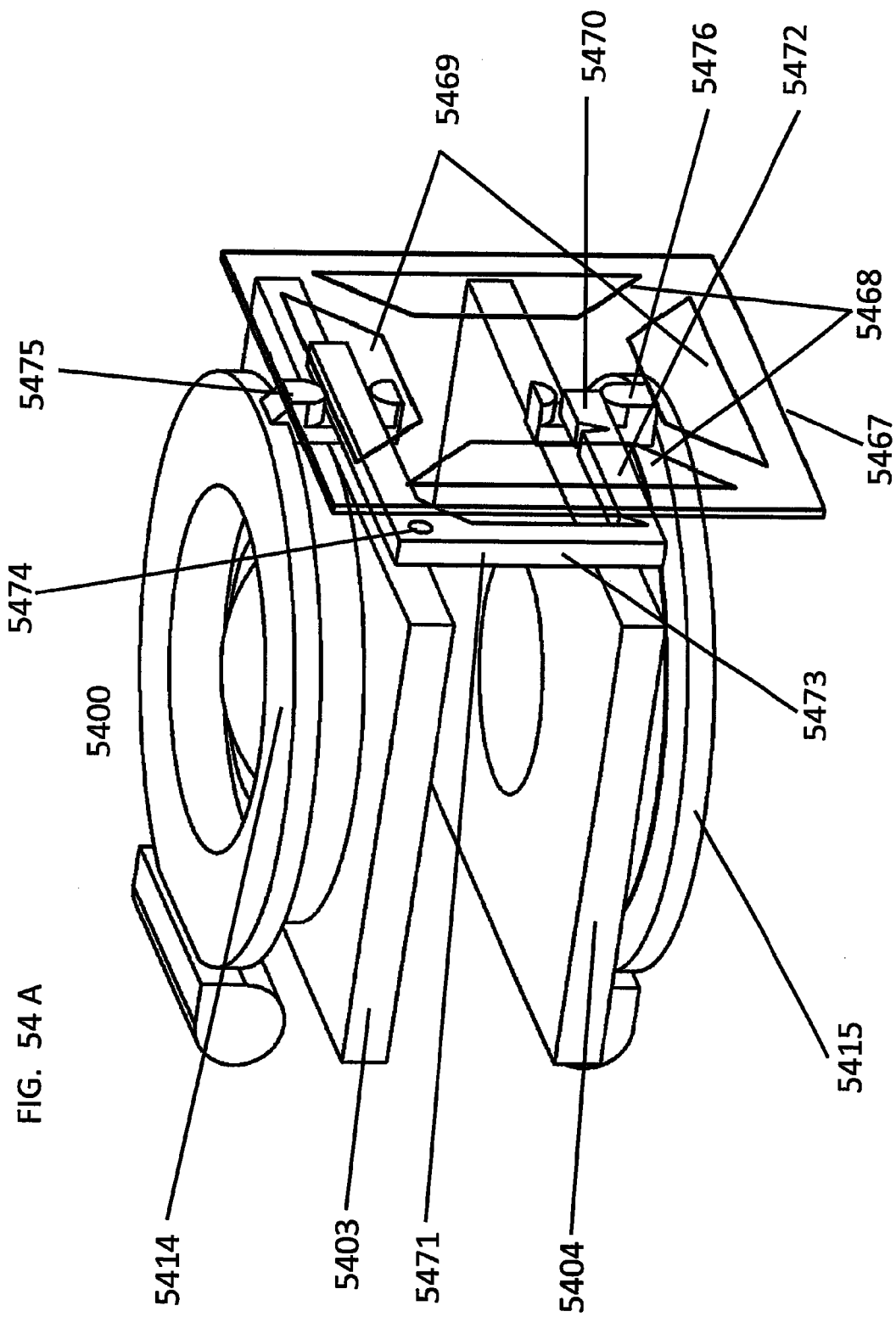

5880

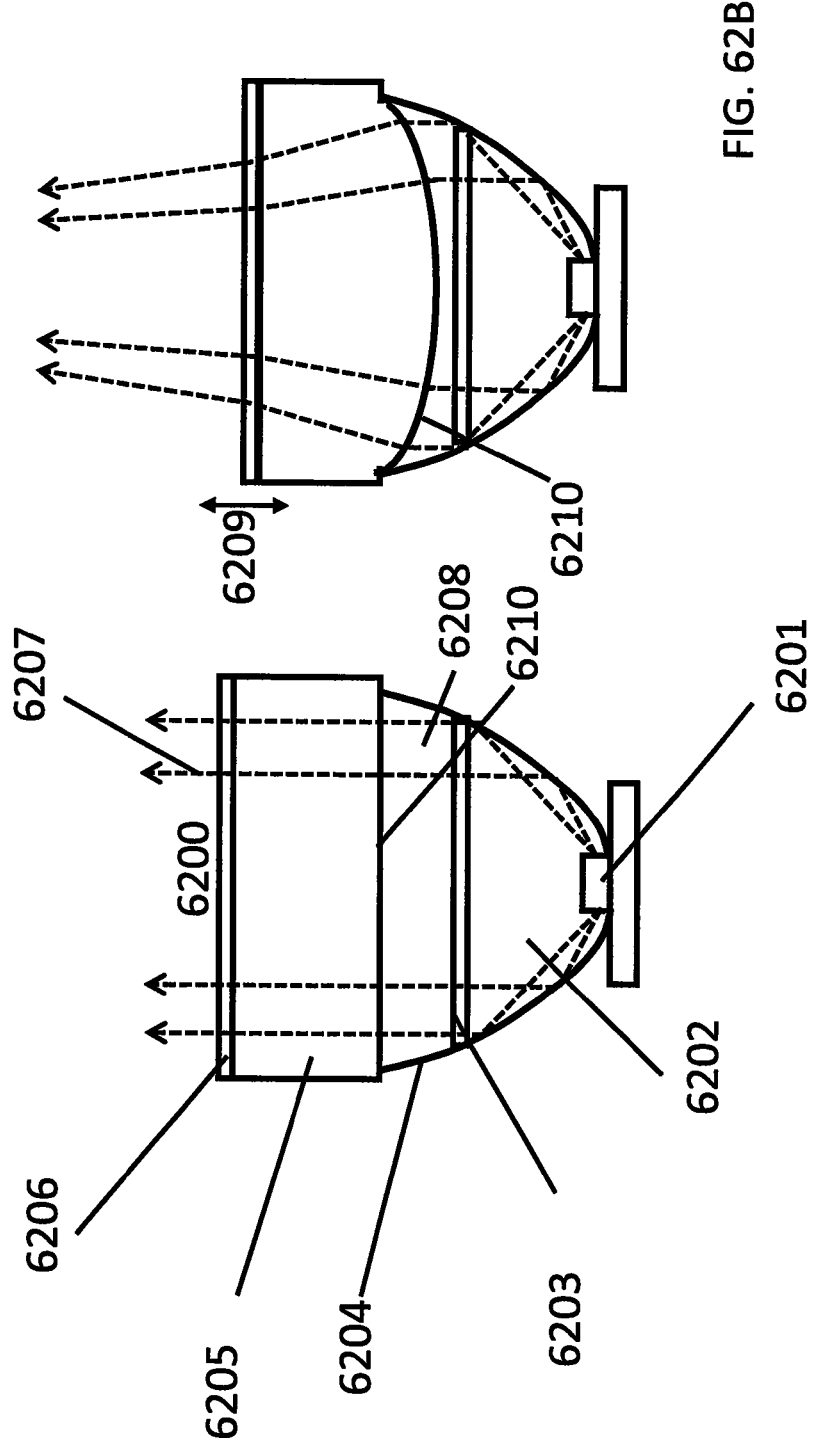

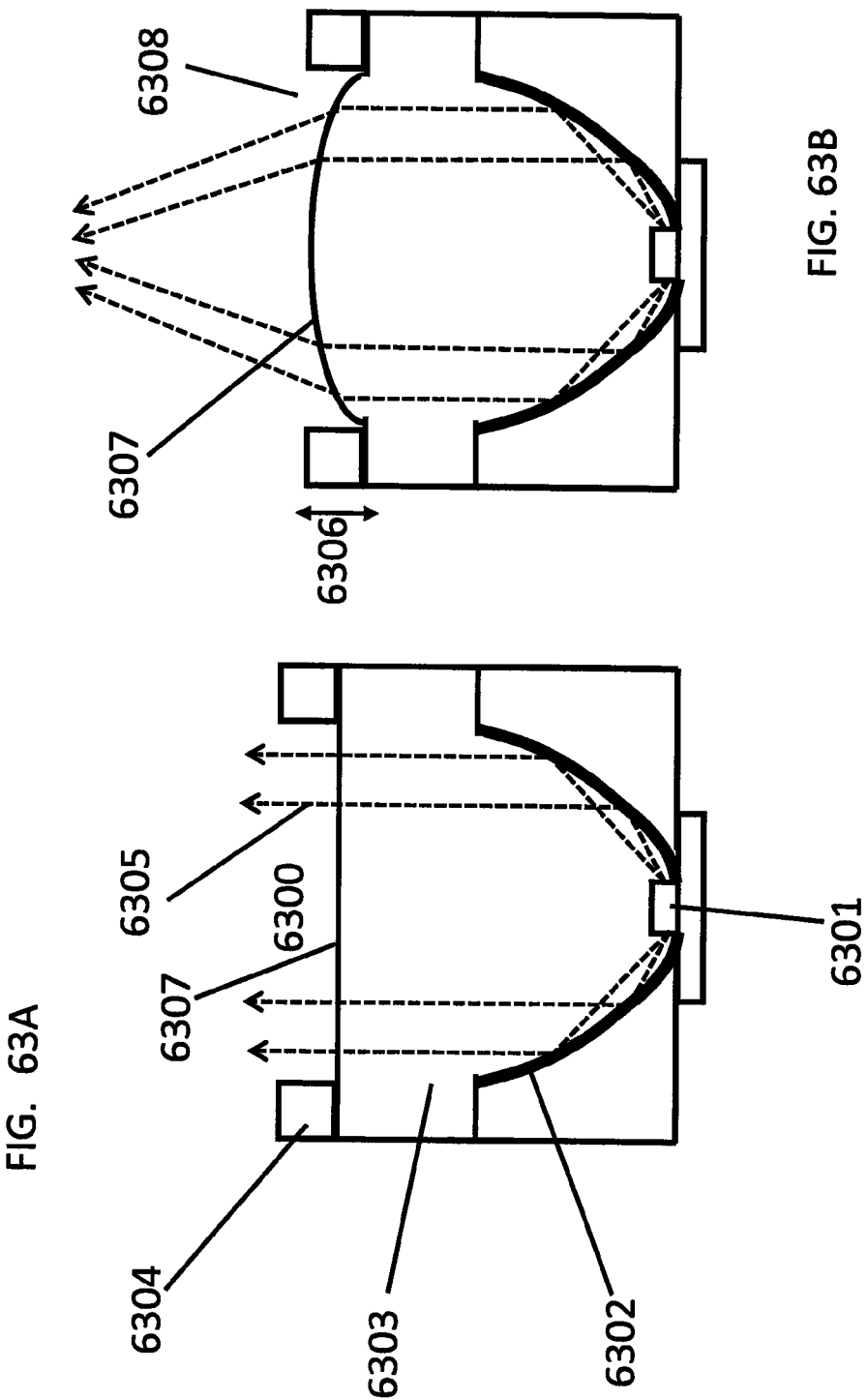

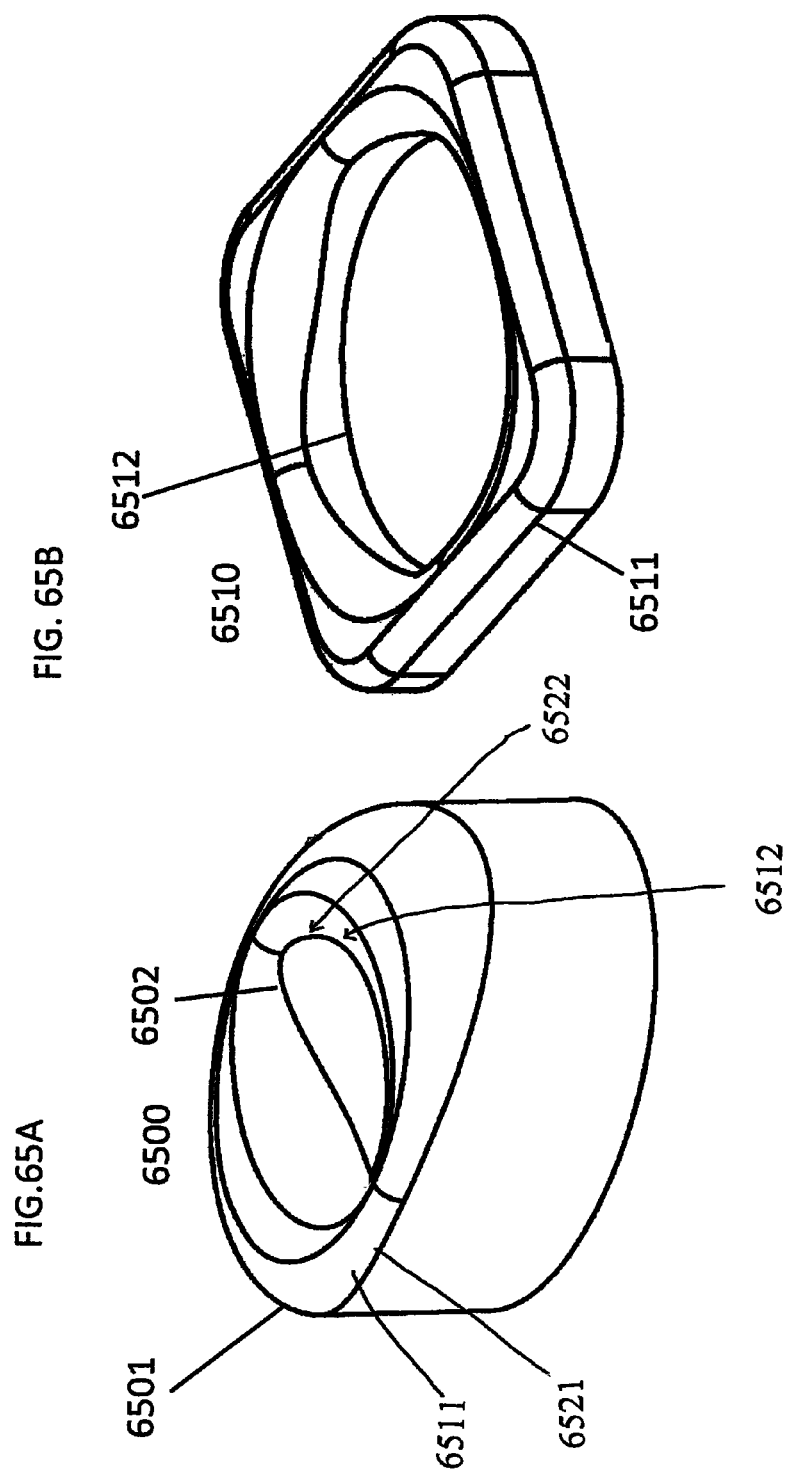

LENS ASSEMBLY APPARATUS AND METHOD

CROSS REFERENCES TO RELATED APPLICATIONS

This patent claims benefit under 35 U.S.C. §119 (e) to U.S. Provisional Application No. 61/160,041 entitled "Lens Assembly System and Method" filed Mar. 13, 2009 and U.S. Provisional Application No. 61/245,438 entitled "Lens Assembly Apparatus and Method of Operation" filed Sep. 24, 2009 the contents of both of which are incorporated herein by reference in their entireties.

TECHNICAL FIELD

This patent relates to optical apparatuses which incorporate lenses and methods of operating lenses.

BACKGROUND OF THE INVENTION

Various optical lens systems have been used over the years for different purposes. For instance, some lens systems provide for magnification of an image while other lens systems provide for zooming in on an image. Lens systems can also be used for various applications and/or in different environments. For example, a lens system may be part of a digital camera and the user may wish to zoom in on objects that are far away in order to obtain images of these objects or to focus on objects that are close. In other examples, the lens system may be part of a camera in a cellular phone or other small electronic device where the user desires to obtain nearby images.

While various types of lens systems have been employed in various applications, these previous systems suffered from several disadvantages. To take one example, due to the desired miniaturization of systems, system components need to be as small as possible. Unfortunately, previous systems had components that were bulky and miniaturization became difficult to accomplish. Previous systems also often used a wide variety of moving parts that frequently moved along an axis of the lens system. Unfortunately, these moving parts had a tendency to break requiring the replacement of system components and leading to the unreliability of these previous approaches. These systems also utilized a large number of parts and this also added to the unreliability (and cost) of these approaches. For all these reasons, previous systems were costly to produce and user satisfaction with these systems was often negatively impacted by the above-mentioned disadvantages.

BRIEF DESCRIPTION OF THE DRAWINGS

For a more complete understanding of the disclosure, reference should be made to the following detailed description and accompanying drawings wherein:

FIGS. 2A and 2B illustrates a cross-sectional view of a magnetic coil lens assembly according to various embodiments of the present invention in which a coil is positioned on both sides of a membrane;

FIG. 4 includes cross-sectional drawings that illustrate a production process for assembling a deformable lens and removing gas bubbles from a lens assembly according to various embodiments of the present invention;

FIG. 62A and FIG. 62B comprise views of a lens assembly according to various embodiments of the present invention;

FIG. 63A and FIG. 63B comprise views of a lens assembly according to various embodiments of the present invention;

FIG. 65A and FIG. 65B comprise views of a lens shaper according to various embodiments of the present invention.

Figure 1A:
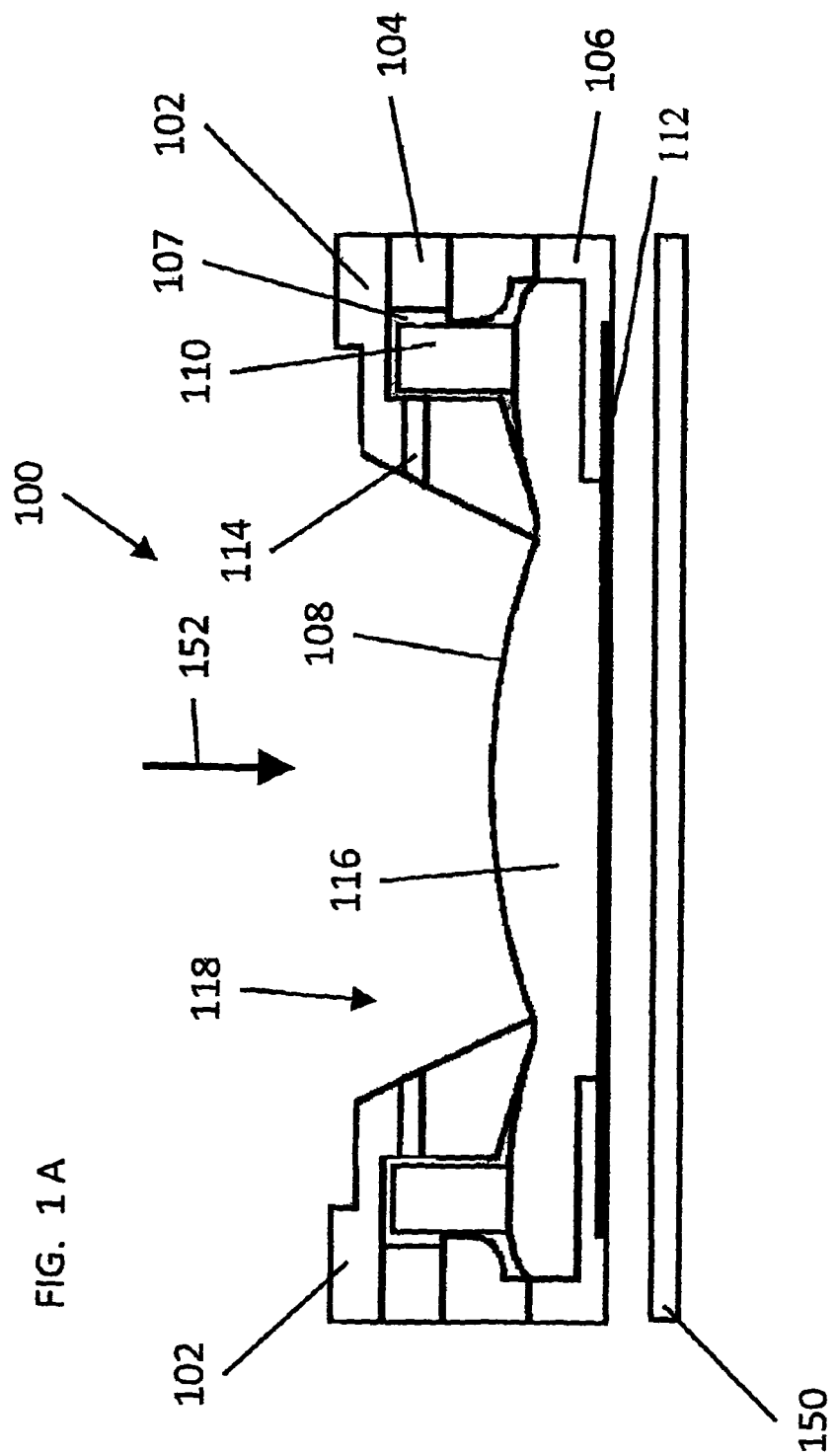
FIGS. 1A and 1B illustrate a cross-sectional view of a magnetic coil lens assembly according to various embodiments of the present invention.

Skilled artisans will appreciate that elements in the figures are illustrated for simplicity and clarity. It will further be appreciated that certain actions and/or steps may be described or depicted in a particular order of occurrence while those skilled in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION

Many of the present approaches provide a magnetic lens assembly that includes a magnetic-coil actuator (e.g., a voice coil motor) which deforms one or more membranes (e.g., a polymeric membrane) in the lens assembly. Other devices such as piezo electric devices could also be used. In many of these examples, the membrane may define at least partially one or more reservoirs that are filled with a filler material (e.g., liquid, gel, or polymer). The membrane, filler material, and a container opposite the membrane, may provide a lens. It should be noted that the term "lens" should be interpreted, in most if not all of the following embodiments—as applicable—as "a three dimensional space filled with a filler material and communicating with a reservoir." The resulting deformation of the membrane occurs via pressure provided from movement of the filler material (e.g., optical fluid) within the reservoir. Deformation of the lens alters the optical characteristics of the lens as desired or required. Consequently, miniaturization is achieved, overall part count is reduced, the number of moving parts is decreased, costs are reduced, system weight is decreased, and system reliability is increased.

In many of these embodiments, a lens assembly includes a moving coil, a flux guiding structure, one or more magnets, and a lens. The lens includes a membrane that at least partially defines a reservoir (e.g., a fluid reservoir). The coil is excited by current and a magnetic flux forms and is directed by the flux guiding structure. The flux creates an electromotive force that moves the coil. The force may be related to the strength of the magnetic field, multiplied by the length of the wire and the current flowing through the wire. The movement of the coil acts to push or pull the membrane and thereby move the filler material (e.g., fluid) within the reservoir creating a pressure and thereby deforming the shape of the membrane and overall lens. Consequently, the optical properties of the lens are altered. Put another way, the optically active area of the membrane is altered. Such lenses are sometime referred to herein as focus tunable lenses or fluid tunable lenses.

In other examples, the position of the coil is fixed. Excitation of the coil moves magnetized parts, which in turn move the membrane. Hence, the optical properties of the lens are adjusted.

A housing structure (e.g., plastic) may be used to support all or some of the assembly elements. In some examples, portions of the housing structure are pushed (or pulled) by the coil to push (or pull) the membrane. In many examples, a bobbin pushes on the membrane.

As mentioned, if a motor is employed as the actuator, the motor structure may include several members including one or more permanent magnets and a flux guiding structure having one or more parts or portions. The flux guiding structure guides and directs the magnetic field to produce an electromotive force of sufficient magnitude and direction to move the coil as desired.

Additionally, the motor structure may include various parts that provide fixturing and alignment functions for the assembly (e.g., support and definition of the shape or other properties of the membrane or other portions of the lens). In this regard, the flux guiding structure may also provide for the housing of the lens, define the lens shape, support the lens structure, define the boundary conditions of the reservoir, support the components that define the reservoir, provide structure to the assembly, and/or define one or more reservoirs. Moreover, these tasks may be performed at the same time as the flux guiding structure provides magnetic field direction and guidance.

The coil component of the magnetic lens is directly attached to or indirectly interacts with (via another element or elements such as a bobbin) the membrane, which as mentioned, is deformable. Also as mentioned, the membrane defines one or more reservoirs. These reservoirs may be filled with a polymer, gel, fluid, or ionic liquid to name a few examples of filler materials. Other examples of filler materials are possible.

In some of these examples, the coil interacts with the membrane on a side of the membrane that does not contain the filler material (e.g., a fluid). Consequently, the reservoir can be filled in a more convenient manner without entrapping air bubbles in the reservoir since edges from the coil may not exist inside the reservoir. Additionally, electrical connections between the coil and devices external to the assembly are easier to accomplish because the coil is in an air-only space.

Coil placement may vary. For example, the coil may be placed within the reservoir (e.g., within a liquid that fills the reservoir), partially within the reservoir (e.g., on both sides of the reservoir separated by the membrane), or completely outside the reservoir (on one or both sides of the reservoir). When fitted within the reservoir, the coil may also float in the reservoir. As mentioned, the coil may also be fixed in position in some of these examples.

The coil can be electrically connected to the other portions of the assembly by various approaches. For example, in one embodiment, the coil wires can be connected with the flux guiding structure, which is electrically insulated by or from the permanent magnet. In another embodiment, the wires are guided outside of the assembly through holes in the housing, magnet and/or the metal-based structure. In still another embodiment, the wires are connected to a metal structure (e.g., a metal spring), or connected or integrated to portions of the assembly (e.g., the bobbin). In yet another embodiment, the wires are guided outside through holes/slits in the assembly and fixed onto a metal structure integrated into the interior of the assembly. In other examples, the wires may be coupled to an electrically conductive membrane.

In some of these embodiments, a push approach is used where the coil (or bobbin) pushes on the membrane to achieve deformation. In other examples, a push-pull approach is used where the membrane is both pushed and pulled. The membrane and coil (or bobbin) are attached by an adhesive (e.g., glue) or any other type of fastener arrangement (e.g., screws, snap connectors, ultrasonic welding, hot melting, or the like). Pull only approaches may also be used. The determination of the type of approach used may depend upon, among other factors, the overall height desired for the assembly and a starting focus or zoom position of lenses used in the assembly.

The approaches described herein can be used to form various types of lens assemblies having any number of lenses used in any combination or order. For example, any number of the tunable lenses described herein can be used in conjunction with other optical elements or lenses to form any type of optical assembly.

The present approaches additionally provide a lens assembly that includes an electrical-to-mechanical actuation device (e.g., a piezoelectric motor or some other type of actuation device) that deforms one or more membranes in the lens assembly. In some of these embodiments, a lens (e.g., a fluid lens) is formed between or bounded by a membrane (e.g., a polymeric membrane) and a container (e.g., a glass plate, optical element, lens, or some other structure). The membrane and/or container may also define at least partially one or more reservoirs that are filled with a filler material. The reservoirs communicate with the lens (e.g., a fluid or gel lens) through holes, channels, slits, or the like and the piezoelectric motor is coupled directly or indirectly to the container. Together, the container and the membrane function to hold the filler material in the reservoir(s) section(s) and lens section(s). Actuation of the electrical-to-mechanical actuation device causes movement of the container (e.g., in the area of the reservoir) which, in turn, moves the filler material between the reservoir and the lens area to create a pressure and thereby deform the membrane. The resultant deformation of the membrane and movement of the filler material alters the optical characteristics of the lens as desired or required. Consequently, miniaturization is achieved, overall part count is reduced, the number of moving parts is decreased, costs are reduced, system weight is decreased, and system reliability is increased.

It will be understood that various types of electrical-to-mechanical actuation devices may be used in the approaches described herein to move components of the lens assembly. For example and as mentioned, piezoelectric motors may be used. However, it will be appreciated that these approaches are not limited to the use of piezoelectric motors but may, for example, include any motor or motor-like device such as miniature stepper motors or screw drive motors to name two examples. In other words, although many of the examples described herein utilize a piezoelectric motor, any other type of motor (or other electrical-to-mechanical actuation device) may also be used.

In others of these embodiments, a lens assembly includes a piezoelectric motor (or some other type of electrical-to-mechanical actuation device), a linkage structure, and a container and membrane assembly. The container and membrane assembly includes a membrane that at least partially defines one or more reservoirs (e.g., a fluid reservoir) and a lens (e.g., a fluid or gel lens) such that a liquid filler material (e.g., a fluid or gel) is able to flow or otherwise move between the reservoir(s) and the lens. The piezoelectric motor is actuated by an electrical signal. The actuation of the piezoelectric motor (and deformation of a piezoelectric material located therein) directly or indirectly pushes or pulls the linkage structure which, in turn, directly or indirectly acts on the reservoir of the lens assembly to move the filler material (e.g., optical fluid) between the reservoir and the lens. Movement of the filler material creates a pressure against the membrane and thereby deforms the shape of the membrane to alter the optical properties of the lens. A lens shaper may be attached to a portion of the membrane to form and/or define the outer perimeter of the lens. A housing structure may be used to support all or some of the assembly elements. In some examples, portions of the housing structure are pushed (or pulled) by the piezoelectric motor (or other type of electrical-to-mechanical actuation device) to push (or pull) the membrane via actuation of the linkage structure.

As mentioned, if a piezoelectric motor is employed as the electrical-to-mechanical actuation device, the piezoelectric motor structure may include several members including one or more piezoelectric elements that move a linkage structure having one or more parts or portions. More specifically, the linkage structure may include one or more elements that act to receive a mechanical force from the motor and guide and direct this force to move (e.g., push or pull) the membrane. The linkage structure may include one or more pins, paddles, rings, rods, bobbins, hinges, or pivots to name a few examples. In other examples, the separate linkage structure may be omitted and portions of the motor may act directly on the membrane.

Additionally, the linkage structure may include various parts that provide fixturing and alignment functions for the assembly (e.g., support and definition of the shape or other properties of the membrane or other portions of the lens). In this regard, the linkage structure may also provide for the housing of the lens, define the lens shape, support the lens structure, define the boundary conditions of the reservoir, support the components that define the reservoir, provide structure to the assembly, and/or define one or more reservoirs. These functions may also be at least partially provided by other elements not in the linkage structure.

As mentioned, the membrane may define the side of one or more reservoirs and a lens shape. The reservoirs and lens may be filled with a filler material such as a polymer, gel, or fluid to name a few examples of filler materials. Other examples of filler materials are also possible. The inner perimeter of the lens shaper defines the outer perimeter of the inner section of the membrane, and restrains the membrane from moving at the edge of the lens shaper.

The placement of the electrical-to-mechanical actuation device may also vary in the present approaches. For example when a piezoelectric motor is used, the piezoelectric motor may be placed within the reservoir (e.g., within a liquid that fills the reservoir), partially within the reservoir (e.g., on both sides of the reservoir separated by the membrane or container), or completely outside the reservoir (on one or both sides of the reservoir).

The electrical-to-mechanical actuation device (e.g., a piezoelectric motor) can be electrically connected to the other portions of the assembly by various approaches. For example, in one embodiment the connection wires are guided outside of the assembly through holes in the housing. In still another embodiment, the wires are connected to a metal structure (e.g., a metal spring), or connected or integrated to portions of the assembly. In yet another embodiment, the wires are guided outside through holes/slits in the assembly and fixed onto a metal structure integrated into the interior of the assembly.

In some of these embodiments, a push-only approach is used by the motor to directly or indirectly push the container (e.g., via the linkage structure) and achieve deformation of the membrane, thereby altering an optical property of the lens. In other examples, a push-pull approach is used where the container (or some other element) is both pushed and pulled. Attachment of the motor, the container, and the linkage structure may be accomplished via various approaches such as by an adhesive (e.g., glue) or any other type of fastener arrangement (e.g., screws, nails, or the like). Pull-only approaches may also be used. The determination of the type of approach used to move the container (and achieve lens deformation) may depend upon, among other factors, the overall height desired for the assembly and a starting focus or zoom position of lenses used in the assembly.

In many of these embodiments, an optical apparatus includes a first membrane, a second membrane, and at least one electromagnetically displaceable component. The first membrane includes an optically active area. The first membrane and the second membrane are coupled by a filler material disposed in a reservoir. The at least one electromagnetically displaceable component is coupled to the filler material via the second membrane, such that a displacement of the at least one electromagnetically displaceable component is operative to cause a deformation of the optically active area of the first membrane by movement of the filler material.

The filler material may be a liquid, an ionic liquid, a gel, a gas, and a polymer. Other examples of filler materials are possible. In some aspects, the filler material and the membrane are the same material.

In one example, the electromagnetically displaceable component includes a coil. In another example, the electromagnetically displaceable component includes at least one magnet. In some examples, the electromagnetically displaceable component is constructed from a magnetically soft material.

In some approaches when a coil is used, applying the current to the electrical coil is operative with a magnetic field to create an electromotive force and to move the electrical coil in a generally axial direction with respect to the optical axis of the lens. In some aspects, the coil is stationary with respect to the container and the at least one magnet is movable with respect to the coil.

In yet other embodiments, the electromagnetically displaceable component is mechanically coupled to the second membrane, such that a deformation of the second membrane results in a deformation of the first membrane by movement of the filler material. In some other examples, the electromagnetically displaceable component is attached to the second membrane section by an attachment mechanism such as by mechanical adhesion, chemical adhesion, dispersive adhesion, electrostatic adhesion and diffusive adhesion.

In other aspects, the electromagnetically displaceable component delimits at least one of the first membrane and the second membrane. In still other examples, the first membrane and the second membrane are delimited from each other by a lens shaper. In some approaches, the lens shaper comprises a circular opening which defines the shape of the optically active area of the first membrane.

In some of these examples, the at least one electromagnetically displaceable component is positioned on either side of the second membrane. In other approaches, the second membrane laterally surrounds the first membrane. In yet other examples, the electromagnetically displaceable component laterally surrounds the first membrane.

In some of these approaches, at least one of the first membrane or the second membrane are arranged in a pre-stretched manner. In other aspects, the membrane is at least partially constructed from at least one material such as gels, elastomers, thermoplast, and duroplast. Other examples of materials can be used to construct the membrane.

In other aspects, the coil comprises a bobbin, which is attached to the second membrane and an electrically conductive wire, which is arranged on the bobbin. In some approaches, the bobbin is constructed from a rigid material.

In still other aspects, the coil operates to interact with a magnetized structure. In some of these examples, the magnetized structure comprises at least one magnet. The magnetized structure comprises a flux guiding structure and the flux guiding structure may be constructed from a magnetically soft material. In some aspects, a periphery of the magnetized structure is substantially rectangular in shape.

The optical apparatus so constructed can be used in a wide variety of systems such as optical focusing systems, zoom systems, and illumination systems. Other examples of systems are possible.

In others of these embodiments, an optical apparatus includes at least one electromagnetically displaceable component and a continuous membrane. The membrane has a first membrane section and a second membrane section and the second membrane section extends from the first membrane section. The first membrane section and the second membrane section are coupled via a filler material. A displacement of the at least one electromagnetically displaceable component causes movement of the second membrane section, thereby causing movement of the filler material that deforms at least a part of the first membrane section.

In some aspects, the filler material is a deformable material. In other aspects, the electromagnetically displaceable component includes a coil. In still other aspects, the electromagnetically displaceable component includes a magnet. In yet other aspects, the electromagnetically displaceable component is constructed from a magnetically soft material.

In some of these examples, the electromagnetically displaceable component is attached to the second membrane section by an attachment mechanism such as by mechanical adhesion, chemical adhesion, dispersive adhesion, electrostatic adhesion and diffusive adhesion.

In other aspects, the electromagnetically displaceable component delimits at least one of the first membrane section and the second membrane section. In some examples, the first membrane section and the second membrane section are delimited from each other by a lens shaper. In some approaches, the lens shaper comprises a circular opening which defines the shape of the optically active area of the first membrane section. In other examples, the electromagnetically displaceable component surrounds the first membrane section.

In other aspects, at least one of the first membrane section and the second membrane section may be arranged in a pre-stretched manner. The membrane may be at least partially constructed from at least one material selected from gels, elastomers, thermoplast, and duroplast. Other examples of materials are possible.

In other examples, the coil is coupled to a bobbin which is attached to the second membrane. When a bobbin is used, the bobbin may be constructed from a rigid material.

In some aspects, the coil operates to interact with a magnetized structure. In some approaches, the magnetized structure comprises at least one magnet. In other aspects, the magnetized structure comprises a flux guiding structure. The flux guiding structure may be constructed from a magnetically soft material.

In some examples, the electromagnetically displaceable component is part of a motor system. In some approaches, a periphery of the motor system is substantially rectangular in shape.

The apparatus may be used in a wide variety of different systems. For example it may be at least part of an optical focusing system, zoom system, and illumination system. Other examples of systems are possible.

In yet others of these embodiments, an optical apparatus includes at least one actuator element, a mechanical linkage element, a lens, a reservoir in communication with the lens, a membrane, and a container. The membrane and the container at least partially enclose a filler material and the membrane is coupled to the mechanical linkage element. Electrical excitation of the at least one actuator element is operative to causes a plurality of movements of the at least one actuator element. Each of the plurality of movements occurs over a first distance, and the plurality of movements of the at least one actuator element are operative to move the mechanical linkage element a second distance. The second distance is substantially greater than the first distance, and the movement of the mechanical linkage element causes a displacement of the membrane and the filler material. The displacement of the filler material alters at least one optical property of the lens.

In some aspects, the at least one actuator element includes a piezo actuator element. The piezo actuator element may be part of a piezo motor.

In other aspects, the actuator element is at least part of one of a piezo motor, stepper motor, voicecoil motor, screw drive motor, microelectromechanical system motor, or magnetostrictive motor. In yet other aspects, the filler material and the membrane are constructed from the same material. In some examples, the membrane is arranged in a pre-stretched manner. In some approaches, the membrane is at least partially constructed from at least one material such as gels, elastomers, thermoplast, and duroplast.

The apparatus may be at least part of one of an optical focusing system, zoom system, and illumination system. Other examples of systems are possible.

In others of these embodiments, a motor includes a first magnet; a first coil placed proximate to the first magnet; a second magnet; a second coil placed proximate to the second magnet; a first flux which is generated by the first magnet; a second flux generated by the second magnet; and a third flux which is generated by both the first and second magnet. A current excitation of the first coil is operative with the first and third flux to create a sufficient force to displace the first coil with respect to the first magnet and excitation of the second coil is operative with the second and third flux to create a sufficient force to displace the second coil with respect to the second magnet. At least some of the first flux, the second flux, or the third flux passes through a deformable optical element.

In some aspects, a flux guiding structure is arranged such that the flux guiding structure increases the flux density at the first coil and the second coil and the flux guiding structure optimizes the force. In other examples, the third flux is a significant portion of the total flux and increases the flux density at the coils. In some approaches, the first coil is mechanically coupled to an optical element. The motor may also include at least one additional magnet configured to increase the flux density at the coils.

In others of these embodiments, an optical apparatus includes a deformable lens, a first reservoir, an optical sensor, and a motor. The first reservoir communicates with the deformable lens. The optical sensor receives light which passes through the deformable lens. The motor includes a first magnet; a first coil placed proximate to the first magnet; and a first flux which is generated by the first magnet wherein the first flux flows through a first coil and interacts with current in the first coil to create a force. A portion of the motor is positioned between the first reservoir and the optical sensor. In other examples, the optical apparatus further includes a second reservoir and a portion of the motor is positioned between the first reservoir and the second reservoir.

In still others of these embodiments, an optical apparatus includes a semi-permeable membrane, a container, a lens, and a filler material. The lens is defined by the semi-permeable membrane and the container. The filler material is disposed within the lens and contained therein by the membrane and the container. The semi-permeable membrane is at least partially constructed from a material that is permeable to gases but substantially impermeable to the filler material and the gases residing within the lens diffuse through the membrane when the lens is closed by the membrane and the container. The optical properties of the optical apparatus are changed by deforming the filler material.

The optical apparatus may further include a mechanically displaceable component that is mechanically coupled to the semi permeable membrane. In some examples, the semi-permeable membrane has physical properties wherein at least approximately 90% of the gas trapped between the semi-permeable membrane and the container diffuses through the semi-permeable membrane within less than approximately 24 hours when a pressure difference of approximately one atmosphere exists across the semi-permeable membrane. Other examples are possible.

In others of these embodiments, an optical apparatus includes a deformable lens, a motor, and a mechanical linkage. The deformable lens has an optical axis and the mechanical linkage is actuated by the motor and coupled to the deformable lens through a filler material, such that an interface exists between the mechanical linkage structure and the filler material. The interface substantially surrounds the optical axis.

In some examples, the motor moves a first distance and the first distance is less than a peak displacement of the deformable lens. In other examples, the motor moves in an axial direction. In some examples, the mechanical linkage disposed at the interface between the filler material and the mechanical linkage is substantially non-deformable.

In other aspects, the mechanical linkage structure provides a non-deformable surface at the interface. The filler material provides a deformable area adjacent to the interface. The non-deformable surface is in a range from approximately 25 percent to approximately 900 percent of the deformable area. In some examples, the mechanical linkage also includes a bobbin which is attached to an electrically conductive coil.

In others of these embodiments, an optical apparatus includes an actuator device, a lens, a reservoir, a membrane, and a container. The actuator device includes at least one piezo motor and the at least one piezo motor has a first portion and a second portion and a piezo actuator and the second portion is movable with respect to the first portion and coupled to a linkage structure. The reservoir is in communication with the lens. The membrane and a container at least partially enclose the filler material within the lens and reservoir and the membrane is mechanically coupled with the linkage structure. Excitation of the at least one piezo motor is operative to move the second portion of the at least one piezo motor to move the linkage structure and cause a displacement of the membrane and the filler material. The displacement of the filler material alters at least one optical property of the lens.

In still others of these embodiments, an optical apparatus includes at least one piezo motor, a lens, a reservoir, a membrane, and a container. The reservoir is in communication with the lens. The membrane and a container at least partially enclose a filler material within the lens and reservoir. A linkage member is coupled to the at least one piezo motor and the membrane and the linkage member is rotatable about a hinge. Excitation of the at least one piezo motor is operative to rotate the linkage member about the hinge and create a substantially axial directed force that is operative to cause a displacement of the membrane and the filler material. The displacement of the filler material altering at least one optical property of the lens.

In still others of these embodiments, an optical apparatus includes a housing, a deformable lens, a lens shaper, a first mechanism, and a second mechanism. The lens shaper defines the shape of the deformable lens. The first mechanism is positioned within the housing to adjust an optical property of the deformable lens. The second mechanism is positioned within the housing to adjust an optical property of the deformable lens. The second mechanism is at least one of an electromechanical actuator or motor and the first mechanism and the second mechanism are different types of mechanisms.

In some examples, the first mechanism utilizes one or more components such as screws, threads, and mechanical positioning. Other examples are possible.

In some approaches, the optical apparatus may further include a locking mechanism which prevents the first mechanism from further adjusting an optical property of the deformable lens. In other approaches, one or more elements of the locking mechanism may involve at least one of a process such as application of adhesive, welding, clamping and heat staking.

In some aspects, the first mechanism is removable from the housing. In other aspects, the deformable lens is at least partially defined by a container. In still other aspects, deformation of the deformable lens causes a change in the optical property of the deformable lens.

In other aspects, the first mechanism changes a position of the lens shaper with respect to the container which causes the deformable lens to deform, thereby changing the optical property of the deformable lens. In other examples, the optical apparatus further includes a membrane and the first mechanism acts to change an initial tension of at least a portion of the membrane.

In still others of these embodiments, an optical apparatus includes a displacement mechanism, a container, and a lens shaper. The container at least partially encloses a filler material and the filler material at least partially defines a plurality of deformable lenses. The displacement mechanism is capable of changing an optical property of at least one of the plurality of deformable lenses.

In other examples, the apparatus further includes a membrane and the membrane at least partially encloses the filler material. In other examples, the apparatus further includes at least one light source which interacts with at least one of the plurality of deformable lenses. The light source is an element such as a light emitting diode, a laser, a halogen lamp, or a discharge lamp. In still other examples, the apparatus further includes a reflector in communication with one or more of the plurality of deformable lenses. The optical apparatus may be used for illumination purposes.

In others of these embodiments, an optical apparatus includes a light source and a reflector. The light source emits light rays and the reflector redirects parts of the light rays emitted by the light source onto a deformable lens, which receives both light rays directly emitted by the light source, and also receives the light rays redirected by the reflector. An actuation mechanism is coupled to the deformable lens and is operative to cause a deformation of the deformable lens, causing a change in the optical properties of the optical apparatus.

In some aspects, the deformable lens is constructed from at least one material such as a gel and a polymer. Other examples are possible. In other aspects, the light source is an element such as a light emitting diode, a laser, a halogen lamp, and a discharge lamp. Other examples of light sources are possible. In still other examples, the reflector is an element such as a free-form metal, mirror, free-form plastic. Other examples of reflectors are possible. In other examples, the optical apparatus further includes at least one rigid optical element such as a filter, a lens, a diffuser, a grating, a micro-structure, and a mirror.

In other aspects, the deformation of the deformable lens is caused by a movement of the rigid optical element towards the light source. In still other aspects, the deformation of the deformable lens is caused by a displacement of a lens shaper.

In some examples, the deformable lens is constructed from a first deformable material which is at least partially surrounded by a deformable membrane. In some approaches, the first deformable material is at least one material such as gas, liquid, ionic liquid, gel, and polymer.

The actuation mechanism may include a variety of different mechanisms. For example, the actuation mechanism may be a manual or an electromechanical mechanism.

In some examples, the deformable lens is coupled to the reflector. In other examples, a plurality of optical apparatuses may be arranged so as to form an optical system (e.g., a system for illumination).

In still others of these embodiments, an optical apparatus includes a first deformable lens, a first reservoir, a first container, a second deformable lens, a second reservoir, a second container, and an electromechanical actuation device. The first reservoir is in communication with the first deformable lens by means of a first filler material. The first container at least partially encloses the filler material within the first deformable lens and the first reservoir. The second reservoir is in communication with the second deformable lens by means of a second filler material. The second container at least partially encloses the filler material within the second deformable lens and the second reservoir. The electromechanical actuation device is operative in a plurality of directions and at least one direction of the electromechanical actuation device is operative to change one optical property of the first deformable lens. The second direction of the electromechanical actuation device is operative to change one optical property of the second deformable lens.

In still others of these embodiments, an optical apparatus includes a deformable lens, a lens shaper, a support member, and a membrane. The lens shaper at least partially defines a shape of the deformable lens. The lens shaper and the support member clamp the membrane such that the membrane is always (or substantially always) in contact with the lens shaper. The deformable lens can have a convex or a concave shape, and the lens shaper and the support member are stationary with respect to each other.

In yet others of these embodiments, an optical apparatus includes a lens shaper, a support member, and a membrane. The lens shaper surrounds an opening in the lens assembly and has an inner ring portion and an outer portion, the inner ring portion extending from the outer portion in a generally axial direction. The membrane is generally disposed between the lens shaper and the support member. The membrane is flexible and deforms across the opening in the optical apparatus. The membrane has a radius that varies based upon the shape of the membrane, and the radius is selectively adjustable. The membrane radially extends from the opening so as to be in contact with the inner ring portion of the lens shaper.

In still others of these embodiments, an optical apparatus includes a deformable lens, a lens shaper, and a first detachment point. The deformable lens defines at least by a first membrane and a filler material. The deformable lens is in contact with the lens shaper at a contact region, and not in contact with the lens shaper at a non-contact region. The first detachment point is defined as the interface between the contact region and the non-contact region. The first detachment point defines a diameter of the deformable lens. The shape of the lens shaper allows for a location of the first detachment point to vary with deformation of the deformable lens, such that the diameter of the deformable lens varies with the location of the first detachment point. In some examples, an axial position of the detachment point varies with the deformation of the deformable lens.

In others of these examples, the optical apparatus further includes a first support member; a second membrane which is a subset of the first membrane that is in contact with the lens shaper at the contact region; a third membrane which is connected with an end of the second membrane and the first support member; a second detachment point which is located at a connection point between the second membrane and the third membrane; a first theoretical line which is tangent to the lens shaper at the first detachment point and a second theoretical line which is tangent to the lens shaper at the second detachment point; and a connection angle defined as an angle between the first theoretical line and the second theoretical line and is a supplementary angle to an angle that contains a majority of the lens shaper. A connection angle positive sense is defined as being in a direction from the second theoretical line through the first theoretical line and towards the lens shaper wherein the connection angle does not span across the lens shaper. The absolute value of the connection angle is between 0 and 180 degrees.

In some examples, only frictional forces are used to hold the first membrane to the lens shaper.

In still other examples, the apparatus further includes a second lens shaper, and a third lens shaper. Deformation of the deformable lens causes the lens shaper to shift from the second lens shaper to the third lens shaper and changes the diameter of the deformable lens.

In still other examples, the optical apparatus further includes a second lens shaper and a third lens shaper. Deformation of the deformable lens causes the detachment point to shift from the second lens shaper to the third lens shaper and changes an axial position of the deformable lens.

In still others of these embodiments, an optical apparatus includes a deformable lens, a lens shaper, and an actuation device. The deformable lens is capable of assuming a plurality of shapes. The lens shaper at least partially defines a shape of the deformable lens. The actuation device is capable of changing at least one optical property of the deformable lens. An inner surface of the lens shaper extends from a first face and has a first perimeter having a first shape and extends to a second face having a second perimeter having a second shape. The first shape and the second shape are different. The shape of the deformable lens can be defined by the first face of the lens shaper or the second face.

In some examples, the first face of the lens shaper is substantially circular and the second face of the lens shaper is substantially non-circular. In other examples, the first face of the lens shaper is substantially non-circular and the second face of the lens shaper is substantially non-circular.

The approaches described herein can be used to form various types of lens assemblies having any number of lenses or other optical components used in any combination. For example, any number of the tunable lenses described herein can be used in conjunction with other optical elements or lenses to form any type of lens assembly to achieve any optical purpose or function. Additionally, the assembly may be combined with other focus tunable and non-focus tunable lenses, filters and any other combination of optical systems, including mirrors, gratings, prisms, shutters, image stabilizers and apertures. Any of the tunable or focus adjustable lenses described herein can be incorporated into a system according to any approach described in the application entitled "Zoom Lens System and Method" having U.S. application Ser. No. 12/720,113 filed Mar. 9, 2010, now U.S. Pat. No. 8,659,835 issued Feb. 25, 2014, the contents of which are incorporated herein in their entirety.

Figure 1B:
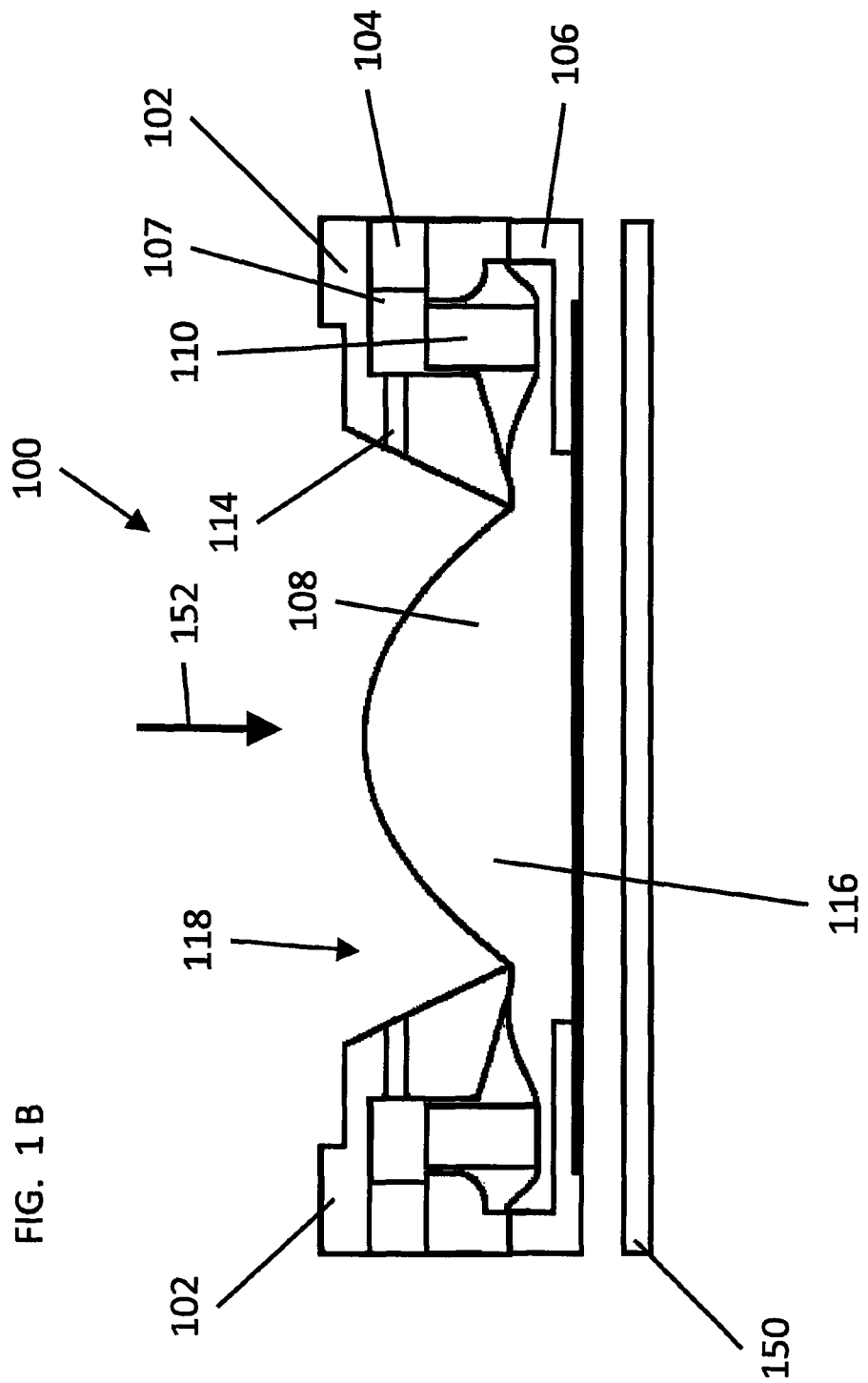

Referring now to the figures and particularly FIGS. 1a and 1b, one example of a lens assembly 100 is described. The lens assembly 100 includes a flux guiding structure 102, a magnet 104, a plastic holder 106, an optical membrane 108, a coil 110 (disposed in a chamber 107), a bottom plate 112 (e.g., a glass plate), and a vent 114. The assembly forms a central opening 118, which is filled with air. A cover (e.g., a glass cover and not shown) may be placed on the top of the assembly to protect the internal components from debris and/or provide other optical functions. The central opening 118 extends in an axial direction (in the direction of the z-axis) through the assembly 100. Light rays 152 representative of an image move through the central opening 118 in the lens structure in the axial direction. Once acted on by the components of the lens structure, a sensor 150 (e.g., a charged coupled device (CCD)) or CMOS device receives and senses the image.

As described elsewhere herein, the flux guiding structure 102 provides a path for magnetic flux provided by the permanent magnet 104 created by excitation of the coil 110. The flux guiding structure 102 may be composed of any suitable paramagnetic material such as metal and in particular iron. More specifically, a magnetically soft iron, steel, or Ni—Fe material may be used. Other examples of metals and other compositions of materials are possible.

The optical membrane 108 and bottom plate 112 form and define a lens and a reservoir 116. Different filler materials (e.g., fluid, gas, gel, or other materials) can be used to fill the reservoir 116. The refractive indexes of the filler materials used to fill the reservoir 116 may also vary. In one example, a fluid is used as the filler material and the refractive index of the fluid in the reservoir 116 is selected to be different from the refractive index of the air in the opening 118. The bottom plate 112 may be constructed from glass and provide optical correction functions. Also, the plate 112 may prevent debris from entering the assembly 100.

The optical membrane 108 separating the upper and lower part of the lens is made of flexible material. The central section of the membrane and the actuator (torus) section (where the coil 110 is attached) may be made of the same membrane material. However, in other examples the actuator section of the membrane and the central/optical section are constructed of different membrane materials. The properties of the membrane and/or the filler materials (e.g., an optical fluid) combine to provide reflective, refractive, diffractive, and absorptive, and/or color filtering functions. Other functions may also be provided by the membrane 108 and/or the filler material in the reservoir 116. An optional top plate (not shown) may be used to cover the top of the assembly 100.

The coil 110 is any wound wire coil structure and can be configured in a variety of different ways. For example, the coil 110 may be a single coil or a double coil. The wire in the coil 110 may also be of any suitable gauge or diameter. The coil 110 may be attached to the membrane with any type of adhesive or fastener (e.g., glue).

The magnet 104 is any suitable permanent magnet that is polarized in a direction that creates the desired flux flow. For example, the magnet 104 may be magnetized in an axial angle of zero degrees with respect to the optical axis. Other magnetization or polarizations and angular directions for the magnetization of the magnet 104 may be provided. The magnet 104 may be a single ring-shaped magnet or alternatively, be constructed from several segments.

The holder 106 may be composed of any suitable material. In one example, it is constructed of a plastic (e.g., the holder may be a plastic or the like). The holder 106 supports some or all of the remaining members of the assembly 100.

As mentioned, the shape of the overall lens (e.g., including the membrane 108 and reservoir 116) can be varied depending upon the optical function desired. For example, spherical lenses (e.g., convex and concave), aspherical lenses (e.g., convex and concave), cylindrical lenses (e.g., defined by a square housing instead of round), flat lenses, micro lenses (e.g. a micro lens array or a diffraction grating), and lenses which include an antireflection coating (e.g., a nano structure) that are integrated or attached to the optically active section of the lens can be provided. Other types of lenses are possible.

In the example of FIGS. 1*a* and 1*b*, the filler material (e.g., an optical fluid) is retained in the reservoir 116 on one side by the flexible membrane 108 and on the other side by a rigid material, for example, by a plate 112 (e.g., a correction glass plate). However, in other examples, both sides of the reservoir are encased by a separate membrane (i.e., two flexible membranes and one motor structure).

The vents 114 allow air to flow in and out of the chamber 107 as the coil 110 moves within the chamber. To take one example, as the coil 110 moves downward, air enters the chamber 107 and as the coil moves upward, air exits the chamber 107.

The assembly 100 may be stacked in any combination with the above-described focus tunable lens, such as, for example, with other focus tunable and non-focus tunable lenses, filters and any other combination of optical systems, including mirrors, gratings, prisms, and apertures. The assembly 100 be used with or include other elements as well.

In one example of the operation of the system of FIGS. 1*a* and 1*b*, application of a current through the coil 110 results in a movement of the coil 110 (e.g., up or down, depending on the direction of the current). The amount and direction of current provided may be controlled by any number of devices or approaches. For example, a user may manually press a switch, button, or other actuator to control current flow. In another example, current flow may be controlled by a program or algorithm (e.g., an autofocus or zoom program or algorithm), which adjusts automatically the current flow supplied to the coil 110.

More specifically, in FIG. 1*a*, the current is zero amperes and the coil is in a first position. Referring now to FIG. 1*b*, current is applied to the coil 110 and the resultant interaction of the current and the magnetic field of the magnet 104 creates an electromotive force that moves the coil 110 from the first position to a second position in an axial direction (along the z-axis). Movement of the coil 110 to the second position pushes the membrane 108 and this pressing of the membrane 108 displaces the filler material (e.g., optical fluid) in the reservoir and moves the membrane 108 from a first position (as shown in FIG. 1A) to a second position (as shown in FIG. 1B). Consequently, the shape of the lens section (e.g., the membrane 108 and the plate 112 and the filler material) changes. Changing the shape of the lens alters the optical properties of the lens. Inhomogeneous material thickness or hardness for the membrane 108 may also be used to alter the optical properties of the lens.

Figure 2B:
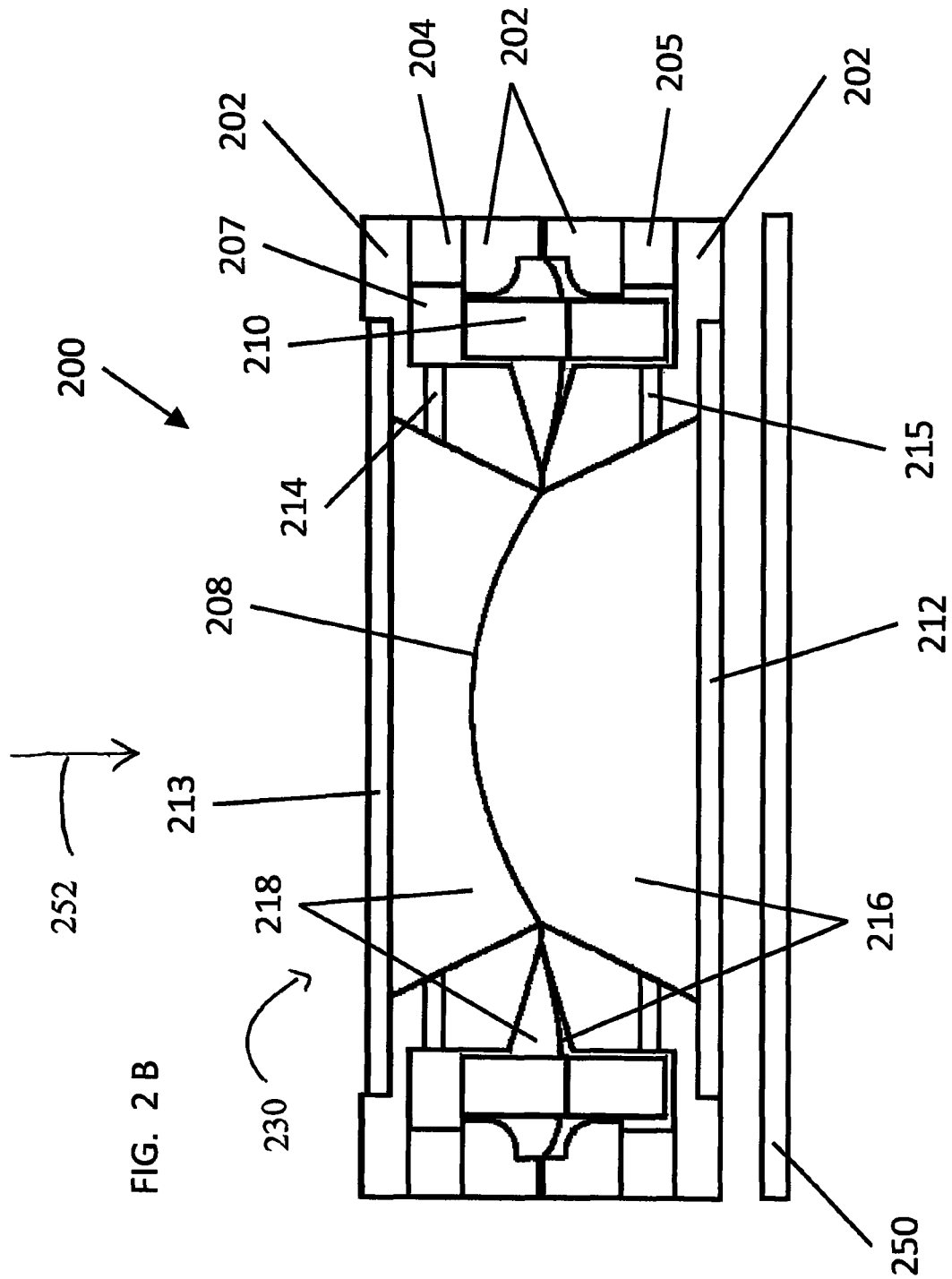

Referring now to FIGS. 2*a* and 2*b*, another example of a lens assembly 200 is described. The lens assembly 200 includes a flux guiding structure 202, a first magnet 204, a second magnet 205, a membrane 208, a coil 210 (disposed in a chamber 207), a bottom plate 212 (e.g., a glass or polycarbonate plate), a top plate 213 (e.g., a glass plate), and vents 214 and 215. The top plate 213 and membrane 208 define a first reservoir 218 and the bottom plate 212 and membrane 208 form a second reservoir 216. Each of the reservoirs 216 and 218 are filled with a filler material such as a liquid, gel, or some other filler material. A support structure (e.g., a plastic component and not shown in FIGS. 2*a* and 2*b*) may support all or some of the elements of the assembly 200. The vents 214 allow air to flow in and out of the chamber 207 as the coil 210 moves within the chamber 207. A central opening 230 extends in an axial direction (in the direction of the z-axis) through the assembly 200. Light rays 252 representative of an image move through the central opening 230 in the lens structure in the axial direction. Once acted on by the components of the lens structure, a sensor 250 (e.g., a charge coupled device (CCD)) receives and senses the image.

In this example, the coil 210 is attached on both sides of the membrane 208. Attachment may be made by any adhesive or fastener arrangement (e.g., glue). This allows, for example, an operation that requires merely pushing on the membrane 208 rather than pulling the membrane, to thereby shift or tune the lens from a convex shape to a concave shape. Accordingly, the support structure (e.g., the bobbin) may not need to be glued or otherwise attached onto the membrane 208. To prevent gravitational effects, both sides of the reservoirs 216 and 218 are filled with a filler material (e.g., liquids) having similar densities, but with different indices of refraction.

As described elsewhere herein, the flux guiding structure 202 provides a path for magnetic flux created by the permanent magnet and interacting with the magnetic fields of the coils 210. The flux guiding structure 202 may be composed of any suitable metal such as iron. Other examples of magnetically soft materials or other compositions are possible.

In the example of FIG. 2A and FIG. 2B, the optical membrane 208 separates the upper and lower part of the lens is made of flexible material. The central section of the membrane 208 and the actuator (torus) section (where the coil 210 is attached) may be made of one membrane material. However, in other examples the actuator section of the membrane and the central/optical section are constructed of different membrane materials. As with the example of FIG. 1A and FIG. 1B, the membrane or the filler material (e.g., an optical fluid) can combine to provide various reflective, refractive, diffractive, and absorptive, or color filtering properties for the system. Other properties may also be provided.

The coil 210 is any wound wire coil and can be configured in a variety of different ways. For example, the coil 210 may be a single coil or a double coil. Additionally, the wire in the coil 210 may be of any suitable gauge or diameter. The magnets 204 and 205 are any suitable permanent magnets that are polarized in a direction that creates the desired flux flow (e.g., the magnets may be radially or axially polarized).

The holder (not shown) may be composed of any suitable material. As mentioned, the holder may be a plastic part or similar arrangement. In one example, it is constructed of a plastic. The holder supports some or all of the remaining members of the assembly.

The shape of the lens (e.g., the relative positioning of the membrane 208 with respect to each of the reservoirs 216 and 218) can be varied. For example, spherical lenses (e.g., convex and concave), aspherical lenses (e.g., convex and concave), cylindrical lenses (e.g., defined by a square housing instead of round), flat lenses, and any micro lenses (e.g., a micro lens array or a diffraction grating), and lenses including antireflection coating (e.g., nano structure), which can be integrated or attached to the optically active section of the lens can be created. Other examples are also possible.

In the example of FIGS. 2A and 2B, the membrane 208 separates the reservoirs 216 and 218. Plates 212 and 213 enclose the other sides of the reservoirs 216 and 218. The plates 212 and 213 may be constructed from glass and provide optical correction functions. Also, the plates 212 and 213 may prevent debris from entering the assembly 200 when an air gap is on the other side of the plate.

The assembly 200 may be stacked in any combination with the above-described focus tunable lens, such as, for example, with other focus tunable and non-focus tunable lenses, filters and any other combination of optical systems, including mirrors, gratings, prisms, and apertures. The assembly 200 can be used with other elements as well.

In one example of the operation of the system of FIGS. 2A and 2B, application of a current through the coil 210 results in a movement of the coil 210 (e.g., up or down, depending on the direction of the current). The amount and direction of current provided may be controlled by any number of devices or approaches. For example, a user may manually press a switch, button, or other actuator to control current flow. In another example, current flow may be controlled by a program or algorithm (e.g., an autofocus or zoom program or algorithm), which adjusts automatically the current flow supplied to the coil.

More specifically, in FIG. 2A, the current is zero amperes and the coil is in a first position and membrane 208 is also in a first position. Referring now to FIG. 2B, current is applied to the coil 210. The current interacts with the magnetic flux created by the magnets 204 and 205 and the flux guiding structures and the resultant electromotive force moves the coil 210 from the first position to a second position in an axial direction along the z-axis. Movement of the coil 210 to the second position pushes the membrane 208 and this pushing of the membrane 208 displaces the filler material in the reservoirs 216 and 218 such that the membrane 208 moves upward. This movement alters the optical properties of the lens since the relative shapes of the first reservoir 216, second reservoir 218, and membrane 208 are changed. Inhomogeneous material thickness or hardness for the membrane 208 may also be used to alter the optical properties of the lens.

Figure 3:
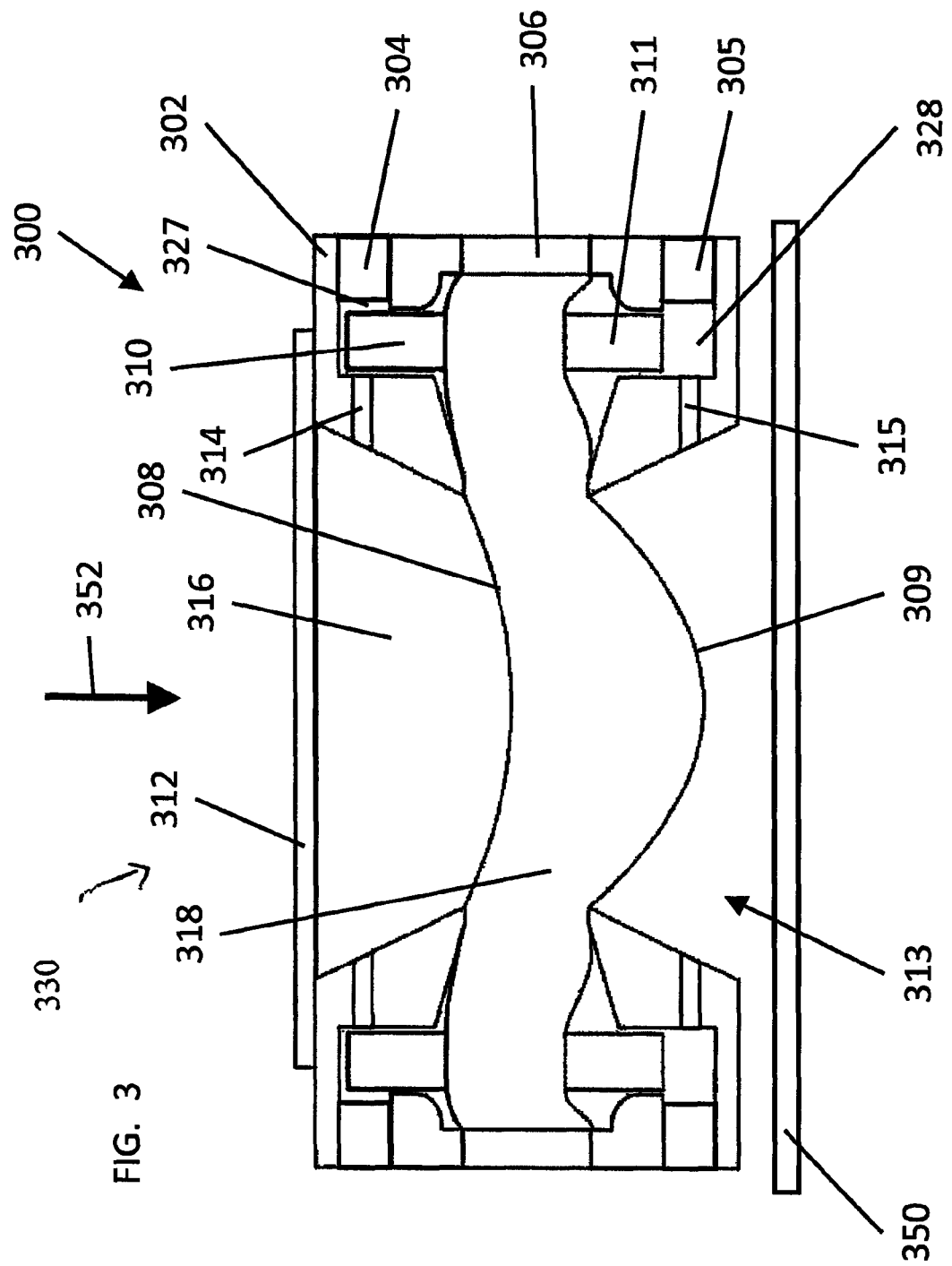
FIG. 3 illustrates a cross-sectional view of a magnetic coil lens assembly according to various embodiments of the present invention in which a plurality of coils are positioned to move a plurality of membranes.

Referring now to FIG. 3, another example of a lens assembly 300 is described. The lens assembly 300 includes a flux guiding structure 302, a first magnet 304, a second magnet 305, a holder 306, a first membrane 308, a second membrane 309, a first coil 310 (disposed in a chamber 327), a second coil 311 (disposed in a second chamber 328) a top plate 312, a first vent 314, and a second vent 315. A chamber 316 is formed between the top plate 312 (e.g., a glass plate) and the first membrane 308 and is filled with air. A reservoir 318 is formed between the first membrane 308 and the second membrane 309 and is filled with a filler material. A second opening 313 extends at the bottom of the assembly and is filled with air. A central opening 330 extends in an axial direction (in the direction of the z-axis) through the assembly 300. Light rays 352 representative of an image move through the central opening 330 in the lens structure in the axial direction. Once acted on by the components of the lens structure, a sensor 350 (e.g., a charge coupled device (CCD)) receives and senses the image.

The vents 314 and 315 allow air to flow in and out of chambers 327 and 328, and the coils 310 and 311 move within these chambers. To take one example, as the coil 310 moves downward, air enters the chamber 327 and as the coil moves upward, air exits the chamber 327.

The plate 312 may be constructed from glass and provide optical correction functions. Also, the plate 312 may prevent debris from entering the assembly 300.

In this example, two motors are used. More specifically, both sides of the lens (e.g., the first membrane 308, reservoir 318, and second membrane 309) are deformed using a separate motor positioned on each side of this lens. When one of the chamber 316 or the opening 313 (when this opening is sealed with a cover or plate) is air-tight sealed, then both of the lens sides (i.e., the membranes 308 and 309) can be deformed independently of each other.

The flux guiding structure 302 provides a path for magnetic flux created by the first magnet 304 and the second magnet 305. The flux guiding structure 302 may be composed of any suitable magnetically soft material such as iron. Other examples of metals or other compositions are also possible.

The optical membrane 308 and 309 separating the upper and lower part made of flexible materials. The central section of the membrane and the actuator (torus) section (where the coils 310 or 311 is attached) may be made of one membrane material. However, in other examples the actuator section of the membrane and the central/optical section are constructed of different membrane materials. As described elsewhere herein the membrane 308, membrane 309 and/or reservoir 318 can provide various reflective, refractive, diffractive, and absorptive, or color filtering functions for the overall system. Other examples of functions may be provided as well.

The coils 310 and 311 are any wound wire coils and can be configured in a variety of different ways. For example, the coil 310 or 311 may be a single coil or a double coil. The wire in the coils 310 and 311 may be of any suitable gauge or diameter. The wire could also be rectangular or hexagonal for improved packing density. The magnets 304 and 305 are any suitable magnet that is polarized in a direction that creates the desired flux flow.

The holder 306 may be composed of any suitable material. In one example, it is a component that is constructed of a plastic. The holder 306 supports some or all of the remaining members of the assembly.

The shape of the lens (e.g., the membrane 308, 309 and the reservoir 318) can be varied to produce various types of lenses. For example, spherical lenses (e.g., convex and concave), aspherical lenses (e.g., convex and concave), cylindrical lenses (e.g., defined by a square housing instead of round), flat lenses, micro lenses (e.g. micro lens array, diffraction grating), and lenses including antireflection coatings (e.g., nano structures) that can be integrated or attached to the optically active section of the lens can be created. Other examples of lens structures are possible. Inhomogeneous material thickness or hardness for the membrane 308 may also be used to alter the optical properties of the lens.

As shown in FIG. 3, the membranes 308 and 309 constrain the filler material in the reservoir 318. The top cover provides an air-tight seal for the chamber 316. A bottom cover (not shown) may also seal the opening 313.

The assembly 300 may be stacked in any combination with the above-described focus tunable lens, such as, for example, with other focus tunable and non-focus tunable lenses, filters and any other combination of optical systems, including mirrors, gratings, prisms, and apertures. The assembly 300 may be used with other elements as well.

In one example of the operation of the system of FIG. 3, electric current can be applied to one or both of the coils 310 and 311. The amount and direction of current provided may be controlled by any number of devices or approaches. For example, a user may manually press a switch, button, or other actuator to control current flow. In another example, current flow may be controlled by a program or algorithm (e.g., an autofocus program), which adjusts automatically the current flow supplied to the coil. The interaction of the current with the magnetic field of the magnets creates an electromotive force that moves one or both of the coils in an axial direction along the z-axis. Movement of the coils 310 and/or 311 displaces the filler material (e.g., optical fluid) in the reservoir

318, thereby altering the overall lens shape. Since the chamber 316 is sealed, movement of each of the membranes 308 and 309 can be independently controlled.

The membranes as described herein can be produced by using various methods and manufacturing techniques. For example, the membranes can be formed using knife coating, curtain coating, calendaring, injection molding, nano-imprinting, sputtering, hot embossing, casting, spin-coating, spraying, and/or chemical self-assembly techniques. Other examples are possible.

The membranes can also be constructed from various materials. For example, the membranes can be constructed from gels (for example, Optical Gel OG-1001 by Litway); polymers (e.g., PDMS Sylgard 186 by Dow Corning, or Neukasil RTV 25); acrylic materials (e.g. VHB 4910 by the 3M Company); polyurethane; and/or elastomers to name a few examples. In many of these examples, the membranes are constructed from a permeable material through which air (but not liquids or gels) can pass. Other examples are possible.

Additionally, in some examples, the membranes are prestretched. This technique may provide an improved optical quality and faster response in movement or deformation of the membrane. For example, the membrane may be mounted in a prestretched manner under elastic tension. The membrane may be stretched in stages such that the elastic tension of the inner area of the membrane is less than the tension in the outer area of the membrane. In other embodiments, pre-stretching is not used.

Figure 5:
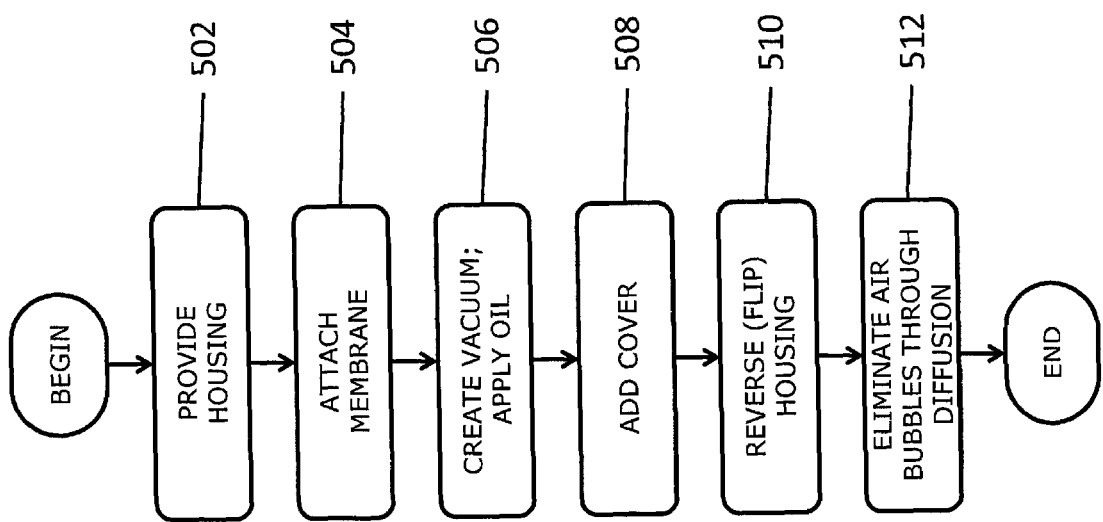
FIG. 5 comprises a flowchart that together with the cross-sectional drawings of FIG. 4 illustrate a production process for assembling a deformable lens and removing gas bubbles from a lens assembly according to various embodiments of the present invention.

Referring now to FIGS. 4 and 5, one example of an approach for forming a lens assembly is described. At step 502 (FIG. 4*a*), a housing is provided. The housing may include a flux guiding structure and a plastic holder to name two example elements. Generally speaking, material choices for the parts of the lens assemblies described herein can be selected to minimize frictional forces between the moving parts of the lens assemblies described herein. For example, durable plastics may be used.

At step 504 (FIG. 4*b*), the membrane is coupled or connected to the housing. The membrane can have a flexible anti-reflective coating having, for example, a nanostructure molded in a flexible material integrated or attached to the lens defining membrane. The coating can have a thin layer of nanoparticles (e.g., SiO2 particles evenly distributed on a thin layer on the membrane). Other coatings are also contemplated which are known to those skilled in the art.

At step 506 (FIG. 4*c*) the structure is flipped upside down and a vacuum is drawn. A fluid (e.g., oil) is then applied over the membrane. The fluid can be applied by various methods. For instance, ink-jetting, dispensing, pumping, and/or dosing may be used. Other approaches are also contemplated which are known to those skilled in the art.

At step 508 (FIG. 4*d*) a cover (e.g., a glass cover) is coupled to the housing. The coupling may be made by glue or some other adhesive or fastener (e.g., screw, snap connectors, ultrasonic welding, hot melting, or the like). The cover, which is in the optical path of the lens can be, for example, reflective, diffractive, transparent, absorptive, refractive or a color-filter glass. It can also take any shape, including but not limited to, prisms, lenses, or micro or nanostructures, including anti-reflective, anti-scratch, and anti-glare coating. Other examples are possible.

At step 510 (FIG. 4*e*), the housing is again reversed (flipped over) and air bubbles appear at the top. At step 512 (FIG. 4*f*), the air penetrates the membrane leaving a reservoir free or substantially free from air bubbles through diffusion. The fluid chamber can be sealed by various methods, such as, for example, heat melting, gluing, chemical cross-linking, ultrasonic welding, and/or clamping. Other sealing approaches are also contemplated which are known to those skilled in the art.

Figure 6:
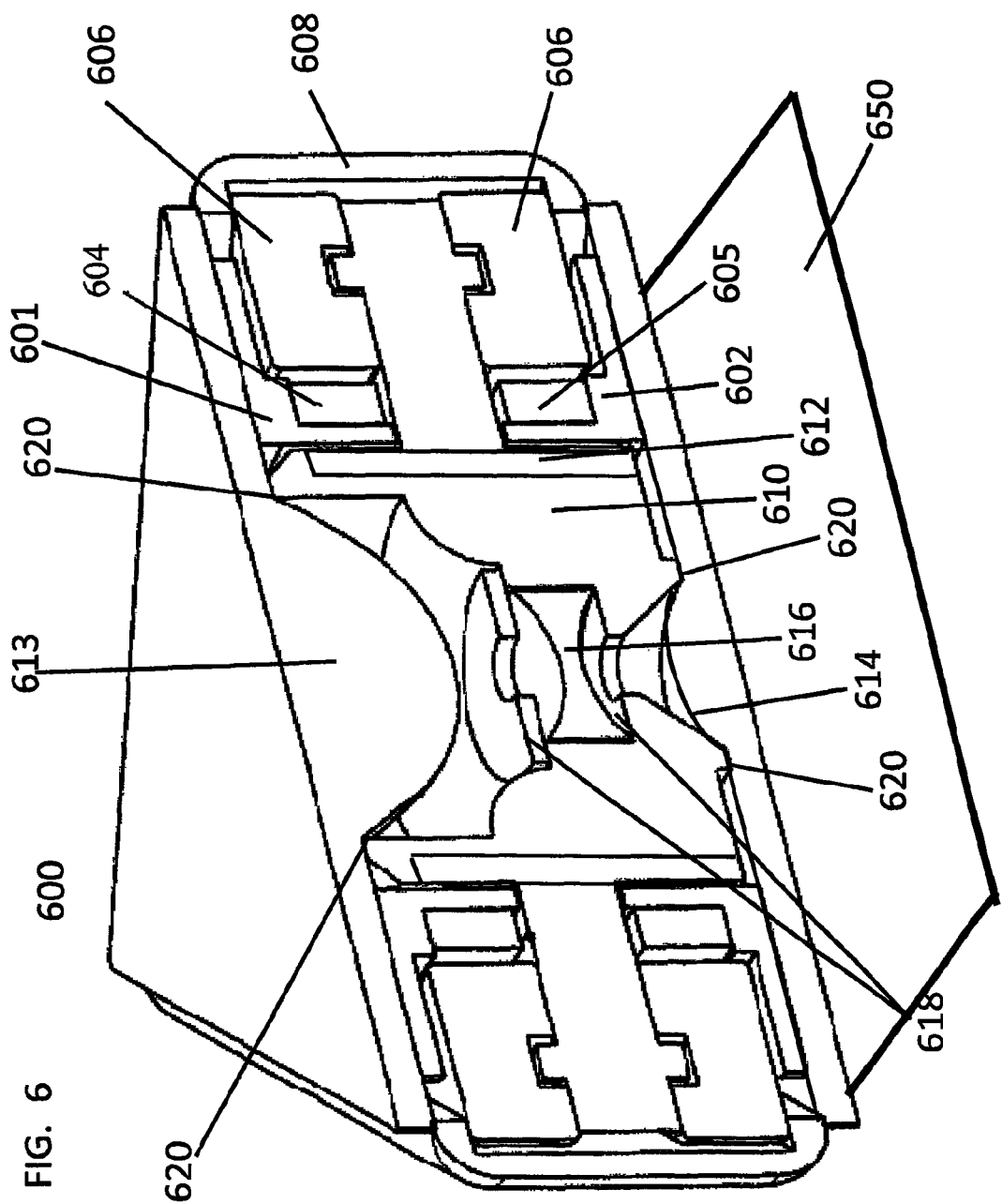
FIG. 6 illustrates a cross-sectional view of a magnetic coil lens assembly having a single axially polarized motor according to various embodiments of the present invention.
Figure 7:
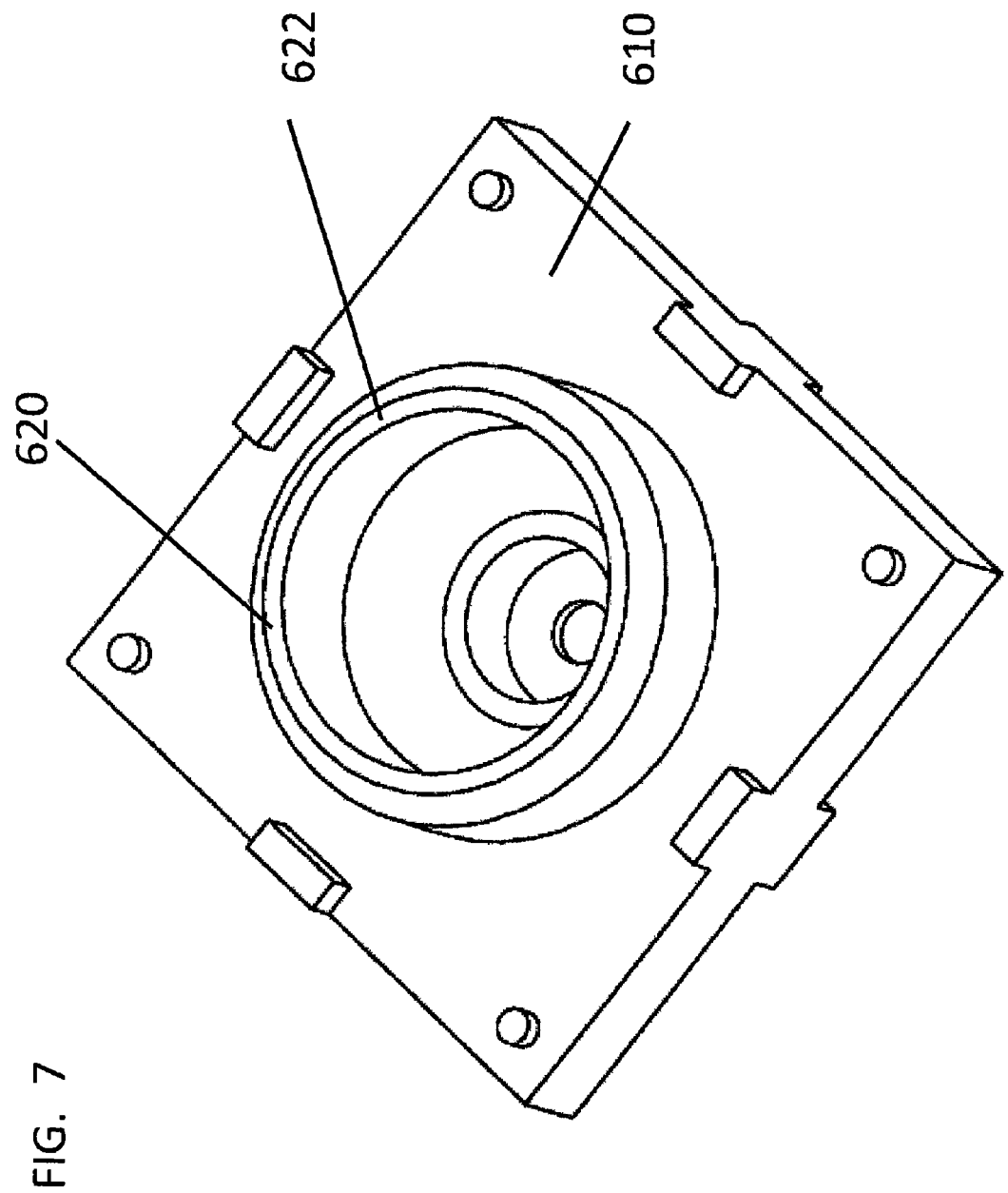
FIG. 7 illustrates a perspective view of a lens defining structure of the example of FIG. 6 according to various embodiments of the present invention.
Figure 8:
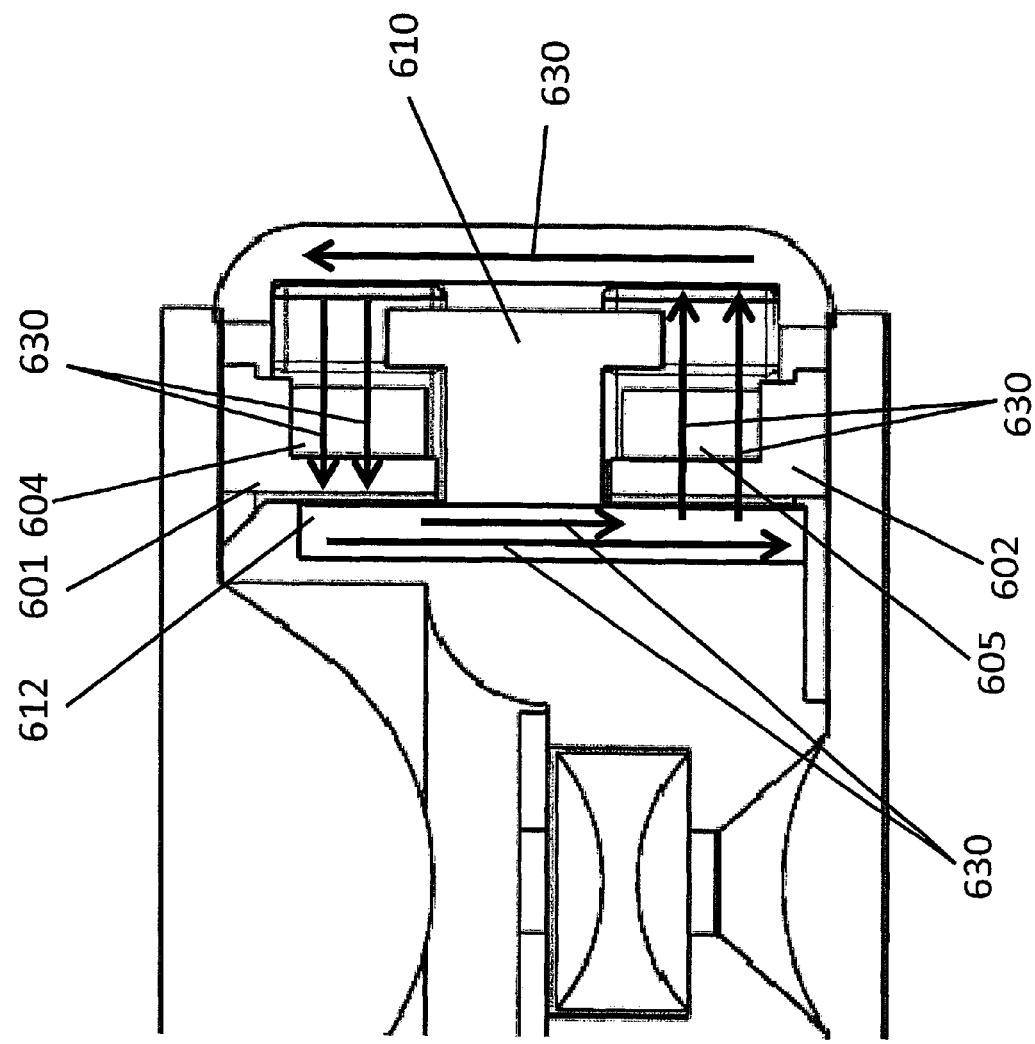
FIG. 8 illustrates a cross-sectional view of a flux guiding structure in a magnetic coil lens assembly according to various embodiments of the present invention where a single motor structure drives two coils.

Referring now to FIGS. 6-8, an example of a lens assembly 600 is described. The lens assembly 600 includes a first bobbin 601 (e.g., an L-shaped bobbin), a second bobbin 602 (e.g., an L-shaped bobbin), a first coil 604, a second coil 605, magnets 606, an outer case return structure 608, a central core 610, a metal cylinder 612, (appearing as a pole in the cross-sectional view) a first fluid lens 613, a second fluid lens 614, a fixed lens 616, aperture portions 618, and lens attach points 620. A separate image sensor 650 receives images through the assembly 600. Attachments to the sensor 650 (e.g., a CCD sensor) and a top cover and further corrective optical elements are not shown in these examples.

The lens aperture portions 618 include an opening and are fixed in all directions and are defined at least in part by the flux guiding structure. In this example, the plastic holds everything and the flux guiding structure is embedded in the plastic. This approach results in much higher optical quality than for structures that have a moving magnet or coil which are defining the boundary of the lens. The improved optical quality is due at least in part to the use of a single part to define most or all of the tolerancing structures. In addition, optical quality strongly relies on the accuracy of the lateral placement of the lens.

The bobbins 601 and 602 may be any structures that hold some or all of the other assembly elements in place. The coils 604 and 605 are any electrical coils that are constructed from wound wire. The coils 604 and 605 may be constructed from, for example, wires wound around a portion of the bobbins, or be a chip-inductor fabricated coil. Other examples of coils are possible. The bobbins 601 and 602 are also moved to deform the lenses.

The magnets 606 are any permanent magnets that are polarized in any suitable direction (e.g., a radial direction). The metal cylinder 612 and outer case return structure 608 provide a flux guiding structure that may be constructed from metals or other paramagnetic/magnetically soft materials. This structure provides a flux path that acts to develop an electromotive force that moves the coils. This flux guiding structure may be created using insert molding techniques to name one approach. Other construction techniques can also be used. Thus, in this example, two independent coils are disposed in the same motor structure.

As mentioned, two independent coils 604 and 605 are used and, when excited, move the bobbins 601 and 602. Movement of the bobbins 601 and 602 changes the shape and optical properties of the lenses at the top or bottom of the assembly. For example, the lenses 613 and 614 may be defined by membranes and fixed plates and movement of the bobbins moves or displaces the filler material in the reservoirs as described elsewhere herein. The two focus tunable lenses 613 and 614 are used to achieve an optical zoom effect. When the properties of one of the lenses 613 or 614 are changed, then the other lens is adjusted, to focus the image back onto the image sensor. Therefore, either of the individual tunable lenses can be used as autofocus and/or zoom lens. The fixed lens 616 may be constructed of glass or plastic (or other suitable material) and is a divergent lens that is used to reduce the height of the assembly while still being able to illuminate the entire or substantially the entire sensor 650.

The central core 610 of the assembly 600 may be molded from plastic or other suitable material and be a fixture that provides support for the membranes or other system components. The central core 610 also defines the location of all optical parts. For example, the central core 610 defines the position of the fluid lens 614 and the fixed lens 616. The central core 610 may also include all or part of the flux guiding structure. The examples of FIGS. 6-8 include focusing lenses (lens 613) and a zoom lens (lens 614). A single motor structure is provided.

A plate (e.g., a glass plate, not shown) may be placed on top of the structure. Thus, moving from top of the assembly downward, are a first fluid lens system (i.e., the plate, a fluid reservoir, and membrane) and the bobbin. A similar fluid lens system is disposed at the bottom of assembly. As the coils 604 and 605 are excited, they move the bobbins 601 and 602 and thereby adjust the optical properties of the system.

In this example, all fixturing and optical features are placed in the central core 610. Consequently, the number and complexity of the parts needed to construct the assembly are minimized. In some examples, the main cost of the assembly is determined by the tolerance of the lens attach circles, apertures, corrected lenses, meniscus lens, other optical elements, and charge coupled device (CCD) sensor placement.

The examples shown with respect to FIGS. 6-8 include an inverted top lens. In this case, the top lens falls downward towards a sensor instead of outward to the object. Upward force of the bobbin produces a downward movement of the lens and downward force produces a downward upward movement. This placement may yield space, cost, and magnetic effect advantages. However, in other approaches the fluid reservoir faces upward towards the object. In this case, downward force of the coil/bobbin produces an upward force on the lens (see, e.g., FIGS. 1A and 1B).

As shown in FIG. 7, the outer portion of the assembly includes a ring 622 that is an attachment point for the upper membrane of the upper lens. The ring 622 is disposed around the molded central core 610.

Referring now to FIG. 8, one example of a desired magnetic flux pattern directed by the flux guiding structure is shown. This structure is for an eight-magnet structure but can be changed to a four-magnet structure and the guiding structure would be suitably modified. The structure could also be an axial magnetized structure with two plates. Cylinder 612 could be bent and the inside portion (shown as a pole in these figures) moved inward. Moving the cylinder 612 away into the corners of the assembly allows for the use of insert molded connectors that could protrude from the bottom and make circuit connections.

The central core 610 contains most of the fixturing for the entire assembly and the outer clamping structure also serves as a flux guiding structure. The central core 610 contains the bottom aperture. Fixtures for corrective lens structure also are formed in the aperture. The central core 610 may contain structures having inserts for pole piece magnetic structure, high precision lens defining structures, wire routing for voice coil lead out wire, insert molding for pins for out of the unit connection to circuit board, to name a few examples.

As shown in FIG. 8, flux lines 630 are formed and directed as shown. The flux lines 630 are formed in a direction perpendicular to the z-axis (axial direction) and through the coil. This selected direction of the flux through the coil creates the desired (and maximizes) and available electromotive force needed to move the coil.

Figure 9:
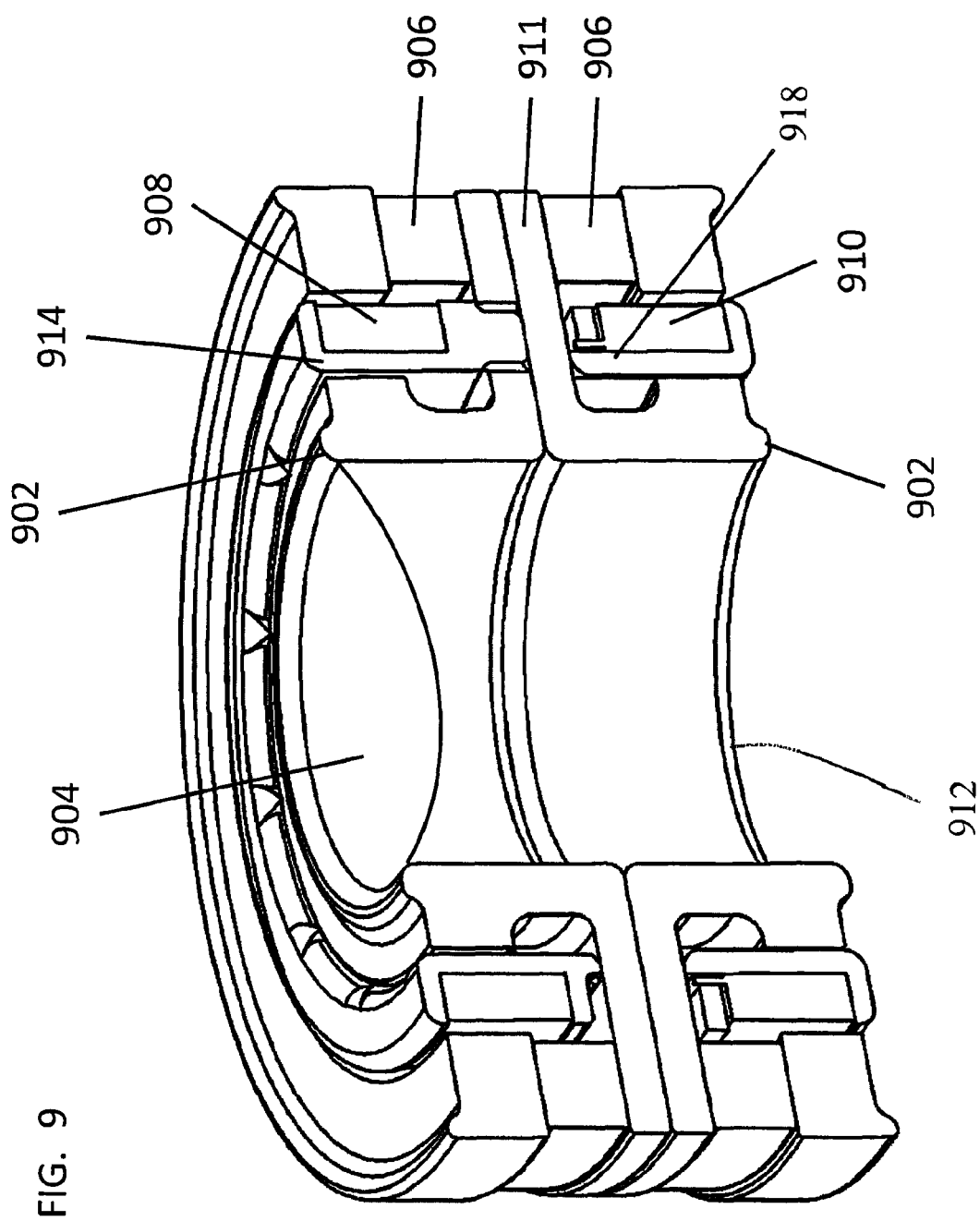
FIG. 9 illustrates a perspective cross-sectional view of a motor structure to activate a dual variable lens structure according to various embodiments of the present invention.

Referring now to FIG. 9, another example of a lens assembly is described. A ring structure 902 (e.g., lip) defines the lens (e.g., the membrane 904, filler material, container, etc.). The ring structure 902 affects the concentricity, flatness, parallelism, circularity, and surface finish of the membrane 904 and hence the optical properties of the lens. As with the examples discussed elsewhere herein, a flux guiding structure 911 (the structure that guides the magnetic flux for the magnet) can be disposed in several different portions of the assembly depending upon the desired outcome.

The assembly includes magnets 906, a first coil 908, a second coil 910, a cylindrical metal piece 912, a first bobbin 914 and a second bobbin 918. The example of FIG. 9 operates in a similar way as the examples of FIG. 6-8 except that one of the bobbins pushes upward while the other bobbin pushes downward.

Figure 10:
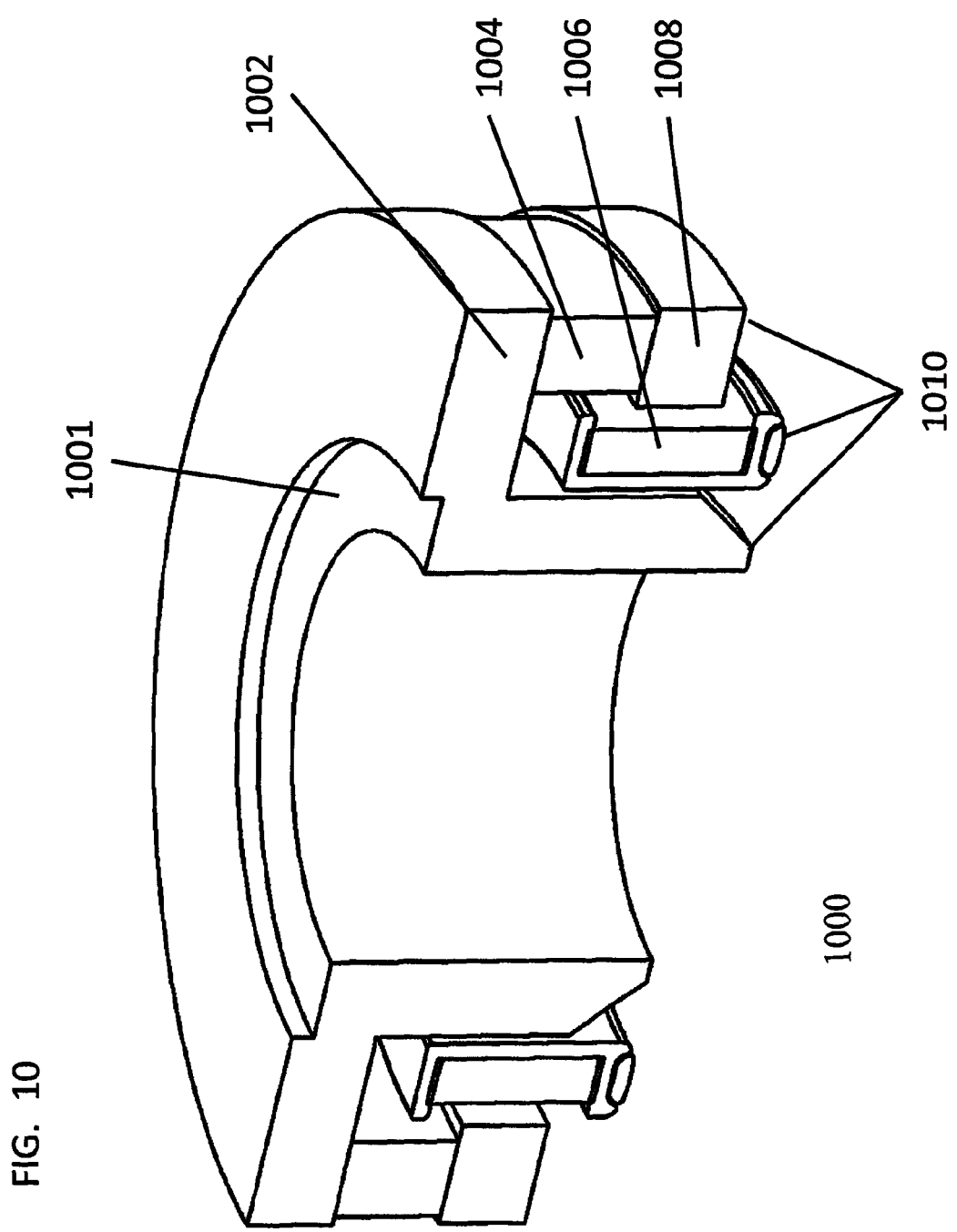
FIG. 10 illustrates a perspective cross-sectional view of a magnetic structure which is used to define a lens and/or reservoir shaping point according to various embodiments of the present invention.

Referring now to FIG. 10, another example of a lens assembly 1000 is described. This example has similar components that have been described with respect to the other examples herein. However, in this example, the flux guiding structure is utilized to define the lens shaping points. The example of FIG. 10 is a push-pull example where the membrane is both pushed and pulled. An axially-polarized magnet is also used.

The assembly 1000 includes a flux guiding structure 1002, a magnet 1004, a coil 1006, and a top plate 1008. Indexing portion 1001 for an optional top cover is also provided, and membrane contact points 1010 for a membrane (not shown) are attached to the coil and the flux guiding structure 1002. The operation of the assembly 1000 in moving the membrane is accomplished similarly to the examples of FIG. 1A and FIG. 1B.

Figure 11:
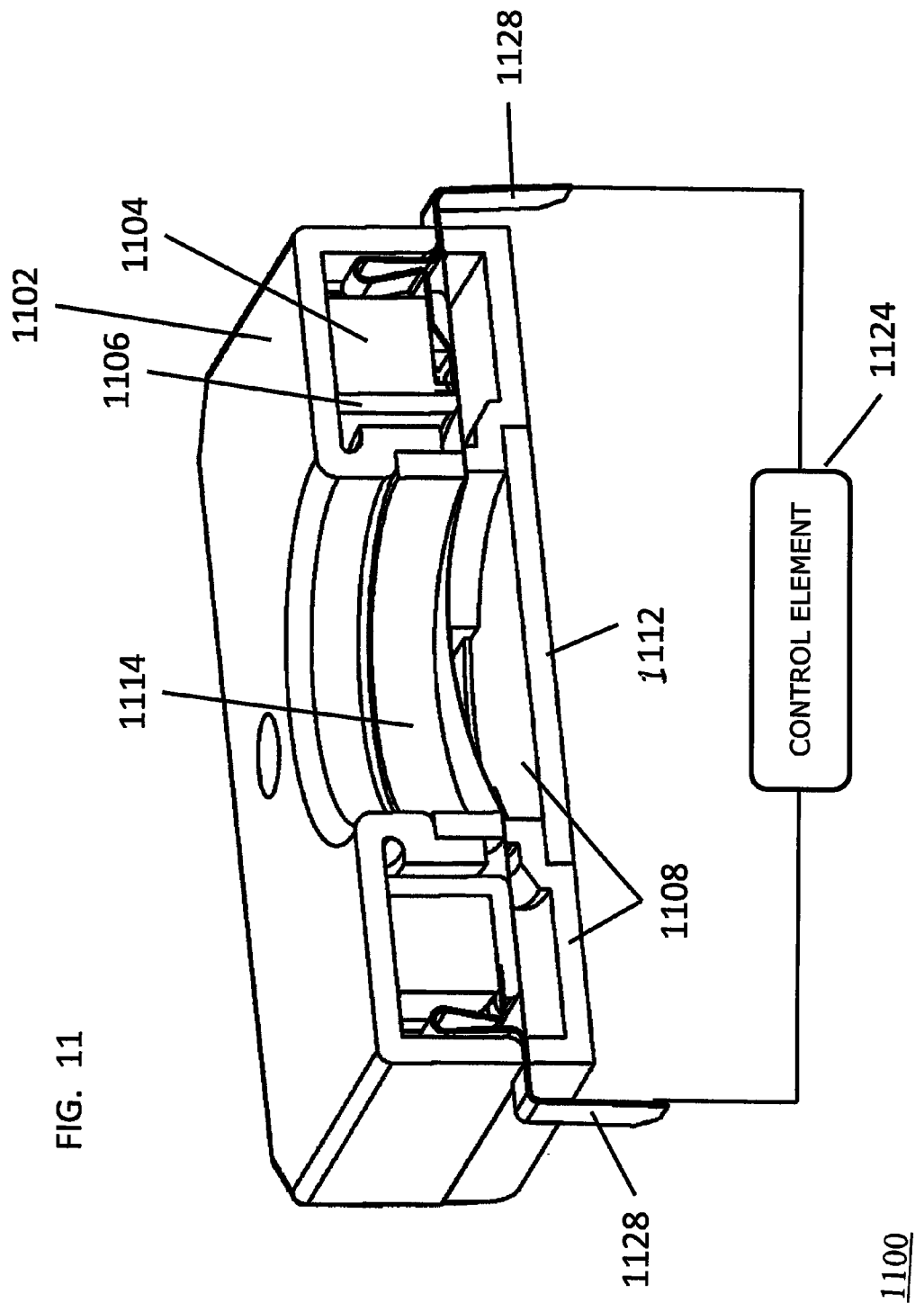
FIG. 11 illustrates a perspective cross-sectional view of a magnetic coil lens assembly having magnets which are distributed into corners of a flux guiding structure according to various embodiments of the present invention.
Figure 12:
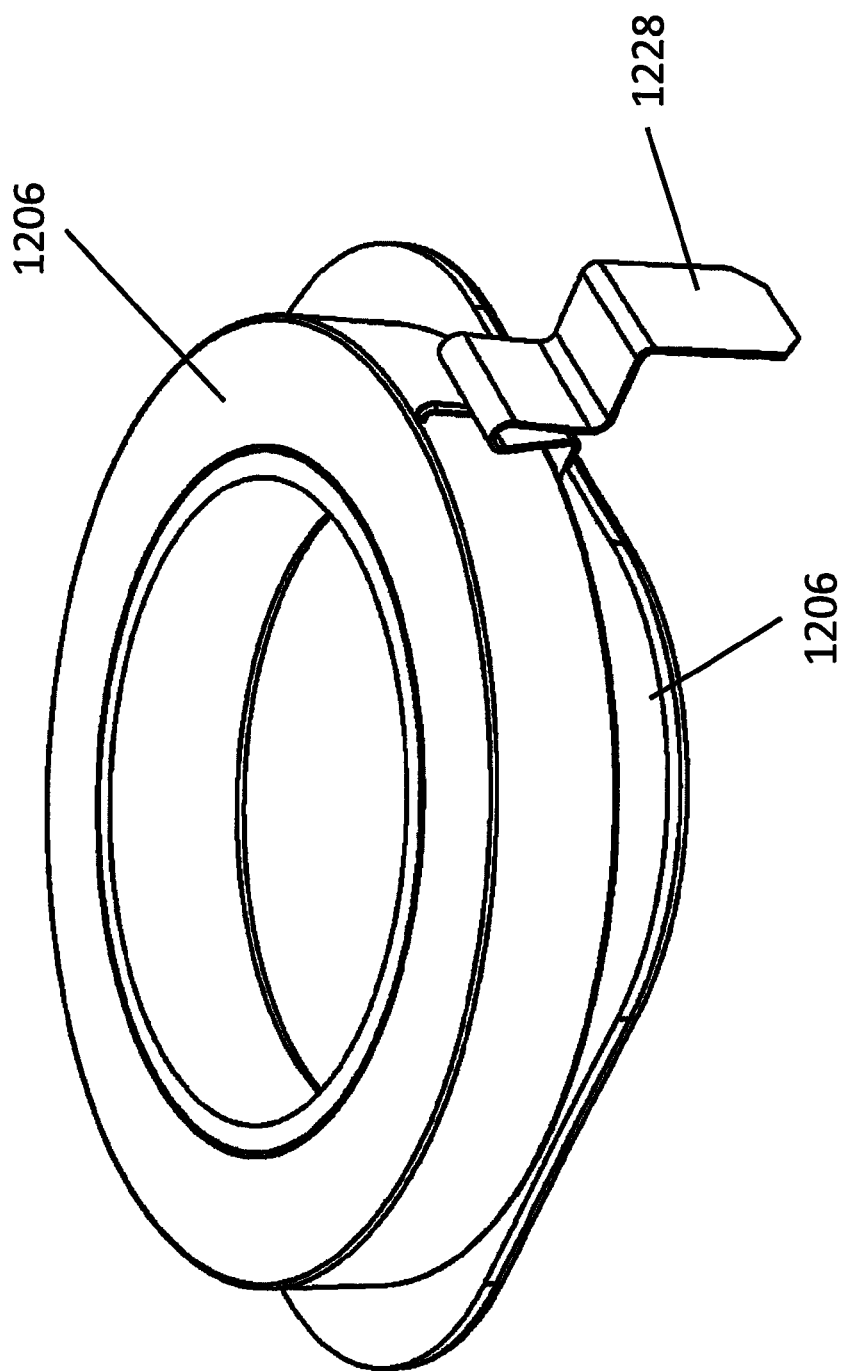
FIG. 12 illustrates an isolated perspective view of a coil and bobbin arrangement of the example of FIG. 11 according to various embodiments of the present invention.
Figure 13:
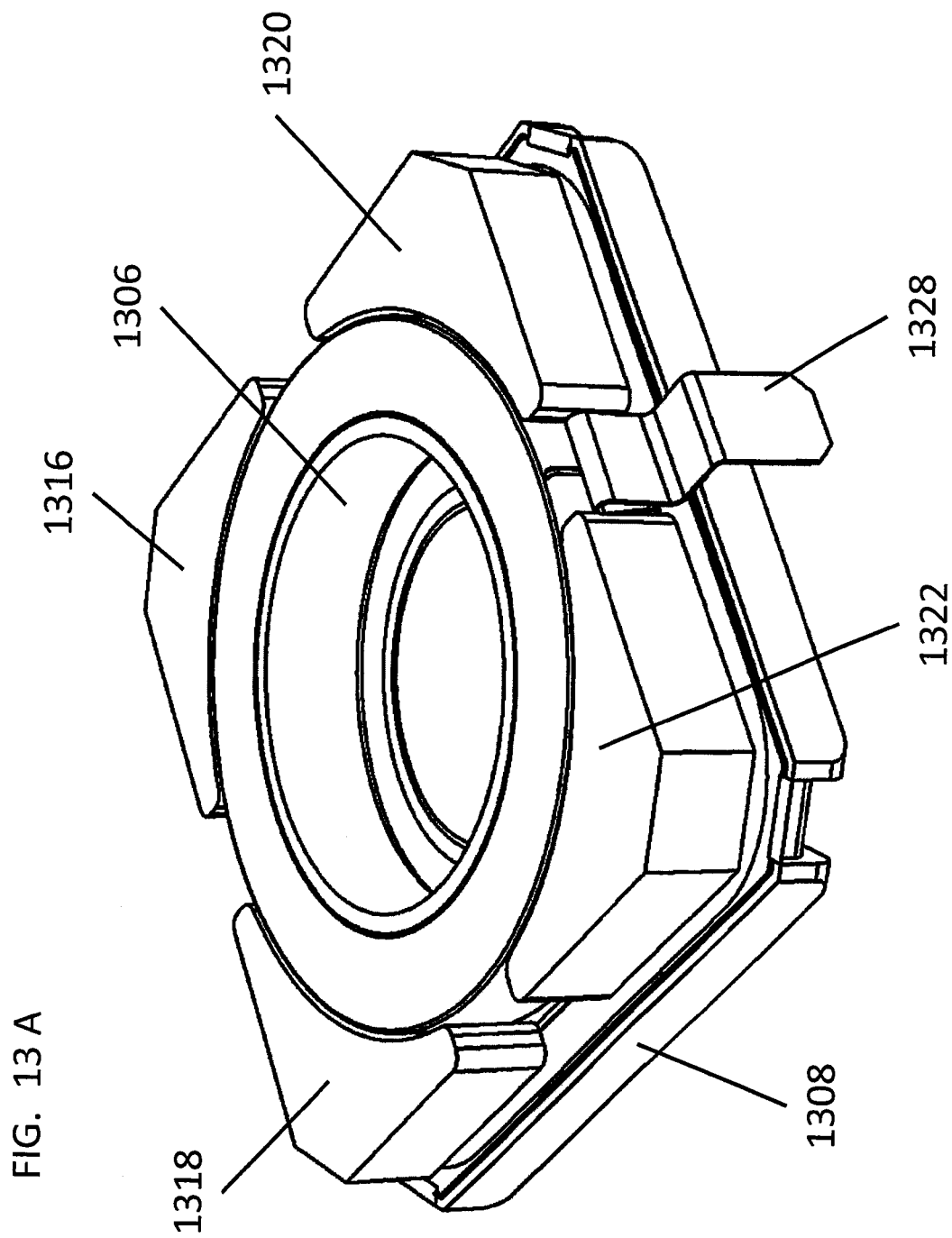
FIGS. 13A and 13B illustrate an isolated perspective view of the coil and bobbin arrangement of FIG. 12 with magnets positioned in corners of the arrangement according to various embodiments of the present invention.
Figure 14:
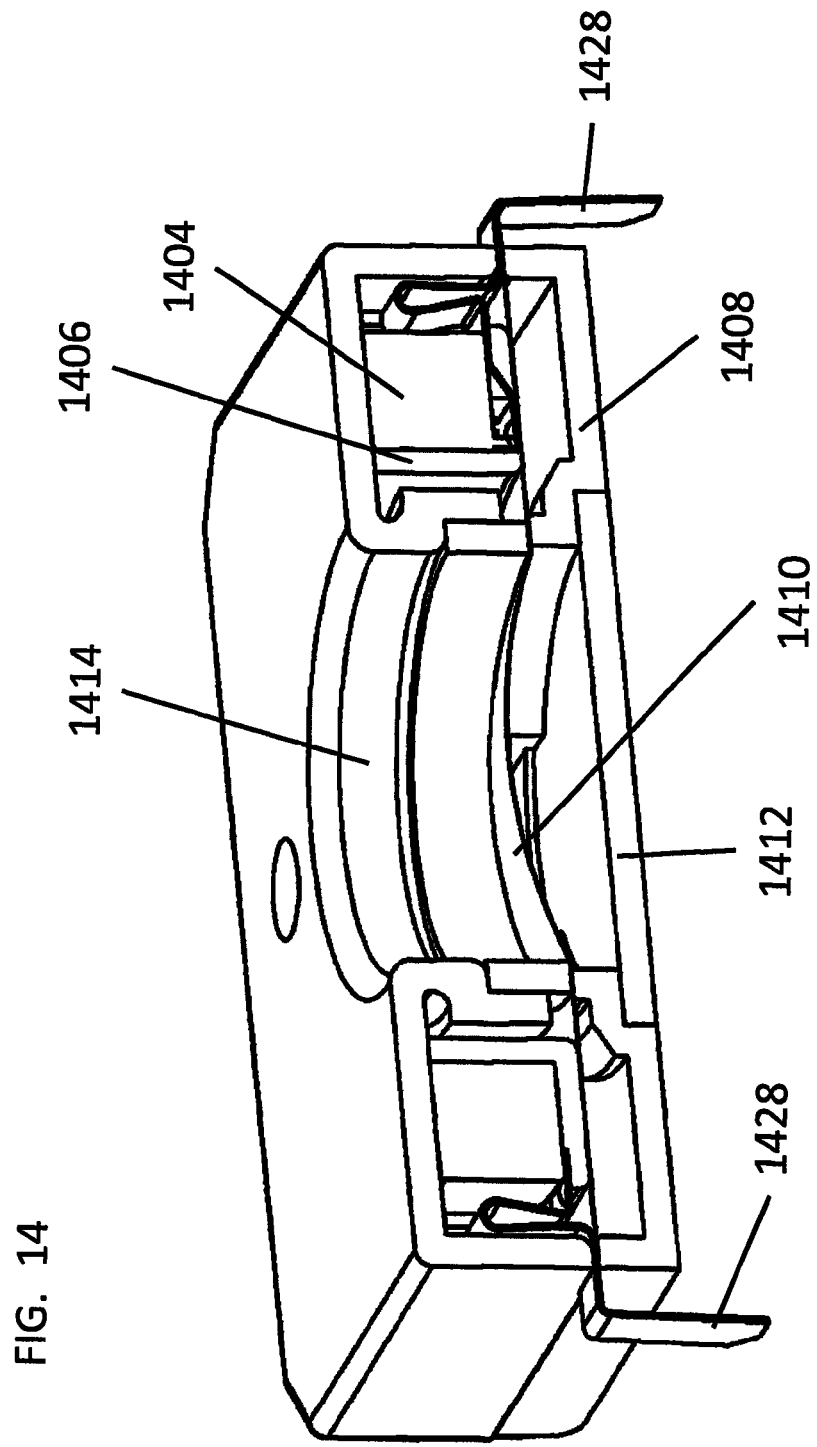
FIG. 14 illustrates a perspective cross-sectional view of a magnetic coil lens assembly having a lens shaper sleeve according to various embodiments of the present invention.

Referring now to FIGS. 11-16, a lens assembly 1100 is shown where the magnets are disposed at the corners of the flux guiding structure and polarized in a radial direction. It will be appreciated that like numbers in these figures refer to like elements (e.g., element 1116 in FIG. 11 is the same as element 1216 in FIG. 12 and so forth). This example may reduce the overall height and/or diameter of the lens and be particularly advantageous for applications that require a compact size. Additionally, this example is configurable to be coupled to image sensors that are square (or rectangular) in cross-sectional shape.

The assembly 1100 includes a flux guiding structure 1102, a coil 1104, a first magnet 1116, a second magnet 1118, a third magnet 1120, a fourth magnet 1122, a bobbin 1106, flexible contacts 1128, and a reservoir 1108 formed between a membrane 1110 and a plate 1112. A lens shaper sleeve 1114 secures and defines the membrane 1110. A control element 1124 is used to control the current in the coil 1104. As mentioned previously, the control of element 1124 may be any actuator (e.g., a button, switch, knob or the like) manually adjusted by the user or a control program (e.g., an autofocus or zoom algorithm) that automatically adjusts the current based upon, for example, properties of the received image. Different control elements can be provided to control different lenses.

Figure 16:
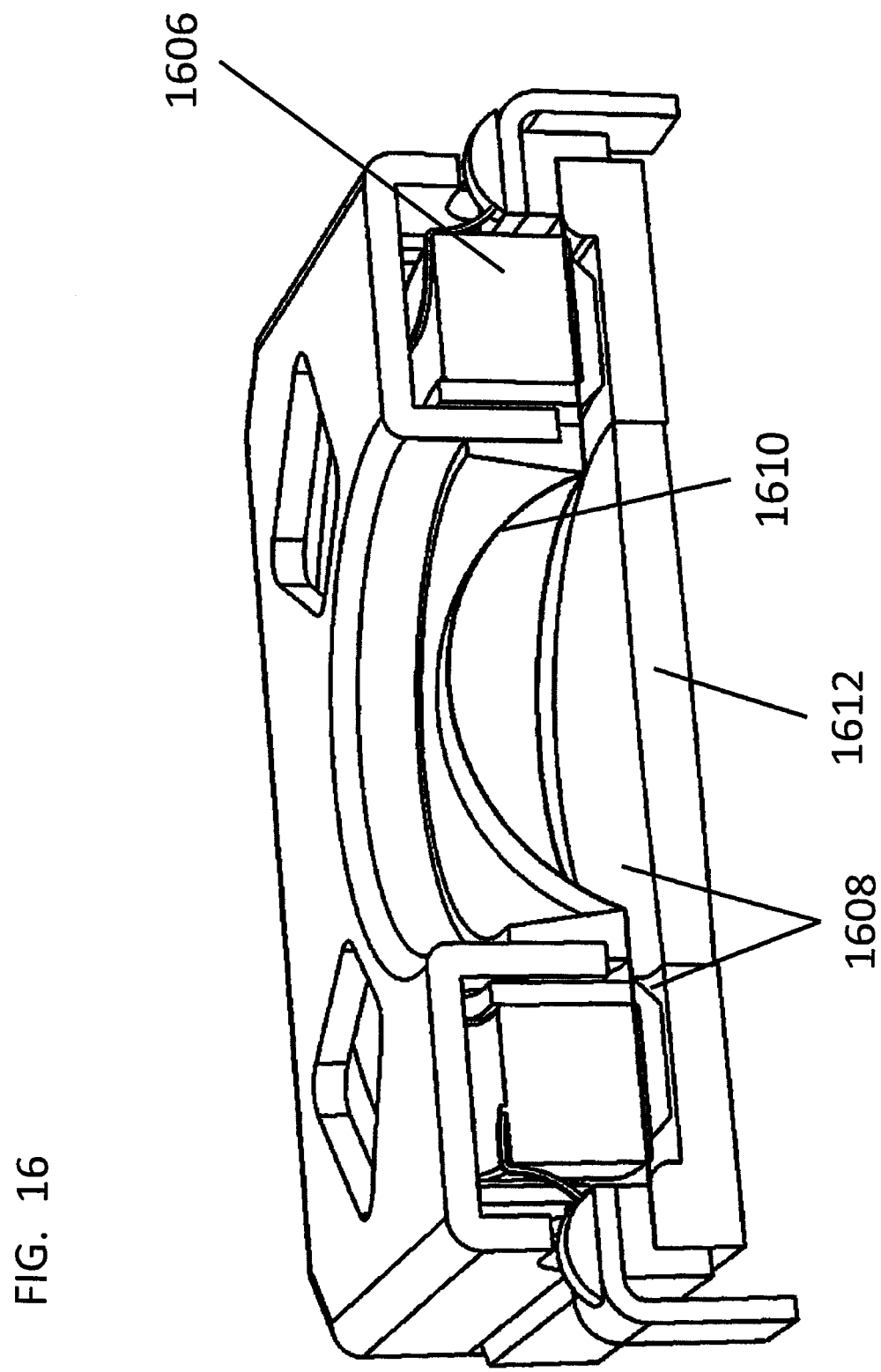
FIG. 16 illustrates a perspective cross-sectional view of the magnetic lens assembly of the example of FIG. 15 according to various embodiments of the present invention.

The placement of the magnets at the corners of the assembly 1100 can be done by using self-alignment of the magnetized magnets into the flux guiding structure. This could also be done manually and magnetized later. The positioning of the magnets 1116, 1118, 1120, and 1122 at the corners also provides more freedom for guiding the coil wires out of the housing. In particular, it is possible to lead the wires out of the housing on the side of the housing where no magnets are present. Slits can be formed on the flat side of the housing to provide for ventilation. To account for the movement of the coil, it is possible to either connect the coil wire to a flexible spring contact, which is guided outside. Alternatively, in another example, the flexibility of the coil wire can be used to guide the wire to a fixed electrical contact integrated into the housing of the lens, as seen in FIG. 16.

The shapes and configuration of components of any of the examples used herein may also vary. In addition, in the examples of FIGS. 11-16 two oppositely polarized magnets can be used in each of the four corners eliminating the need for at least some portions or even the vast majority of the flux guiding structure. Anti-reflective (AR) coatings may be used on various structures of the assembly to reduce reflection of light as it passes through the assembly.

Matching the bobbin shape to the fluid retaining structure may be performed. Matching the shape benefits or reduces overall part size, improves shock performance, and reduces the total force needed to move the structure.

By using a generally square-shaped bobbin, the axial displacement of the bobbin can be reduced to approximately 10% of the diameter of the optical active lens portion defined by the lens shaper sleeve 1114. This may prove advantageous, when, for example, a lens deformation from approximately 10% of the lens radius to approximately 70% of the lens radius is required.

As shown, the first magnet 1116, second magnet 1118, third magnet 1120, and fourth magnet 1122 are in the corners of the assembly and the magnet is magnetized radially inward in the direction of arrows 1330. Also, as shown, the wires of coils are directly bonded to the flexible metal contact connected to the plastic bobbin. This prevents a complex attachment of the wire after it is taken from the coil winding machine.

Figure 15:
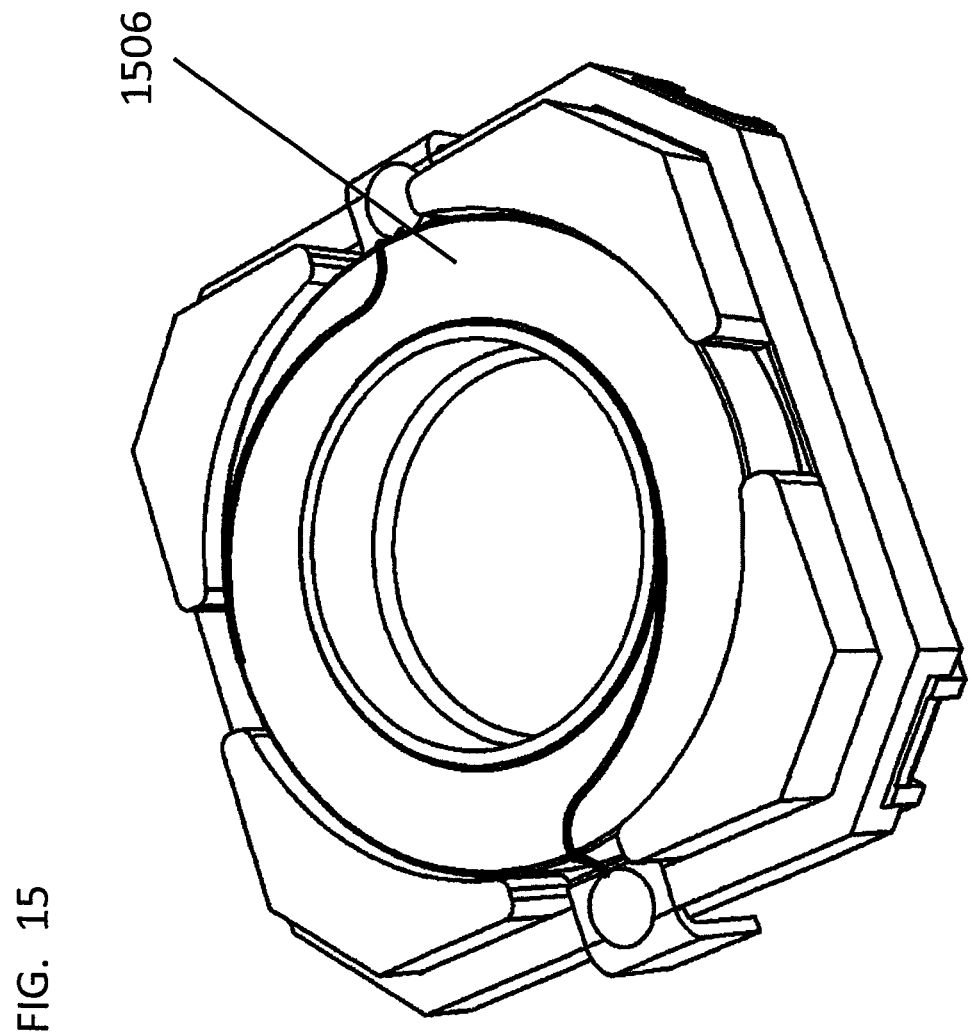
FIG. 15 illustrates a coil connection in a magnetic lens assembly according to various embodiments of the present invention.

As mentioned, the voice coil motor structure provided has four triangular magnets in the corners. Such a design reduces height, width, and length of the assembly. Height is reduced because thick plates can be avoided. The rectangular design allows matching to a sensor that is rectangular in shape. The lens shaper sleeve 1114 allows the reduction of the tolerances on the metal return structure, while maintaining accuracy for the lens defining structure. This reduces the manufacturing costs for the assembly. As shown in FIGS. 15-16, alternative coil connection approaches can be employed utilizing the flexibility of the coil wire to make electrical connections to an electrical conductor.

Figure 17:
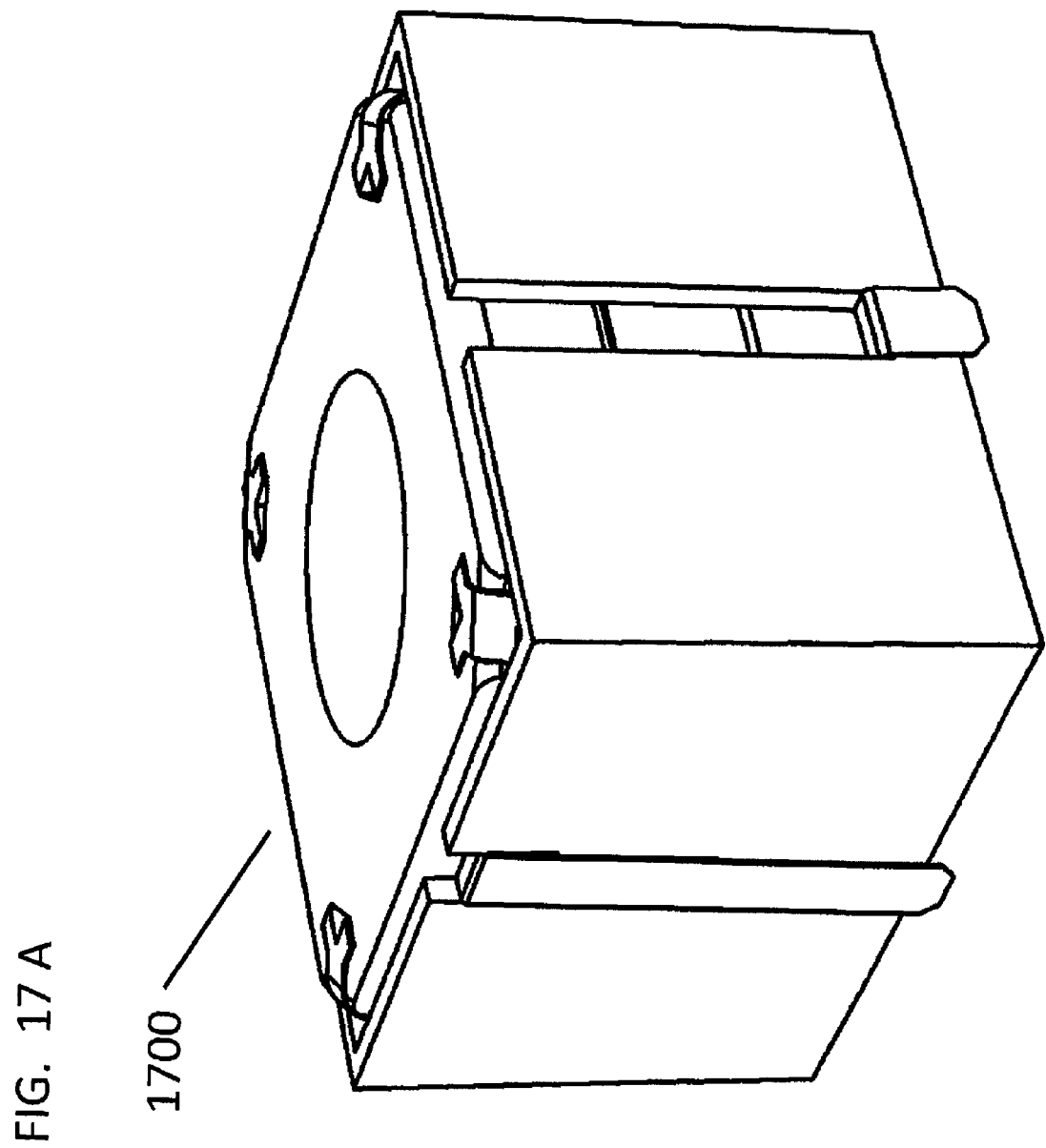
FIGS. 17A and 17B illustrate whole and cross-sectional perspective views of a magnetic lens assembly having two tunable lenses stacked in a housing according to various embodiments of the present invention.
Figure 17:
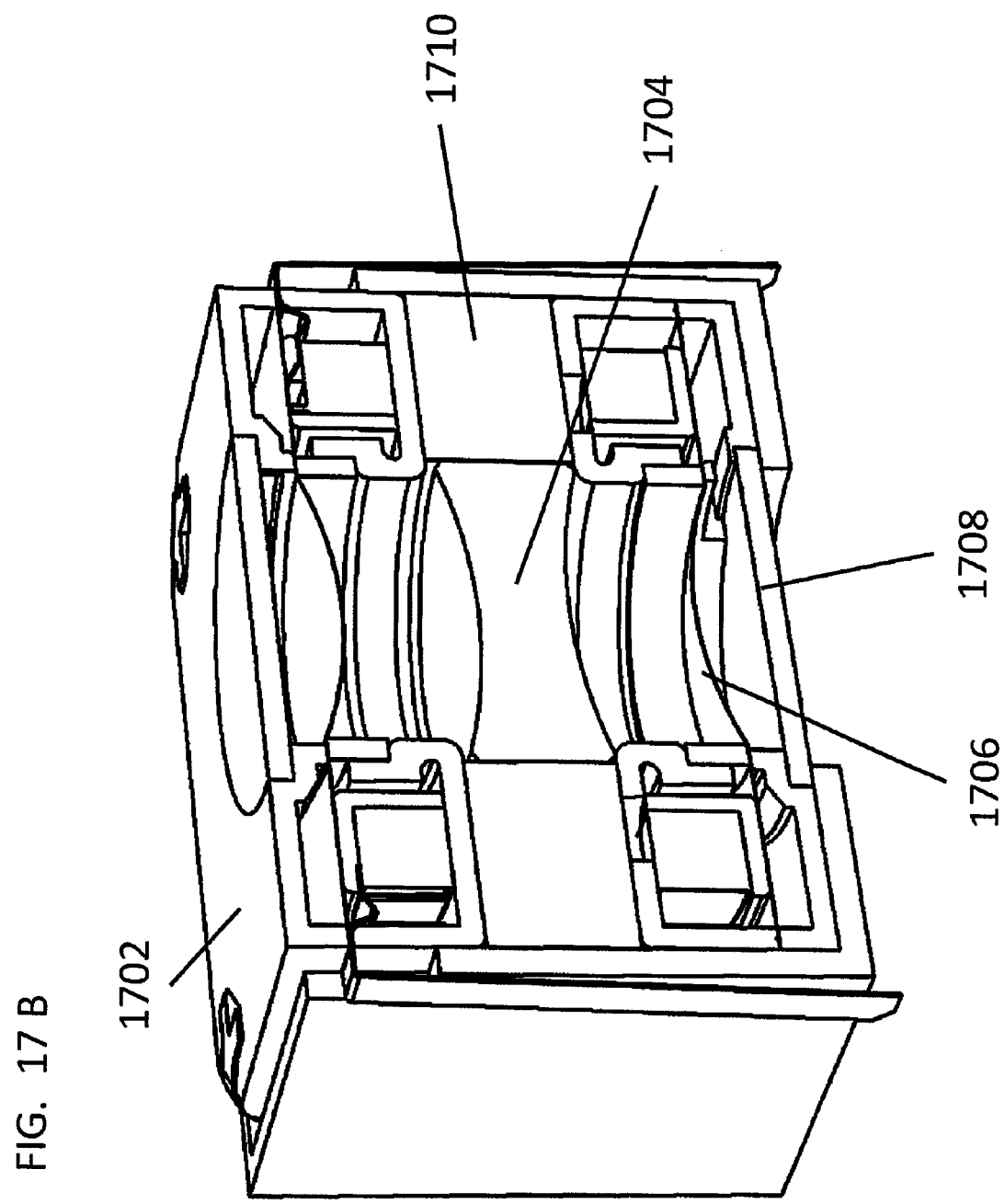

Referring now to FIGS. 17a and 17b, another example of a lens assembly 1700 is described. The assembly includes and upper flexible lens 1702, a bi-concave lens 1704, a lower flexible lens 1706, and an infrared (IR) filter 1708. A spacer 1710 separates different portions of the assembly 1700.

The assembly 1700 can utilize any combination of individual tunable lenses (e.g., the lenses 1702 and 1706) consisting of at least one focus tunable lens (e.g., for autofocus) or multiple lenses (e.g., with a possible zoom feature) in combination with other focus tunable lenses or other hard optical elements such as, for example, lenses, filters, diffusers, optical apertures and other examples. The stacking of lenses in a lens barrel may allow for simple assembly and cost reduction. Additionally, it is possible to guide the electric contact out of the lens barrel to the control integrated circuit by providing slots into the outer lens barrel.

Figure 18:
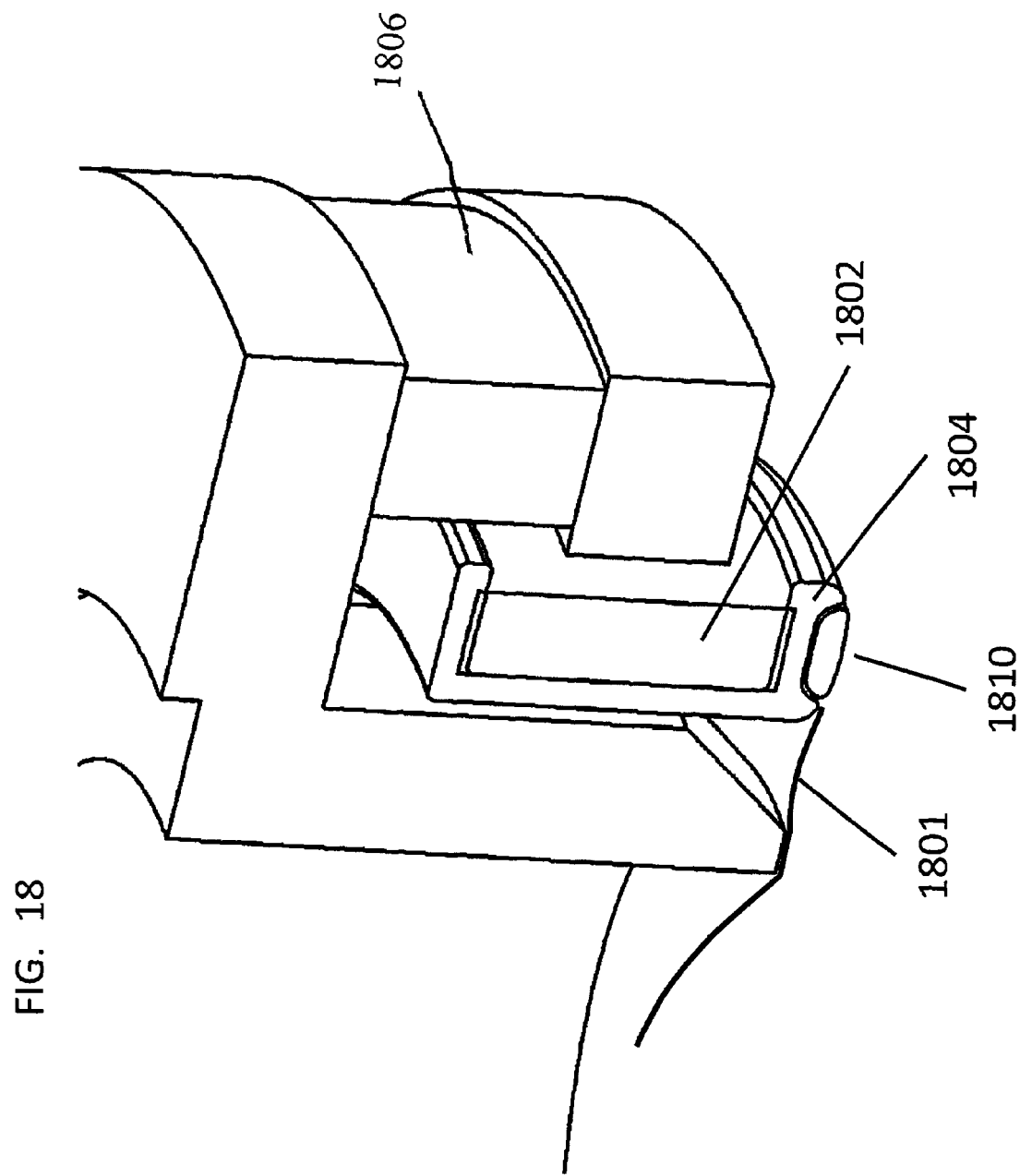
FIG. 18 illustrates an isolated view of a bobbin-membrane interface of a magnetic lens assembly according to various embodiments of the present invention.
Figure 19:
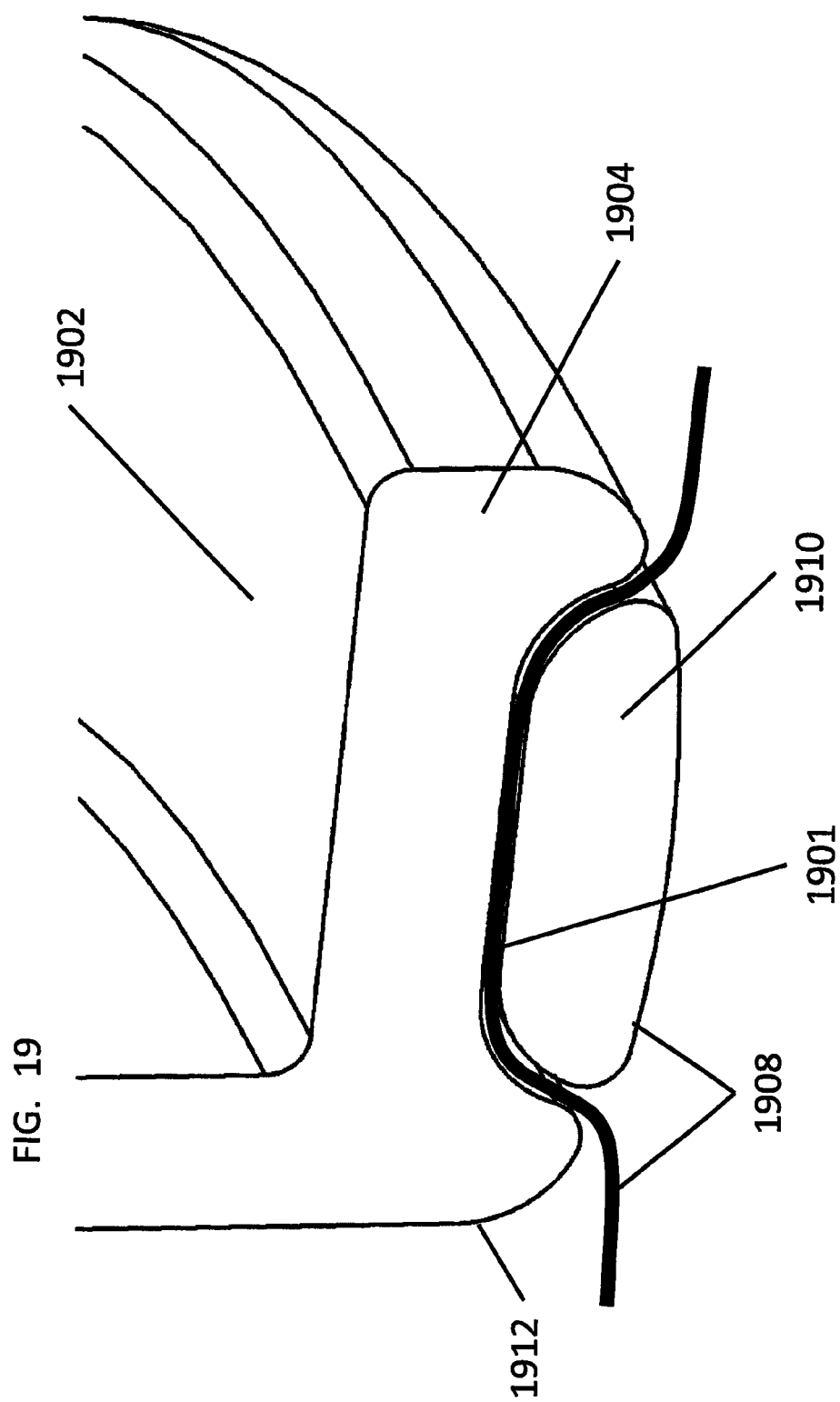
FIG. 19 illustrates another isolated view of the bobbin-membrane interface where the membrane is clamped and mechanically held in the bobbin of FIG. 18 according to various embodiments of the present invention.

Referring now to FIGS. 18 and 19, one example of attachment of a membrane 1801 to a bobbin 1804 is described. In this example, the bobbin is the structure around which the coil is wound. A coil 1802 when energized moves thereby moving the bobbin 1804 due to the interaction of the coil current with a magnetic field created by the magnet 1806 as directed by a flux guiding path. The membrane 1801 and a cap 1810 are position at an angle indicated by identifier 1808.

By indenting, inserting, or otherwise providing the lens film capture system into the bobbin or molded magnet, a low profile assembly is provided that may not retain air bubbles in the filling stage of assembly. Further, the thin ring could be welded in place for a secure connection. In some examples, there is an approximately 90 degree meeting of the membrane and the cap on the liquid side of the lens. However, in the example shown in FIG. 18, the angle 1808 is closer to approximately 180 degrees. Because there may be a 0.05 mm radius (as the membrane is positioned between the cap 1810 and the bobbin 1804), there will still be a mild indentation (or some small angle between the cap and the membrane) but the angle will be much smaller than in other examples.

A cap 1810 captures the membrane between the cap 1810 and the bobbin 1804. Curves 1812 of the bobbin 1804 help avoid air bubble creation or formation in the reservoir. Although applicable to many types of lens assemblies, this example is particularly useful in lens assemblies that utilize both the pushing and the pulling the membrane. The channel indicates a path that creates a path around the membrane. A hole indicates a pierce and is shown in FIG. 20B.

Figure 20:
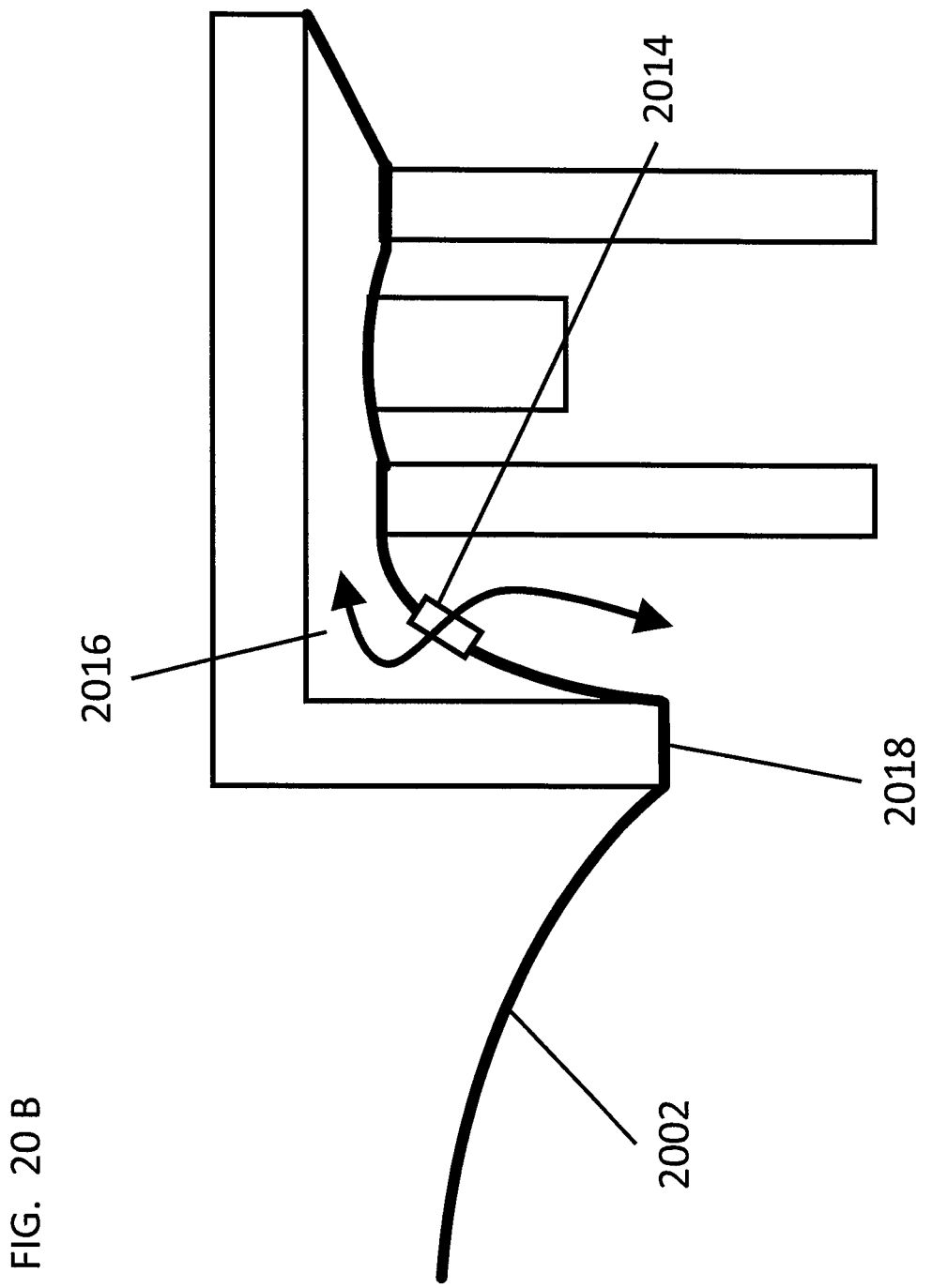
FIG. 20a illustrates a lens assembly in which a positioning of a reservoir and lens is optimized for space reduction according to various embodiments of the present invention.
FIG. 20b illustrates another view of the lens assembly of FIG. 20a in which a positioning of a reservoir and lens is optimized for space reduction according to various embodiments of the present invention.
Figure 21:
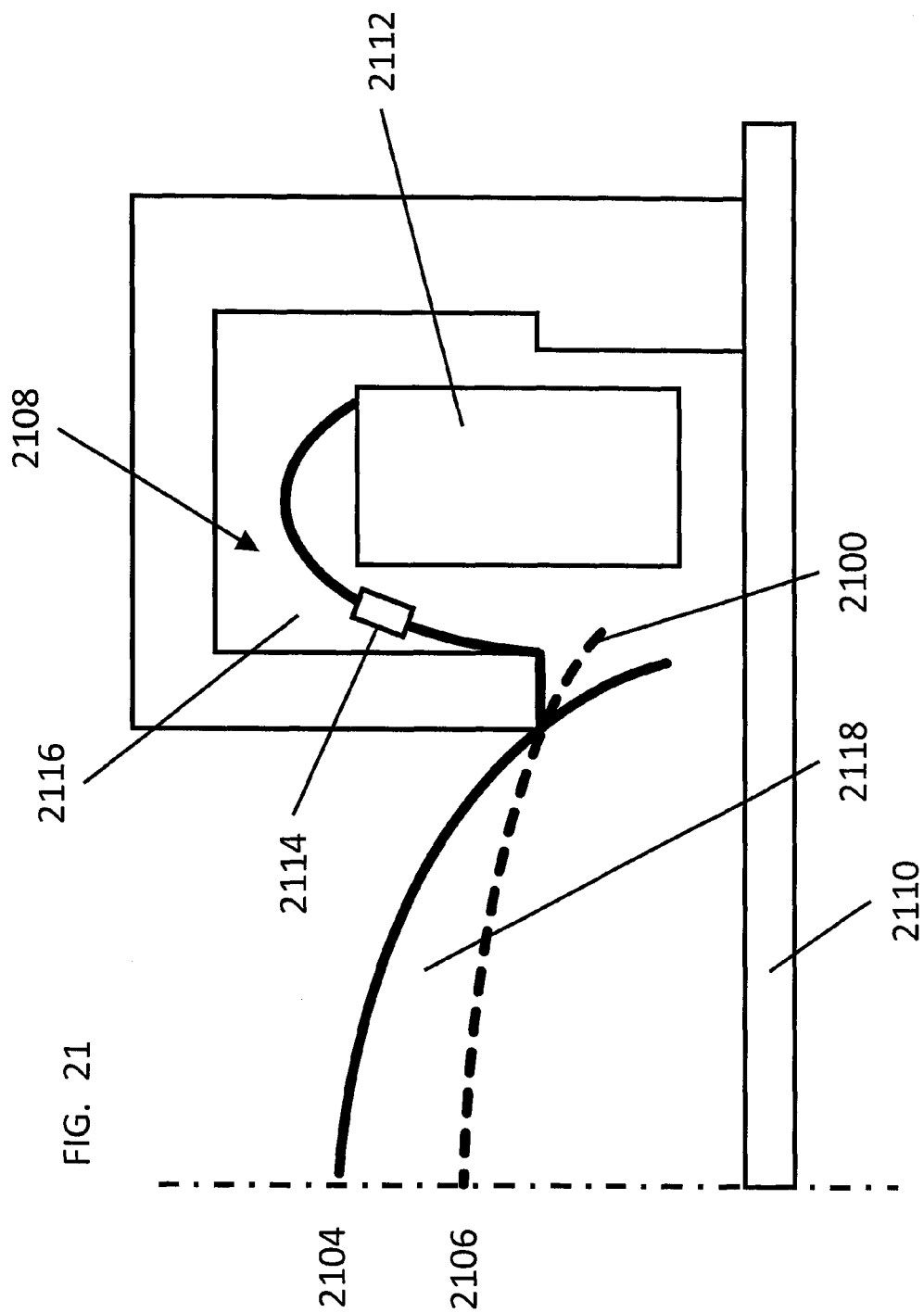
FIG. 21 illustrates another lens assembly in which a positioning of a reservoir and the bobbin shape and lens is optimized for space reduction according to various embodiments of the present invention.
Figure 22:
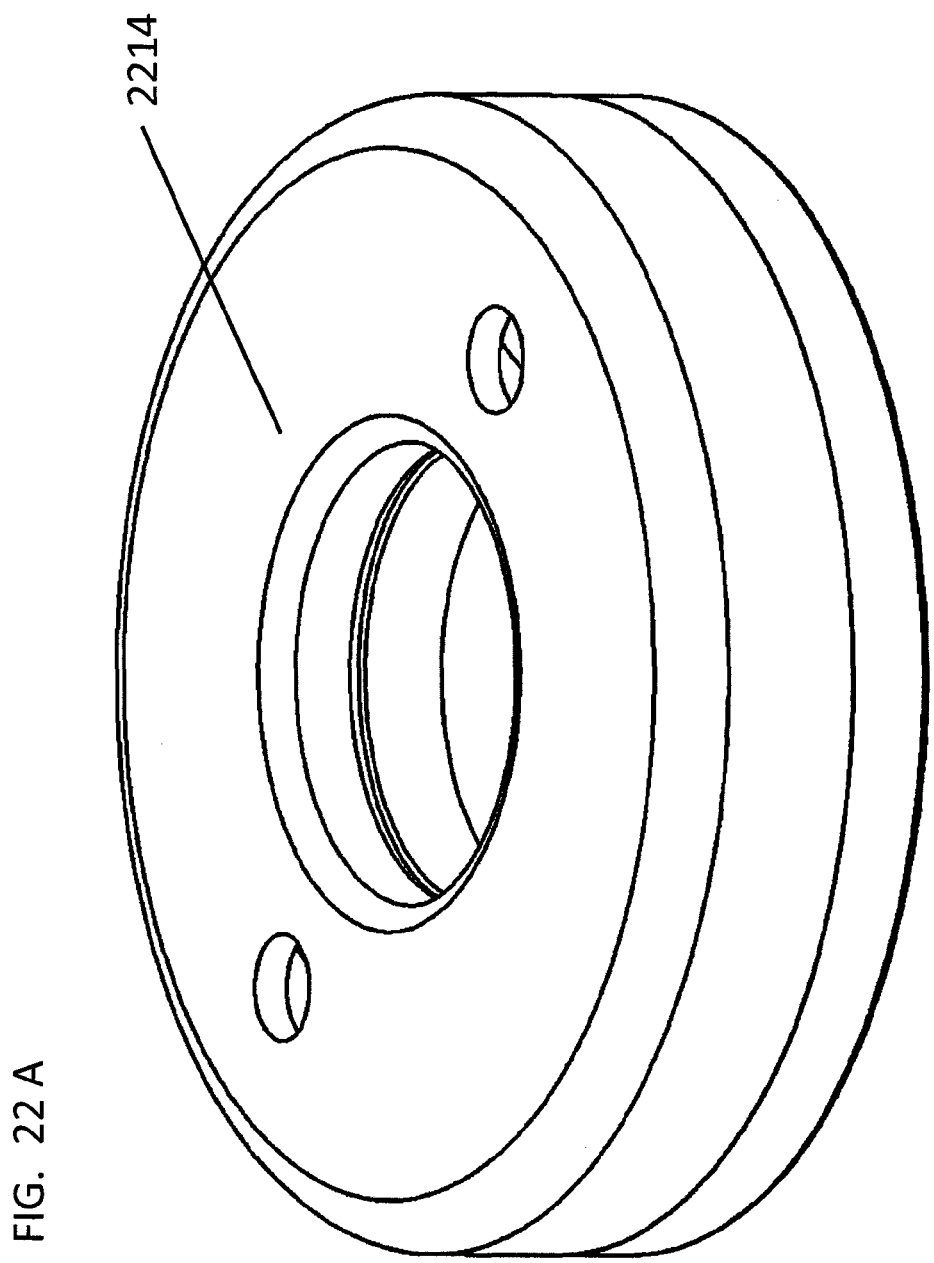
FIGS. 22A and 22B illustrate a lens assembly utilizing piezo-actuation according to various embodiments of the present invention.
Figure 22:
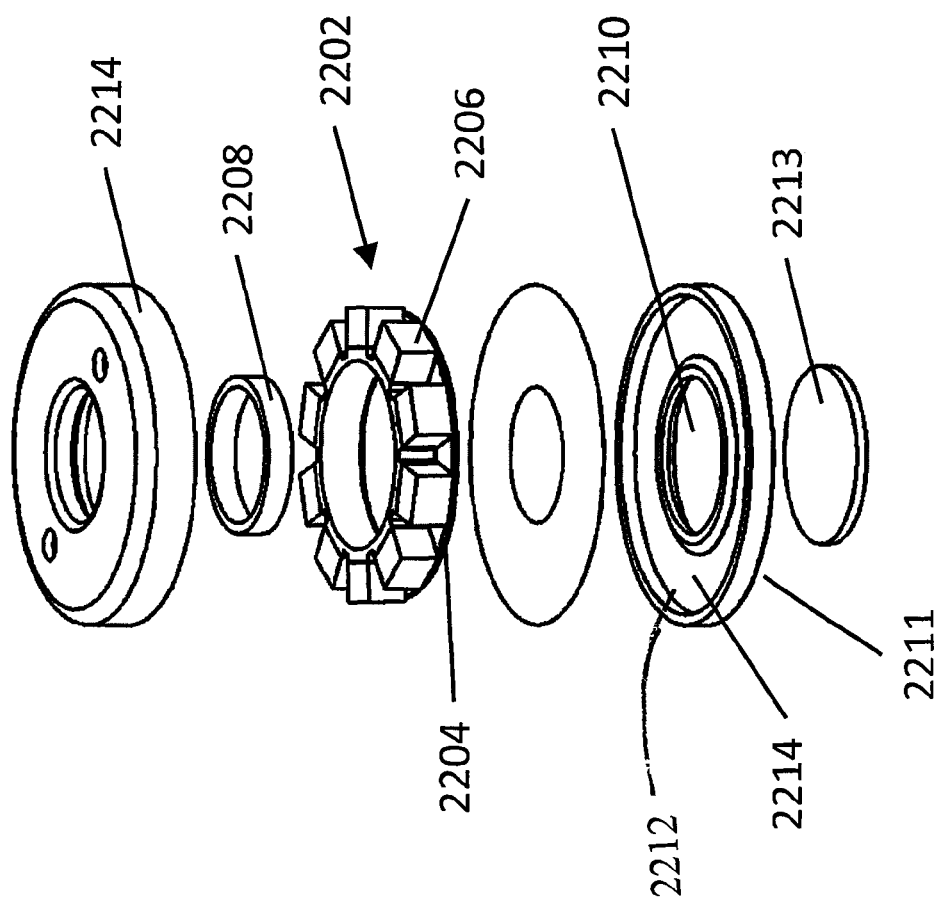

Referring now to FIGS. 20a, 20b, and 21 another example of a lens assembly is described. A membrane 2002 moves between position 2004 and 2006 and a reservoir 2008 is formed between plate 2010 and the membrane 2002. A coil 2012 is energized and the electromagnetic force created pushes the coil 2012 against the membrane 2002. As especially shown in FIG. 20b, fluid is exchanged via a channel (e.g., hole) 2014 in the membrane 2002 from a first portion 2016 of the reservoir to a second portion 2018 of the reservoir as movement occurs.

In the example of FIG. 20a and FIG. 20b, the reservoir is split between different portions. To connect the portions, the channel 2014 is disposed in the membrane that affects movement of fluid around the membrane and between different portions of the reservoir. The channel 2014 could be positioned in the membrane at any vertical location. In alternative examples, independent membranes could be used instead of providing a channel. When using independent membranes, the reservoir location may be completely independent of the lens location. Because the fluid is being squeezed, for example, the reservoir can be in any location and squeezed in any orientation.

In the example of FIG. 21, as compared to the example of FIGS. 20a and 20b, the reservoir is lowered. The motor structure is placed so that the coil 2012 is just under the tangent 2100 of the initial curve of the membrane. For example, the motor may be moved a half a millimeter distance compared to the previous examples. Consequently, a structure is provided that may be less than 10 mm in height. In this example, the bobbin shape is optimized to achieve a large lens deformation with small travel. Optimization of the bobbin structure is further discussed elsewhere in this specification.

Referring now to FIGS. 22A, 22B, 23A, 23B, and 23C, examples of lens assemblies are described where the voice coil motor is replaced by a piezo actuator. Instead of using a voice coil motor, these examples deform the lens using a traveling piezo actuator also called a piezo motor. By using the stick-slip effect, the small piezo movement can be translated into a large travel distance.

The piezo actuator 2202 includes a slider 2204 with piezos 2206. A lens defining sleeve 2208 fits into the slider 2204 and attaches to a membrane 2210 that covers a reservoir 2212. The reservoir 2212 is formed between the membrane 2210 and a glass cover 2211. A housing cover 2214 fits over the entire assembly. Actuator of the piezo elements 2206 moves the slider 2204 up and down impacting the membrane 2210 and changes the shape of the membrane 2210 via the impact. A cover (e.g., glass) is disposed at the bottom of the assembly.

Figure 23:
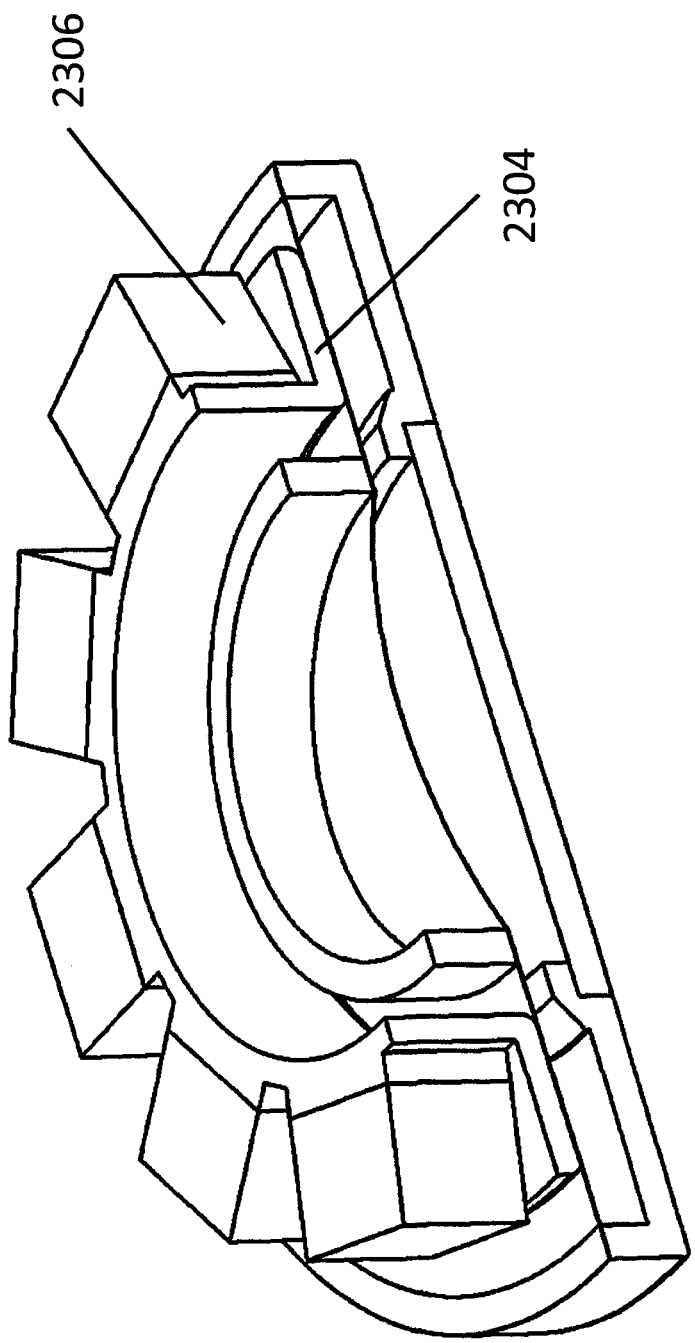
FIGS. 23A, 23B and 23C illustrates an interior view of the lens assembly of FIG. 22 according to various embodiments of the present invention.
Figure 23:
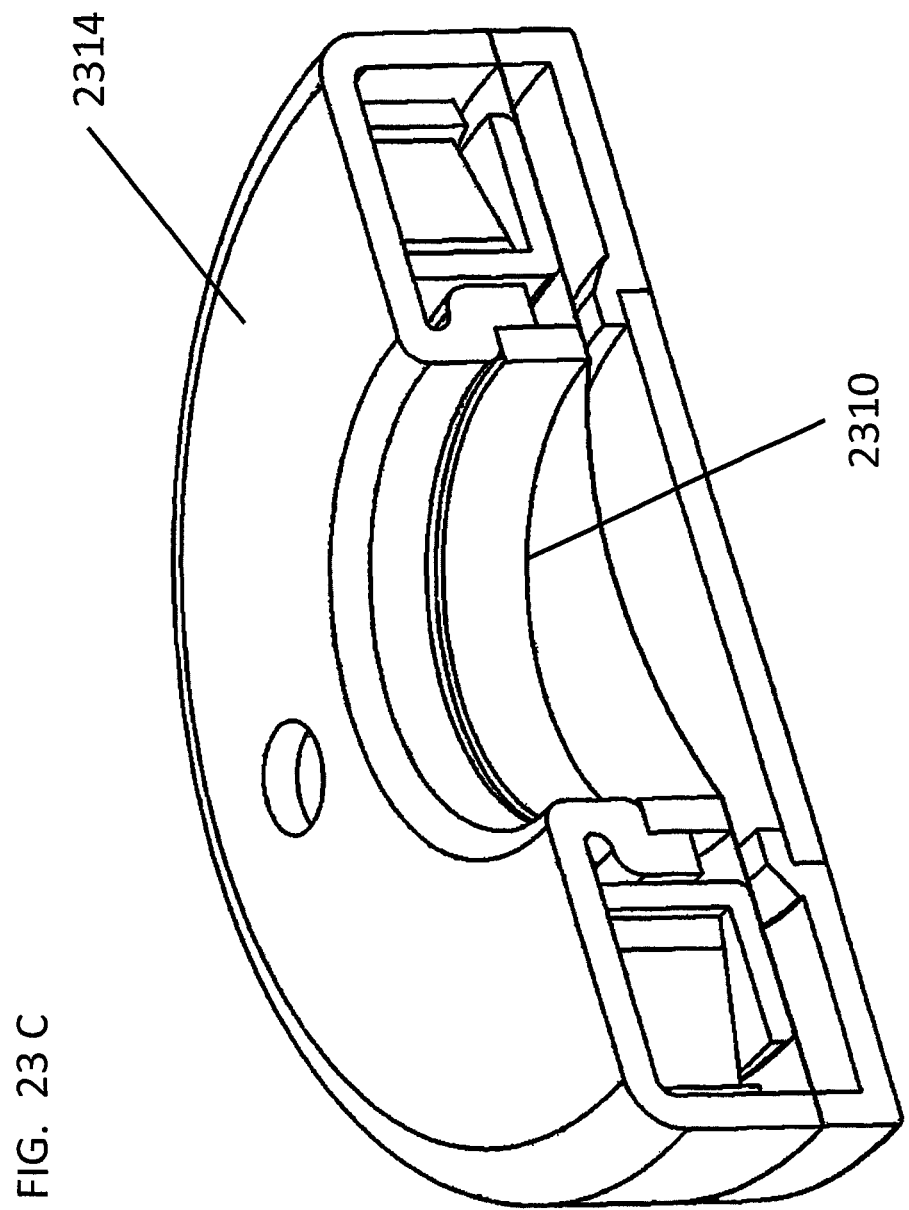

As shown especially in FIGS. 23A-C, piezo elements are fixed to the slider 2204. Alternatively, a single piezo ring can be used. The slider 2204 travels up and down displacing liquid in the reservoir 2212 and thereby changes the shape of the lens.

These examples illustrate moving the slider 2204 along a vertical path utilizing a piezo actuator elements 2206. As shown, the piezo actuator elements 2206 are disposed in a ring shape, with individual strips integrated into the housing or on a moving component. An advantage of utilizing a piezo-actuated force is that a relatively large force may be provided by the piezo actuator elements 2206. In addition, these piezo actuators may only need power when moving the slider 2204 up and down. Once a specific focal length is reached, the slider 2204 and the piezo elements 2206 remain fixed in place without using any additional power.

Figure 28:
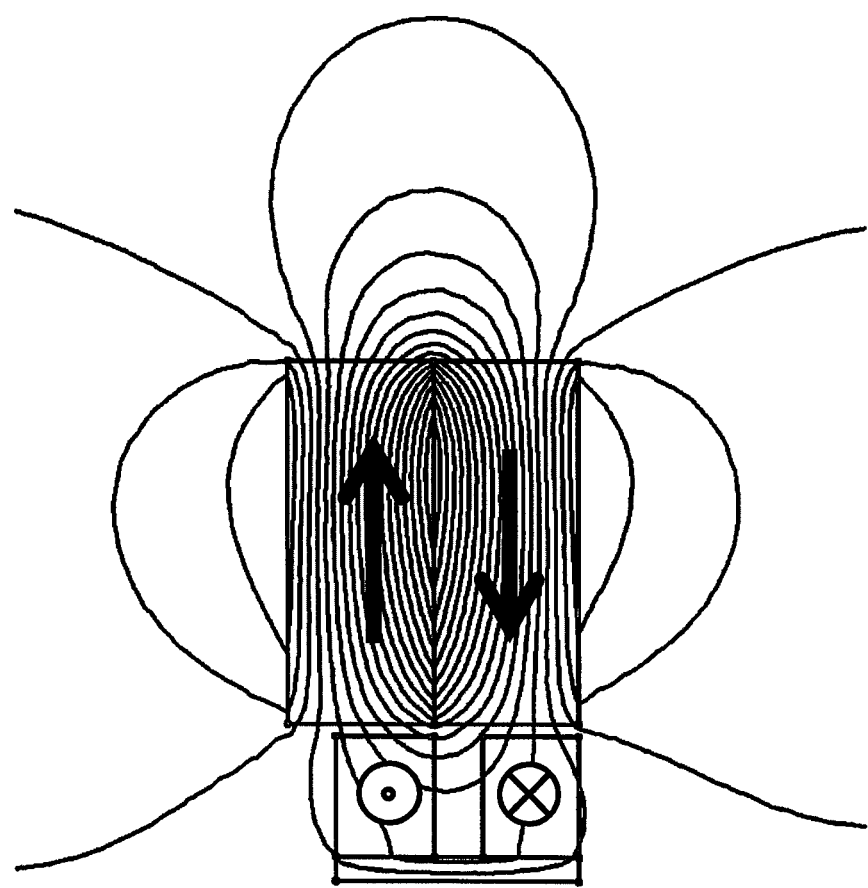
FIG. 28 illustrates a field guiding ring that optimizes the magnetic flux generated by the assembly of FIG. 26 according to various embodiments of the present invention.
Figure 29:
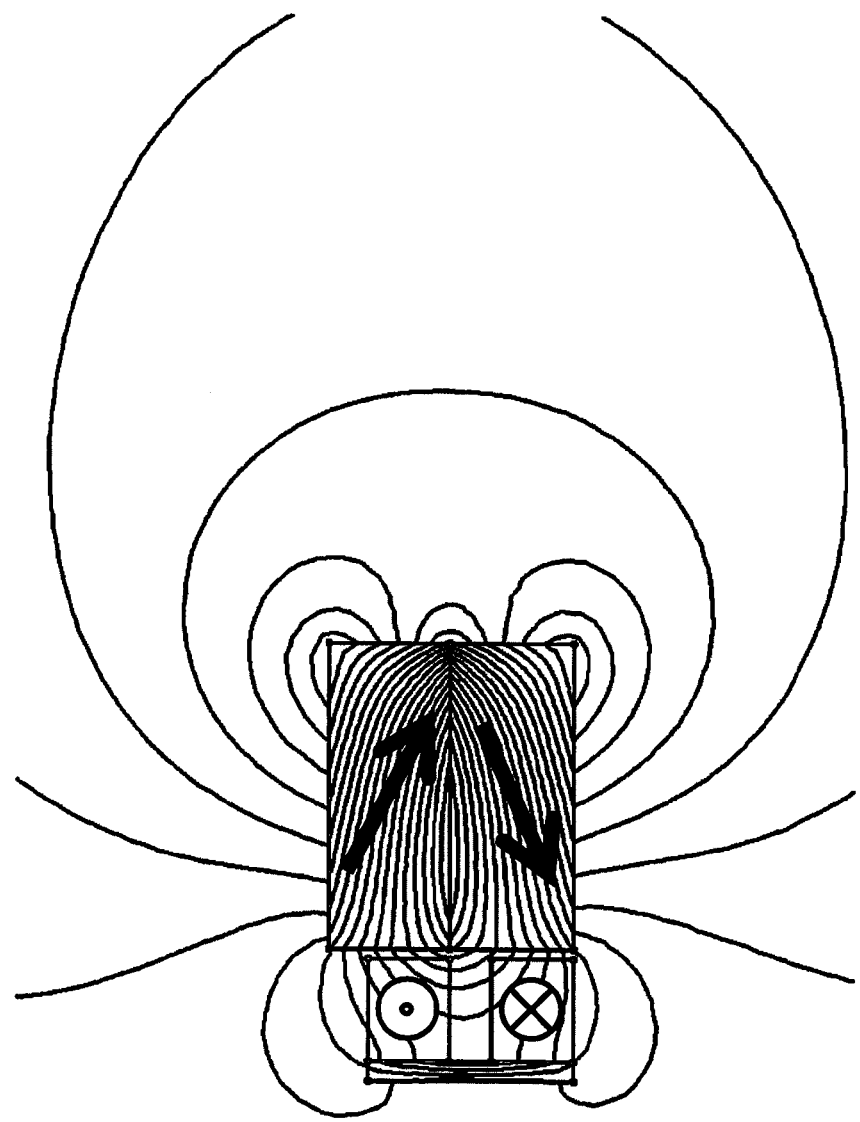
FIG. 29 illustrates magnetic flux generated by the assembly of FIG. 26 in which the magnets are polarized at an angle according to various embodiments of the present invention.
Figure 30:
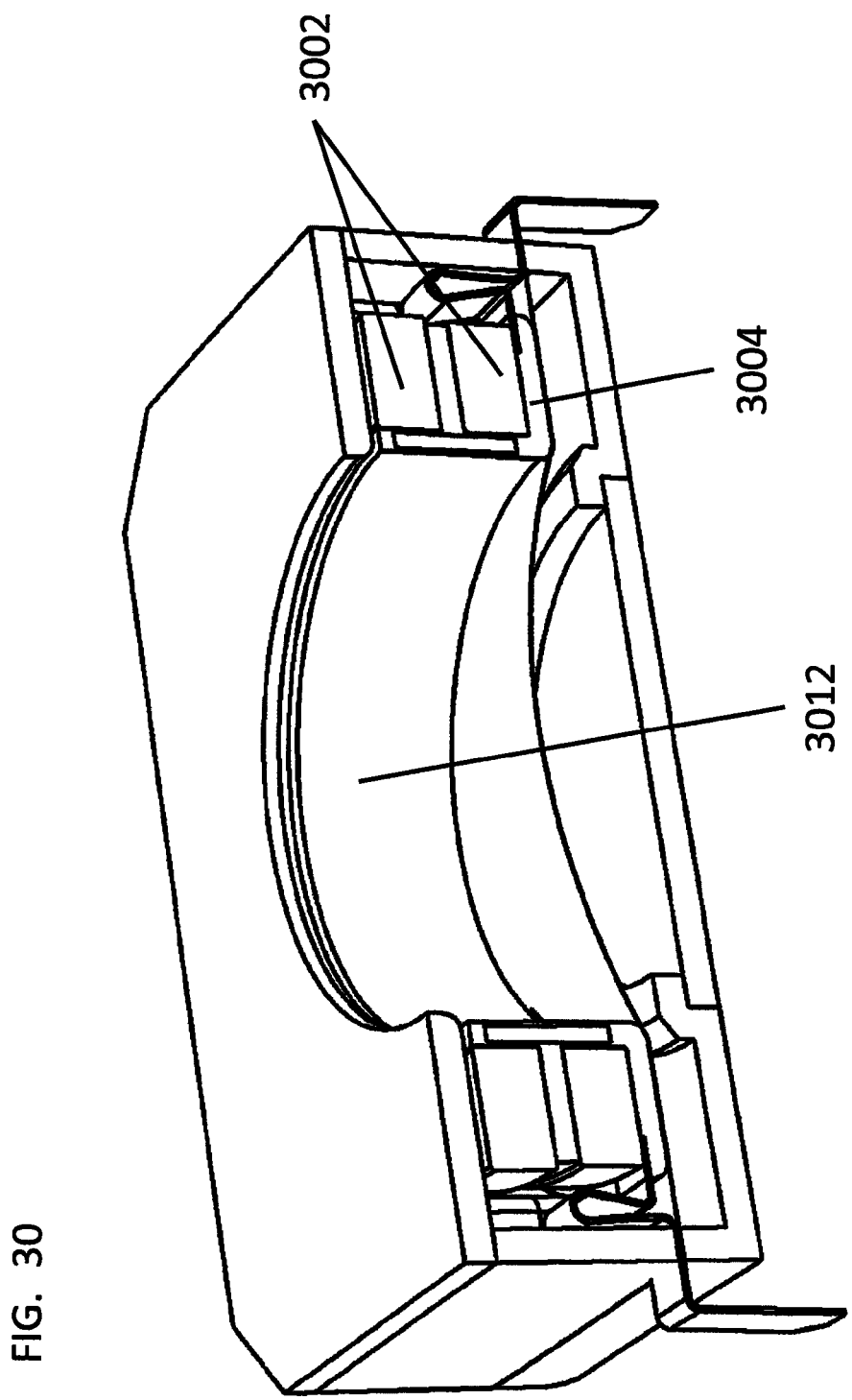
FIG. 30 illustrates a perspective cross-sectional view of a lens assembly in which a bobbin is a lens defining structure according to various embodiments of the present invention.

Referring now to FIGS. 24-30, another example of a lens assembly 2400 is described. A double coil 2402 presses a bobbin 2404 when excited. The bobbin 2404 is cylindrically shaped and this shape reduces friction. Flexible contacts 2406 excite the coil. Magnets 2408 are positioned around the coils 2402. Referring now to FIG. 30, the bobbin 2402 defines the shape of the membrane 2410. A lens shaper sleeve 2412 attaches to the membrane 2410. A bottom plate of cover 2416 seals a reservoir 2414 formed between the membrane 2410 and the plate 2416. These examples provide a compact assembly since the axial movement of the lens defining structure enables not only a displacement of the liquid under the bobbin but also changes the distance between the lens defining structure and the bottom plate of cover 2416. This results in an increased optical effect. In another example, the magnets may be polarized at an angle (and in radial or non-radial directions as desired).

Figure 24:
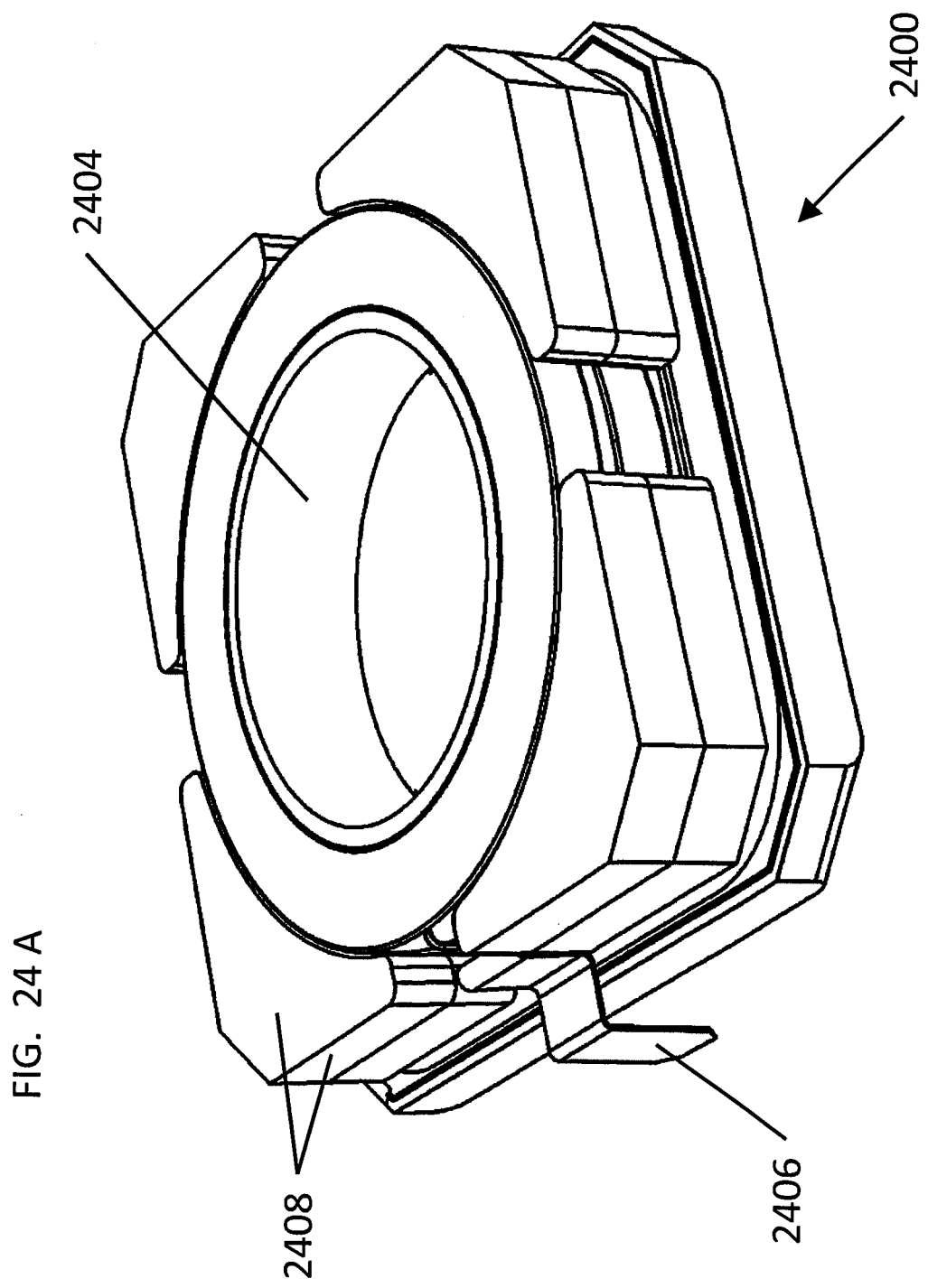
FIGS. 24A and 24B illustrates a perspective view of a lens assembly having a voice coil actuator with a double wound coil according to various embodiments of the present invention.
Figure 24:
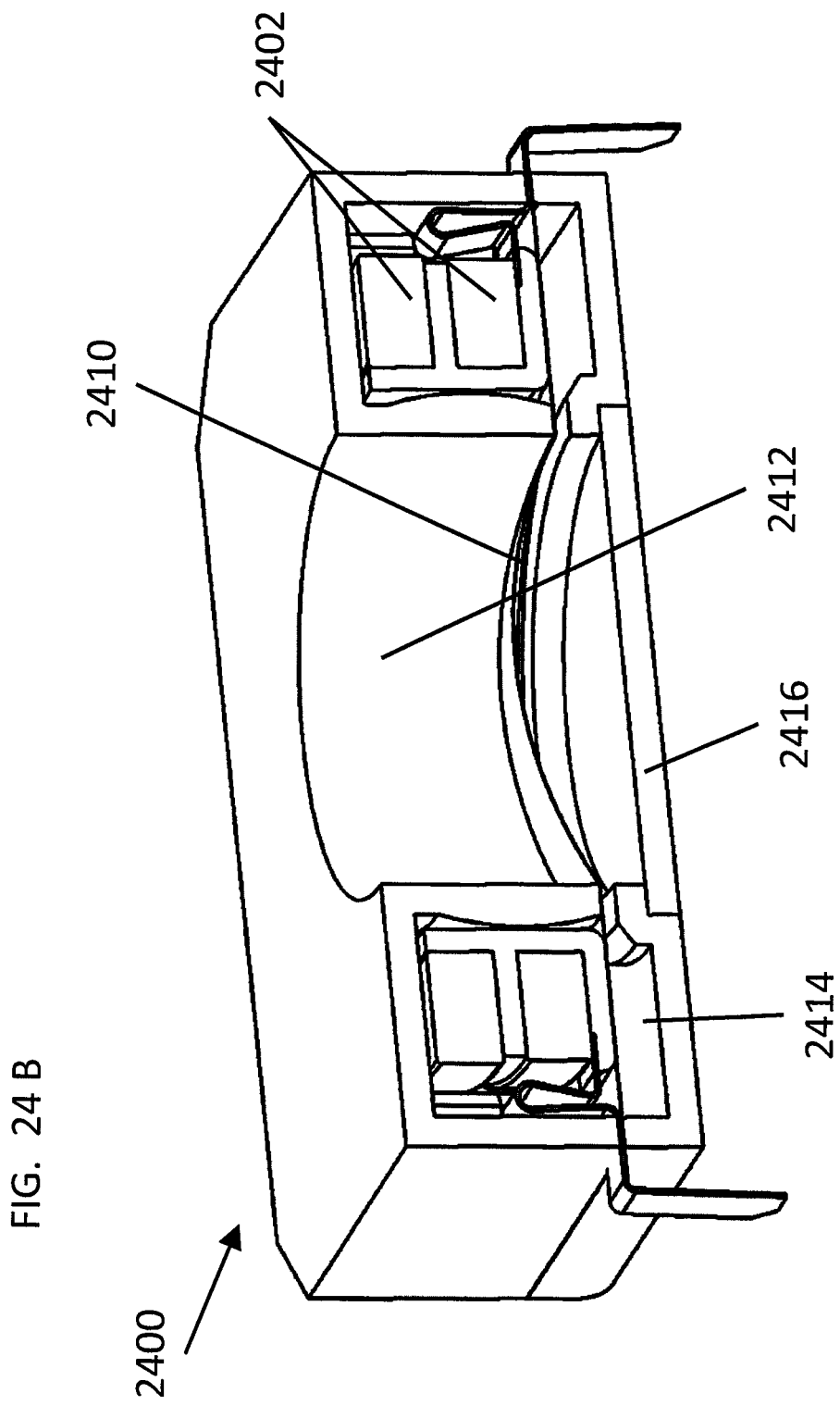
Figure 25:
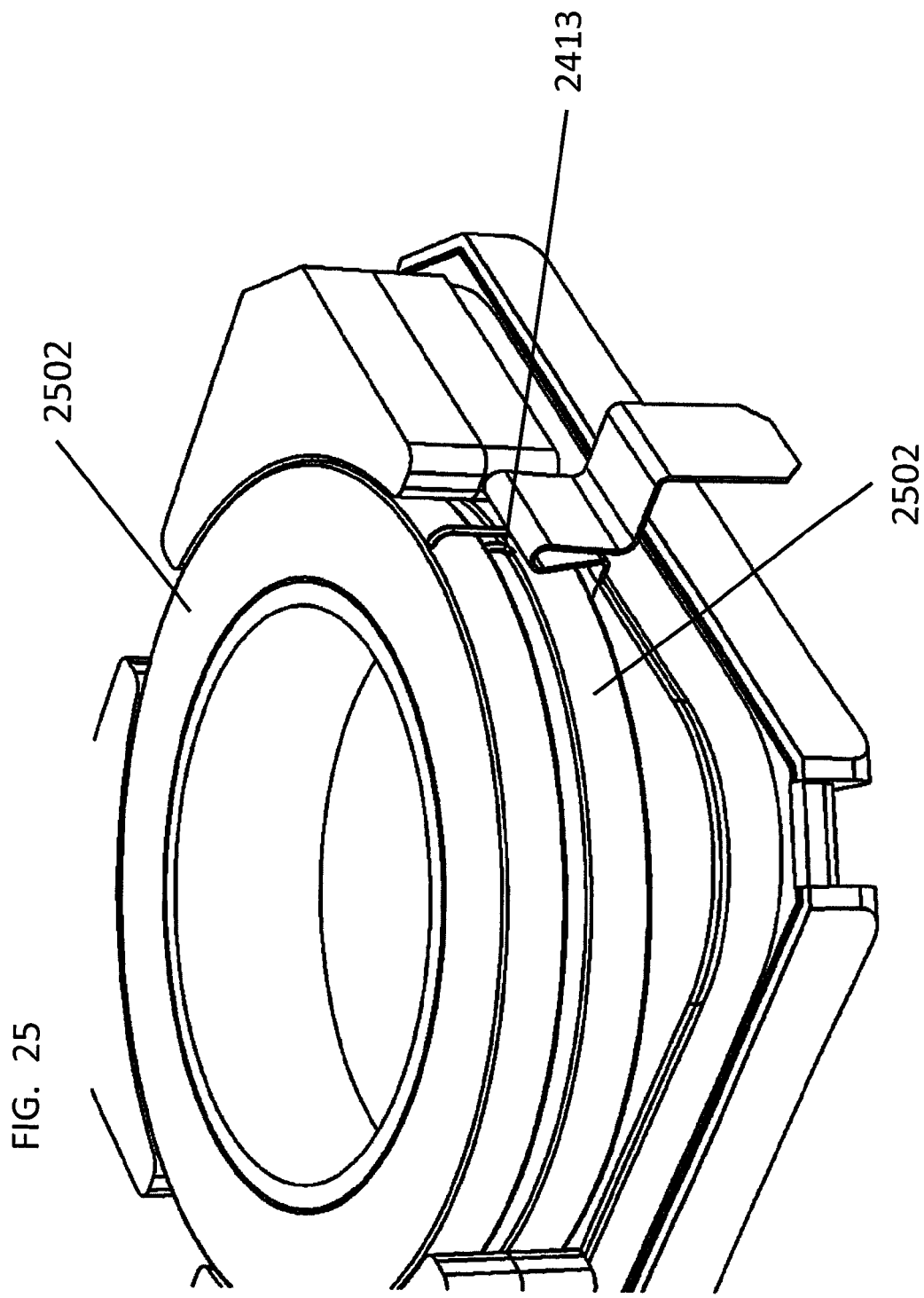
FIG. 25 illustrates a perspective isolated view of upper and lower coils of the assembly of FIG. 24 showing the lower coil wound opposite of the upper coil according to various embodiments of the present invention.
Figure 26:
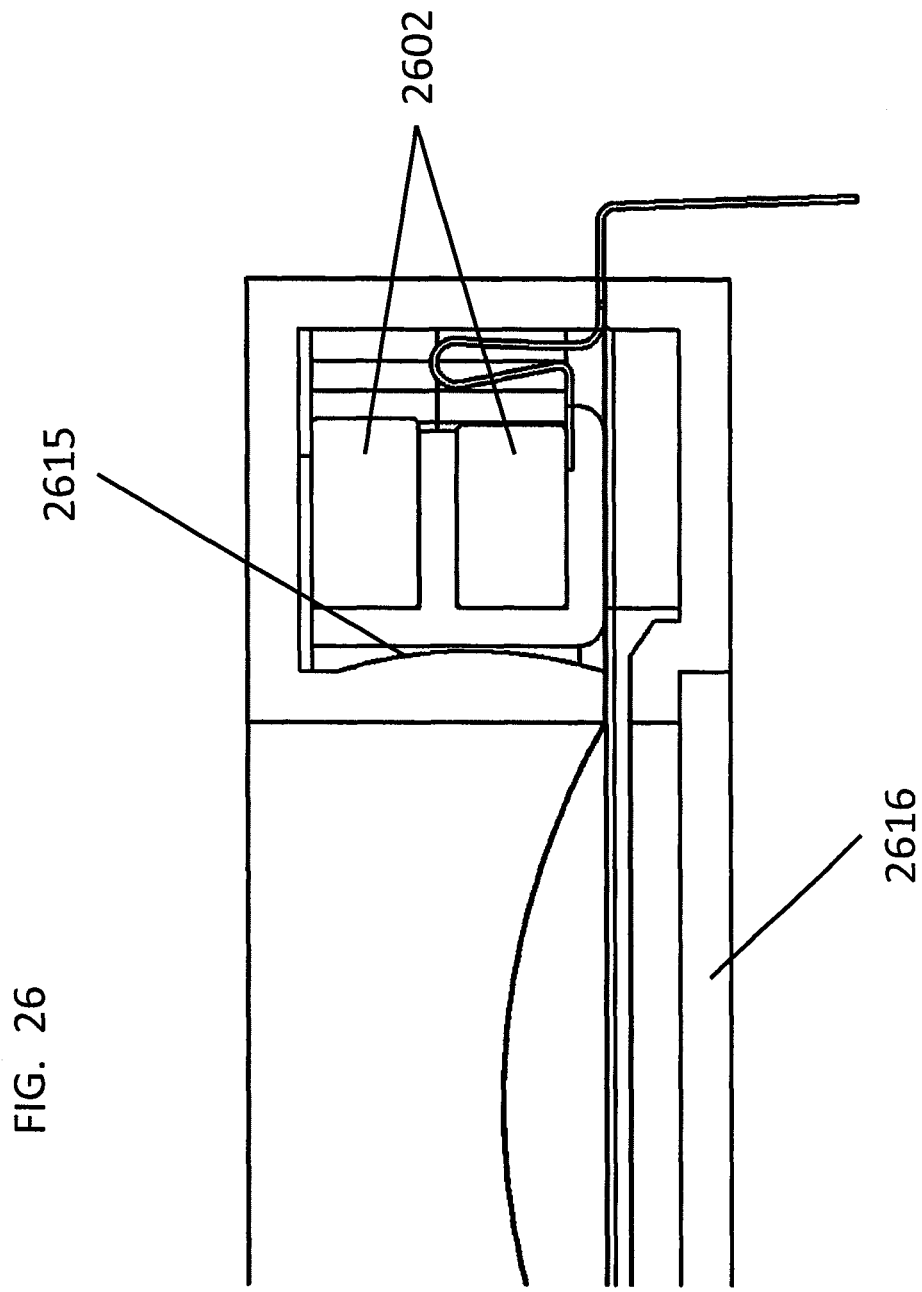
FIG. 26 illustrates an isolated cross-sectional view of the assembly of FIG. 24 according to various embodiments of the present invention.

Referring now again to FIGS. 25 and 26, an embodiment similar to FIG. 24 is shown. Here, the upper coil is wound clockwise and the lower coil is wound counter clockwise. A wire jump 2413 is provided from upper coil to lower coil. An arched surface 2415 provides less friction and contact between the bobbin and the lens shaper (e.g., metal cylinder). Alternatively, ribs may be placed on the axis of movement. The membrane helps to keep the relative position of the bobbin perpendicular to the lens shaper due to the constant pressure in the reservoir. To achieve current flow in two directions, the wire turns around at a wire jump point.

Figure 27:
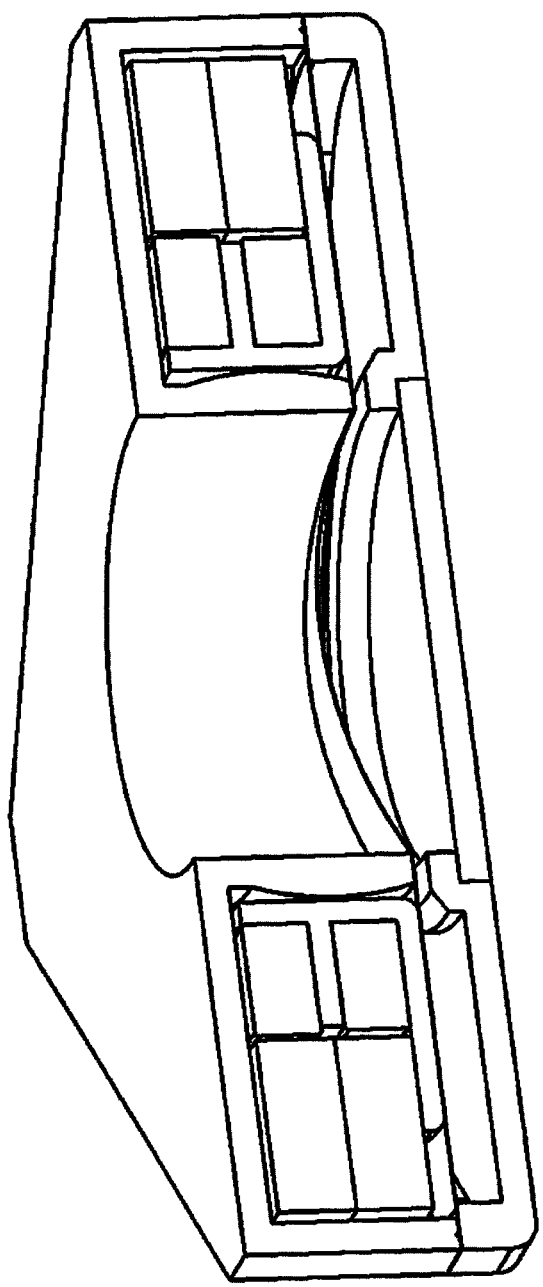
FIGS. 27A and 27B illustrates a perspective view of the assembly of FIG. 26 and further illustrates current flow and magnetic field flow on a top part of the assembly in one direction and on a bottom part in the opposite direction according to various embodiments of the present invention.
Figure 27:
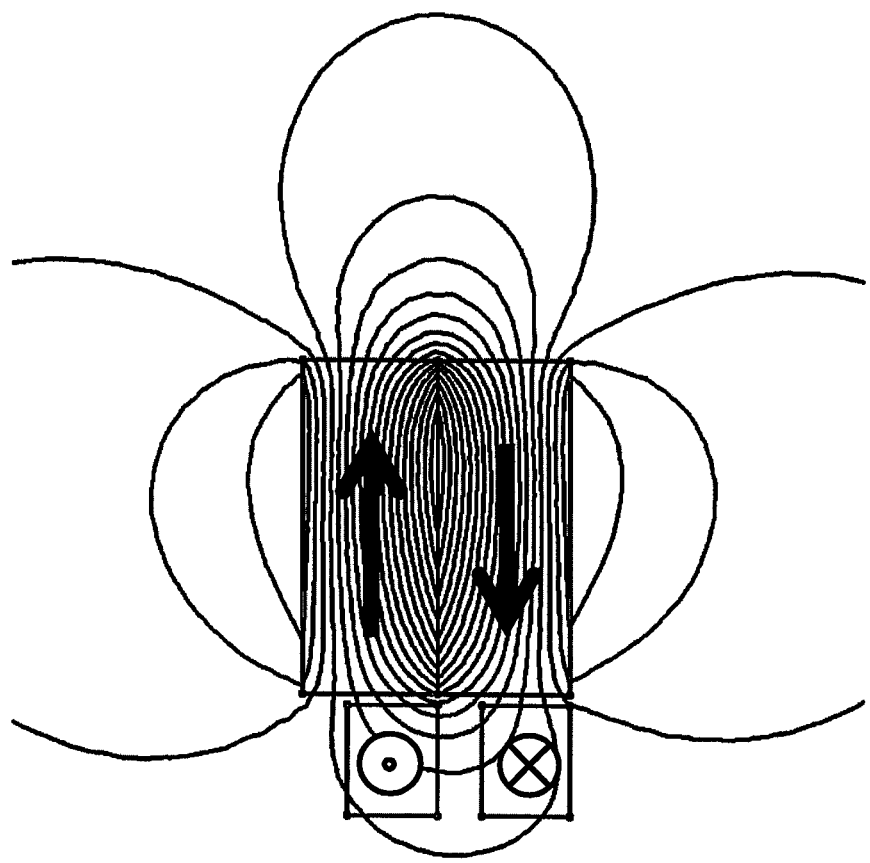

Referring now especially to FIGS. 27, 28 and 29, flux pattern adjustment based upon the design of the lens assembly is described. FIG. 27 shows an example flux pattern where no cylindrical steel cylinder (e.g., cylinder 612 in FIG. 6 that is shown as a pole in the cross-section) is used as a flux guiding structure. In the example of FIG. 6, two bobbins move in different directions. In both FIG. 6 and the present examples of FIGS. 25-29, radially inward and outward flux is utilized. However, in the examples of FIGS. 25-29 the bobbin moves in one same direction and the coil winding changes direction so that the force acts in only one direction.

FIG. 28 shows an example where a steel cylinder is used in the flux guiding structure. FIG. 29 shows an example of the flux pattern where the magnets are polarized at an angle, which changes the magnetization direction. In all of these examples, the coil is wound onto the bobbin. In the example of FIG. 29, the coil has 250 windings, is energized to 100 milli-amperes, and ceramic magnets are used.

Figure 31:
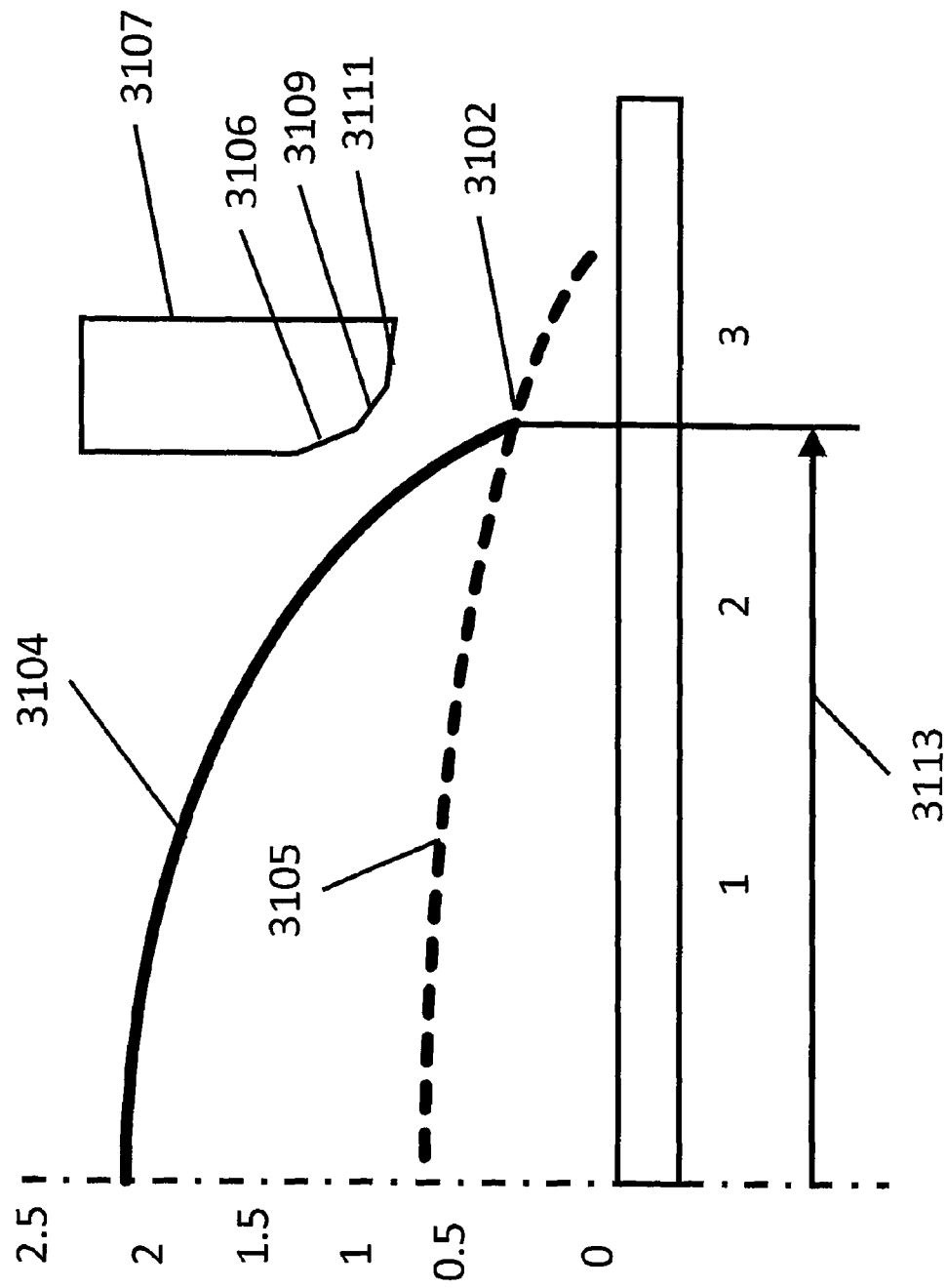
FIG. 31 illustrates an isolated view of a beveled contact point for a membrane and inner diameter of a ring structure of a lens assembly according to various embodiments of the present invention.

Referring now to FIG. 31, another example of a lens assembly is described. A lens defining point 3102 occurs where the membrane moves from a fully deformed position 3104 to a least deformed position 3105. The structure 3107 is beveled and presses against the membrane (the structure is shown raised in FIG. 31 for purposes of clarity; it is pressed against the membrane). Beveling may result in various advantages in the present approaches. For instance, if the contact point between the membrane and the assembly is shaped whereby it has one or more bevels, it may provide a more measureable part. Multiple bevels may also reduce the error associated with the radius 3113 of the lens defining point 3102. The bevels can also have different shapes such as circles, ovals or squares.

As shown in FIG. 31, a first bevel 3106, matched to the membrane at a low position and high side, just above the position of the lens at full height is provided. A second bevel 1309 and third bevel 1311 are also present. The lens may contact some or all of the second bevel 1309 and the third bevel 1311 but not the first bevel 1306 as it is deformed. However, the lens defining point 3102 remains constant.

The lens defining point may actually be a radius (i.e., a length). Whether the lens defining point 3102 is a single point or an arc (length) this point can move or remain at a fixed position depending on the shape of the lens shaper. Examples with single bevels may be manufactured in metal while examples using multiple bevels may be manufactured in plastic.

Figure 32:
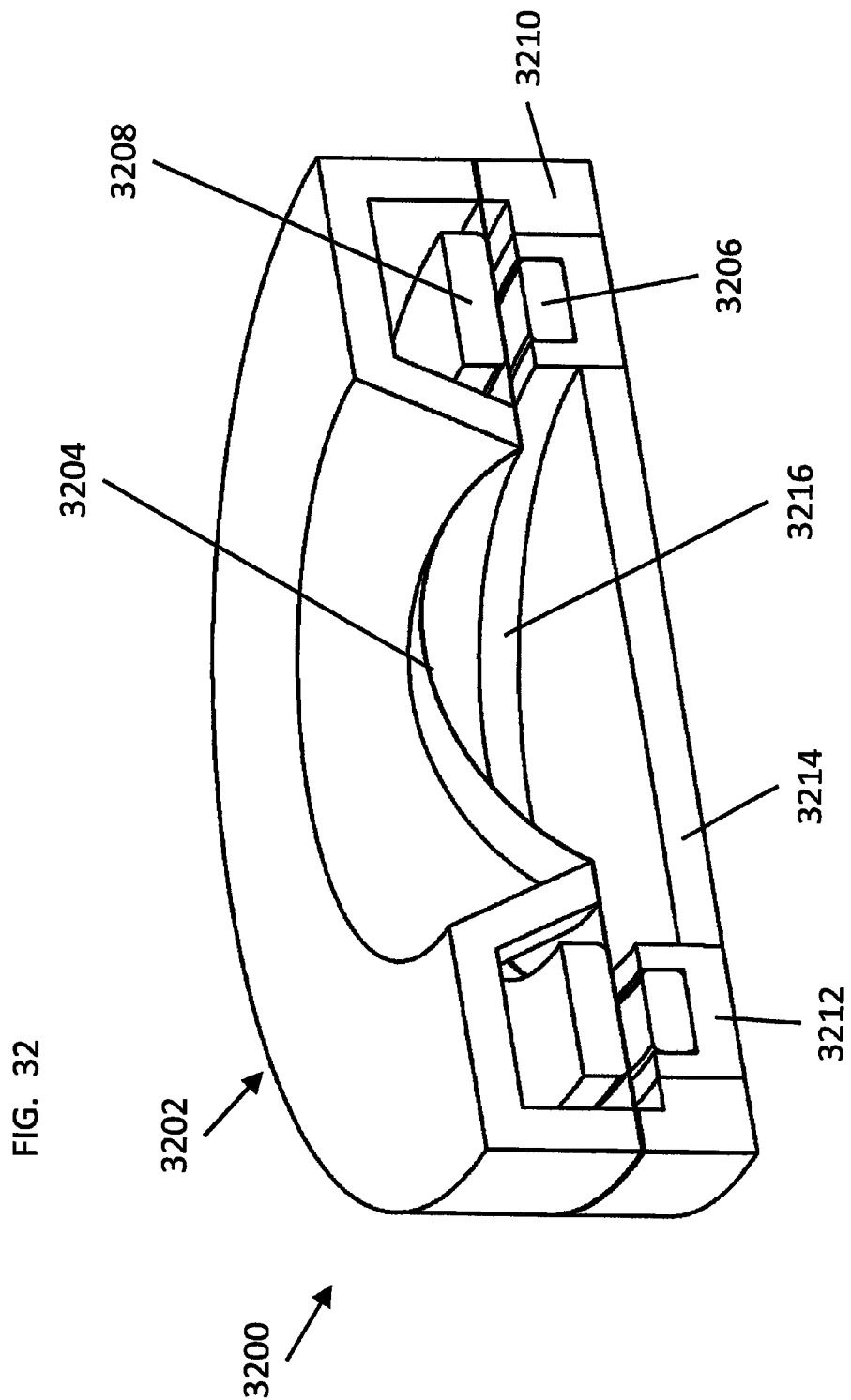
FIG. 32 illustrates a perspective cross-sectional view of a lens assembly according to various embodiments of the present invention.

Referring now to FIG. 32, another example of a lens assembly 3200 is described. The assembly 3200 includes a lens shaper (e.g., a plastic component) 3202, a membrane 3204, a coil 3206, a metal pusher 3208, a housing (e.g., a plastic housing) 3210, a metal housing 3212, and a cover (e.g., a glass cover) 3214. The cover 3214 and membrane 3204 define a reservoir 3216. In this example, magnets are not used.

The metal pusher 3208 and metal housing 3212 are constructed of magnetically permeable or soft magnetic materials and magnetized in a polarization such that when current flows through the coil 3206, the metal pusher 3208 moves upward or downward. A rectified response is achieved where the movement of the pusher is proportional to the amplitude of the current but independent of the direction of the current. For example, at 0 amps, the device is in a rest position. At +0.1 amps and −0.1 amps it moves to the same closed position. The metal pusher 3208 is attached to the membrane 3204 by an adhesive, fastener, or some other arrangement. The properties of the remaining components have been discussed elsewhere herein and will not be discussed further here.

In operation, the coil 3206 is fixed and when actuated the metal pusher 3208 is drawn downward. Consequently, the filler material (e.g., optical fluid) in the reservoir 3216 is displaced, the membrane 3204 changes shape, and the optical properties of the lens (membrane 3204, filler material, plate 3212) are adjusted.

More specifically, when no current flows through the coil 3206, no magnetic field exists and no magnetic field flows through the metal housing 3212 (constructed of magnetically permeable or soft magnetic materials). When a current flows through the coil 3206, a closed magnetic flux builds up in the metal parts and this flux flows through the metal housing 3212 and the metal pusher 3208. The resulting attraction force between the metal pusher 3208 and the metal housing 3212 causes a deformation of the membrane 3204 in the outer ring, resulting in a change of the membrane 3204 in the central, optically active part.

One advantage of the example described with respect to FIG. 32 is that no permanent magnet snap-in can occur since no permanent magnets are used. Generally speaking, when the magnets are positioned too close together, the attraction force between the magnet and metal is larger than the retention force of the membrane and the elastic membrane that prevent the magnet and metal from coming together. Once this occurs, "snap-in" happens, and the magnet and metal can generally do no more (by themselves) to separate themselves when the current is removed, meaning that the device is locked in a fixed position. The configuration of FIG. 32 prevents snap-in from occurring and, if it does occur, allows snap-in to be easily reversed.

As shown, no permanent magnets are required making this approach inexpensive to produce. The coil 3206 is fixed in the housing and does not move. This makes it shock resistant and easy to make electrical connections with internal and external components or devices. Additionally, the lens shaper 3202 is fixed, providing a high optical quality.

Figure 33:
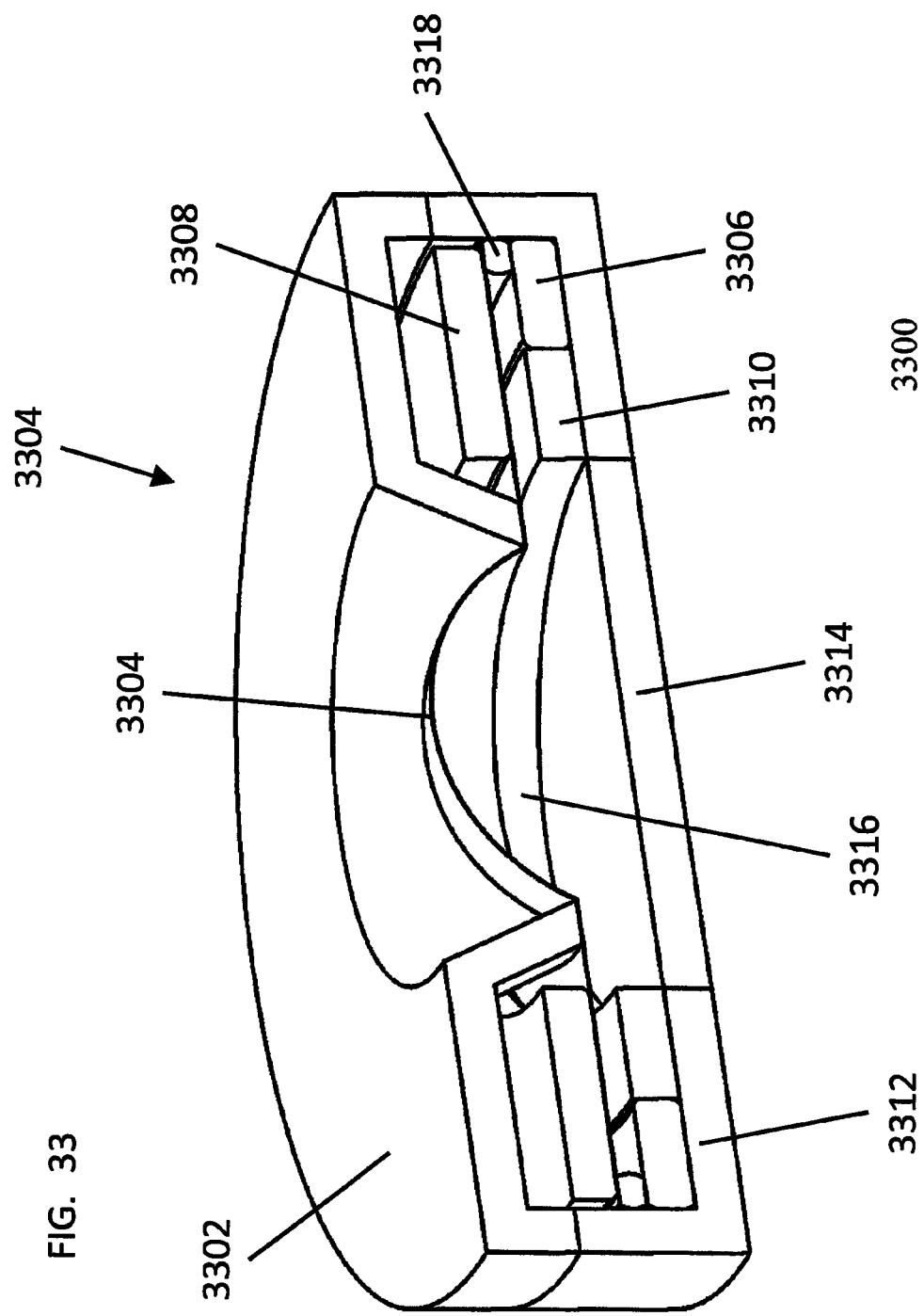
FIG. 33 illustrates a perspective cross-sectional view of another lens assembly according to various embodiments of the present invention.

Referring now to FIG. 33, another example of a lens assembly 3300 is described. The assembly 3300 includes a lens shaper (e.g., a plastic component that is not magnetized) 3302, a membrane 3304, a coil 3306, a metal pusher 3308, a magnet 3310, a metal housing 3312, and a cover (e.g., a glass cover) 3314. The cover 3314 and membrane 3304 define a reservoir 3316. An elastic rubber seal 3318 is positioned between the metal pusher 3308 and the coil 3306. The seal 3318 is used as a sealing element as well as for preventing "snap-in."

In this example, a permanent magnet 3310 is used that creates a constant flux in the metal housing 3312 and the metal pusher 3308. This causes a permanent attraction of the metal pusher 3308 and the metal housing 3312.

The metal pusher 3308 is magnetized in a polarization pattern such that when current flows through the coil 3306 (and depending upon the direction of the current) and due to the magnetic field created by the magnet 3310, the metal pusher 3308 moves upward or downward. The metal pusher 3308 is attached to the membrane 3304 by an adhesive, fastener, or some other arrangement. The properties of the remaining components have been discussed elsewhere herein and will not be discussed further here.

In operation, the coil 3306 is fixed and when actuated the metal pusher 3308 is moved. Consequently, the filler material (e.g., optical fluid) in the reservoir 3316 is displaced, the membrane 3304 changes shape, and the optical properties of the lens (membrane 3304, reservoir 3316, plate 3312) are adjusted.

More specifically, the initial distance between the metal housing 3312 and the metal pusher 3308 is defined by the elastic rubber seal 3318 that works against the attraction forces of the metal pusher 3308 and the magnet 3310. When a current flows through the coil 3306, a controllable field is superimposed onto the DC field. Depending on the current direction, the attraction between the metal pusher 3308 and the magnet 3310 increases or decreases. To avoid snap in, the elastic rubber seal 3318 is adjusted such that the force required to compress the rubber increases more than the attraction force between the metal pusher 3308 and the magnet 3310, when the distance between the metal pusher 3308 and the magnet 3310 decrease.

As shown, no moving coil and no problem with lead out wires exists. The lens can be tuned in both directions, meaning that the force on the metal pusher 3308 can be increased or decreased with a control current. The rubber used in the elastic rubber seal 3318 is chosen to be hard enough to prevent snap in from occurring. Snap in can also be prevented by putting non-magnetic elements in the metal at distances that prevent snap in.

Figure 34:
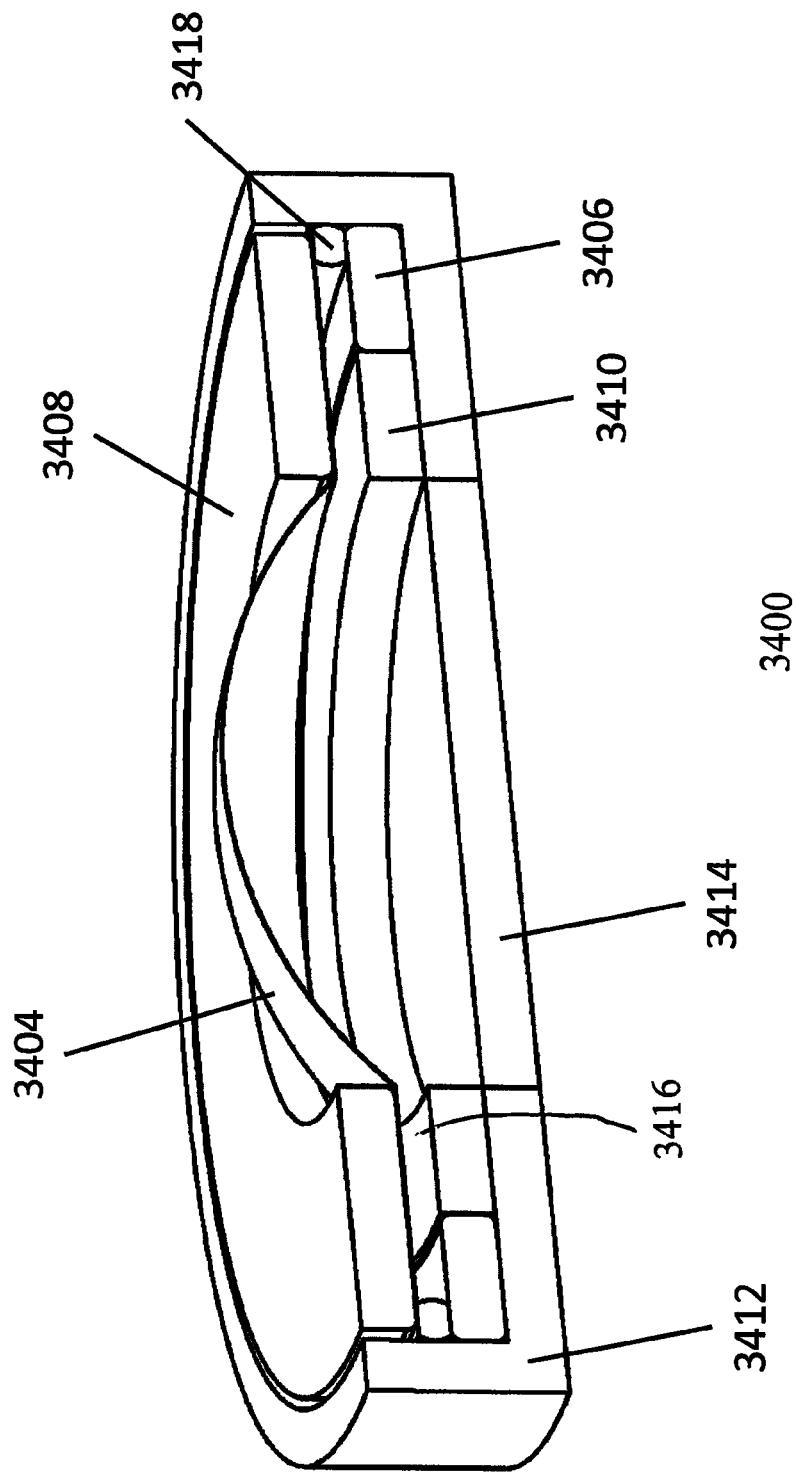
FIG. 34 illustrates a perspective cross-sectional view of still another lens assembly according to various embodiments of the present invention.

Referring now to FIG. 34, another example of a lens assembly 3400 is described. The assembly 3400 includes a membrane 3404, a coil 3406, a metal pusher 3408, a magnet 3410, a metal housing 3412, and a cover (e.g., a glass cover) 3414. The cover 3414 and membrane 3404 define a reservoir 3416. An elastic rubber seal 3418 is positioned between the metal pusher 3308 and the coil 3406. In this example, the metal pusher 3408 defines the shape of the membrane 3404. Compared to the examples of FIGS. 32 and 33, no lens shaper is used, providing a smaller form factor. The elastic rubber seal 3418 can be constructed such that the metal pusher 3408 remains well centered and snap in is prevented. In this example, the position and shape of the lens changes as current is applied.

The metal pusher 3408 is magnetized in a polarization such that when current flows through the coil 3406 (and depending upon the direction of the current) and due to the magnetic field created by the magnet 3410, the metal pusher moves upward or downward. The metal pusher 3408 is attached to the membrane 3404 by an adhesive, fastener, or some other arrangement.

In operation, the coil 3406 is fixed and when actuated the metal pusher 3408 is moved. Consequently, the filler material (e.g., optical fluid) in the reservoir 3416 is displaced, the membrane 3404 changes shape, and the optical properties of the lens (membrane 3404, reservoir 3416, plate 3412) are adjusted.

Figure 35:
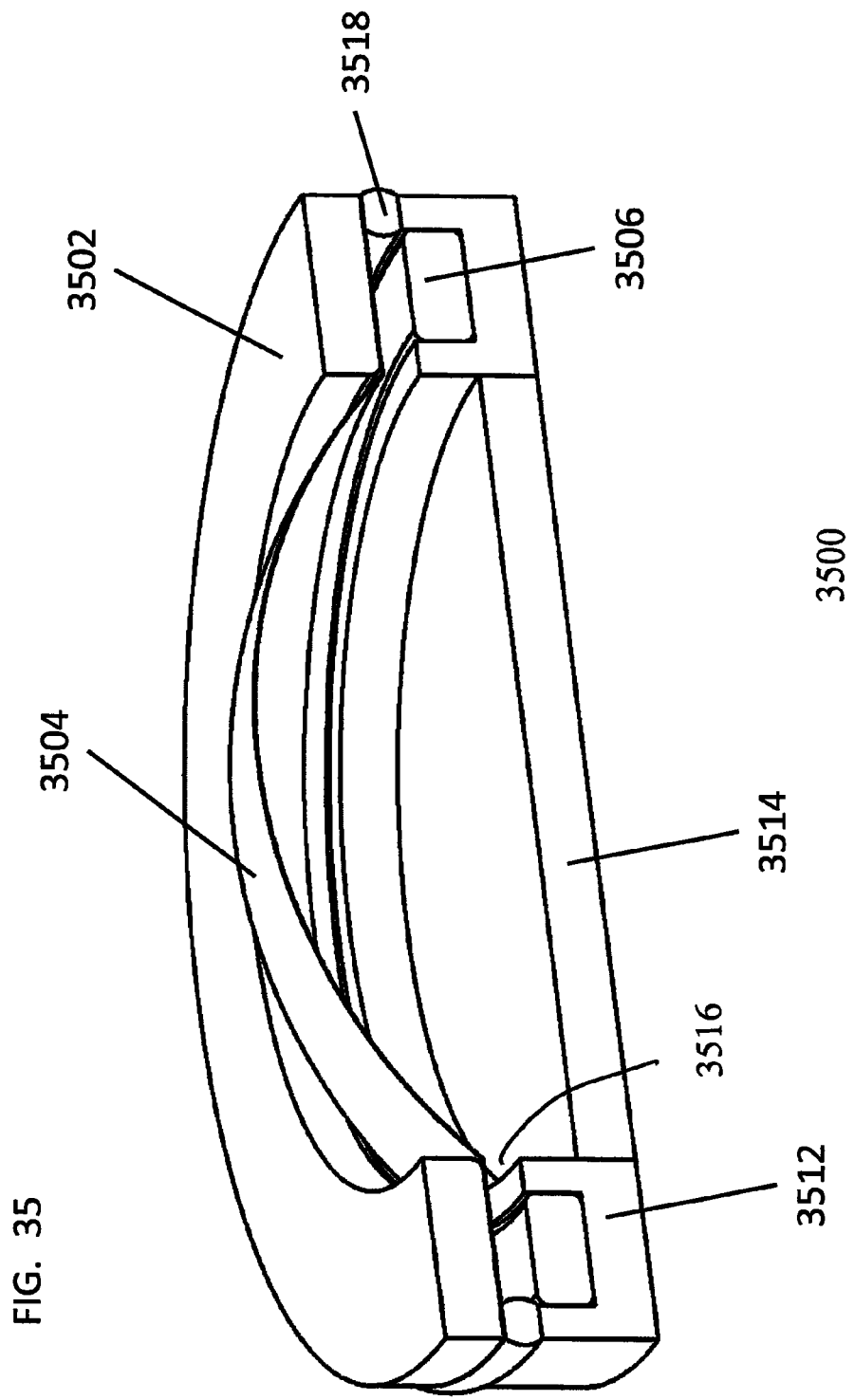
FIG. 35 illustrates a perspective cross-sectional view of another lens assembly according to various embodiments of the present invention.

Referring now to FIG. 35, another example of a lens assembly 3500 is described. The assembly 3500 includes a lens shaper (e.g., a metal component) 3502, a membrane 3504, a coil 3506, a metal housing 3512, and a cover (e.g., a glass cover) 3514. The cover 3514 and membrane 3504 define a reservoir 3516. In this example, magnets and a metal pusher are not used. An elastic seal 3518 is positioned between the metal lens shaper 3502 and the coil 3506. The metal lens shaper 3502 is attached to and defines the membrane 3504. Compared to the example of FIG. 32, no lens shaper is used, providing a smaller form factor. Additionally, the elastic rubber seal 3518 can be constructed such that the metal pusher 3508 remains well centered and snap in is prevented. In this example, the position and shape of the lens changes as current is applied.

The metal lens shaper 3502 is magnetized in a polarization pattern such that when current flows through the coil 3506, the metal lens shaper 3502 moves. The metal lens shaper 3502 is attached to the membrane 3504 by an adhesive, fastener, or some other arrangement. The properties of the remaining components have been discussed elsewhere herein and will not be discussed further here.

In operation, the coil 3506 is fixed and when actuated the metal lens shaper 3502 is drawn downward. Consequently, the filler material (e.g., optical fluid) in the reservoir 3516 is displaced, the membrane 3504 changes shape, and the optical properties of the lens (membrane 3504, reservoir 3516, plate 3512) are adjusted.

Figure 36:
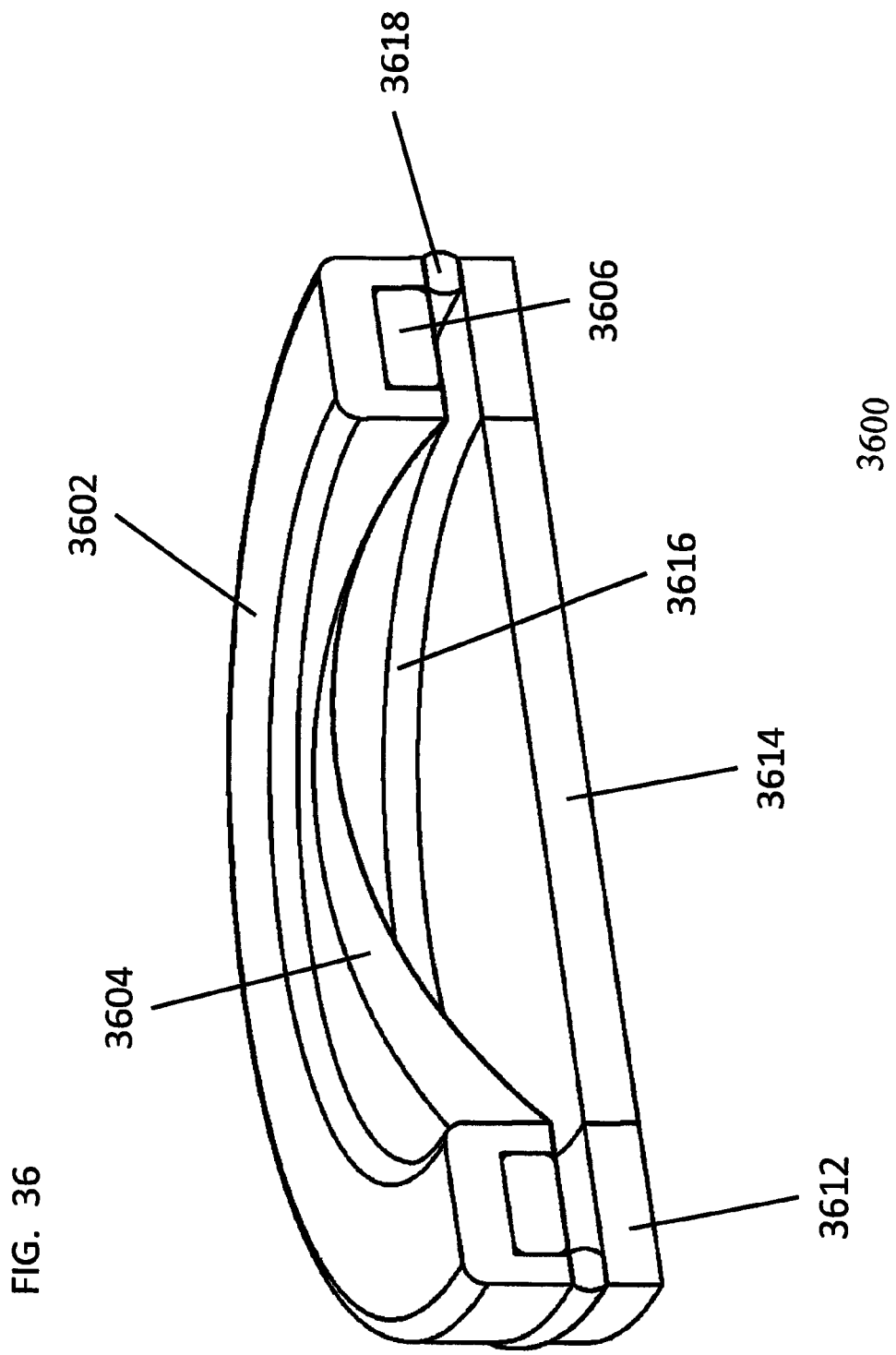
FIG. 36 illustrates a perspective cross-sectional view of yet another lens assembly according to various embodiments of the present invention.

Referring now to FIG. 36, another example of a lens assembly 3600 is described. The assembly 3600 includes a lens shaper (e.g., a metal component) 3602, a membrane 3604, a coil 3606, a metal housing 3612, and a cover (e.g., a glass cover) 3614. The cover 3614 and membrane 3604 define a reservoir 3616. In this example, magnets and a metal pusher are not used and the coil 3606 is on the same side of the membrane 3604 as the metal lens shaper 3602. An elastic seal 3618 is positioned between the metal lens shaper 3602 and the coil 3606. The lens shaper 3602 is attached to and defines the membrane 3604. To minimize height, the metal lens shaper 3602 is disposed on the side of the flexible membrane 3604. The membrane 3604 can be attached to the metal housing 3612 for easy sealing of the liquid in the lens, or the elastic rubber seal 3618 can be used as sealing material. In this example, the position and shape of the lens changes as current is applied.

The metal lens shaper 3602 is magnetized in a polarization such that when current flows through the coil 3606, the metal lens shaper 3602 moves. Amplitude of the current determines movement of the lens shaper 3602. The metal lens shaper 3602 and the coil 3606 are attached to the membrane 3604 by an adhesive, fastener, or some other arrangement. The properties of the remaining components have been discussed elsewhere herein and will not be discussed further here.

In operation, the coil 3606 is not-fixed as in the examples of FIGS. 32-35 but moves with the lens shaper 3602. When the coil 3603 is actuated, the metal lens shaper 3602 is drawn downward. Consequently, the filler material (e.g., optical fluid) in the reservoir 3616 is displaced, the membrane 3604 changes shape, and the optical properties of the lens (membrane 3604, reservoir 3616, plate 3612) are adjusted.

As mentioned, the present approaches provide various advantages. Further, the wear provided by any of the approaches described herein is superior as compared to that of previous systems. Since many lens assemblies are often required to provide 100,000 cycles of operation to meet industrial or government requirements, a plastic construction for many of the assembly components would likely ensure the assembly components so-constructed would not fail due to the durability of plastic. However, other materials may also be used.

In some push-only lenses as described herein, the coil would not need to be in contact continually with the lens. The voice coil could be wound on a bobbin or encapsulated so that it could float and occasionally rub in the motor gap. Tolerancing can be configured to enable the bobbin/coating to rub on the motor and not the coils.

The closeness of coil to motor may help to minimize shock problems created when the assembly is bumped, moved, or jarred. An advantage of these approaches is that proximity of the coil to the motor wall may allow for assembly to function without disposable fixtures.

Using the lens defining structure as a flux guiding structure allows maximizing the amount of metal and magnet that can be used and thus maximizing the force generated by the moving coil and, thus, minimizing the power consumption. Further, using magnetic members as one part of the housing of the lens assembly allows an easy assembly without the requirement for glues, making an assembly much easier and more cost efficient.

A moving coil as used in the approaches described herein prevents sticking of magnets to metallic structures. If a moving permanent magnet were connected to the deformable membrane and a strong mechanic shock happens, the magnet could permanently stick to the metal structure (snap in), resulting in a failure of the lens. This problem is avoided by the approaches described herein with the use of moving coils.

For a zoom module two tunable lenses are employed and allow for the independent control of both lenses. This is not the case when multiple, moving magnets are used instead of moving coils.

Further, the membrane deformation can be easily controlled by varying the current flowing through the coil since the lens membrane acts as a spring. In addition and as mentioned, the manufacturing process is very simple, especially in the case where a deformation of the lens from a flat shape to a balloon shape is assumed.

Referring now collectively to FIGS. 37A-37T, another example of a lens assembly 3700 is described. The lens assembly 3700 includes a top membrane 3702, a bottom membrane 3703, a core subassembly 3704, a housing base subassembly 3706, a final cover subassembly 3708, a cushion 3710 (to provide cushioning of the elements in the assembly 3700 and which can be constructed of any suitable flexible material such as silicon gel), a top motor subassembly 3712, and a bottom motor subassembly 3714. The assembly 3700 is configured to achieve one example of an optimal tolerance structure. Some or all of the optical elements in the assembly 3700 are referenced or indexed through a minimum number of additional or intervening elements.

As shown in FIG. 37K, FIG. 37L, and FIG. 37T, the top and bottom membranes 3702 and 3703 are similar to the other membranes described herein. In many of these examples, the membranes 3702 and 3703 are at least partially permeable to air. When fully deformed, the membrane 3702 has been moved in an upward direction and when fully deformed, the membrane 3703 has been moved in a downward direction. Other characteristics of the membranes have been discussed previously herein and will not be discussed further here.

As shown especially in FIG. 37B and FIG. 37J, the core subassembly 3704 includes a top lens cover 3720 (e.g., constructed from glass or some other transparent material), a top lens aperture portion 3722 (including an aperture or opening 3723), a central lens piece 3724, a bottom lens aperture portion 3726 (including an aperture or opening 3727), and a bottom glass cover 3728. As shown especially in FIG. 37C, the top membrane 3702 fits over the core subassembly 3704 and may be attached by an adhesive (e.g., glue) or some fastener arrangement.

As shown in FIG. 37S, the central lens piece 3724 includes a corrective lens 3780 (e.g., with a diameter of approximately 3 mm in one example), an aperture retaining feature 3782 (for retaining and holding one of the aperture portions), a retaining feature 3783 (for retaining a cover), a vent 3784 (for releasing air from the inner portion of the central lens piece 3724, automation handling points 3785 (for indexing/alignment of the assembly for, example, attachment to other parts), a reservoir 3785 (with a cover on the bottom of reservoir), and a membrane attachment surface 3786. The aperture portions and covers are applied to the central lens piece 3724 to form the core subassembly 3704. It will be under stood that FIG. 37S shows only one side of the central lens piece 3724 and that the same features are also present on the bottom portion of the central lens piece 3724 (for the bottom fluid tunable lens).

The center lens piece 3724 may be formed as part of the outer housing which allows for lower part count, low cost, and higher tolerances. As mentioned, this structure contains two reservoirs for each of the two fluid tunable lenses.

Also as mentioned, indexing features can be used (e.g., four holes with two on each side to allow for ease of assembly). Vent holes are also provided to allow air to escape during vacuum assembly process and to prevent trapped humid air from condensing when temperatures are colder. The bottom surface of the central lens piece attaches to the bottom lens shaper 3762 to define optical tolerances for the bottom membrane 3703.

The top lens aperture portion 3722 and the bottom lens aperture portion 3726 are constructed from a material such as Polyethylene terephthalate (PET) and have apertures 3723 and 3727 extending through respectively. The material is colored black in many of these approaches.

Figure 37:
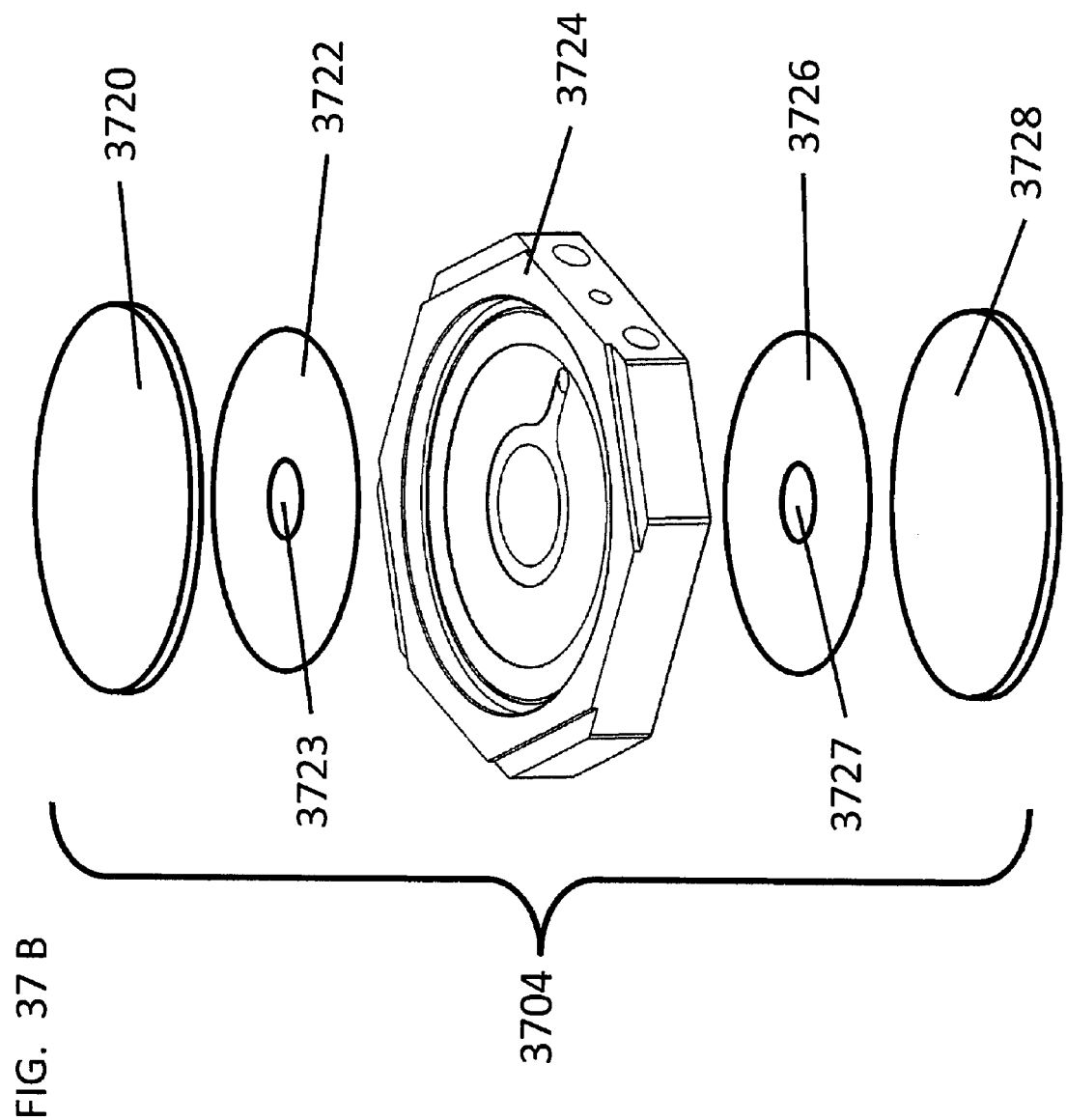
FIGS. 37A-T illustrate various views of another example of a lens assembly according to various embodiments of the present invention.
Figure 37:
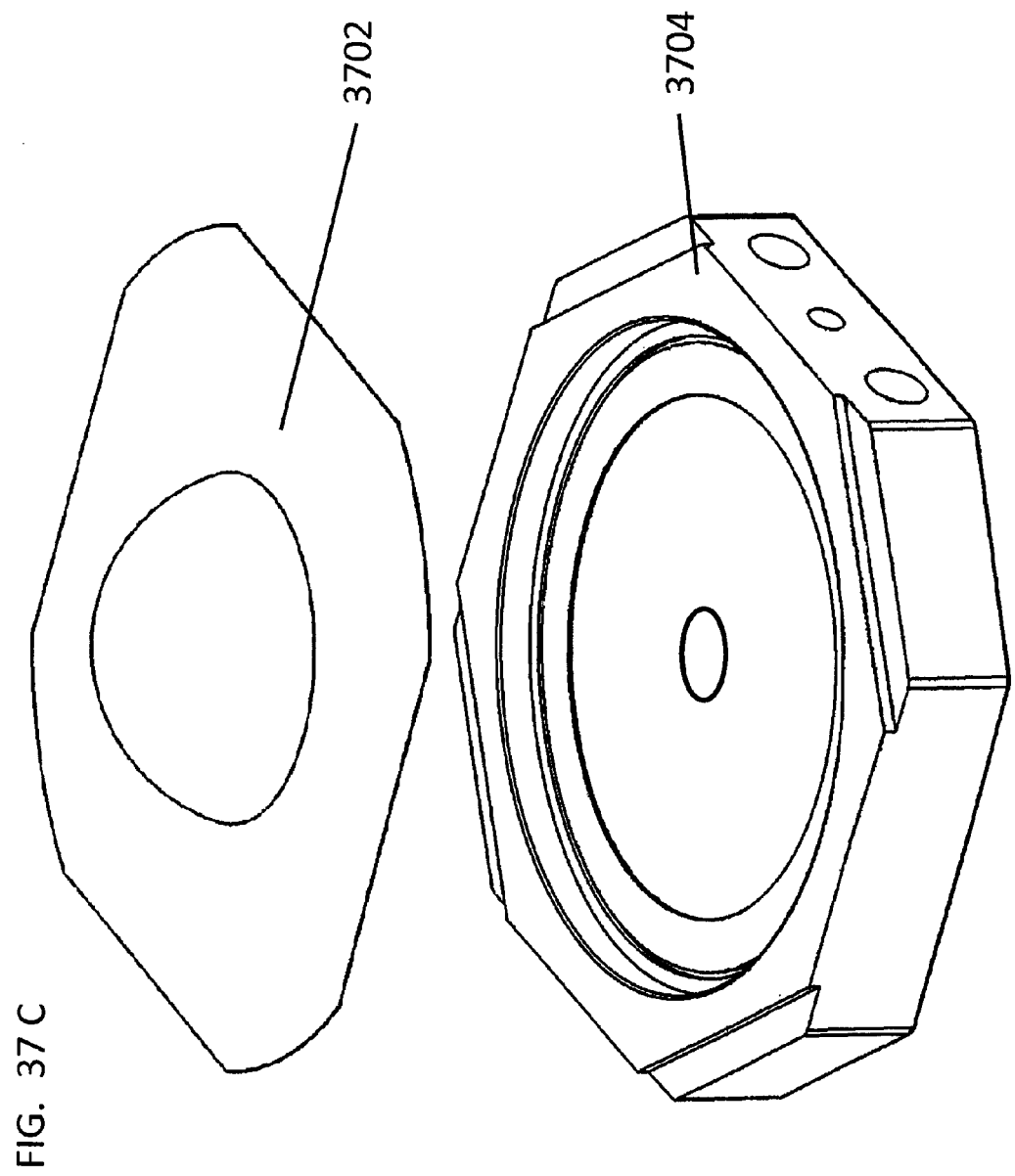
Figure 37D:
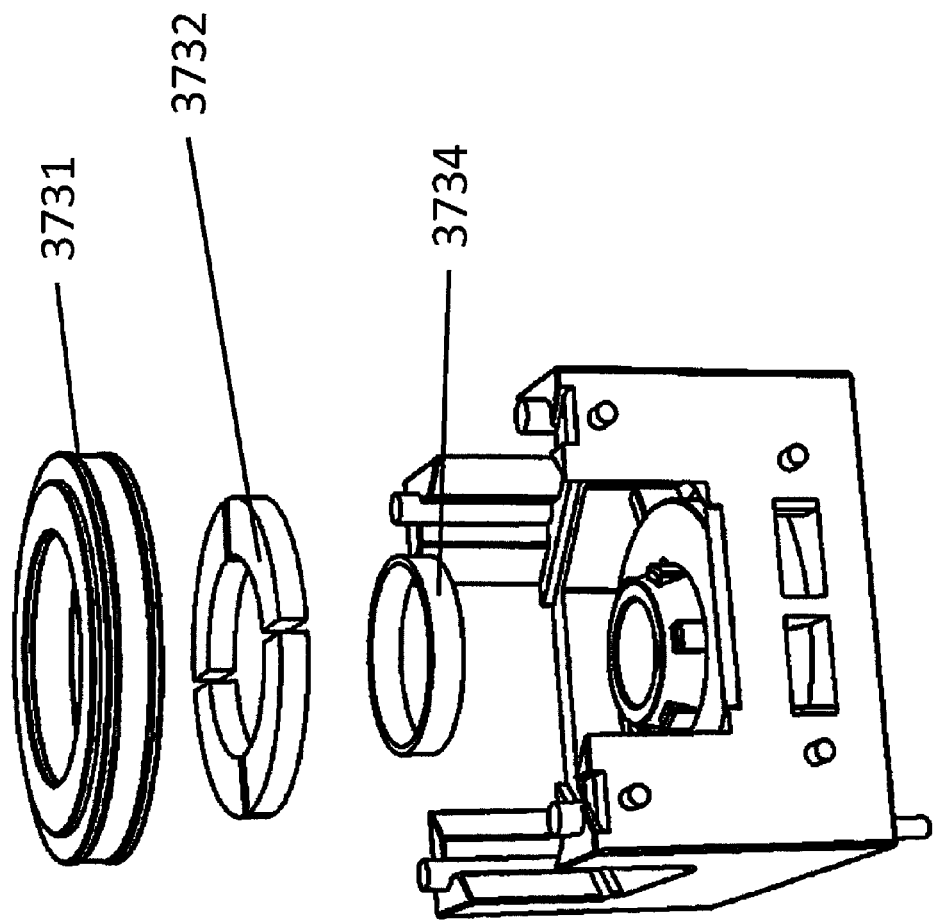
Figure 37:
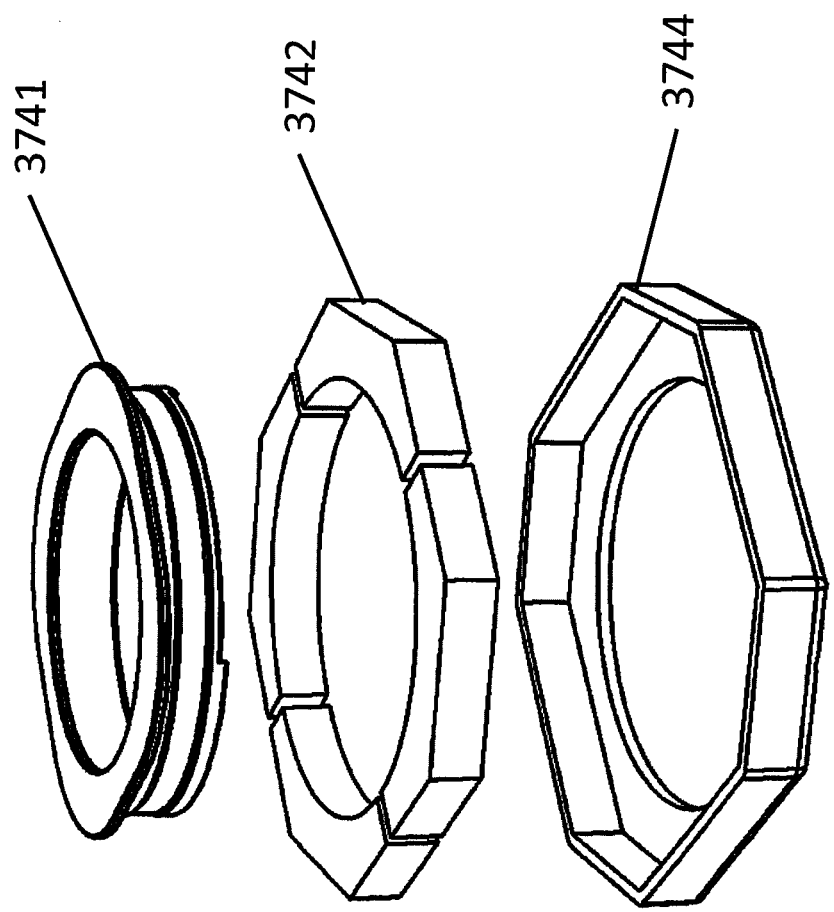
Figure 37:
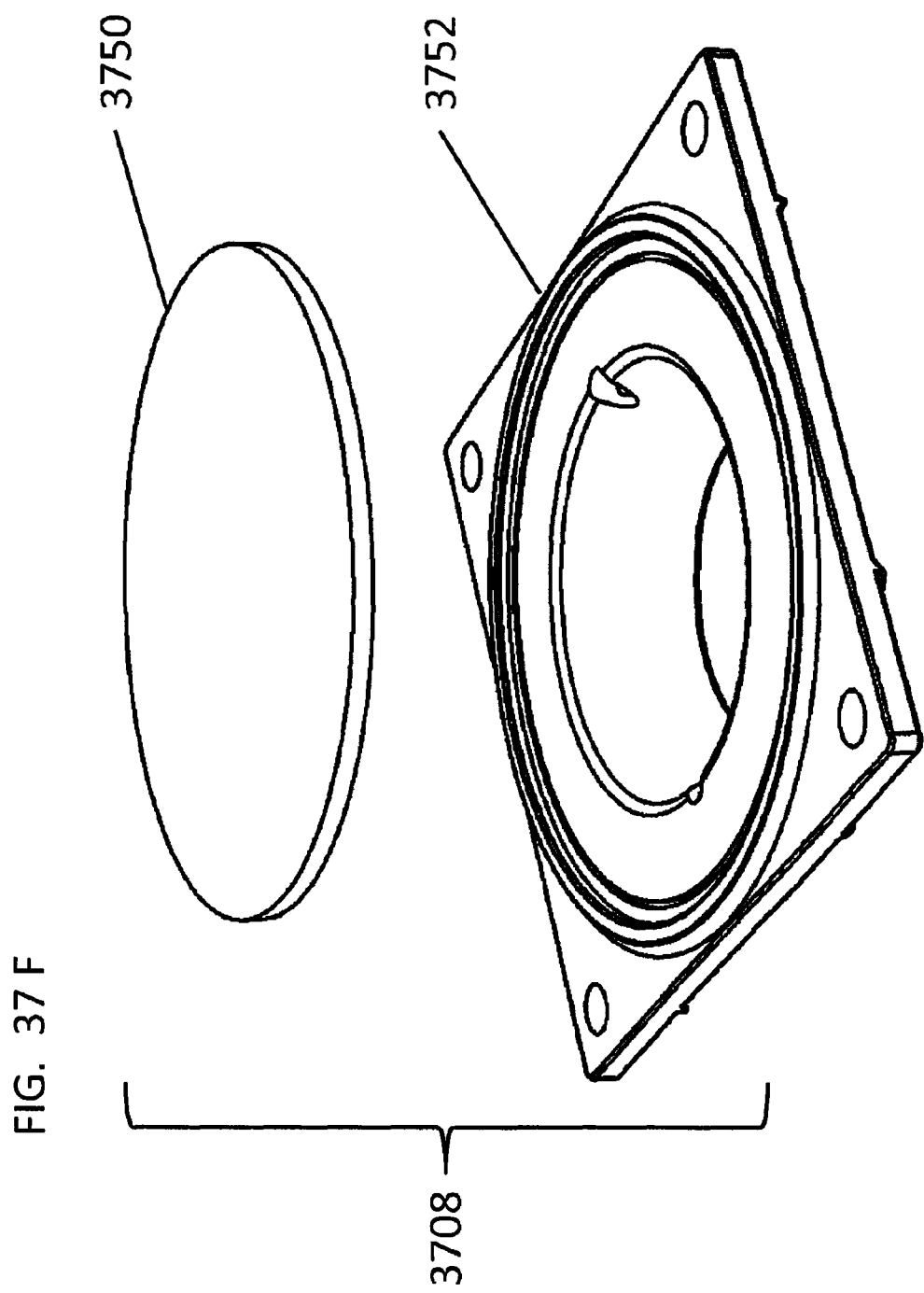

As shown in FIG. 37D and FIG. 37N, the bottom motor subassembly 3714 includes a coil 3730, a bobbin 3731, magnets 3732, and a flux guiding structure 3734. As shown in FIG. 37E and FIG. 37M, the top motor subassembly includes a coil 3740, a bobbin 3741, magnets 3742, and a flux guiding structure 3744. To minimize coil travel, the bobbins 3731 and 3741 surround the optical parts of the assembly 3700.

As shown, the motors may include an L-shaped (in the cross section) octagonal flux guiding structures 3734 and 3744. This configuration creates a magnetic structure for the assembly that is both compact and provides for a higher operating point of the magnet to allow for usage of higher energy product magnets even at high temperatures.

Figure 37G:
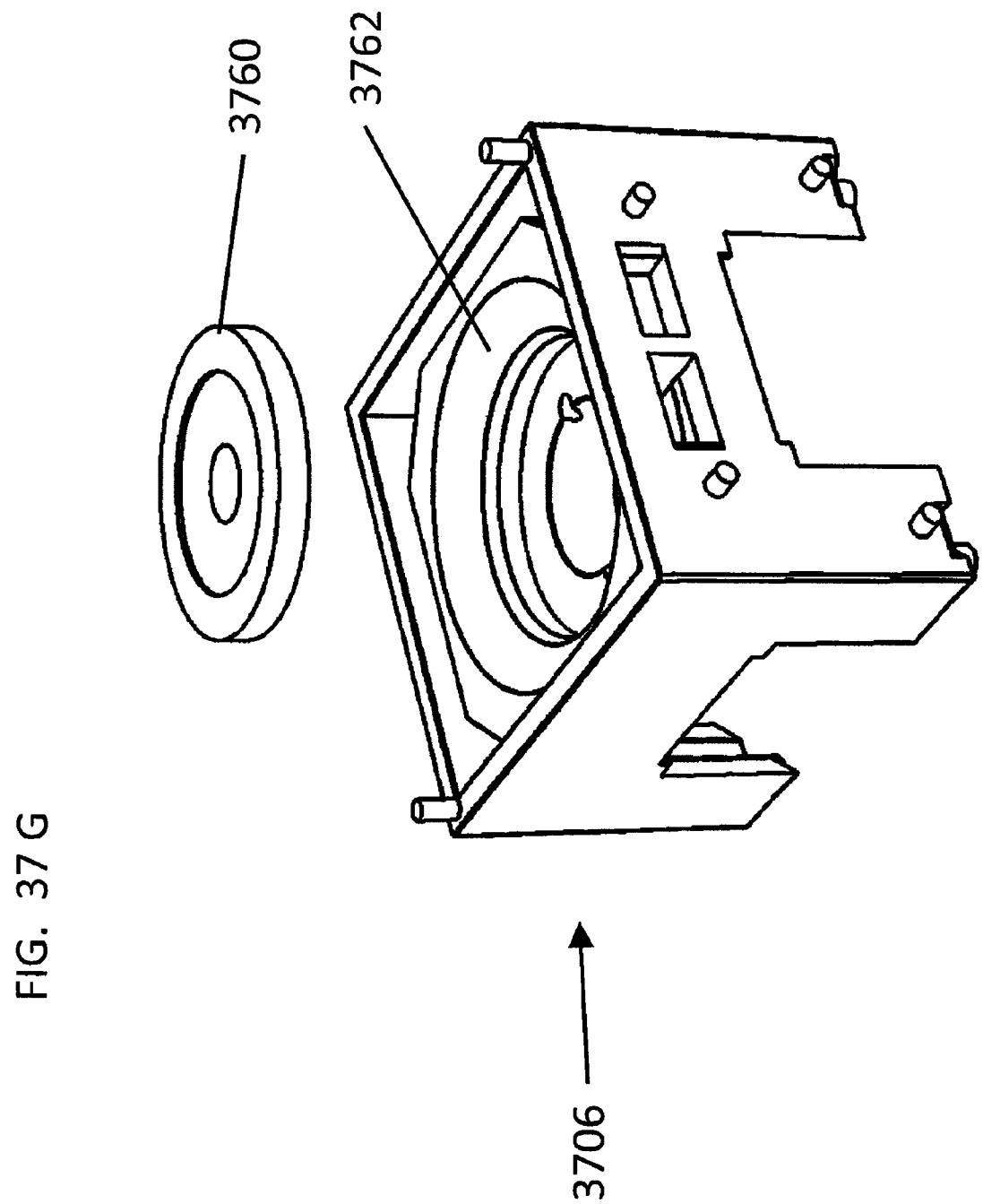
Figure 37:
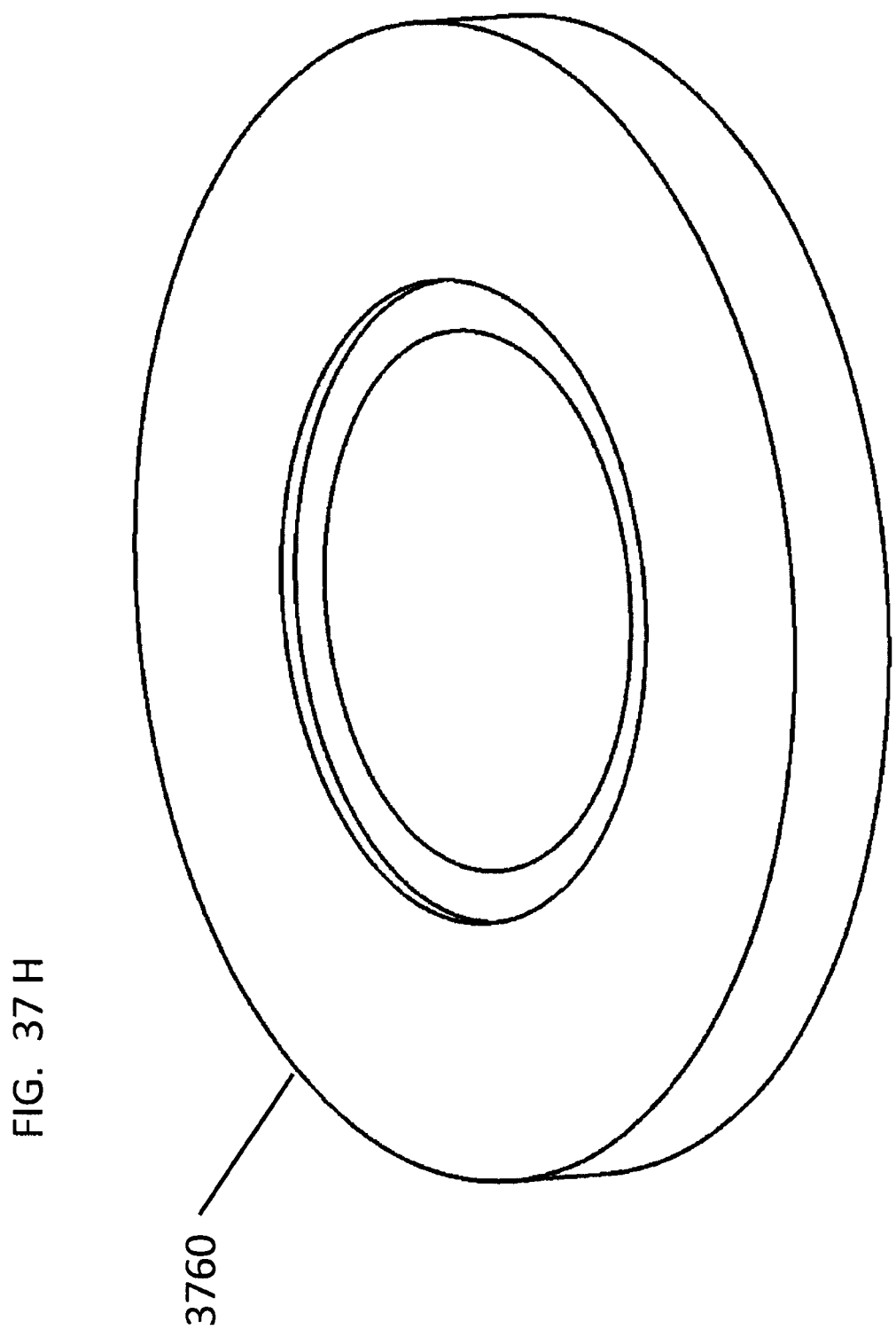
Figure 37I:
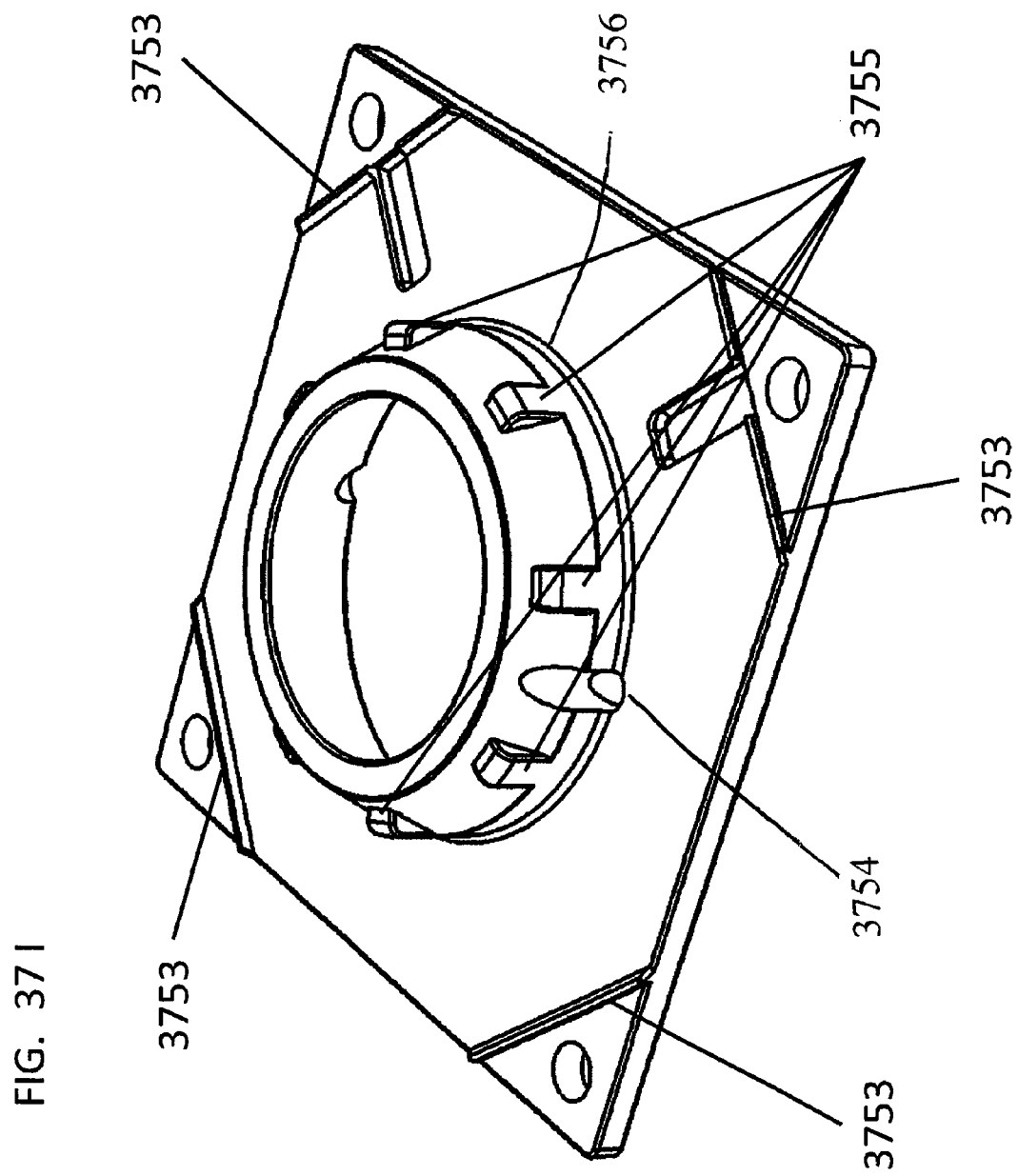
Figure 37:
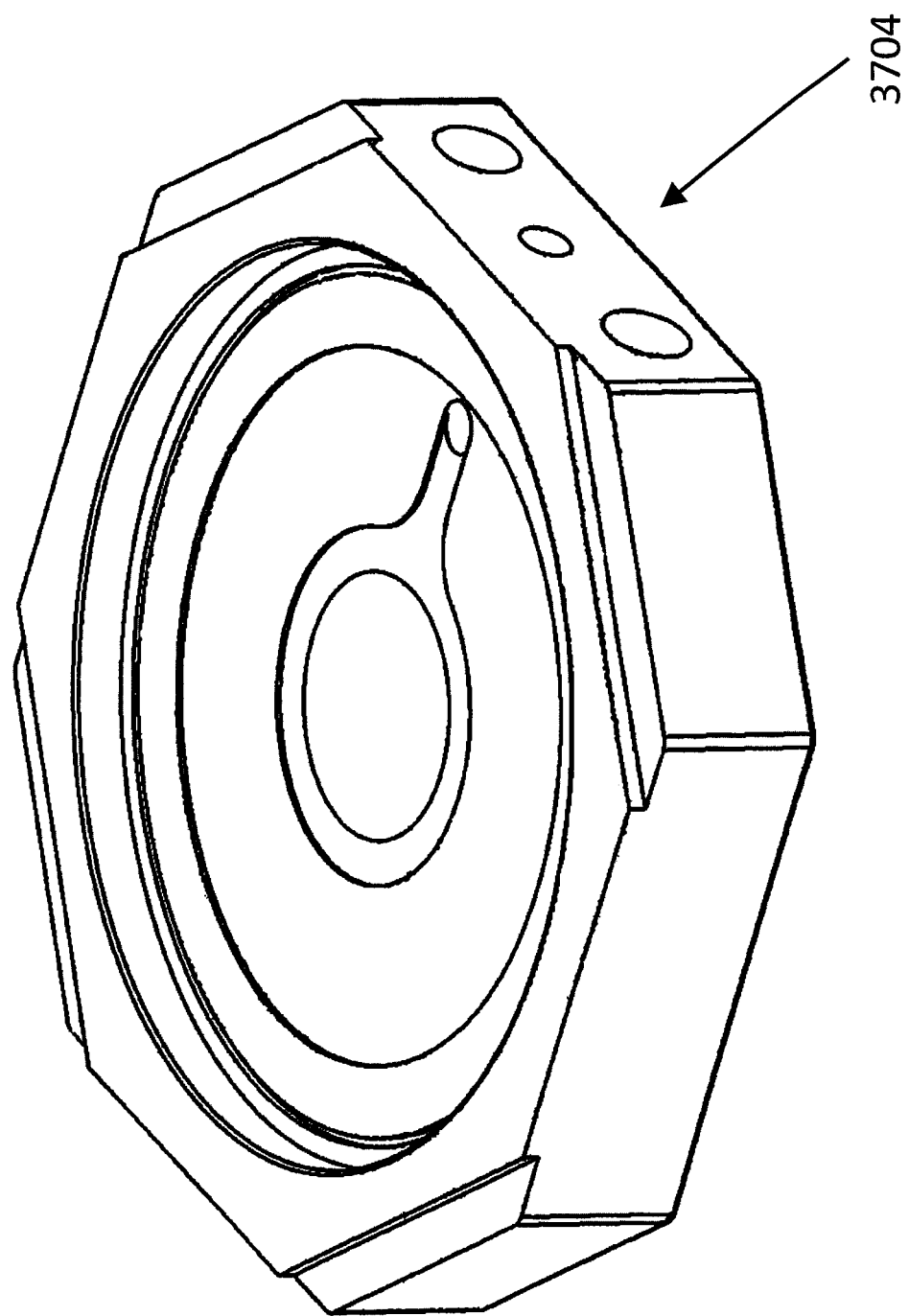
Figure 37:
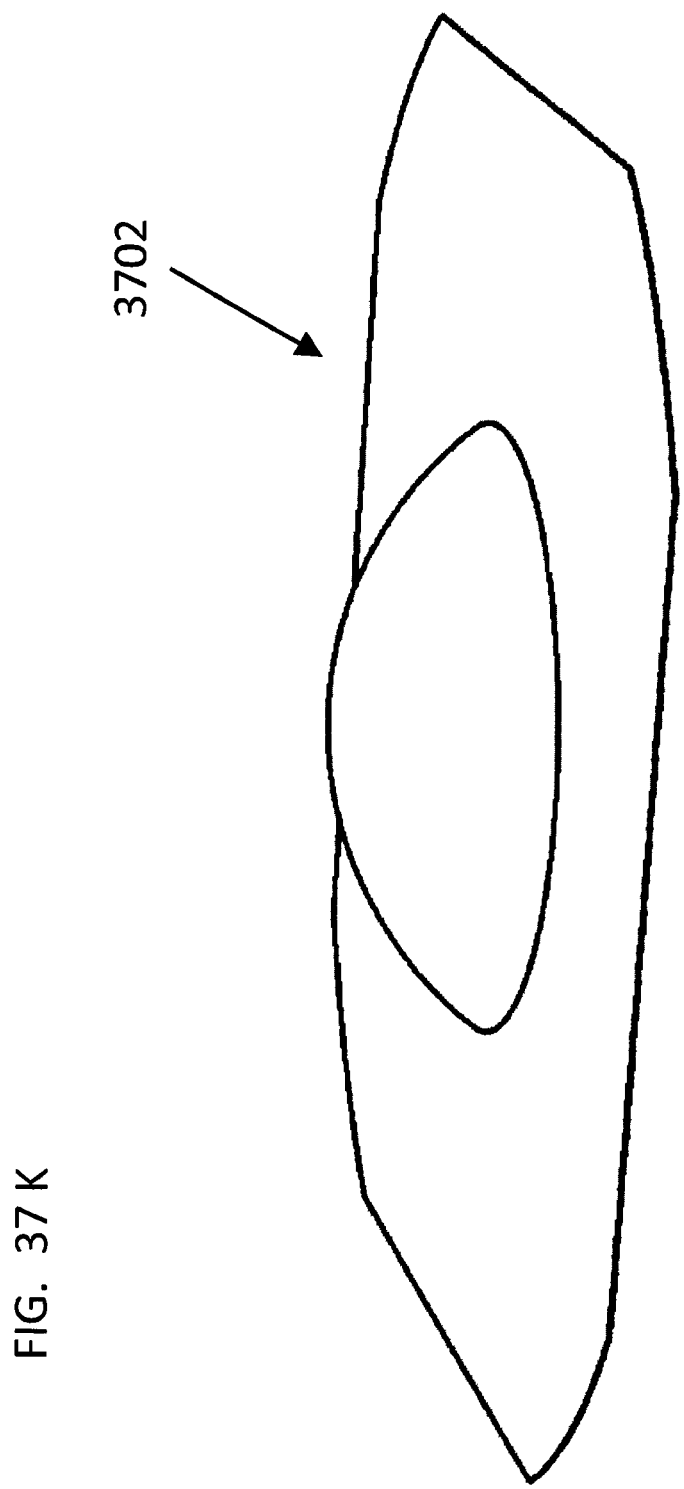
Figure 37:
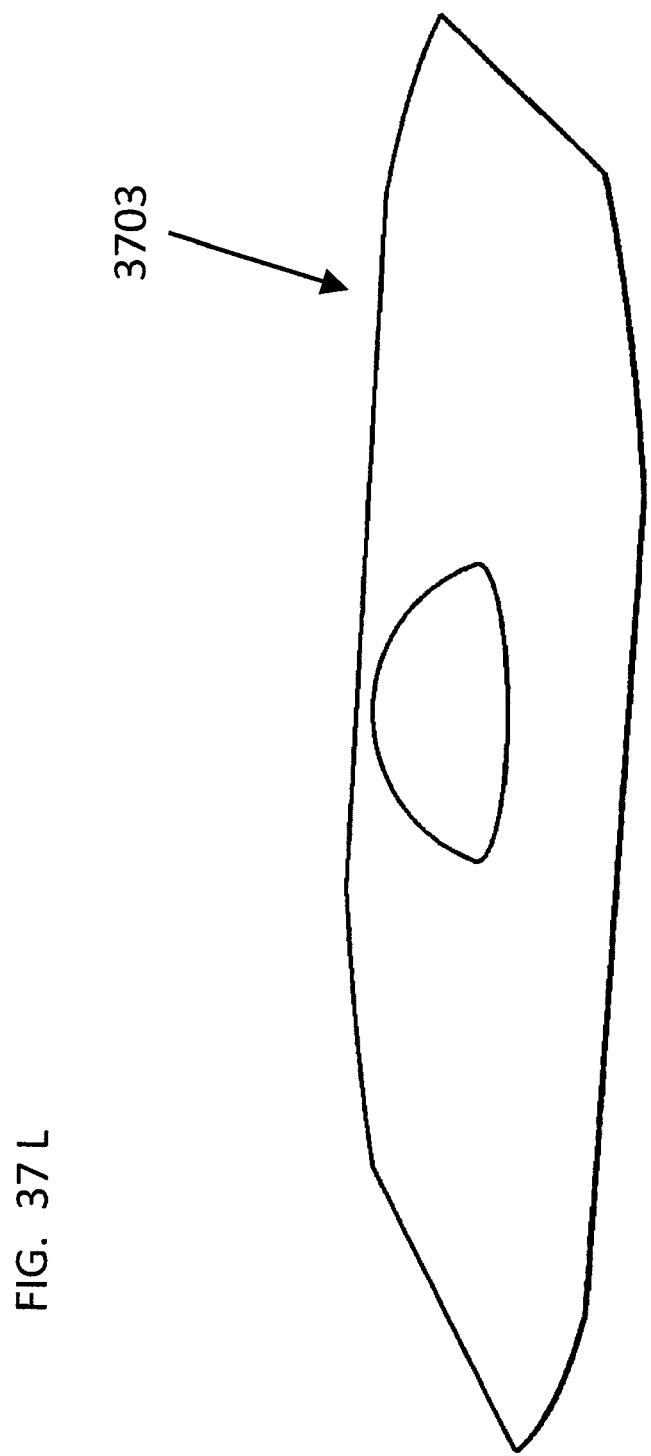
Figure 37:
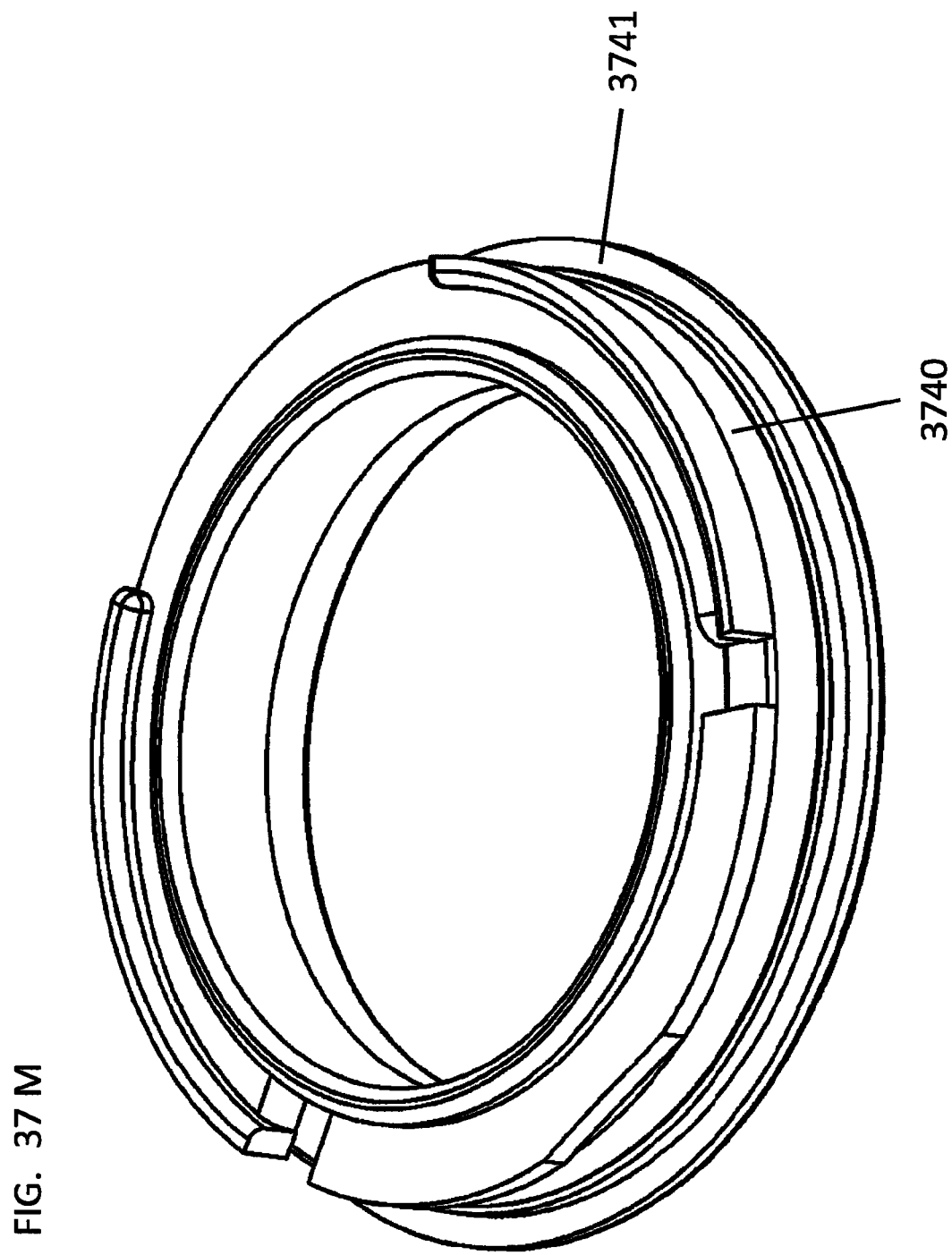
Figure 37:
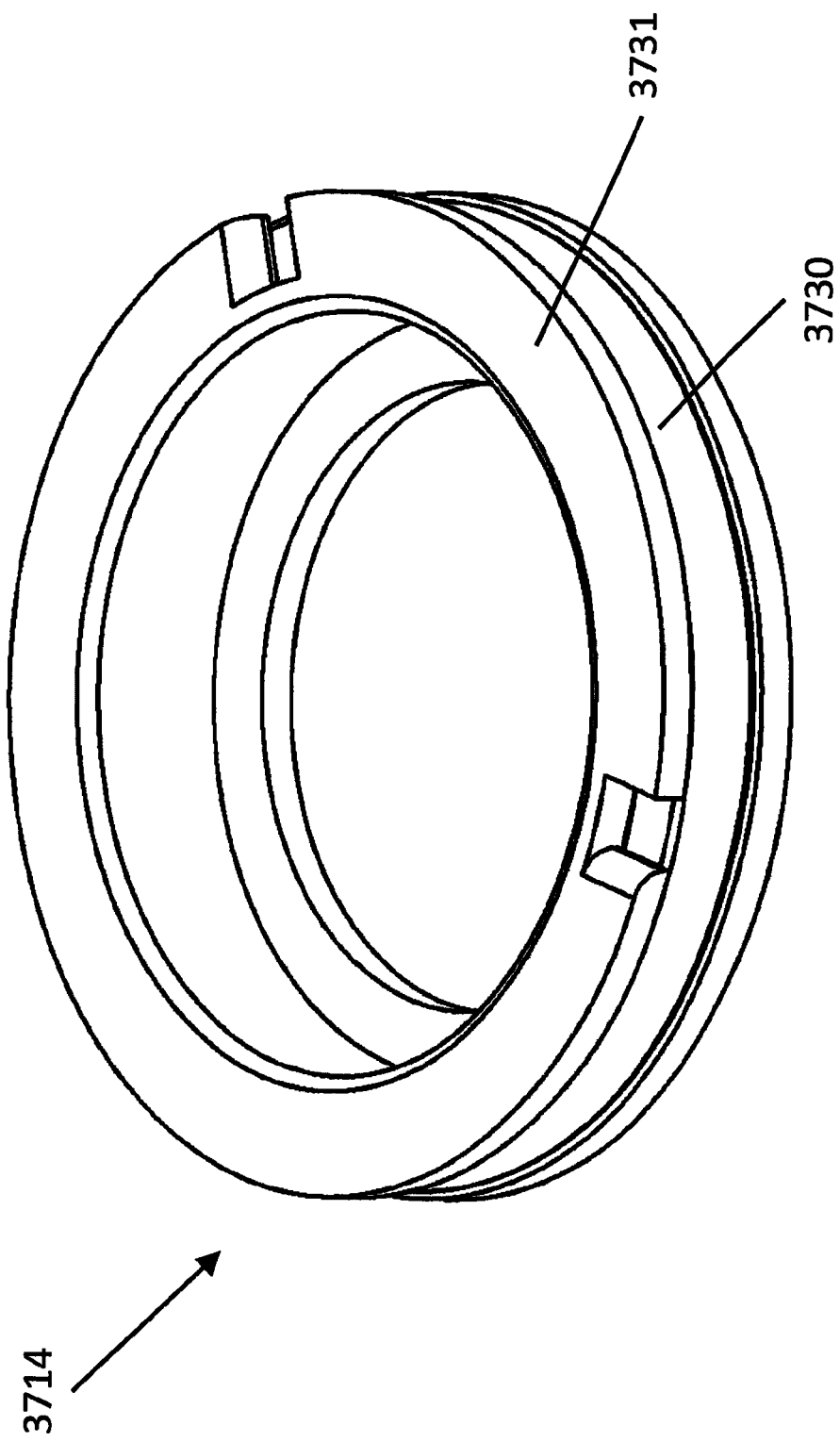
Figure 37:
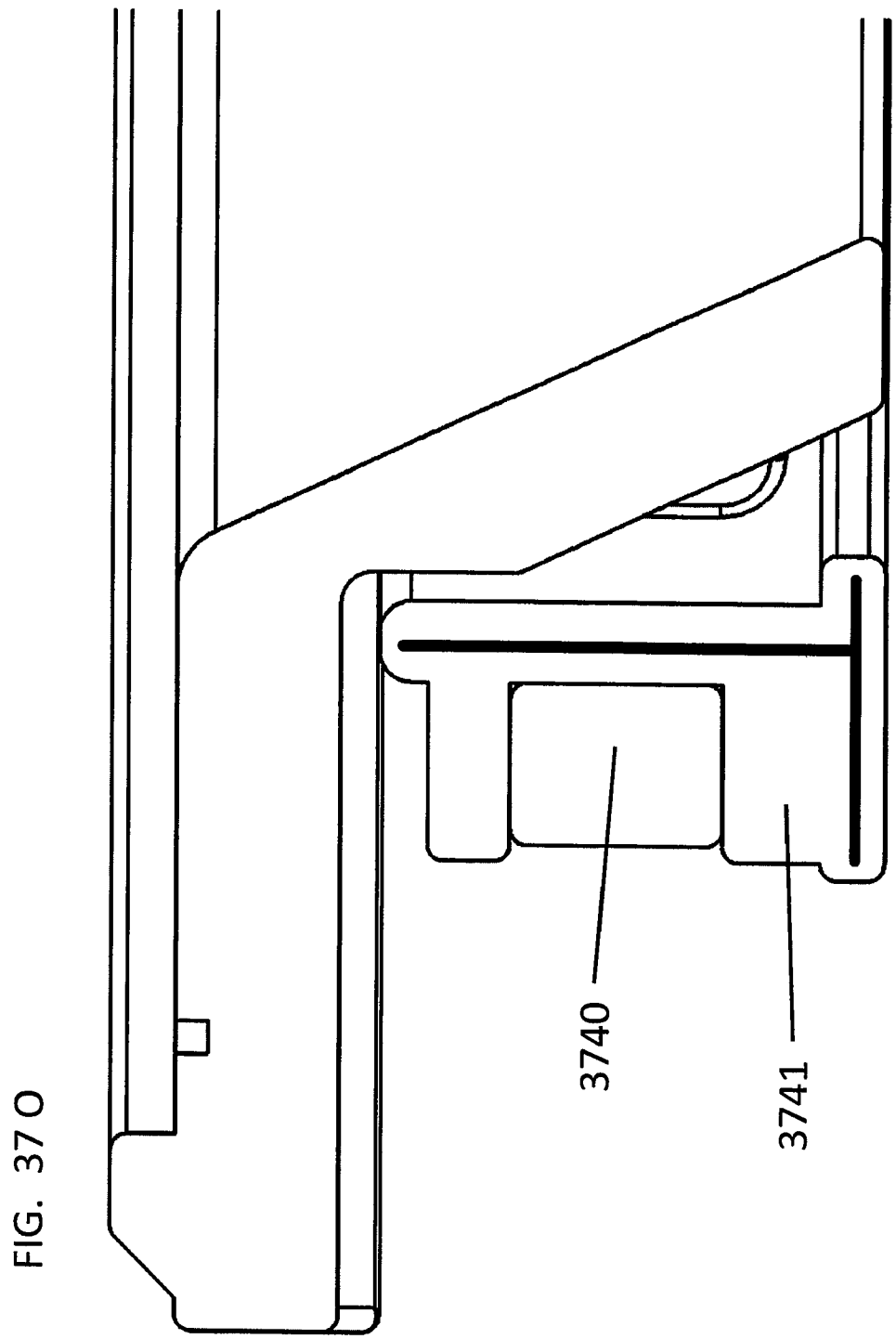
Figure 37:
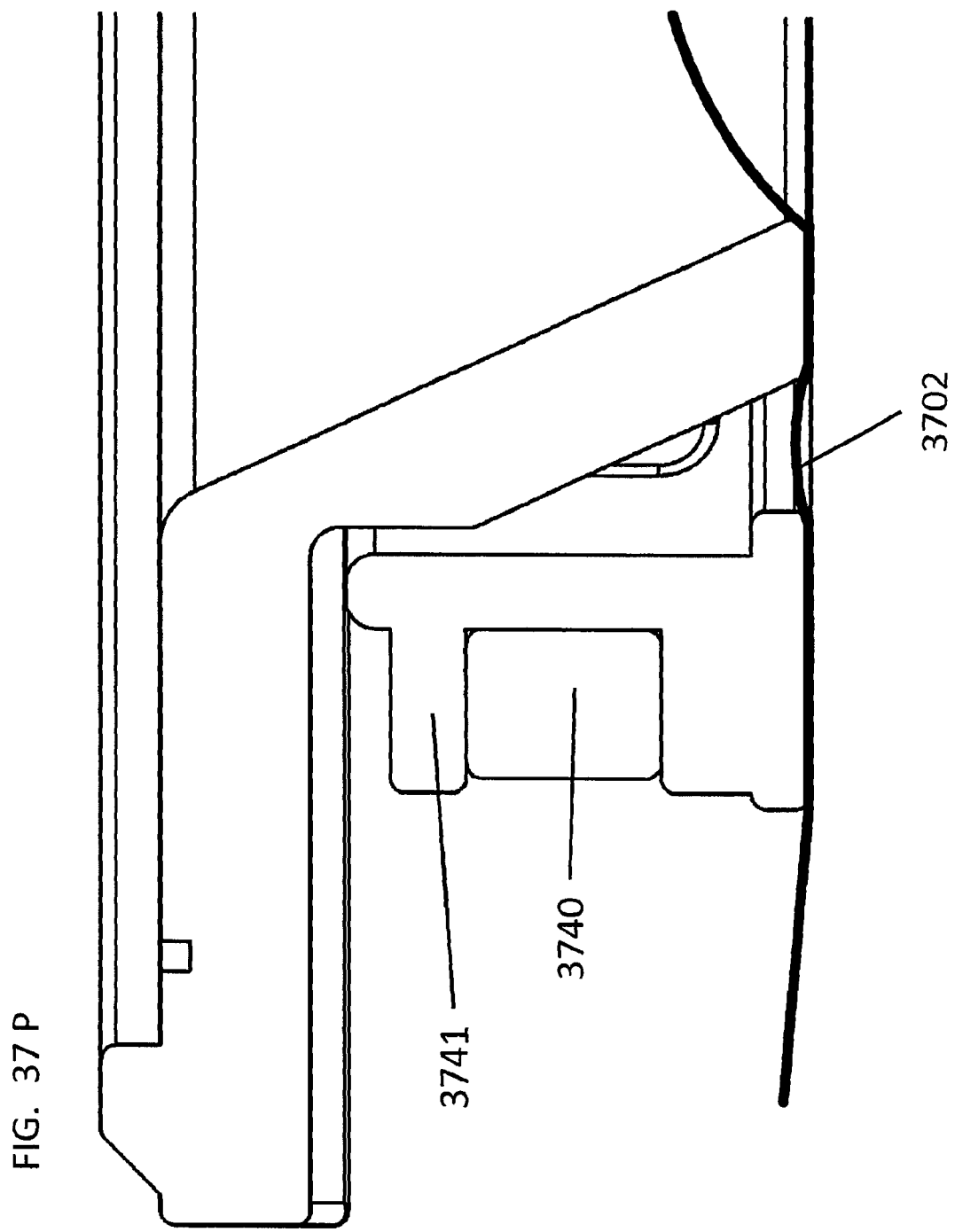
Figure 37:
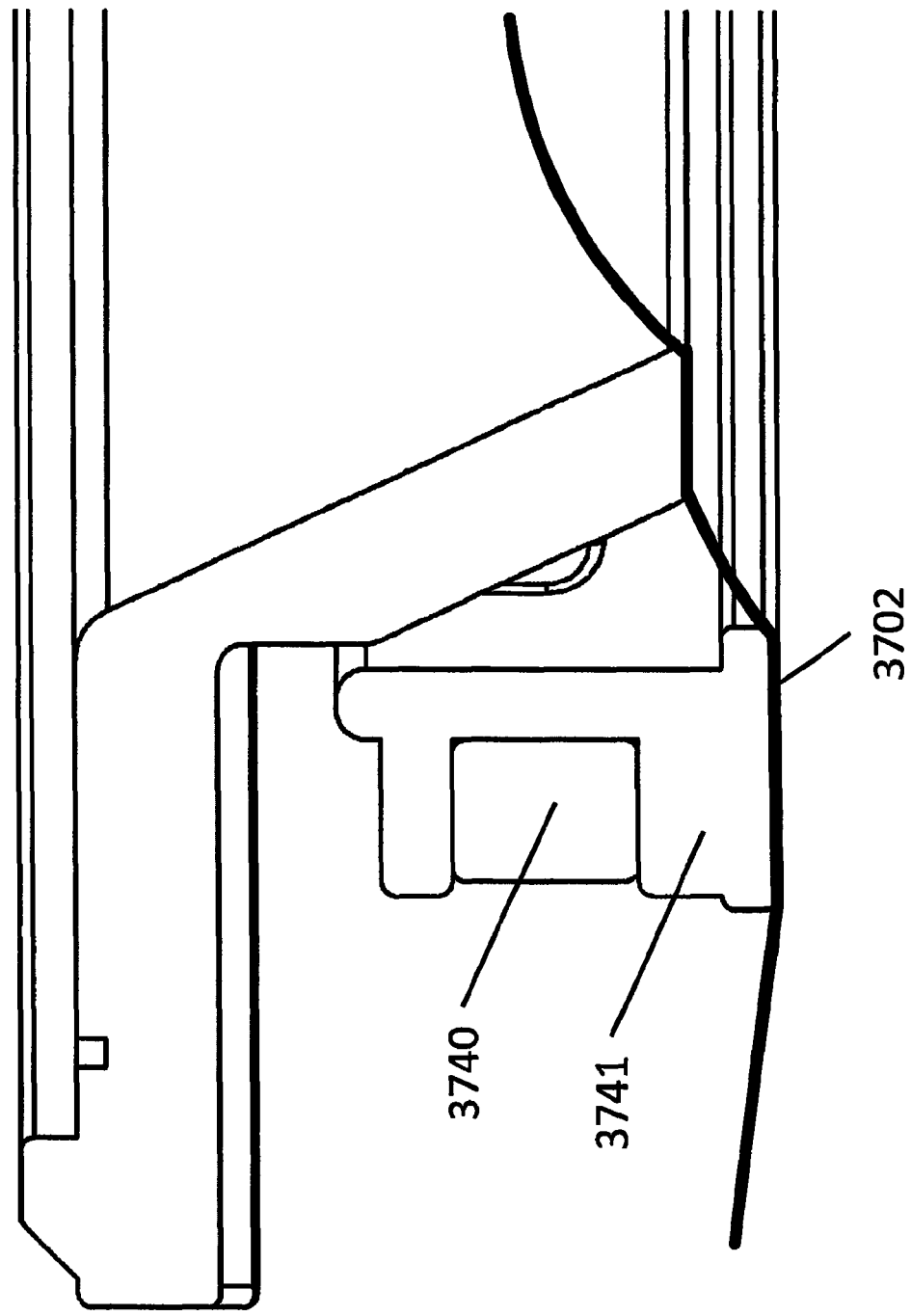
Figure 37:
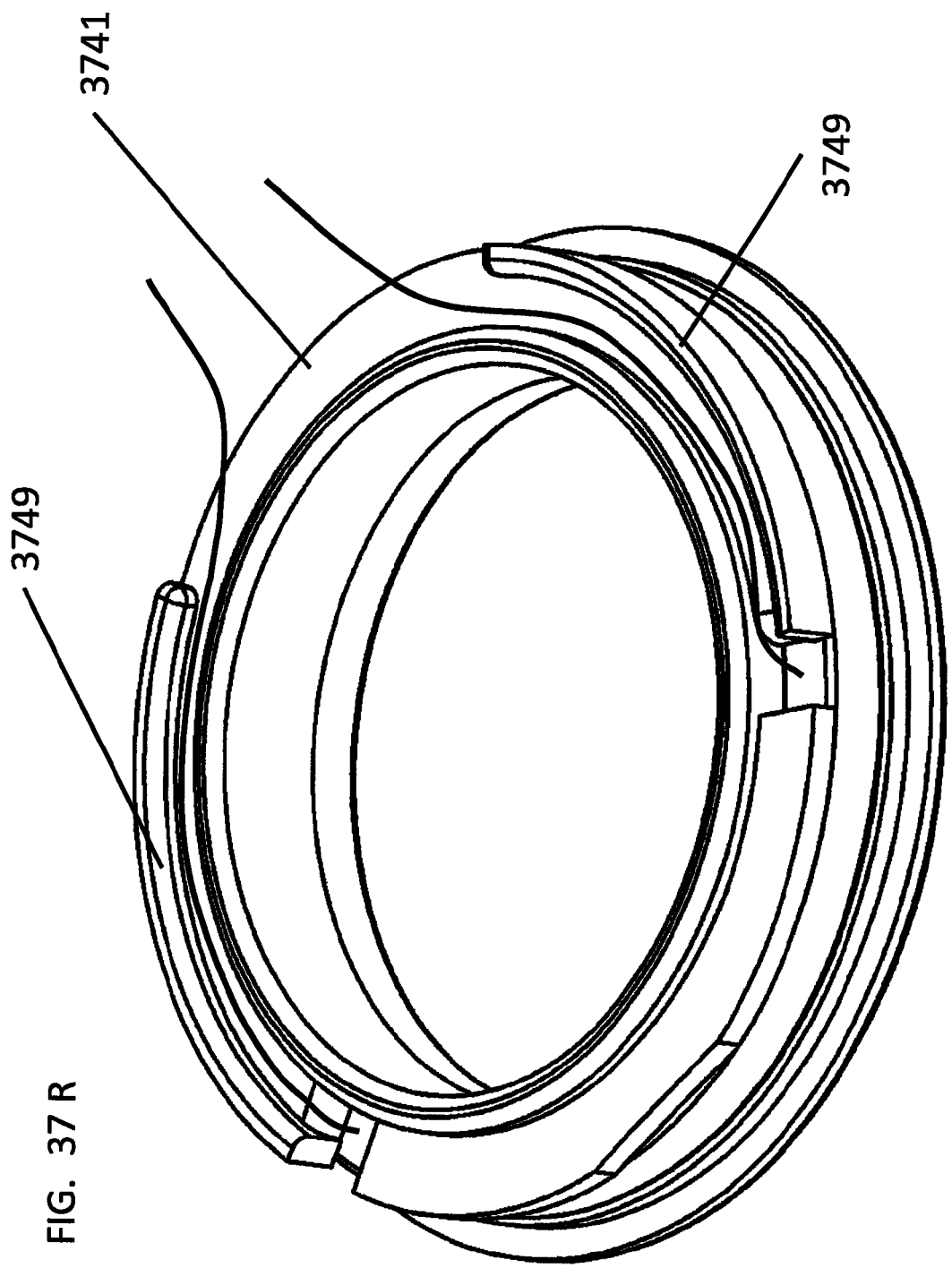
Figure 37:
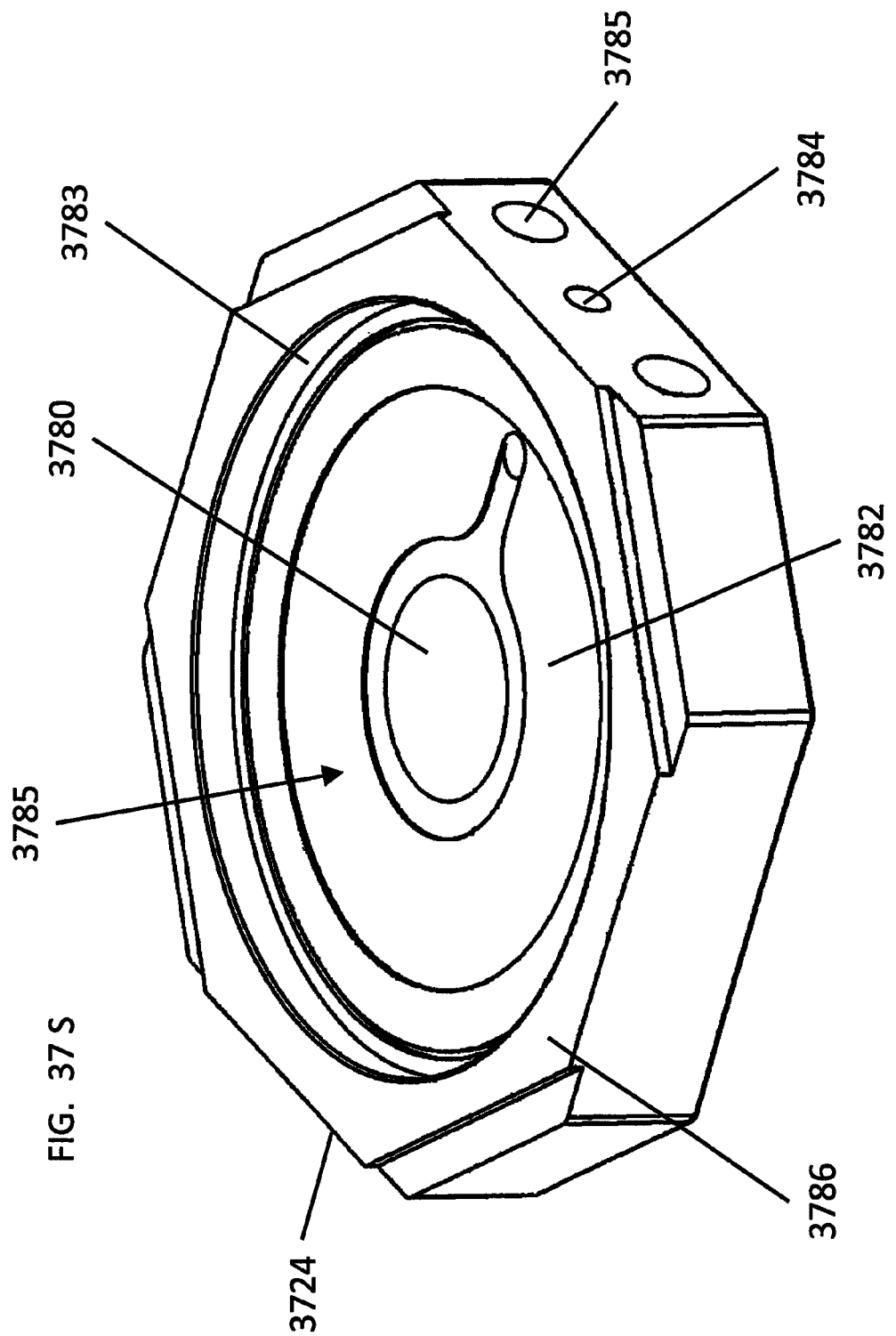
Figure 37:
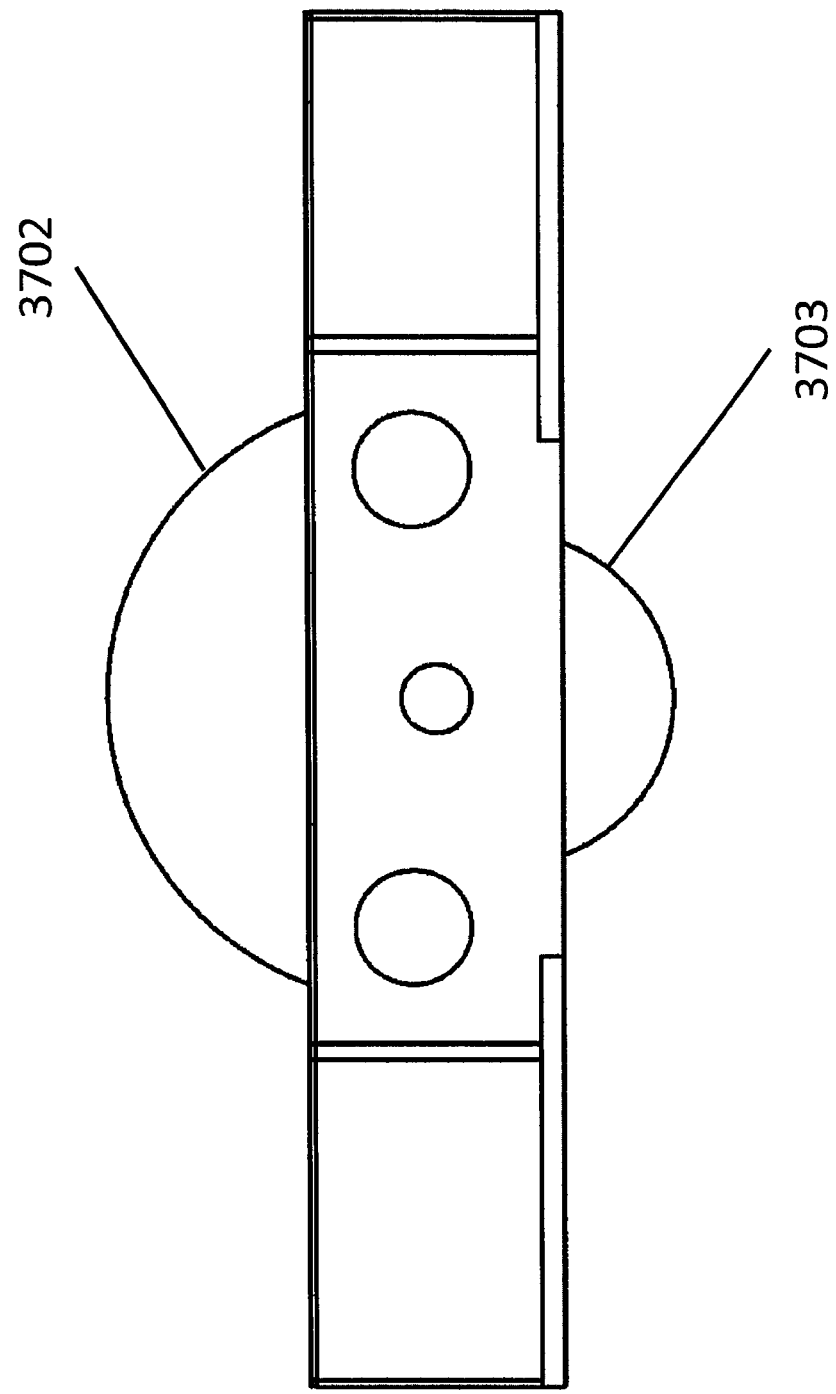

As shown in FIG. 37F and FIG. 37I, the final cover subassembly 3708 includes a protective cover 3750 and a lens shaper 3752. As shown in FIGS. 37G and 37H, the housing base subassembly 3706 includes a meniscus lens 3760 and a bottom lens shaper 3762.

The top lens shaper 3752 includes various features. For example, force alignment ribs 3753 force the top motor structure into place and align the top plate to the rest of the structure. The ribs also provide a force to push the motor structure into the gel cushion. This feature minimizes the stress of the top cover and helps to maintain good tolerances of lens shaper. The lens forming feature also provides barometric relief using vents 3754. Notches 3755 provide coil alignment feature with other portions of the assembly. The inner diameter of the bobbin aligns with an outer diameter 3756 of the lens shaper 3752. The lens shaper 3752 includes a cover glass alignment feature (e.g., in the form of a ring). An undercut is also provided to support gluing of the lens shaper 3752 to the membrane. These features may be included in the bottom lens shaper 3762 as well.

In many of these examples, the configuration (e.g., shape and dimensions) of the bobbin structure is optimized. In this respect and as shown in FIG. 37O, the bobbin 3741 is somewhat shaped (in the cross section) like a "T." The shape of the bobbin is optimized according to various parameters. First, the force displacement of the coil/bobbin is required to be great enough to move the bobbin 3741 with the coil 3740 and displace enough fluid for full deformation of the lens. In one example, the coil 3740 is arranged/placed in a high magnetic field area as the membrane 3702 is displaced. Another parameter that may be optimized is the location where the inner diameter of the bobbin 3741 meets the outer diameter of the lens shaper 3752.

If the dimensions of the bobbin 3741 are too small, for example, if the vertical portion of the "T" is too small, inadequate force is provided to move the bobbin 3741 by the coil 3740. If the horizontal portion of the "T" is too small, the membrane may become overstretched because too much bobbin travel is required to displace enough liquid. In another example, if the vertical dimensions (i.e., the vertical portion of the "T") of the bobbin are too long, too high of a fluid displacement occurs in the x-direction of the reservoir. On the other hand if the horizontal direction (i.e., the horizontal portion of the "T") of the bobbin is too large, too much force is required to displace the liquid. It is desirable to provide medium displacement conditions (somewhere midway between low displacement and high displacement) by altering the horizontal and vertical dimensions of the bobbin accordingly.

Referring now to FIG. 37P and FIG. 37Q, an example of an optimized T-shape is shown for the bobbin 3741 as it holds the coil 3740. It will be appreciated that as used herein "T-shaped" may refer to a structure that is somewhat T-shaped (even in the shape of an L) rather than exactly T-shaped). In this example, the shape of the bobbin is optimized such that in the deformed state, an S-like curve of the membrane 3702 is formed as the membrane 3702 is moved from a non-deformed condition (FIG. 37P) to a fully deformed condition (FIG. 37Q). As the membrane 3702 is moved, it is altered into the "S" shape of FIG. 37Q, which in some examples, has been found to be an optimal shape.

The system of FIG. 37 operates in a similar way to some of the other examples described herein. That is, the coils associated with each lens are excited by current. This current interacts with a magnetic flux generated by a permanent magnet guided by a flux guiding structure associated with each fluid tunable lens. The interaction between the current and the magnetic flux creates an electromotive force that moves the corresponding coil. The movement of the coils act to push their associated membranes and thereby moves the filler material (e.g., fluid) within the reservoirs creating a pressure and thereby deforming the shape of the membrane and overall lens. Consequently, the optical properties of the lens are altered as required.

The square (or at least rectangular) cross-sectional shape of the bobbin 3741 also provides for preferred force versus displacement characteristics. The coil placement within the bobbin allows for preferred force displacement in a push only structure. The coil placement is arranged so that the coil hits the maximum magnetic flux at point of maximum displacement. The ribs on top of the coil provide routing features of wires 3749 (see FIG. 37R). The bobbin 3741 is also configured so that wires from the coil can not be crimped and damaged as the coil and bobbin move.

The shape of the bobbin and the size of the horizontal portion of the "T" gives the distance between the bobbin and fluid structure so that the membrane achieves an S-shaped displacement between the bobbin and coil. A membrane that becomes bubble-shaped in a fully deformed state is undesirable as then the membrane may rub against/impact other structures. This approach provides a compact structure and the force displacement curve is changed by changing the surface area of the portion bobbin that makes contact with the membrane/fluid reservoir. Optimal configuration of the surface area of the bobbin with respect to the surface area of the fluid lens creates leverage so different displacements are obtained from the lens. When the bobbin is positioned radially outward from the centrally located optical structure, more surface area on the bobbin is created and an effective transformation ratio is achieved.

All lenses in the lens stack are indexed/can be easily referenced and their position determined in this example. This allows for extremely low tolerances on the parts used. In this regard, the bottom lens shaper 3762 extends further up the assembly than the top lens shaper extends downward. This part contains the lens alignment, meniscus lens, image sensor and reference surfaces to all lenses and lens defining parts. The welding features (the poles shown on the top of the assembly of FIG. 37A) allow for heat melt fixturing as well as for alignment and easy assembly. The wire slot is carefully shaped so that wire can not be broken and can be brought to a location that is solderable.

Various approaches can be used to apply anti-reflective coatings to the existing interfaces (e.g., where air interfaces with a membrane) in the assembly 3700. In one example, a master sheet can be used to replicate the nanostructure and transfer this structure onto the membrane. An uncured polymer is coated onto the nanostructured master sheet. The master sheet is placed onto the stretched membrane. The polymer is cured (e.g., using UV or a heat cure). The master sheet is peeled off of the prestretched membrane, which has the nanostructured polymer layer attached. Nanoparticles are applied onto the membrane by inkjet printing or spray coating. Nanostructures are hot embossed or plasma etched onto the membrane, which may be prestretched.

Various approaches can be used to apply the top membrane to the core/aperture subassembly. The core with apertures subassembly is inserted into vacuum chamber to avoid air bubbles trapped in the fluid. Air bubbles can degrade the optical quality. Glue is applied to top attachment surface. Fluid is dispensed into the top liquid reservoir. The membrane is placed on top surface and the glue is cured. The remaining air diffuses through the semi-permeable membrane.

The core assembly can be assembled using the following procedure. The core assembly with apertures subassembly is inserted into a vacuum chamber (e.g., 10 mbar to remove 99% of air or 100 mbar to remove 90% of the air). Glue is applied to the top attachment surface. Fluid is dispensed in the top liquid container (reservoir). A membrane is placed on the top surface and the glue is cured. UV cement may also be used for time savings and to provide stability.

The central lens portion is then reversed (i.e., flipped over). Glue is applied to the bottom attachment surface. Fluid is dispensed into the bottom liquid container (reservoir). A membrane is placed on the bottom surface. The glue is cured. The core is removed from vacuum chamber and singulation of the part may be performed (e.g., a hot knife can be used).

Other portions of the assembly 3700 of FIG. 37 may be assembled in a variety of different ways. The core with apertures assembly may be assembled by applying the top lens aperture to the top side of the central lens piece (CLP) The top lens cover is added to top side of CLP. Glue is applied into groove between the aperture and CLP. A fixture is used to secure glass during operation. The CLP is flipped (i.e., reversed) and the bottom lens aperture is applied to the bottom side of the CLP. The bottom lens cover is attached to the bottom side of the CLP. Glue is applied into groove between the aperture and the CLP and the glue is cured under ultraviolet radiation. A thicker glue may be used to avoid flow problems.

Pre-stretching of the membranes may be used to provide better optical quality. Prestretching may prevent wrinkling of the lens, reduce gravitational effects on the lens shape, and allow for faster responses of the lens of electrical application to the coil.

The housing base can be assembled by inserting the meniscus lens into the bottom lens shaper. Glue is applied into groove between the meniscus lens and the bottom lens shaper and the glue is cured.

The bottom motor subassembly can be assembled by inserting the bottom flux guiding structure in the bottom lens shaper. The bottom magnets are inserted onto the bottom flux guiding structure. Glue is applied into gaps between the magnets and cement curing temperature is lowered. The bottom coil is inserted onto the magnets by inserting/threading the wires through the bottom lens shaper and attaching the wires to any relating pins (e.g., on an external device).

The top motor subassembly is assembled by inserting the top magnets into the top flux guiding structure (e.g., into the corners and, if necessary, cement is applied). The top coil is inserted onto the magnets by inserting/threading the wires through the top flux guiding structure.

The final cover subassembly may be assembled by placing the top protection plate onto the top lens shaper. Glue is applied into gap between top protection plate and the top lens shaper and the glue is cured.

The core of the assembly is assembled by inserting the core subassembly into the bottom motor subassembly. The cushion is applied on core subassembly. The cushion can be made from silicon rubber of an appropriate hardness and flexibility. The cushion can be delivered in a roll for use in the assembly process. The flaps of the cushion are applied to cover the central lens. The top motor is inserted and the final cover is placed onto the alignment pins. A hot melt is used with the alignment pins with the final cover. The wires from the coil are soldered to the appropriate pins (e.g., of an external device).

It will be appreciated that the manufacturing/assembly approaches described above are examples only and may be changed/modified as needed to suit the particular requirements of a user or specific design. For example, the materials, processes used, tools used, dimensions, actions performed, and the order of the steps performed can be altered/changed with these approaches. In addition, other examples of approaches for assembling/manufacturing all or some of the above-mentioned elements are possible.

Referring now to FIGS. 38A-F, one example of a bobbin structure that has its dimensions and configuration optimized according to the principles described herein is described. Now referring specifically to FIG. 38A, the inner diameter of a bobbin 3802 is matched to the outer diameter of the lens defining structure 3804. It has been found that if the bobbin 3802 has a 1% tolerance and lens defining structure 3804 has a tolerance of 1%, the difference between the two elements is barely larger than 2% of the radius of the assembly. A coil 3806 is positioned inward of the magnet 3808.

For the top motor, the bobbin 3802 is optimally placed when the coil 3806 just reaches the end of the magnet 3808 indicated by position 3803. The top dimension of the coil 3806 is as large as the assembly will allow. In some examples, this extends to the top of the magnet 3808 while in other examples it does not.

A limited space exists between the lens defining structure 3804 and the outer diameter of the lens assembly. Both the coil 3806 and the magnet 3808 fit into this space. In some examples, the optimum amount of coil 3806 from a force perspective is approximately 0.5 mm. Larger coil widths produce the same amount of force but the operating point of the magnet 3808 will be reduced as the magnet gets smaller. Winding widths of less than approximately 0.5 mm have been found to produce less force in these approaches.

Figure 38:
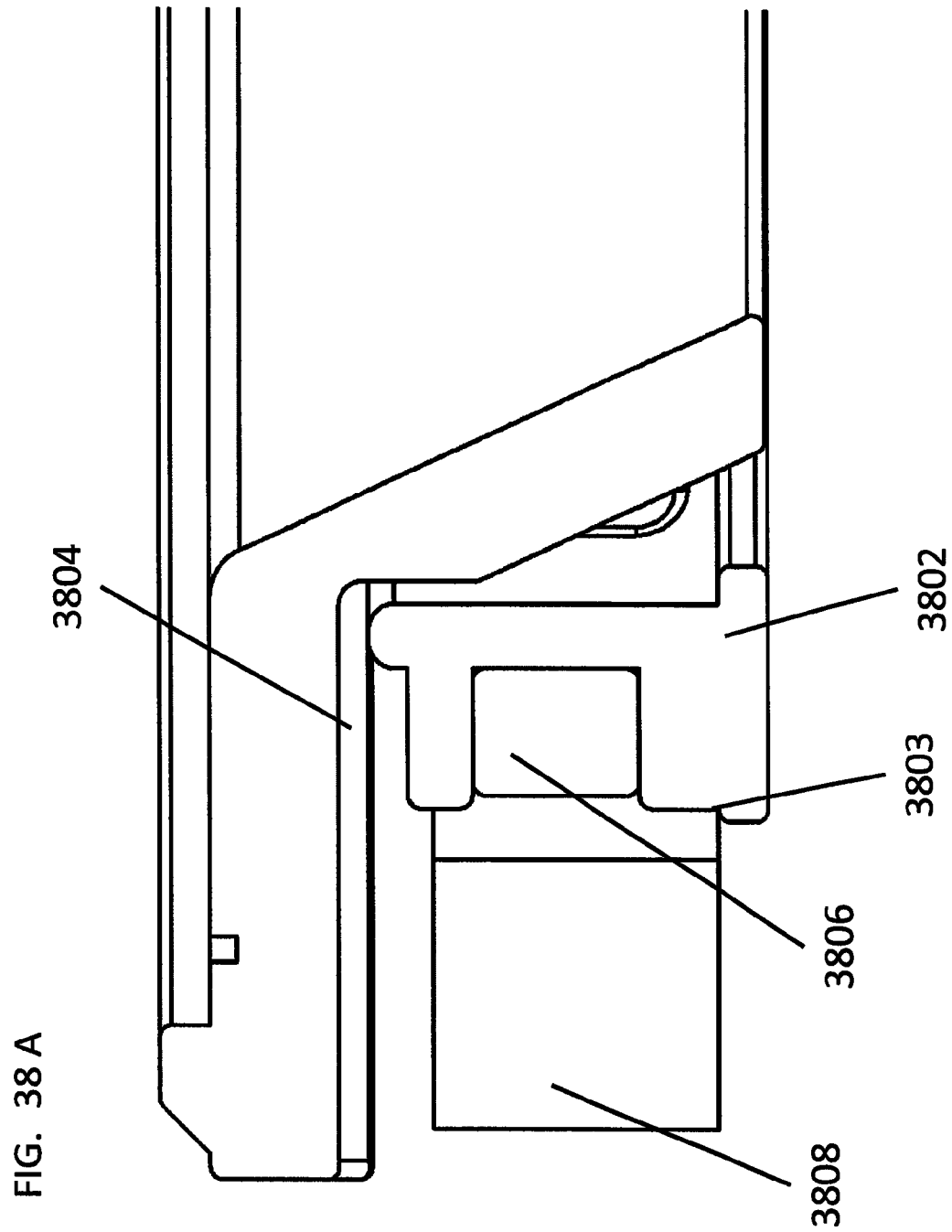
FIGS. 38A-F illustrate various views of a lens assembly showing one example of the optimization of bobbin design according to various embodiments of the present invention.
Figure 38:
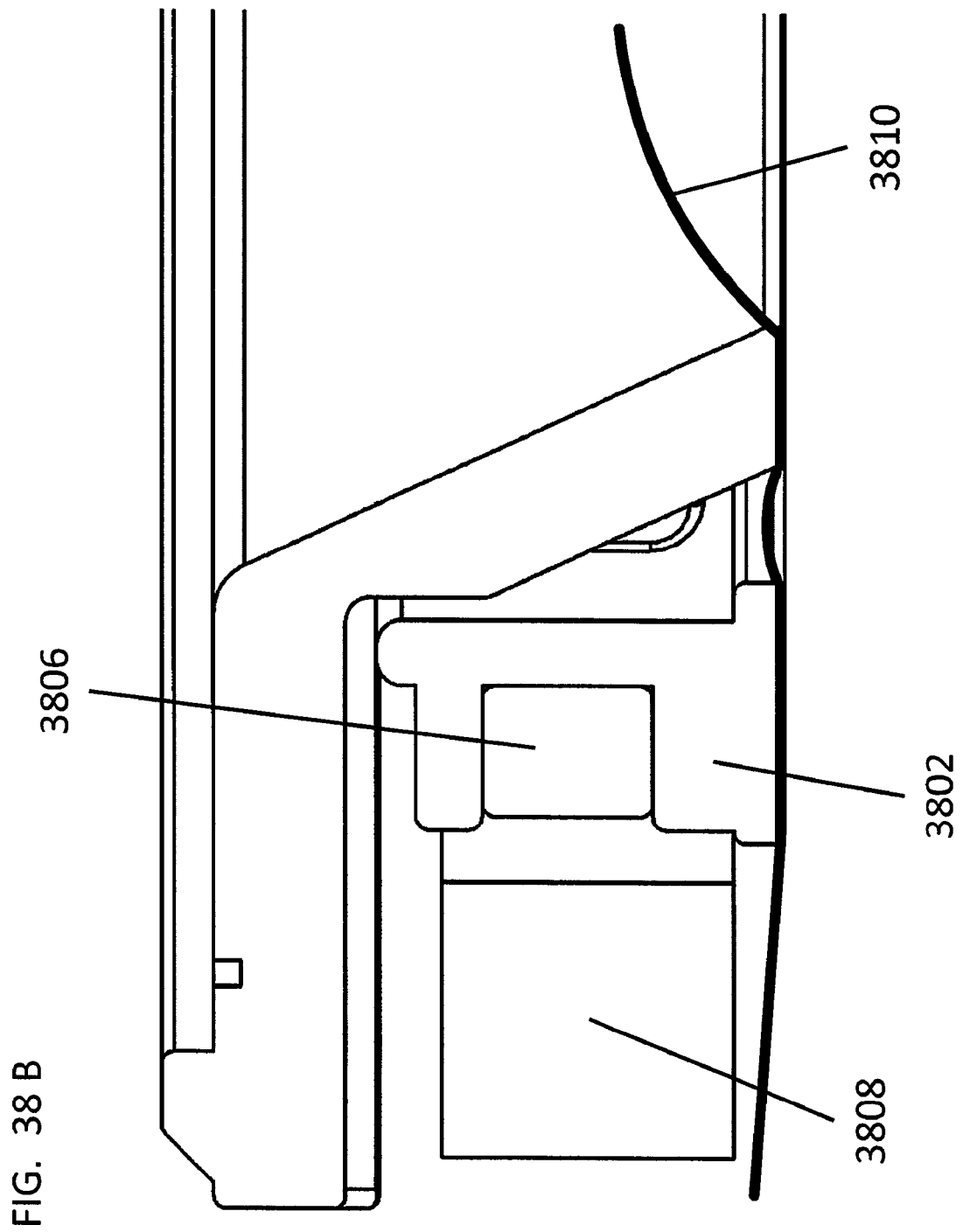
Figure 38:
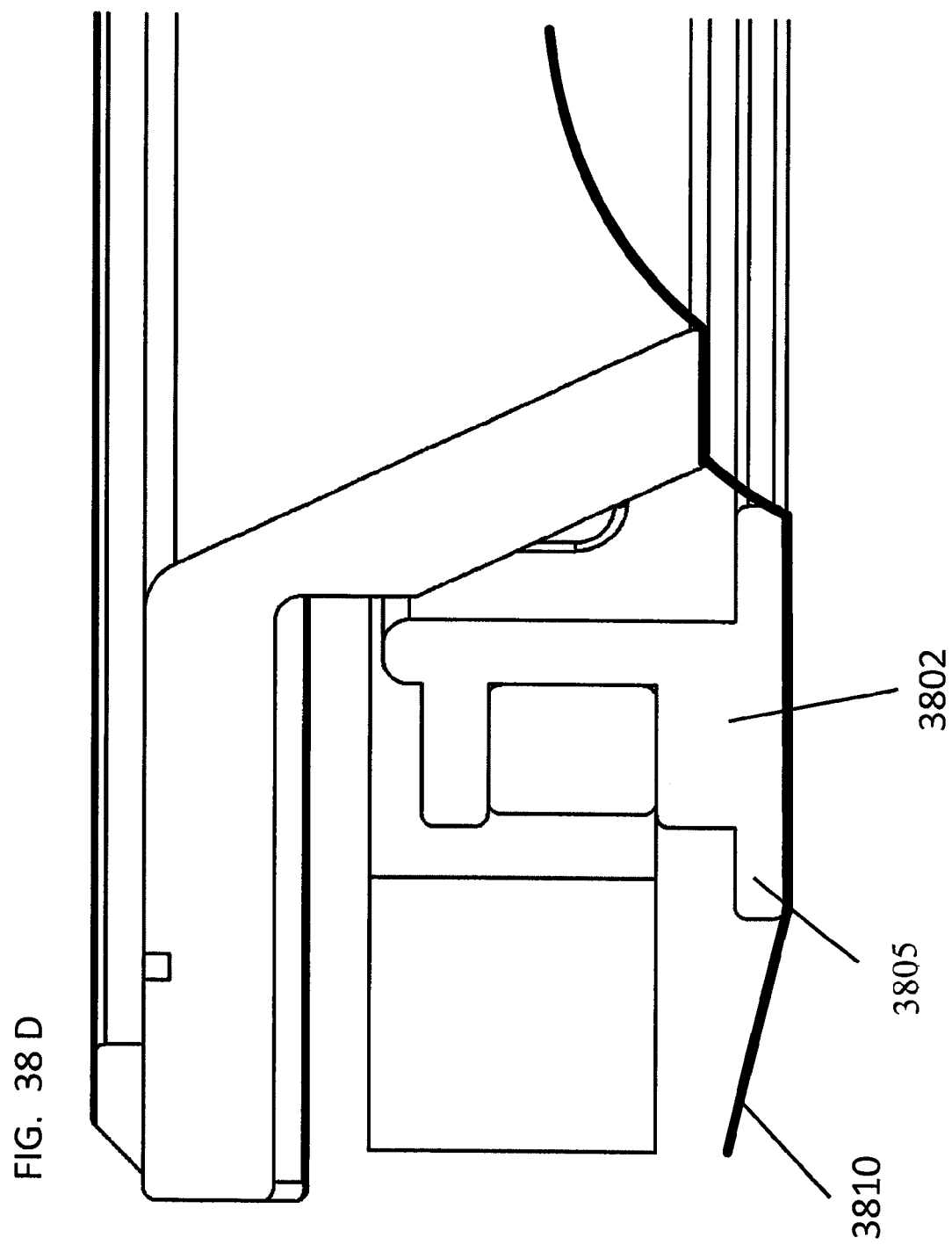
Figure 38:
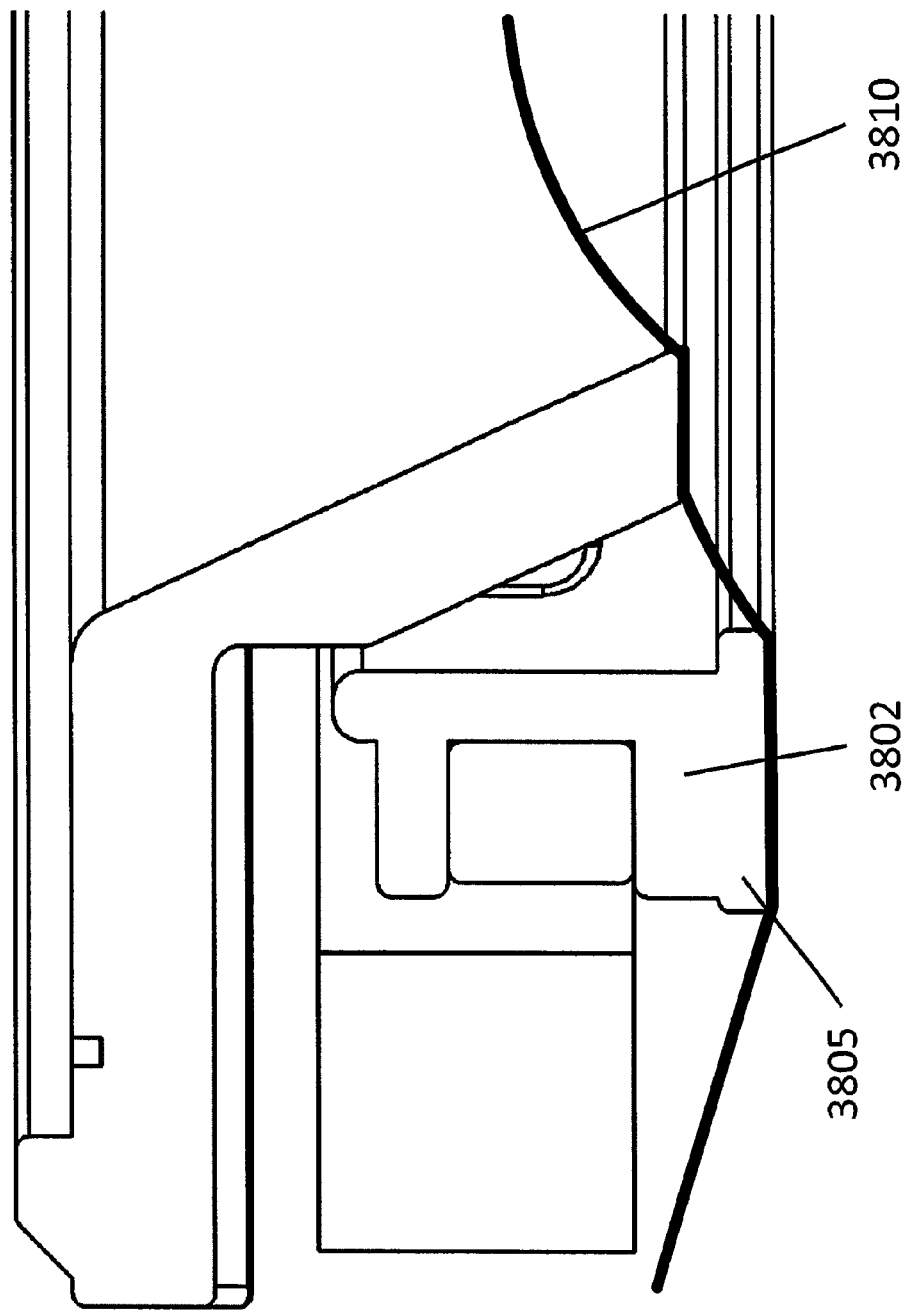
Figure 38:
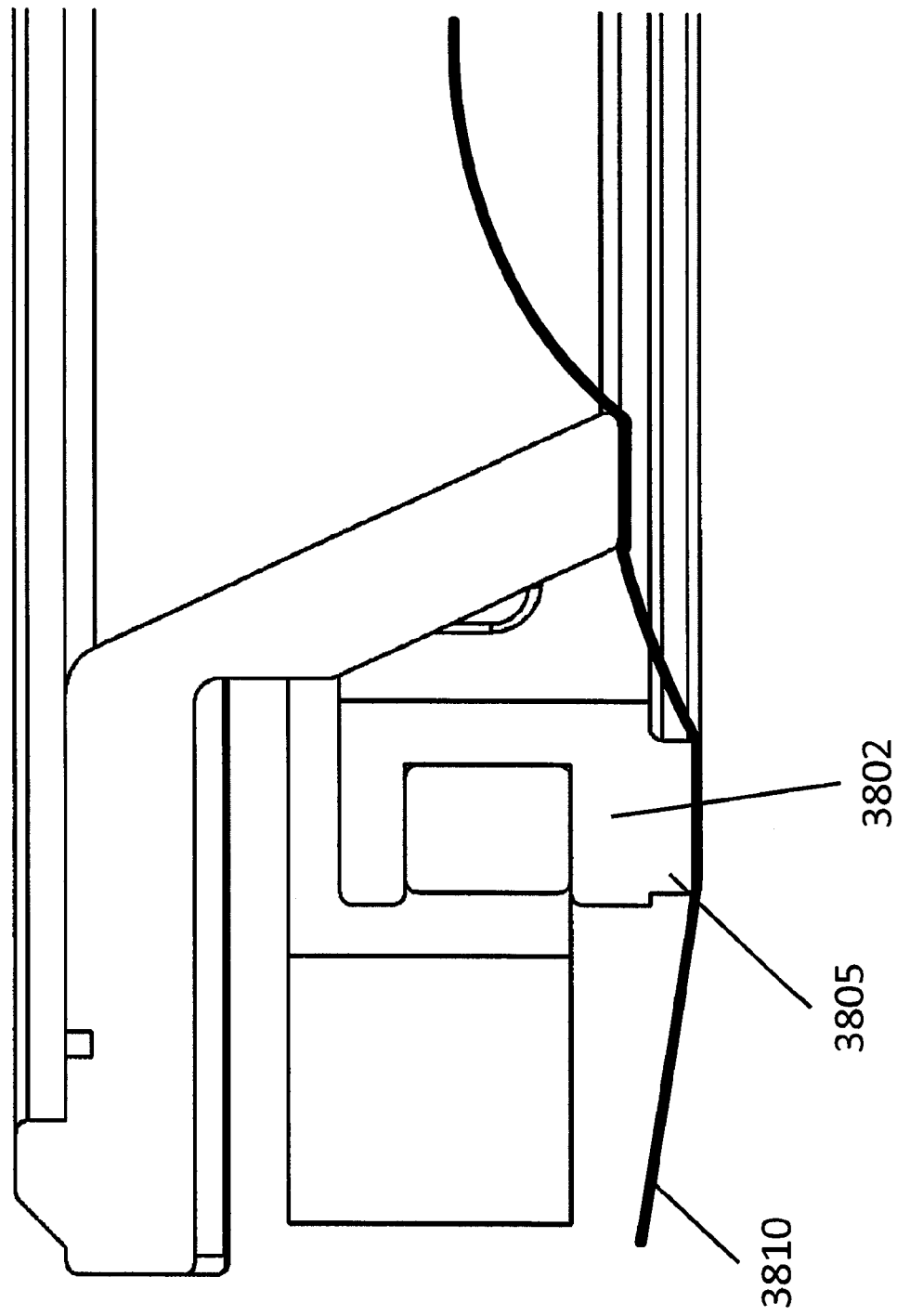
Figure 39:
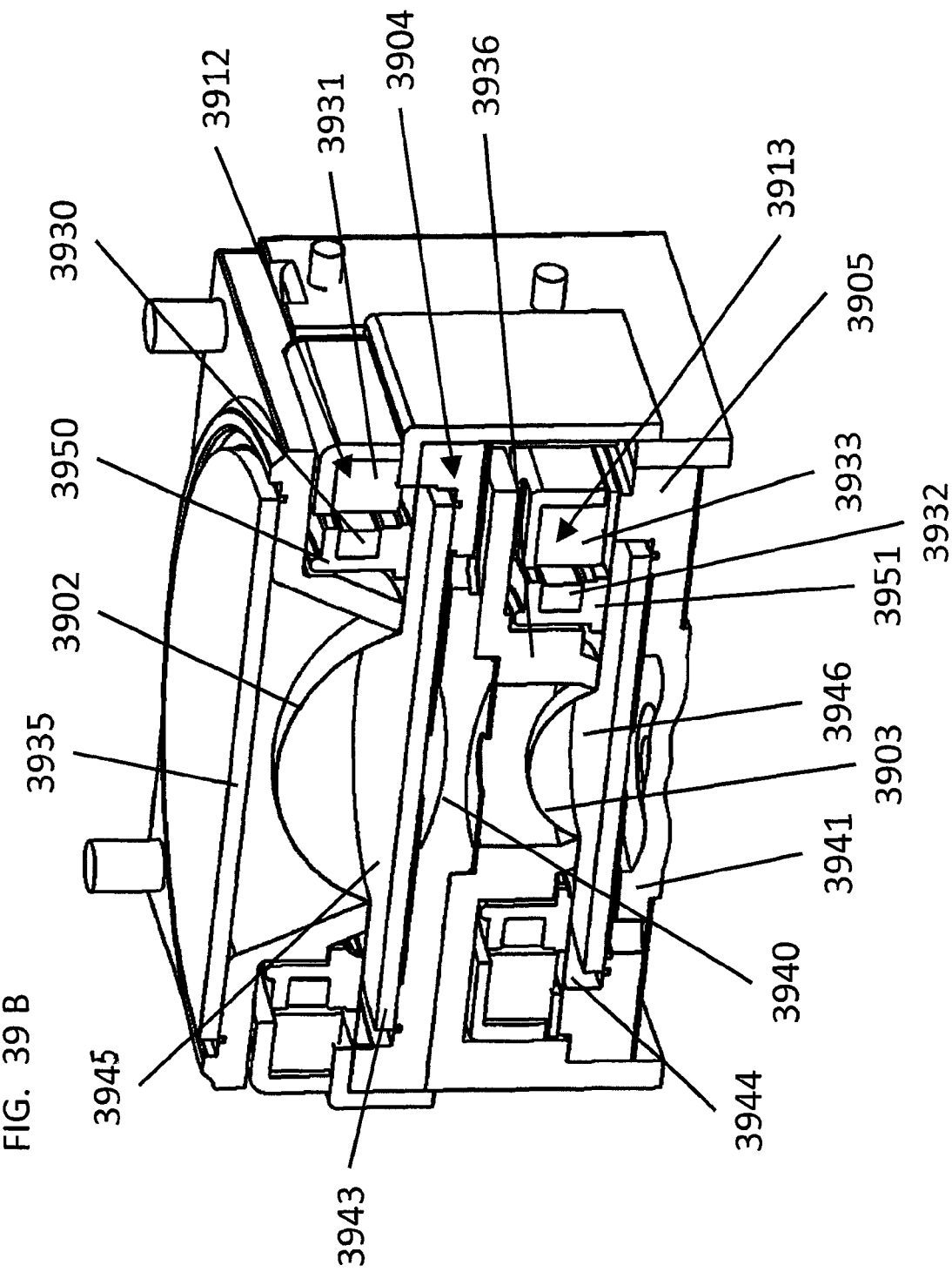
FIGS. 39A-E illustrate various views of another example of a lens aperture, reservoir, and magnetic subassemblies according to various embodiments of the present invention.
Figure 39:
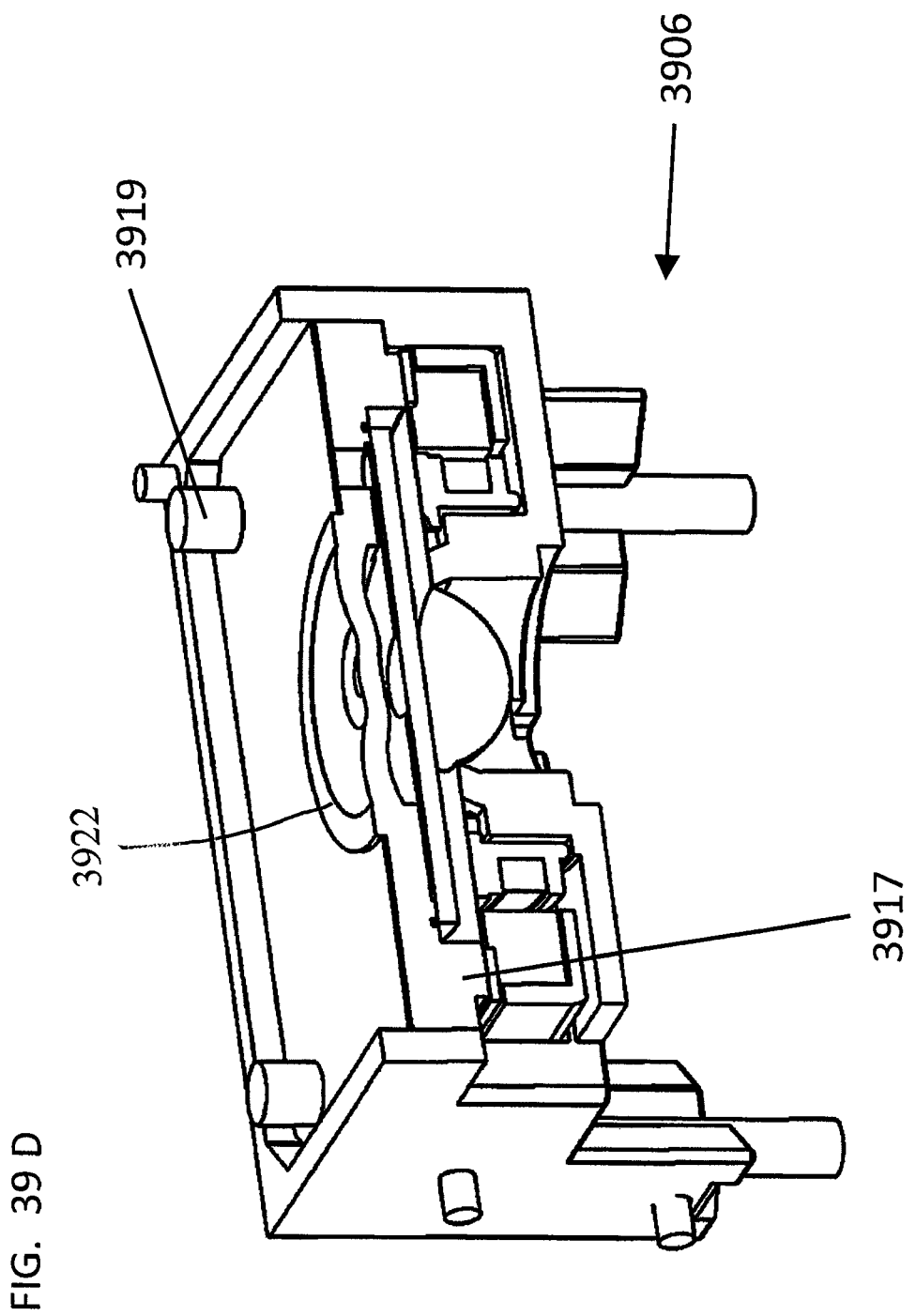
Figure 39:
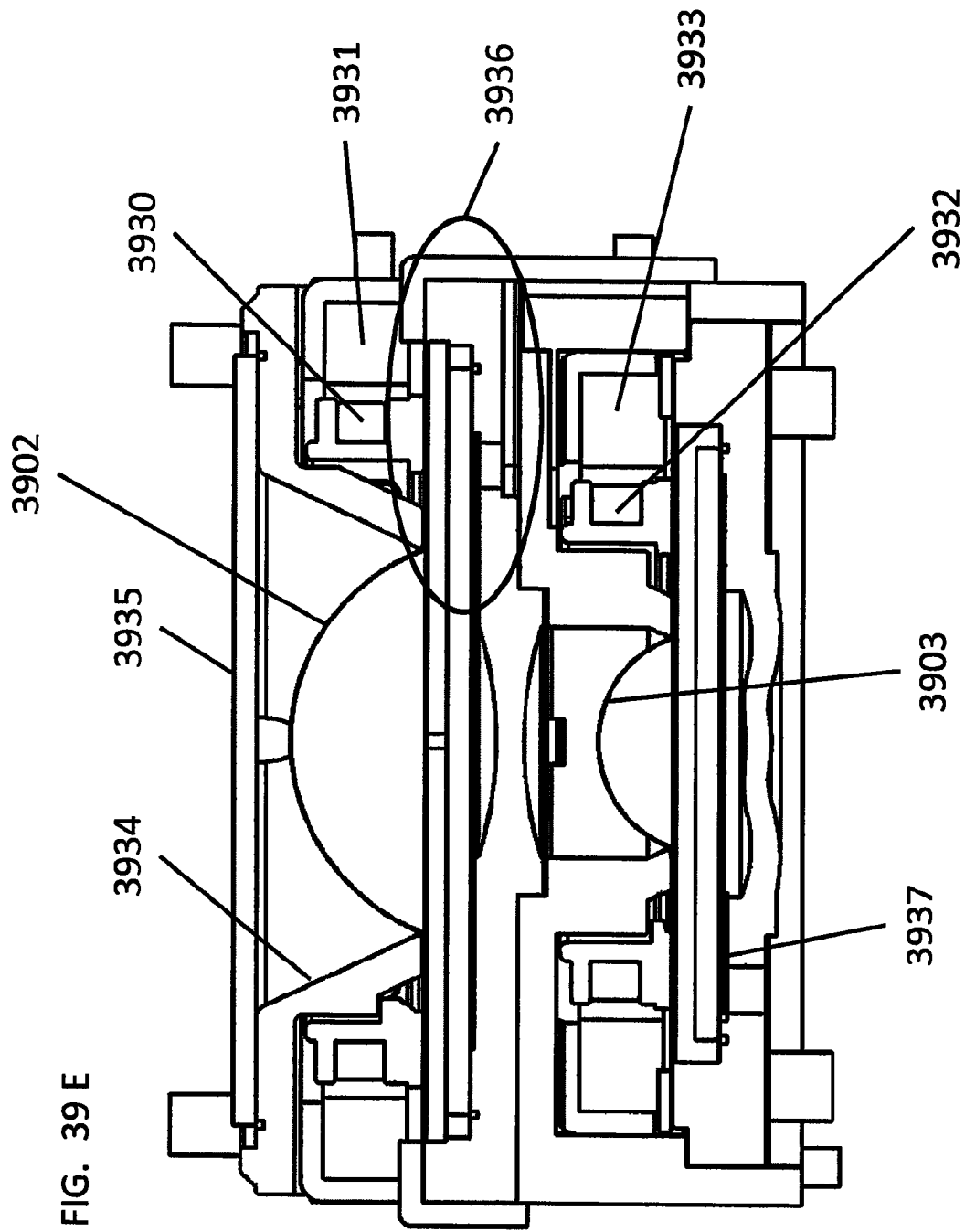

Referring now to FIG. 38B, a membrane 3810 is shown in the un-deformed position. As shown in FIG. 38C, the membrane 3810 is shown in the fully deformed condition.

Referring now to FIG. 38D, if the portion 3805 (the horizontal portion of the T) is too large, the membrane 3810 will stretch as a straight line and extra force will be required to deform the membrane 3810. Referring now to FIG. 38F, if the portion 3805 is too small, the membrane 3810 will tend deform inward and force will be wasted deforming the reservoir portion of the membrane 3810. In one example as shown in FIG. 38E of an optimum configuration for the portion 3805 (and the bobbin 3802), deformation of the membrane 3810 will tend to assume an S-like shape.

Referring now collectively to FIGS. 39A-39E, another example of a lens assembly 3900 is described. In this example, the bottom flexible lens points to an object and not the sensor as shown in the examples of FIG. 37. The lens assembly 3900 includes a top membrane 3902, a bottom membrane 3903, a first core subassembly 3904, a second core subassembly 3905, a housing base subassembly 3906, a final cover subassembly 3908, a top motor subassembly 3912, a bottom motor subassembly 3713, a first aperture portion 3922, a second aperture portion 3923, a top fixed lens 3940 (e.g., a corrective lens), a bottom fixed lens 3941 (e.g., a meniscus lens), a first plate 3943, a second plate 3944, a first reservoir 3945, and a second reservoir 3946. The plate and membrane combinations define the shape of the respective reservoirs. Consequently, the assembly 3900 includes two tunable (e.g., fluid tunable) lenses and two fixed lenses. The assembly 3900 can be operated to provide zoom, autofocus, or other optical functions.

In this example, two core subassemblies 3904 and 3905 are provided and each of these subassemblies serves one liquid reservoir (chamber) 3945 and 3946. Consequently, production yield problems are reduced, since the reservoirs (containers) can be constructed independently. Additionally, no side actions (i.e., the process in injection molding that requires a part of the tool to come from/positioned/used the side, that allows for making a structure that cannot be created by a two dimensional process) are required to provide the barometric relieve holes in the lenses. The top lens shaper and bottom fixed lens 3941 (e.g., a meniscus lens) are both fixed using, for example, heat melt.

As shown in FIG. 39B, the top motor subassembly 3912 includes a top coil 3930 top magnets 3931, and a top bobbin 3950. The bottom motor subassembly 3913 includes a bottom coil 3932, bottom magnets 3933, and a bottom bobbin 3951. A top lens shaper 3934 defines the lens 3902. A bottom lens shaper 3936 defines the bottom lens 3903. The operation of the assembly 3900 to adjust the shape of membranes 3902 and 3903 has been described previously and will not be repeated here.

As shown in FIG. 39C, coil wires 3938 exit through the bottom lens shaper 3936. Threading of the wires 3938 is used to remove the wires 3938 from the assembly 3900 during the manufacturing process.

As shown in FIG. 39D, the first aperture portion 3922 is colored black to provide absorptive properties. A bottom cushion 3917 is used to fix the bottom motor and to compensate tolerances. Heat welding 3919 may be used similar to the final cover assembly. As shown in FIG. 39E, vents 3937 may be used to provide barometric relief for the assembly 3900.

Figure 40:
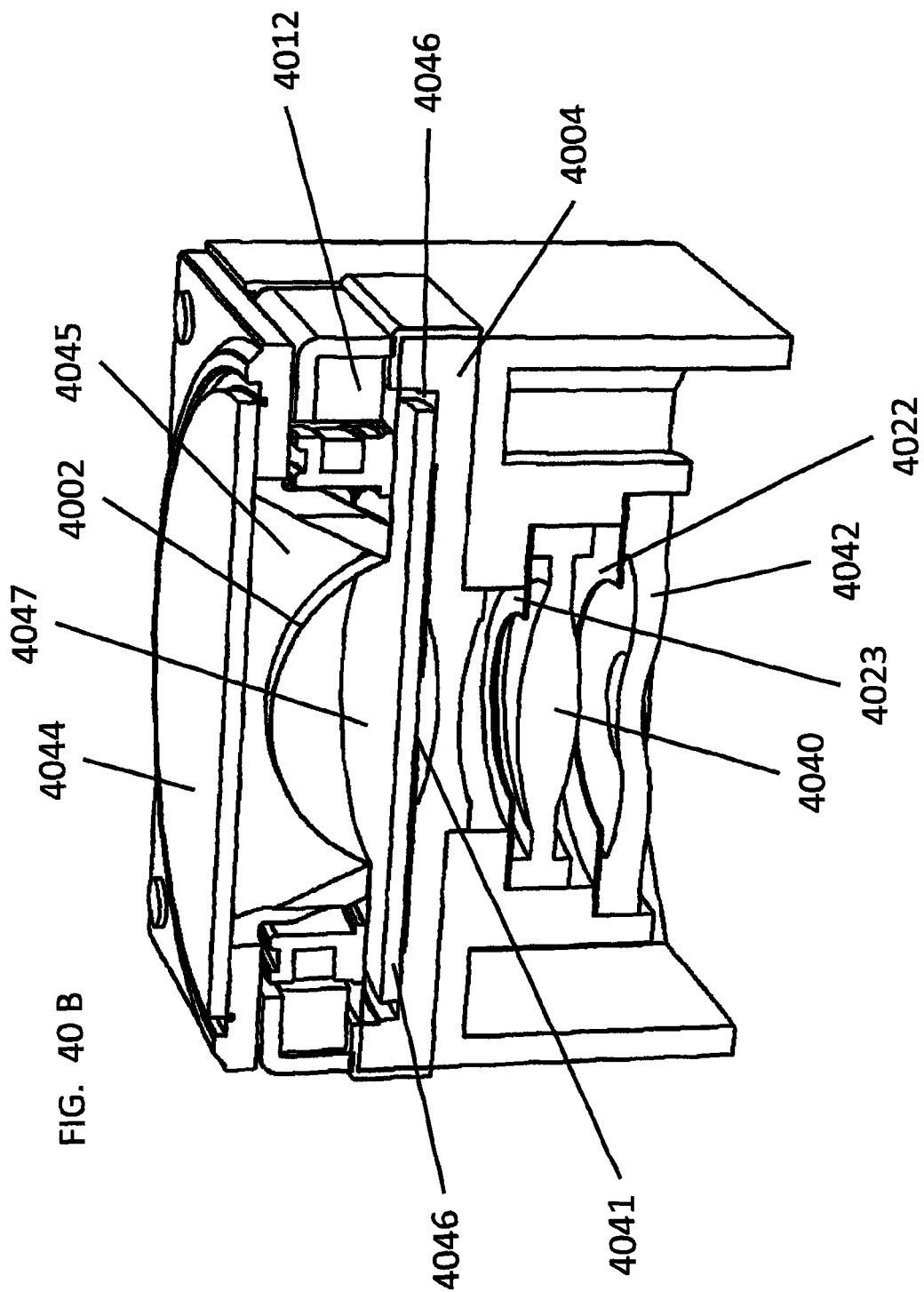
FIGS. 40A-C illustrate various views of another example of a lens assembly according to various embodiments of the present invention.
Figure 40:
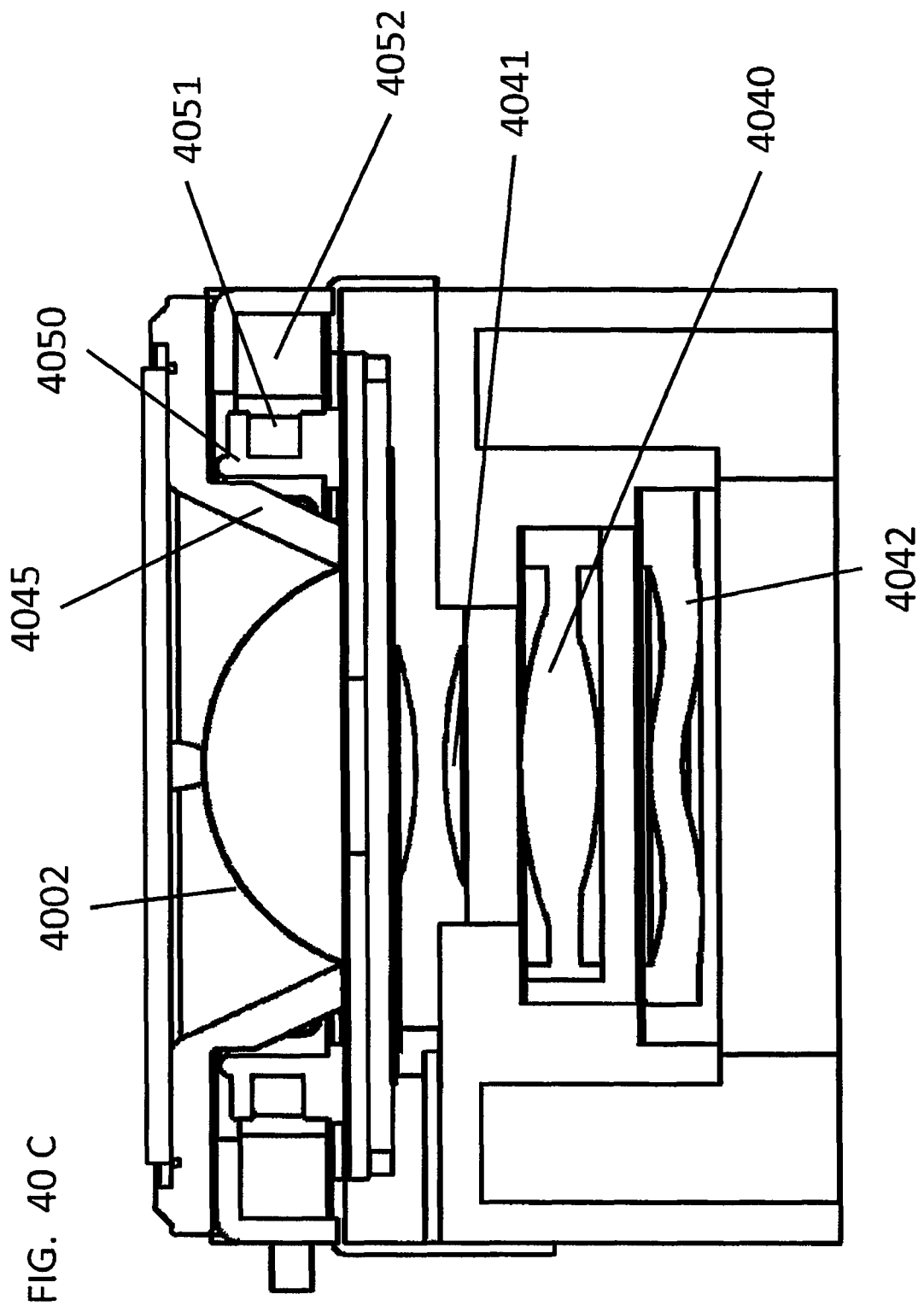

Referring now to FIGS. 40A-C, another example of a lens assembly 4000 is described. The lens assembly 4000 includes a top membrane 4002, a core subassembly 4004, a housing base subassembly 4006, a final cover subassembly 4008, a motor subassembly 4012, a first aperture portion 4022 (e.g., colored black to provide absorptive properties), a second aperture portion 4023 (e.g., colored black to provide non-reflective properties), a top fixed lens (e.g., a corrective lens) 4041, a middle fixed lens 4040 (e.g., a corrective lens), a bottom fixed lens 4042 (e.g., a meniscus lens), a cushion 4010 (to provide cushioning of the elements in the assembly 4000 and which can be constructed of any suitable flexible material such as rubber), a top cover 4044 (e.g., constructed of glass), a top lens shaper 4045, a plate 4046, and a reservoir 4047. The plate and membrane combination defines the shape of the reservoir 4047. The motor subassembly 4012 includes a bobbin 4050, a coil 4051, and magnets 4052. The operation of the assembly 4000 in adjusting the shape of membrane 4002 has been described previously and will not be repeated here. In addition, the many of the elements present in FIG. 40 have already been discussed herein (e.g., with respect to the examples of FIGS. 37 and 39) and their composition and functionality will not be discussed further here.

The assembly 4000 includes one fluid tunable lens and three fixed lenses. Barometric relief may be provided via chamfers 4053 in the fixed lenses. In this example, the fixed lenses 4040, 4041, and 4042 may be press fit into the assembly 4000. In one example, the tunable lens may be operated as a part of an autofocus module.

Figure 41A:
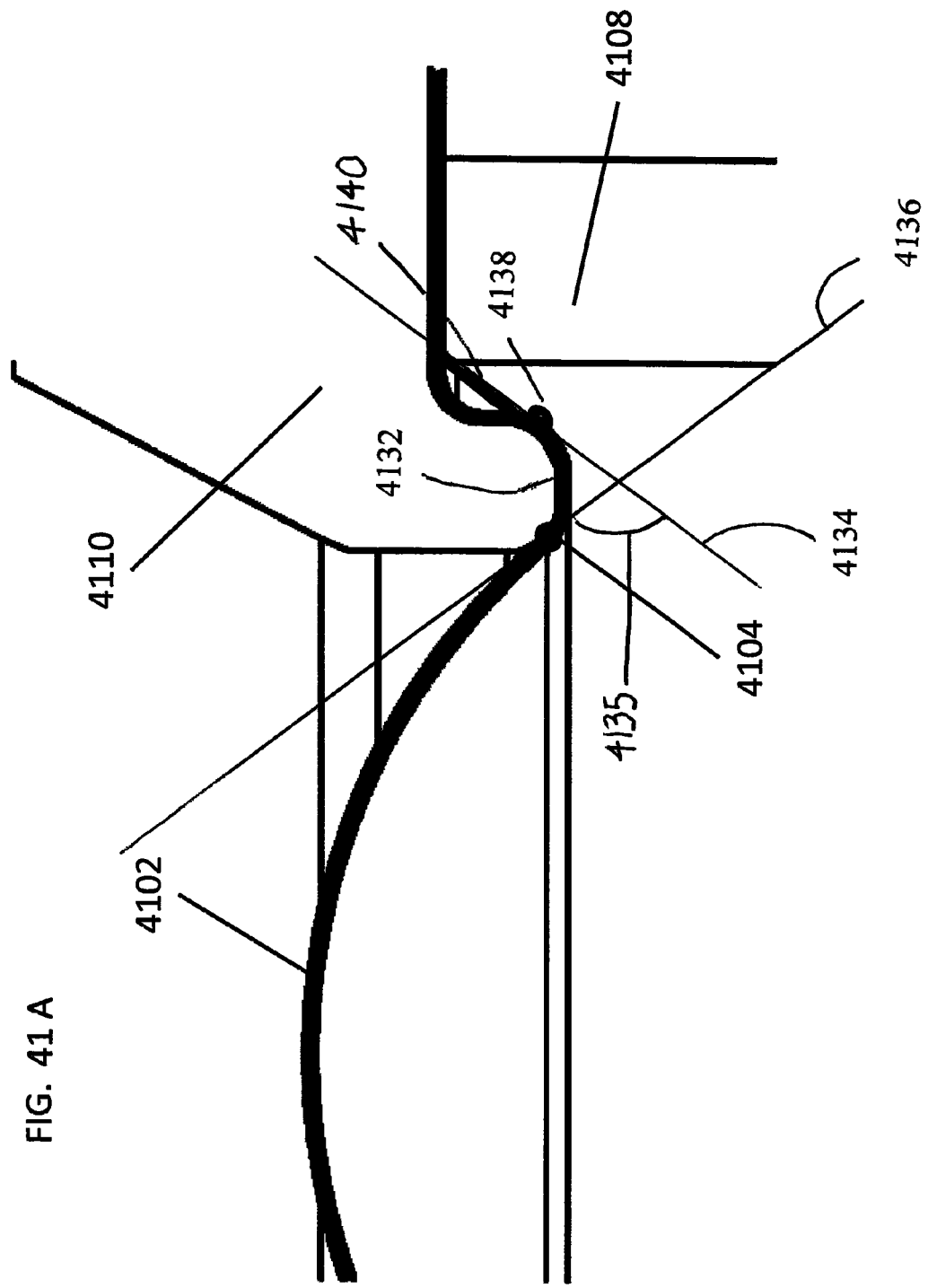
FIGS. 41A-B illustrate various views of another example of a lens assembly according to various embodiments of the present invention.
Figure 41:
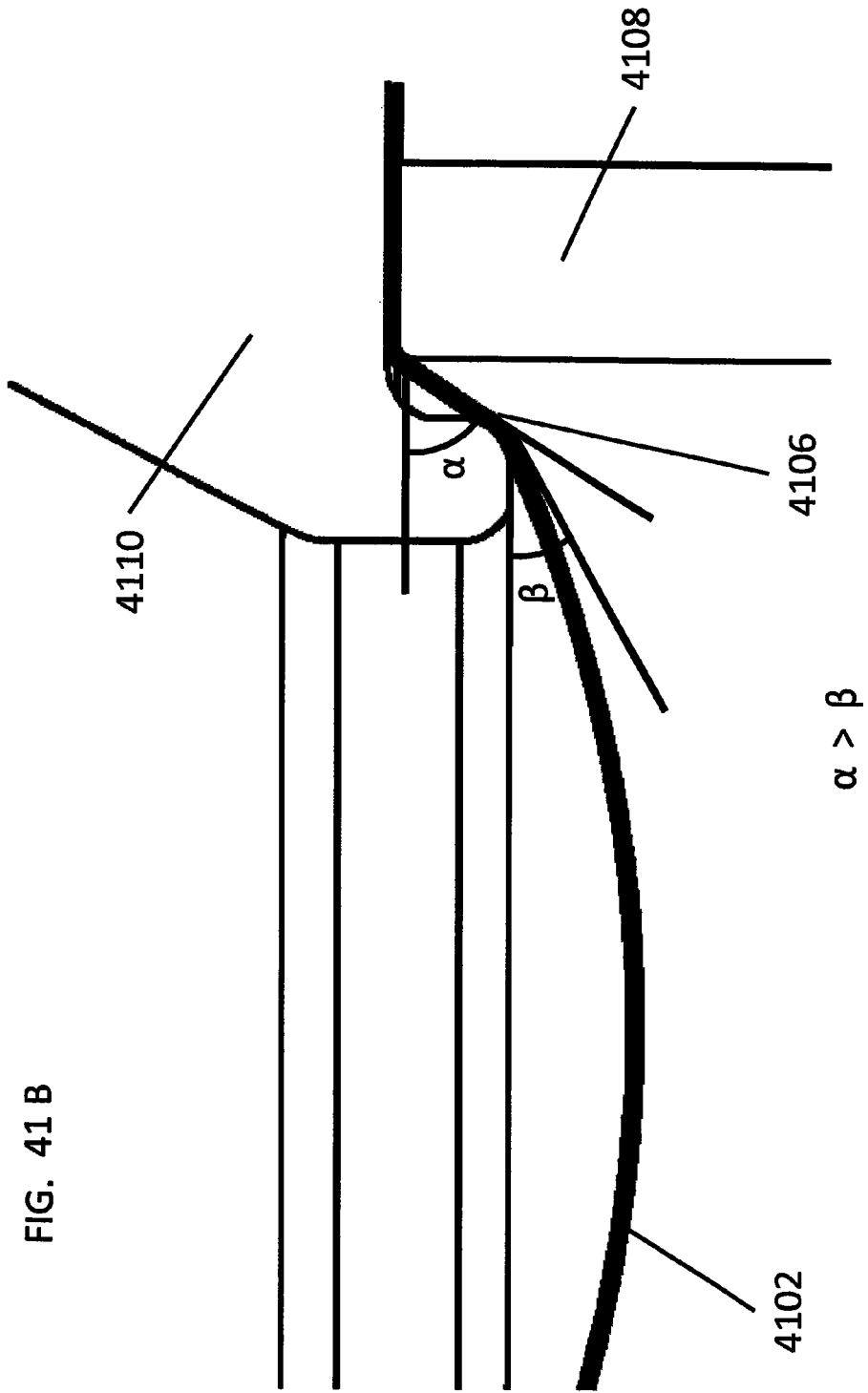
Figure 42:
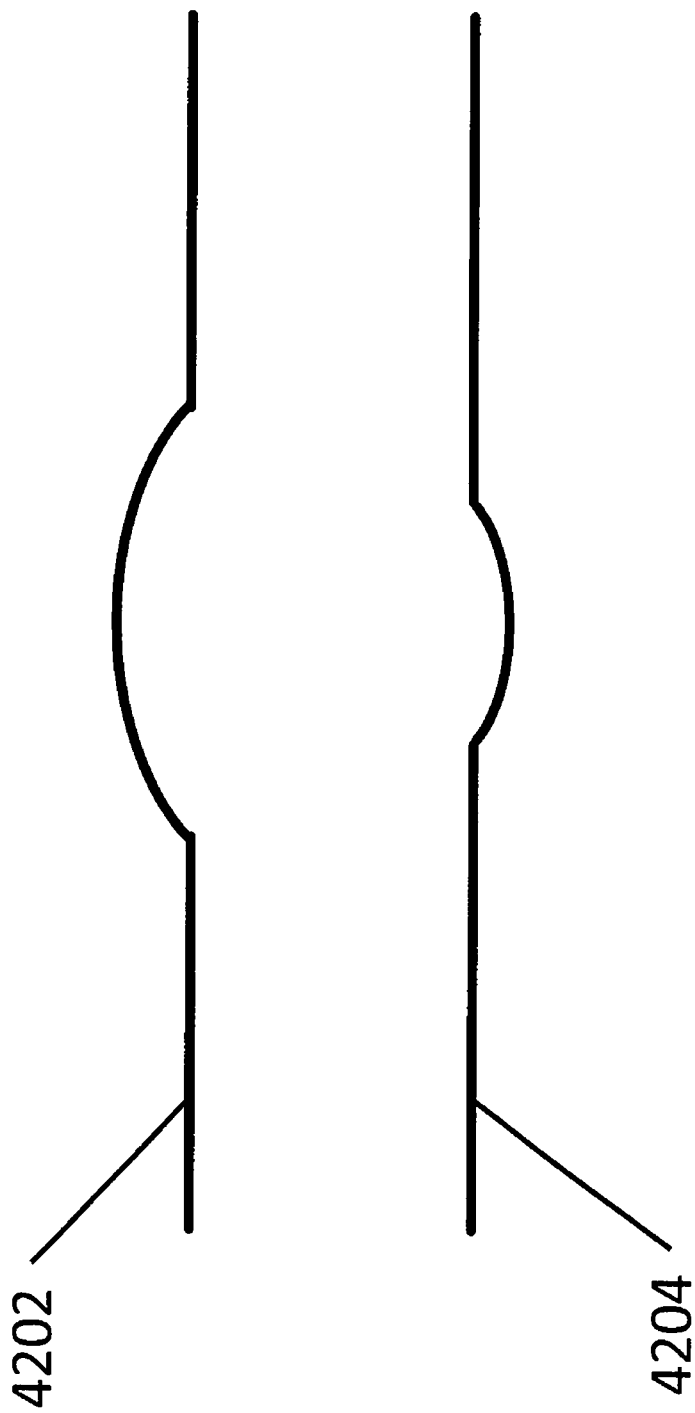
FIGS. 42A-D illustrate various lens configurations according to various embodiments of the present invention.
Figure 42:
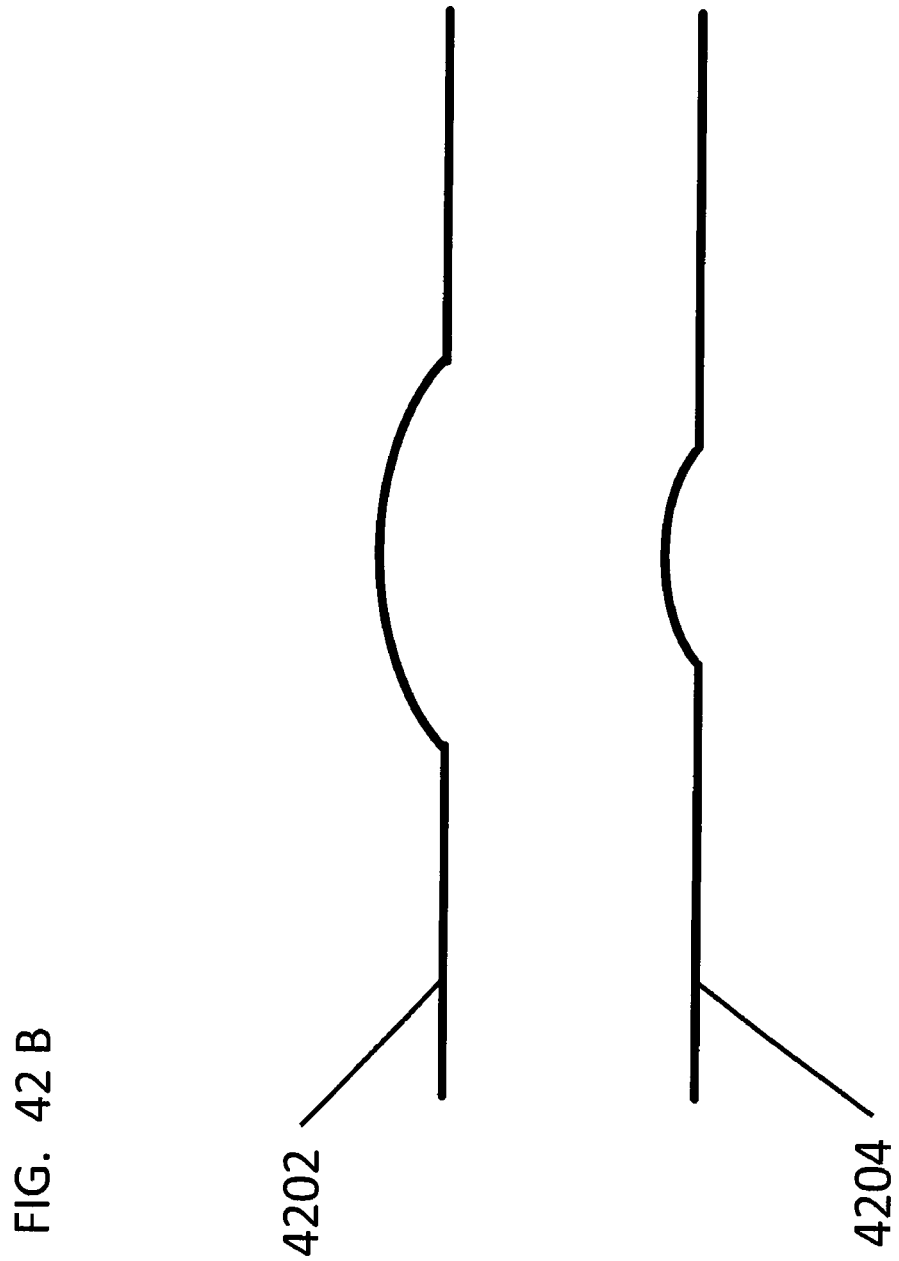
Figure 42:
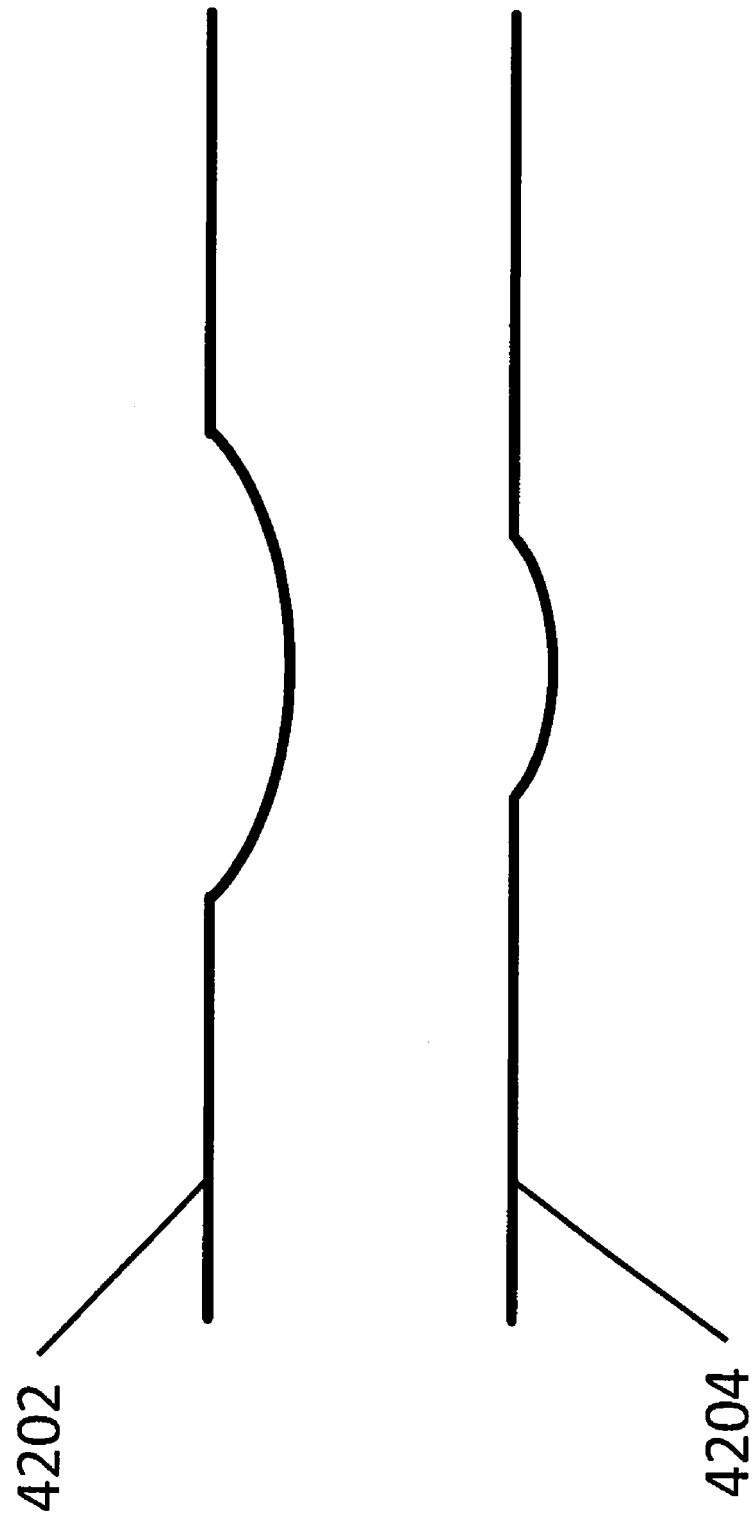
Figure 42:
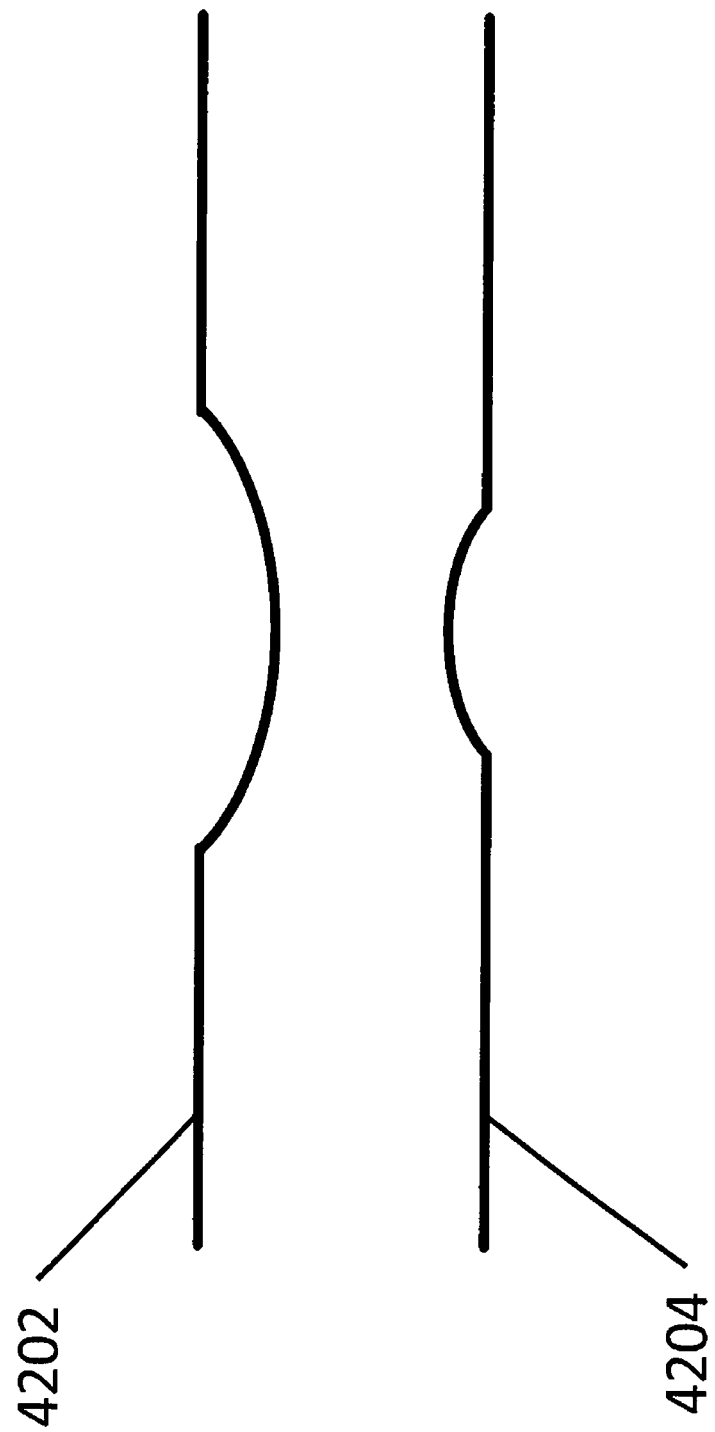

Referring now to FIGS. 41a and 41b, another example of lens shaping is described. A first membrane 4102 is attached at an attachment point (4104 in FIGS. 41a and 4106 in FIG. 41b). A second attachment point 418 is also shown in FIG. 41A. The assembly also includes a support 4108 and a lens shaper 4110. FIG. 41a shows the lens in a convex shape and FIG. 41b shows the lens in a concave shape. A first theoretical line 4136 and a second theoretical line 4138 are also shown in FIG. 41A. The lines define a connection angle 4135.

To achieve a precise lens that can be tuned in a convex and concave state while keeping a high quality shape, the lens shaper 4110 is formed such that the membrane attach point is defined by a single lens shaper. To avoid the use of glue, the support 4108 is placed at a first angle alpha between the support 4108 and the lens shaper and this angle alpha is larger than the curvature of the membrane in the concave position (indicated by the angle beta). In one advantage of these approaches, no gluing is needed as between the lens shaper and the support and, at the same time, the lens attachment point is well defined.

As shown in FIG. 41A, the deformable lens defines at least by the first membrane 4102 and a filler material. The deformable lens is in contact with the lens shaper 4110 at a contact region, and not in contact with the lens shaper at a non-contact region. The first detachment point 4104 is defined as the interface between the contact region and the non-contact region. The first detachment point 4104 defines a diameter of the deformable lens. The shape of the lens shaper 4110 allows for a location of the first detachment point 4104 to vary with deformation of the deformable lens, such that the diameter of the deformable lens varies with the location of the first detachment point 4104. In some examples, an axial position of the detachment point 4104 varies with the deformation of the deformable lens.

In others of these examples, the optical apparatus further includes a first support member 4108; a second membrane (or membrane portion or section) 4132 which is a subset of the first membrane that is in contact with the lens shaper 4110 at the contact region; a third membrane (or membrane portion or section) 4140 which is connected with an end of the second membrane 4132 and the first support member 4108; a second detachment point 4138 which is located at a connection point between the second membrane 4132 and the third membrane 4140. The first theoretical line 4136 is tangent to the lens shaper 4140 at the first detachment point 4140 and the second theoretical line 4134 is tangent to the lens shaper 4110 at the second detachment point 4138. The connection angle 4135 is defined as an angle between the first theoretical line 4136 and the second theoretical line 4134 and is a supplementary angle to an angle that contains a majority of the lens shaper 4110. A connection angle positive sense is defined as being in a direction from the second theoretical line 4134 through the first theoretical line 4136 and towards the lens shaper 4110 wherein the connection angle 4135 does not span across the lens shaper 4110. The absolute value of the connection angle 4135 is between 0 and 180 degrees.

In some examples, only frictional forces are used to hold the first membrane 4102 to the lens shaper.

In still other examples, the apparatus further includes a second lens shaper, and a third lens shaper. Deformation of the deformable lens causes the lens shaper to shift from the second lens shaper to the third lens shaper and changes the diameter of the deformable lens.

In still other examples, the optical apparatus further includes a second lens shaper and a third lens shaper. Deformation of the deformable lens causes the detachment point to shift from the second lens shaper to the third lens shaper and changes an axial position of the deformable lens.

Referring now to FIGS. 42A-D, it will be appreciated that the above-described approaches can be used in conjunction with two variable lens structures 4202 and 4204. As shown in these examples, the bottom and top lens can expand into either concave or convex shapes and can be used in the various combinations shown and according to the various approaches described herein.

Figure 43:
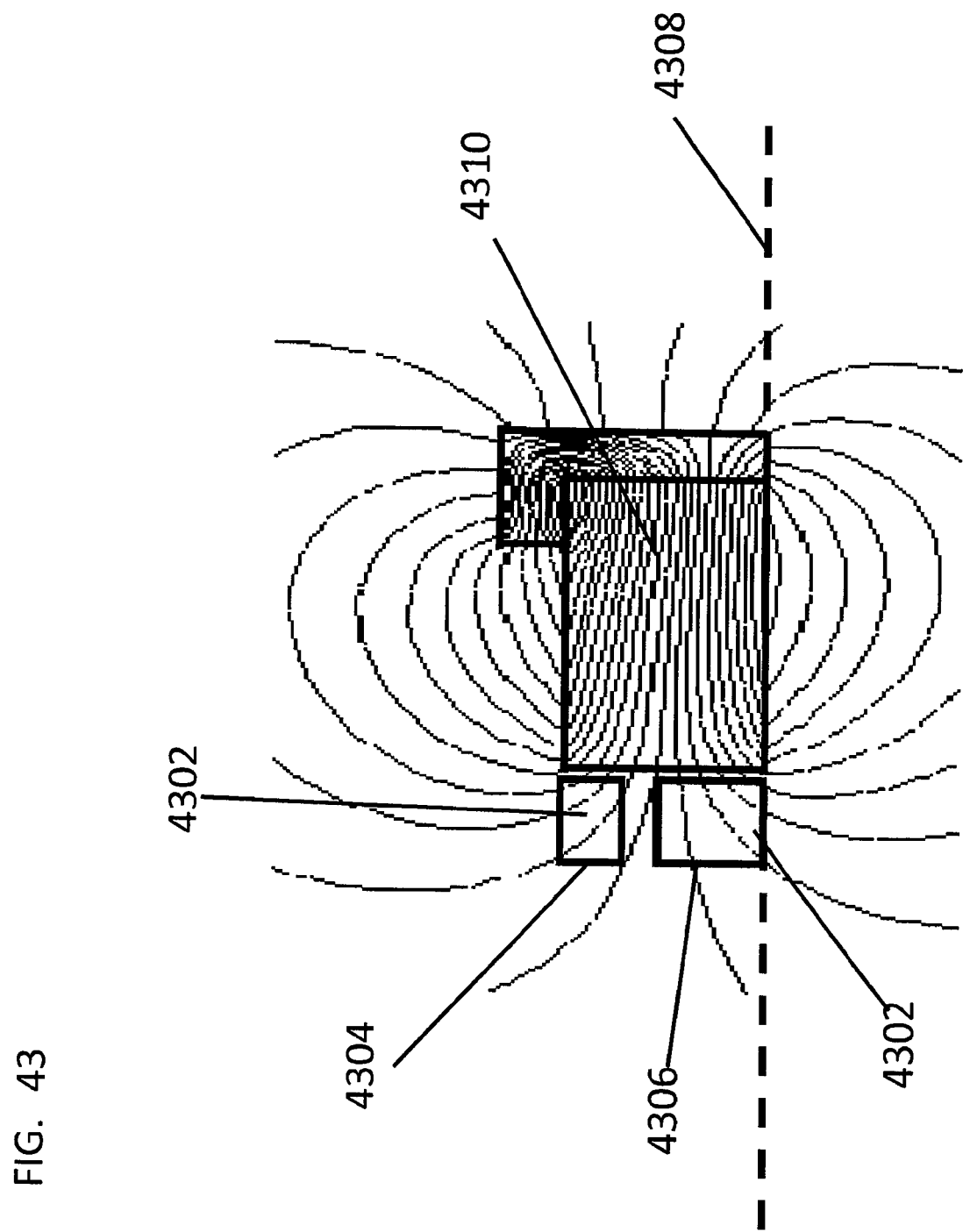
FIG. 43 illustrates alignment of the coil and magnet according to various embodiments of the present invention.

Referring now to FIG. 43, a coil 4302 moves from a first position 4304 to a second position 4306. If the coil 4302 were to move below a plane 4308 of a magnet 4310, the flux normal to the current in the coil that produces the moving force would rapidly decrease or be eliminated. In the present example, in the most deformed state the coil 4302 is aligned to the bottom surface of the magnet 4310. As shown in FIG. 43, a flux plot is shown where the coil 4302 is in the most deformed position. As shown, the bottom of the coil 4302 is aligned with the bottom of the magnet 4310.

The approaches described herein can be used with membranes that are thicker than used in previous systems. In some examples, membranes having a thickness of 10-50 um and a stiffness (Young's modulus) of 0.5 MPa are used. Other examples are possible.

Relatively thick membranes offer several advantages. For example, thicker membranes allow easier processing of the membrane in production and their shape is easier to maintain. Additionally, the membrane is less prone to gravitational effects (when the lens is in a vertical position) so that larger lenses are possible that still provide good optical quality. Also, a thicker membrane is less likely to rupture when handled or when a shock occurs. The membrane thickness is easier to control (1 um thickness variation is only 1% for a 100 um thick membrane, but 10% for a 10 um thick membrane) and results in an improved optical quality. Additionally, thicker membranes make it easier to integrate an AR coating into a thicker membrane.

Figure 44:
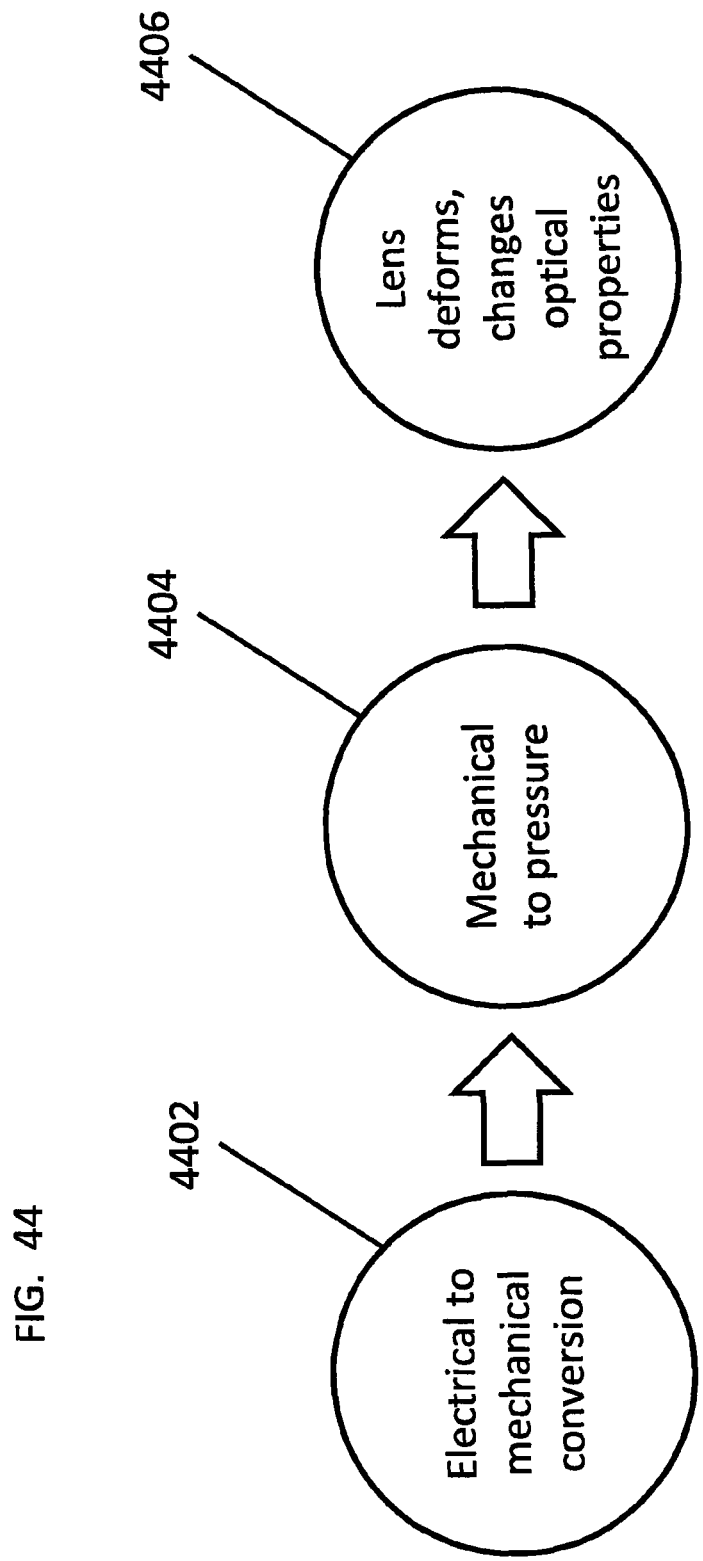
FIG. 44 comprises a flowchart of one example the operation of a lens assembly according to various embodiments of the present invention.

Referring now to FIG. 44, one example of an approach for adjusting the optical characteristics of one or more lenses is described. At step 4402, conversion of electrical energy to mechanical energy occurs. The conversion of electrical energy to mechanical energy may be accomplished by using any electrical-to-mechanical actuation device such as a piezoelectric motor, a magnetostrictive motor, a stepper motor, or a voice coil motor to name a few examples. The piezoelectric motor may be a quasi-static, ultrasonic, stepping, inertial, standing wave, travelling wave, bidirectional, or unidirectional piezoelectric motor to name a few examples. Such motors are of the models typically manufactured by Williams and Brown, Konico Minolta, New Focus, Lavrinenko, Bacnsiavichus, Nanomotion, Physik Instrumente, or New Scale corporations to name a few examples of piezoelectric motor manufacturers.

In some of the examples described herein, the motor is described as being a piezoelectric motor. However, it will be appreciated that the motor may be any type of suitable electrical-to-mechanical actuation device such as a electroactive polymer motor, magnetostrictive motor, a voice coil motor, or a stepper motor. Other examples of motors or devices are possible.

At step 4404, the mechanical force (produced at step 4402) is converted to a pressure that eventually alters the optical properties of a lens. The lens may be a three-dimensional space filled with a filler material and communicating with a reservoir. The electrical-to-mechanical actuation device (e.g., piezoelectric motor) creates the mechanical force to directly or indirectly act on a filler material within the lens and/or the reservoir.

In one approach, the linkage structure mechanically interconnects to a surface of a reservoir and the linkage structure includes drive rods, paddles, pins, adhesives, to name a few examples. The mechanical force communicated by the linkage structure creates a pressure over a surface of the reservoir and the pressure moves the filler material in the reservoir and/or lens. More specifically and as mentioned, the reservoir communicates with the lens and the filler material is exchanged between the reservoir and the lens based upon the direction, magnitude, or other property of the force acting on the reservoir. It will be appreciated that in many of the examples described herein, one or more reservoirs are described as being interconnected or communicating with a lens and filler material is exchanged between these two distinct spaces. However, it will be appreciated that instead of two labeled, separate, and distinct spaces (i.e., lens and reservoir) a single space (e.g., a single reservoir) can be used and filler moved within this single space.

Additionally, the reservoir can be one or more reservoirs. Multiple reservoirs, combinations or reservoirs and tubes or channels may also be used. The reservoir can be directly connected to the lens (i.e., the optical area where optical properties are determined) via an open channel or opening or through a network of one or more fluid chambers. Other configurations are possible.

At step 4406, pressure to the membrane causes optical deformation of the lens to occur. The dimensions, curvature, and shape of membrane at least in part determine the optical properties of the lens within the lens assembly. The pressure in the filler (e.g., optical fluid) deforms the membrane and determines the amount of deformation that occurs. The membrane can be deformed so as to be concave, convex, or flat in shape. The curvature of the membrane can be spherical among other shapes. Other examples are possible.

Figure 45:
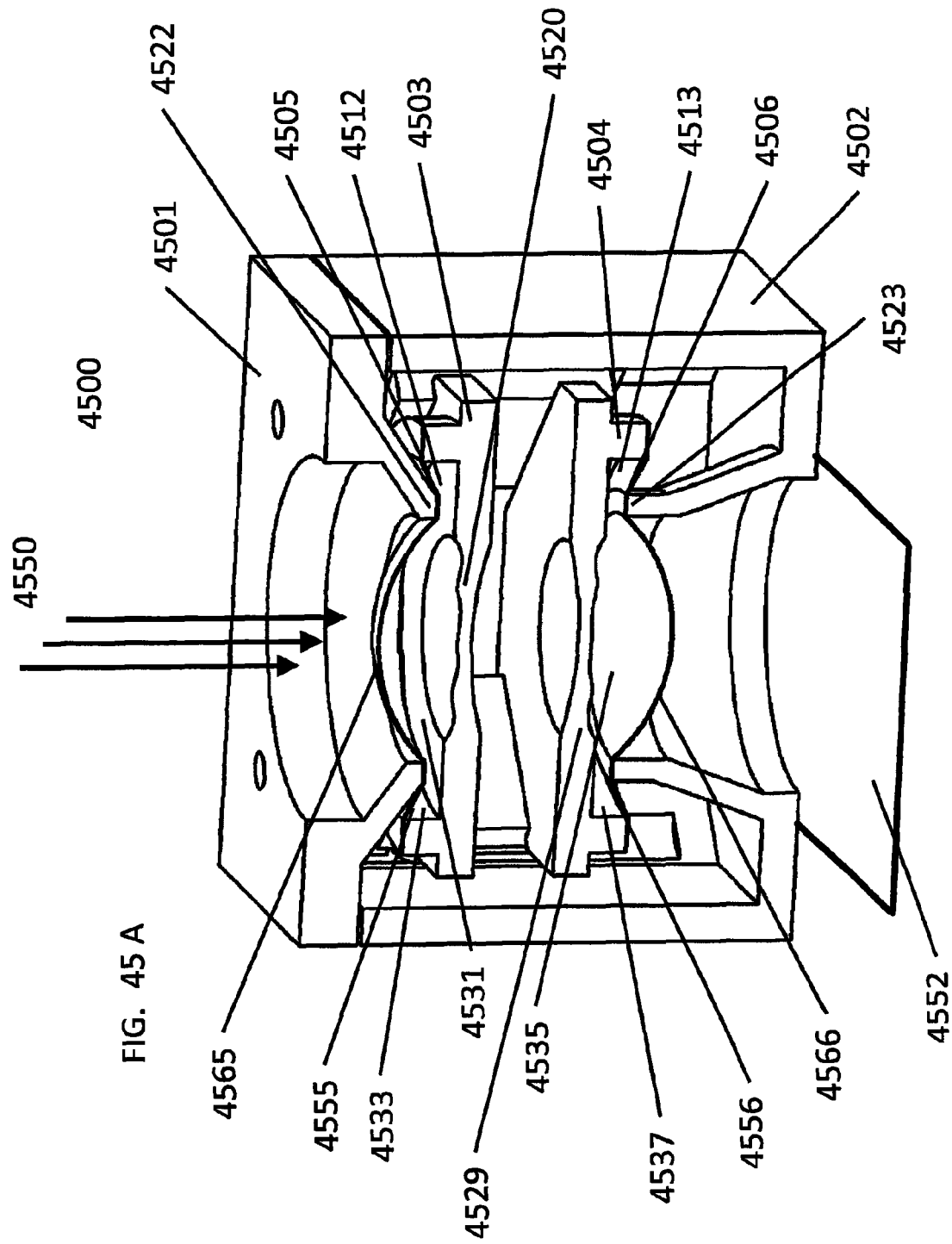
FIGS. 45A-45C comprise various perspective cross-sectional views of a lens assembly according to various embodiments of the present invention.
Figure 45:
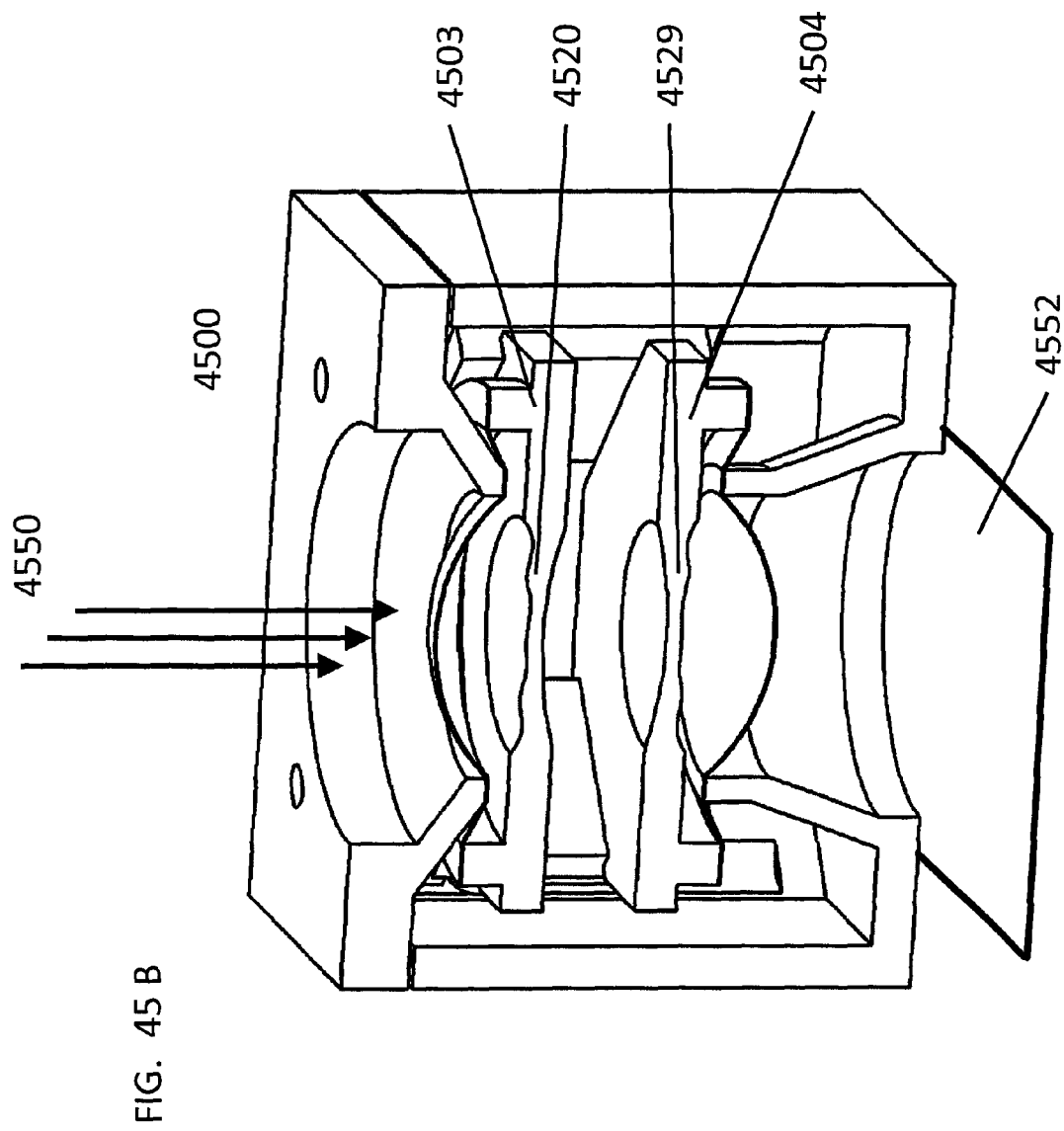
Figure 45:
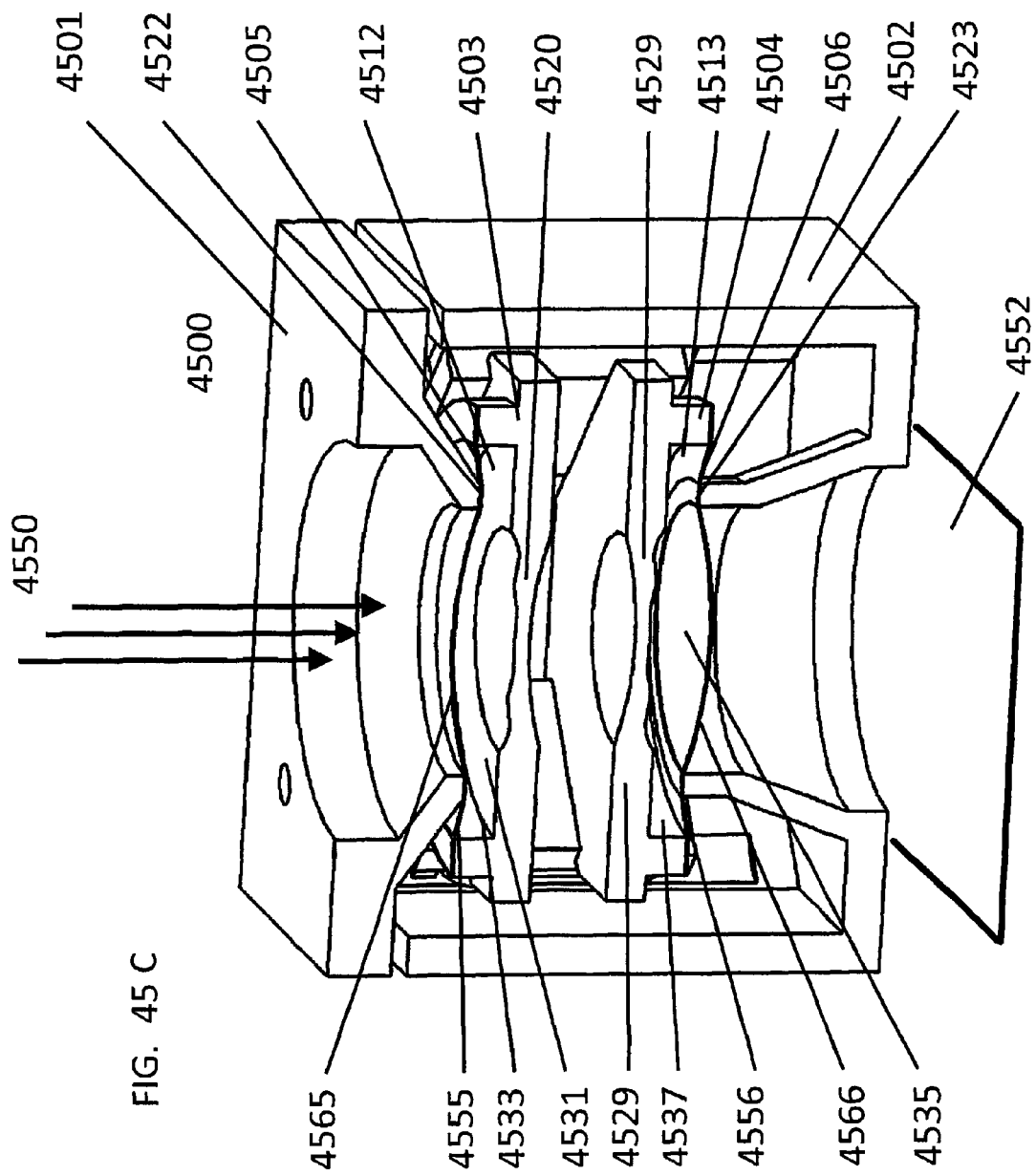

Referring now to FIG. 45A, one example of a lens assembly 4500 is described. The lens assembly 4500 includes a top housing 4501 having a top lens shaper 4522, a bottom housing 4502 having a bottom lens shaper 4523, a top filler 4512, which is enclosed between a top container 4503 and a top membrane 4505, a bottom filler 4513, which is enclosed between a bottom container 4504 and a bottom membrane 4506. It will be appreciated that in the figures the term "top" will denote the side of the lens assembly through which light enters the lens assembly, and that "bottom" will denote the side of the lens assembly through which light exits the lens assembly to be projected, for example, on a sensor. It will also be appreciated that although in all the examples the optic axis, being the line through the nominal center of the optical components, is illustrated as single straight line, it is possible to introduce a reflective component, such as a mirror or prism, to alter the direction of the optic axis before, in between, or after the optical components in the lens assembly. The membrane 4505 may be divided by a top lens shaper 4522 into an inner section 4565 and an outer section 4555. The membrane 4506 may be divided by a bottom lens shaper 4523 into an inner section 4566 and an outer section 4556. A perimeter of the inner section 4565 extended toward the top container 4503 divides the filler into a lens (bounded by the inner section 4565) and a reservoir (exterior to the inner section). A perimeter of the inner section 4566 extended toward the bottom container 4504 divides the filler 4513 into a lens (bounded by the inner section 4566) and a reservoir (exterior to the inner section). The containers 4503 and 4504 in one example are hard plastic members (e.g., plates). In another example, the containers 4503 and 4504 are constructed from glass and/or other optical materials and provide optical correction functions. Other materials may also be used to construct the containers 4503 and 4504. Light rays 4550 pass through and their properties are altered by the lens assembly 4500 and the altered rays are sensed by a sensor 4552, which may, in one example, be an electronic sensor chip.

The housings 4501, 4502 support all or some of the other elements and may be constructed of plastic or any other suitable material. The top lens shaper 4522 and the bottom lens shaper 4523 define the two-dimensional shape of their respective membranes and hence the shape of the lens. In particular, the lens shapers contact the respective membranes 4505 and 4506 and define the perimeter of, and to a certain extent, the shape of the lenses 4531 and 4535 due to their contact with the membranes 4505 and 4506. Other factors which can contribute to the shape of the lenses 4505, 4506 are elastic stress in the membrane, and the hydraulic pressure of the filler in the filler volume. The filler volume is considered as the total volume of filler in the lens and reservoir, a preponderance of which may exist between the membrane and the container. A balance of forces between the filler pressure and restoring forces in the membrane as constrained by the shaper ring determines the shape of the lens.

The membranes 4505 and 4506 bounding the lens are made at least partially of a flexible material. The inner sections of the membranes and the outer sections may be made of the same membrane material. However, in other examples the actuator section of the membrane and the inner section are constructed of different membrane materials. The properties of the membranes 4505 and 4506 and/or the filler materials (e.g., an optical fluid) combine to provide reflective, refractive, diffractive, and absorptive, and/or color filtering functions. Other functions may also be provided by the membrane and/or the filler material in the reservoirs. An optional top plate (not shown) may be used to cover the top of the assembly 4500.

The membranes 4505 and 4506 and the containers 4503 and 4504, define a filler volume which consists of the reservoirs 4533 and 4537, as well as lenses 4531 and 4535, respectively. Different filler materials (e.g., fluid, ionic liquids, gas, gel, or other materials) can be used to fill the reservoirs 4533, 4537 and lenses 4531, 4535. The refractive indexes of the filler materials 4512 and 4513 used to fill the reservoirs and lenses may also vary. In one example, a fluid is used as the filler material and the refractive index of the fluid in the reservoirs and lenses is selected to be different from the refractive index of the surrounding air.

By axially moving or interacting with the containers 4503 and 4504 using piezoelectric motors (for clarity, not shown in FIG. 45A), the membranes 4505 and 4506 are deformed (via pressure from movement of the filler materials 4512 and 4513) resulting in a changed optical behavior of the lenses in the lens assembly. A top corrective lens 4520 is positioned at the bottom of the first container 4503 and a second corrective lens 4529 is positioned at the top of the second container 4504. The corrective lenses 4520 and 4529 are passive components (e.g., their shape does not change) and ensure proper focusing of the light 4550 passing through the lens assembly 4500. For example, if the lens assembly provides zoom and/or autofocus functions, then the corrective lenses 4520 and 4529 ensure proper focusing of the received light at the sensor 4552.

Referring now to FIGS. 45B and 45C, one example of a lens assembly shown in two states of operation is described. The labels for the elements in these figures correspond to the labels used in FIG. 45A. As shown in FIG. 45B, the top corrective lens 4520 and the bottom corrective lens 4529 are separated by a distance d3. As shown in FIG. 45C, the piezoelectric motor (for clarity not shown in these figures) has been actuated to move the containers 4503 and/or 4504. Consequently, since the containers 4503 and 4504 move, the distance between the corrective lenses 4520 and 4522 decreases as shown in FIG. 45C to a distance d4. Consequently, the approaches described herein can automatically adjust at least some focusing properties of the lens 4500.

Figure 46:
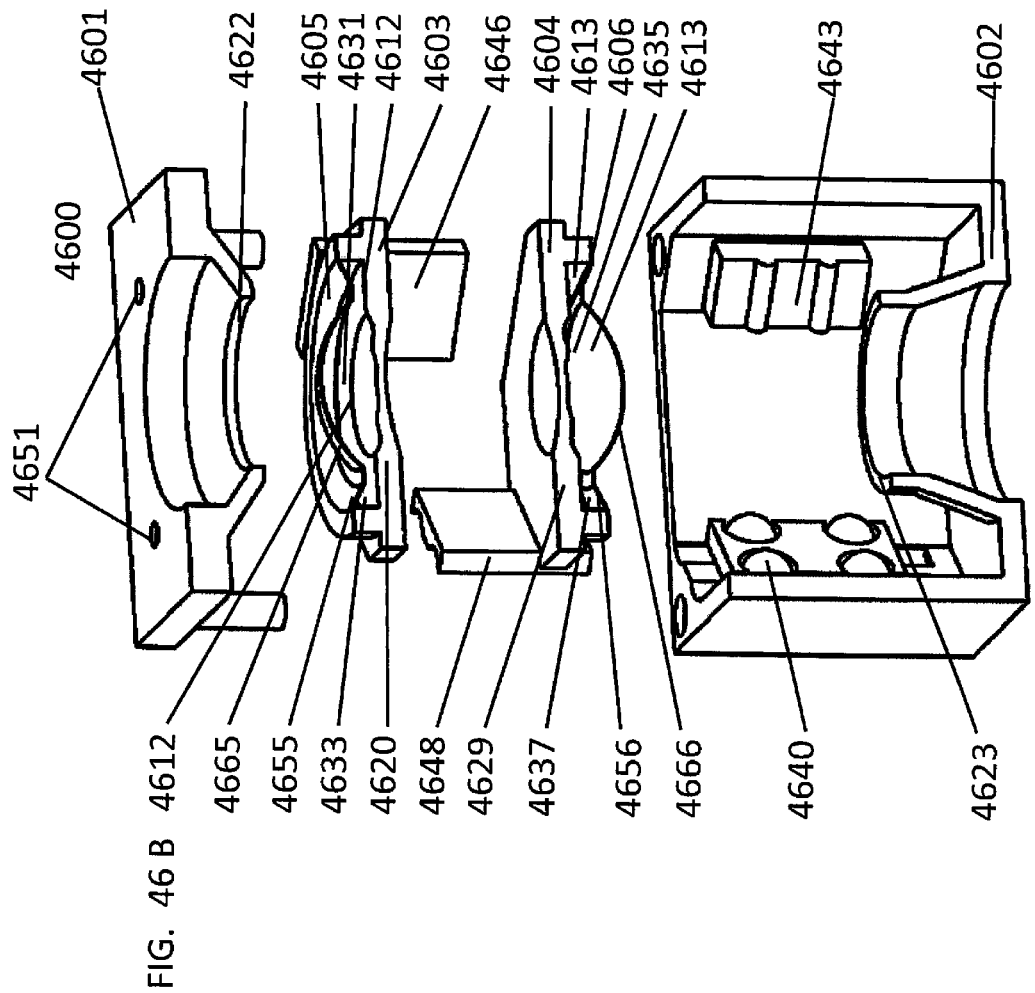
FIGS. 46A and 46B comprise perspective exploded and cross-sectional views of another example of a lens assembly according to various embodiments of the present invention.

Referring now to FIGS. 46A and 46B, a detailed view of a lens assembly showing the piezoelectric motors that are located in the corners of the housing is described. A lens assembly 4600 includes a top housing 4601, a top lens shaper 4622, a bottom housing 4602, a bottom lens shaper 4623, a top filler 4612, which is enclosed between a top container 4603 and a top membrane 4605, a bottom filler 4613, which is enclosed between a bottom container 4604 and a bottom membrane 4606. The top membrane 4605 may be divided by a top lens shaper 4622 into an inner section 4665 and an outer section 4655. The bottom membrane 4606 may be divided by a bottom lens shaper 4623 into an inner section 4666 and an outer section 4656. A perimeter of the inner section 4665 extended toward the top container 4603 divides the filler into a lens (bounded by the inner section 4665) and a reservoir (exterior to the inner section). A perimeter of the inner section 4666 extended toward the bottom container 4604 divides the filler 4613 into a lens (bounded by the inner section 4666) and a reservoir (exterior to the inner section). The containers 4603 and 4604 in one example are hard plastic members (e.g., plates). In another example, the containers 4603 and 4604 are constructed from glass and/or other optical materials and provide optical correction functions. Other materials may also be used to construct the containers 4603 and 4604. As they move, the containers 4603 and 4604 are guided by ball bearings 4640 and 4641 on one side of the assembly 4600 and on the other side of the assembly 4600 by a first piezoelectric motor 4642 and a second piezoelectric motor 4643. The piezoelectric motors 4642 and 4643 may be coupled to linkages 4645 and 4646 and the linkages 4645 and 4646 may, in turn, be coupled to the containers 4603 and 4604. The ball bearings 4640 and 4641 may couple to linkages 4648 and the linkages 4647 and 4648 may communicate with the containers 4603 and 4604. In other examples, the linkages are omitted.

The membranes 4605 and 4606 bounding the lens are made at least partially of a flexible material. The inner sections of the membranes and the outer sections may be made of the same membrane material. However, in other examples the actuator section of the membrane and the inner section are constructed of different membrane materials. The properties of the membranes 4605 and 4606 and/or the filler materials (e.g., an optical fluid) combine to provide reflective, refractive, diffractive, and absorptive, and/or color filtering functions. Other functions may also be provided by the membrane and/or the filler material in the reservoirs. An optional top plate (not shown) may be used to cover the top of the assembly 4600.

The membranes 4605 and 4606 and the containers 4603 and 4604, define a filler volume which consists of the reservoirs 4633 and 4637, as well as lenses 4631 and 4635, respectively. Different filler materials (e.g., fluid, gas, gel, or other materials) can be used to fill the reservoirs 4633, 4637 and lenses 4631, 4635. The refractive indexes of the filler materials 4612 and 4613 used to fill the reservoirs and lenses may also vary. In one example, a fluid is used as the filler material and the refractive index of the fluid in the reservoirs and lenses is selected to be different from the refractive index of the surrounding air.

By axially moving or interacting with the containers 4603 and 4604 using piezoelectric motors 4642 and 4643, the membranes 4605 and 4606 are deformed (via pressure from movement of the filler materials 4612 and 4613) resulting in a changed optical behavior of the lenses in the lens assembly. A top corrective lens 4620 is positioned at the bottom of the first container 4603 and a second corrective lens 4629 is positioned at the top of the second container 4604. The corrective lenses 4620 and 4629 are passive components (e.g., their shape does not change) and ensure proper focusing of the light passing through the lens assembly 4600. For example, if the lens assembly provides zoom and/or autofocus functions, then the corrective lenses 4620 and 4629 ensure proper focusing of the received light at the sensor (for clarity, not shown in FIG. 46A or 46B.)

As shown in FIGS. 46A and 46B, the containers are guided on one side with ball-bearings 4640 and 4641 and on the other side by the piezoelectric motors 4642 and 4643. When a voltage is applied to the piezoelectric motors 4642 and 4643, the piezoelectric material (within the piezoelectric motors) deforms or vibrates, resulting in movement of some elements of the motors, and this movement is communicated to the linkages 4645 and 4646 which are moved, and this linkage movement moves the containers generally in a direction indicated by arrows labeled 4624. In this example, the piezoelectric motors 4642 and 4643 are independently controlled (i.e., separate control signals are applied to each to independently control the shaping of each lens).

The deformation or vibration of the piezoelectric material within the piezoelectric motors 4642 or 4643 is controlled such that in one direction, the linkage is sticking on a contact surface of the container and in the other direction, the linkages and containers are sliding on or with respect to each other (i.e., slipping), thereby enabling container movement in a specific direction. This "stick-slip" behavior results in an axial movement of the containers. By changing the shape (or other characteristic) of the electrical signal, the stick-slip motion can be reversed, resulting in a reversed direction of the axial movement of the containers. The various container movements result in various deformations of the membrane (and lens) and thus result in a change of the optical properties of lens. In some examples, ball bearings are used to prevent tilting of the liquid container and to reduce friction force. Alternatively, the piezoelectric motors may directly drive or move the containers without an intermediate linkage. It will also be appreciated that two piezoelectric motors are provided and this provides for the independent control of each resulting in the ability to independently shape the top and bottom lenses (i.e., two degrees of freedom). In another embodiment, a single motor capable of independent motion along two axes may also be used.

Figure 50:
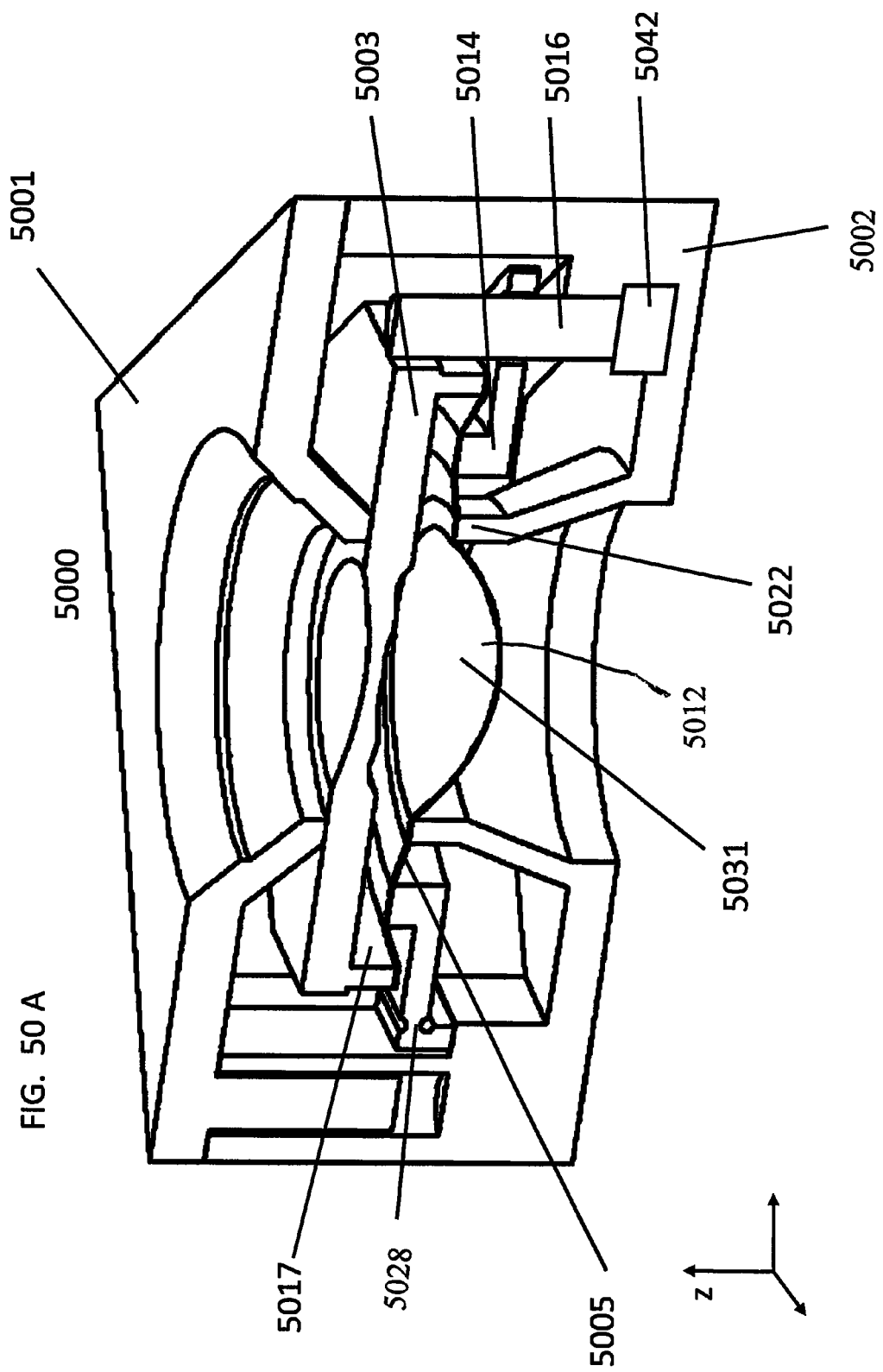
FIGS. 50A-50D comprise perspective cross-sectional and exploded views of a lens assembly according to various embodiments of the present invention.
Figure 50:
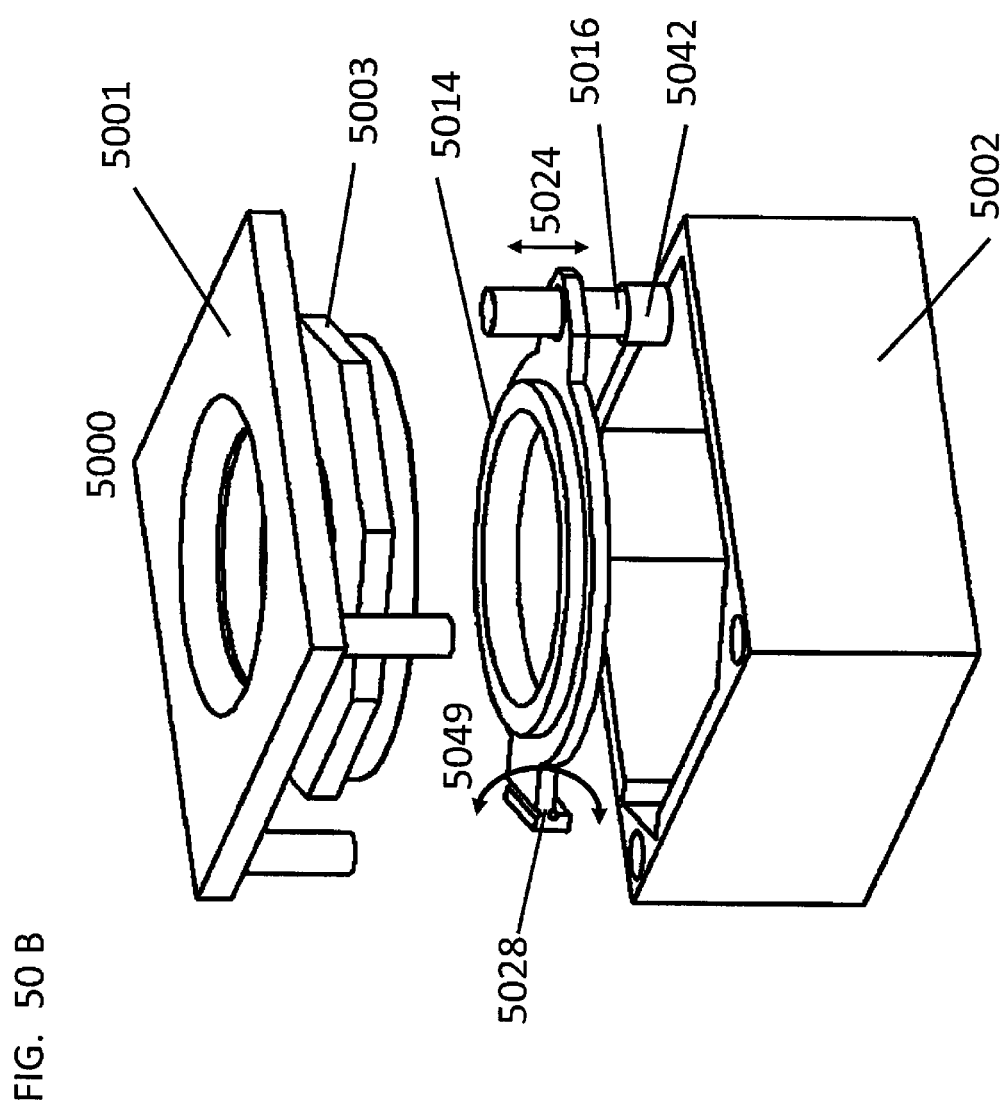
Figure 50:
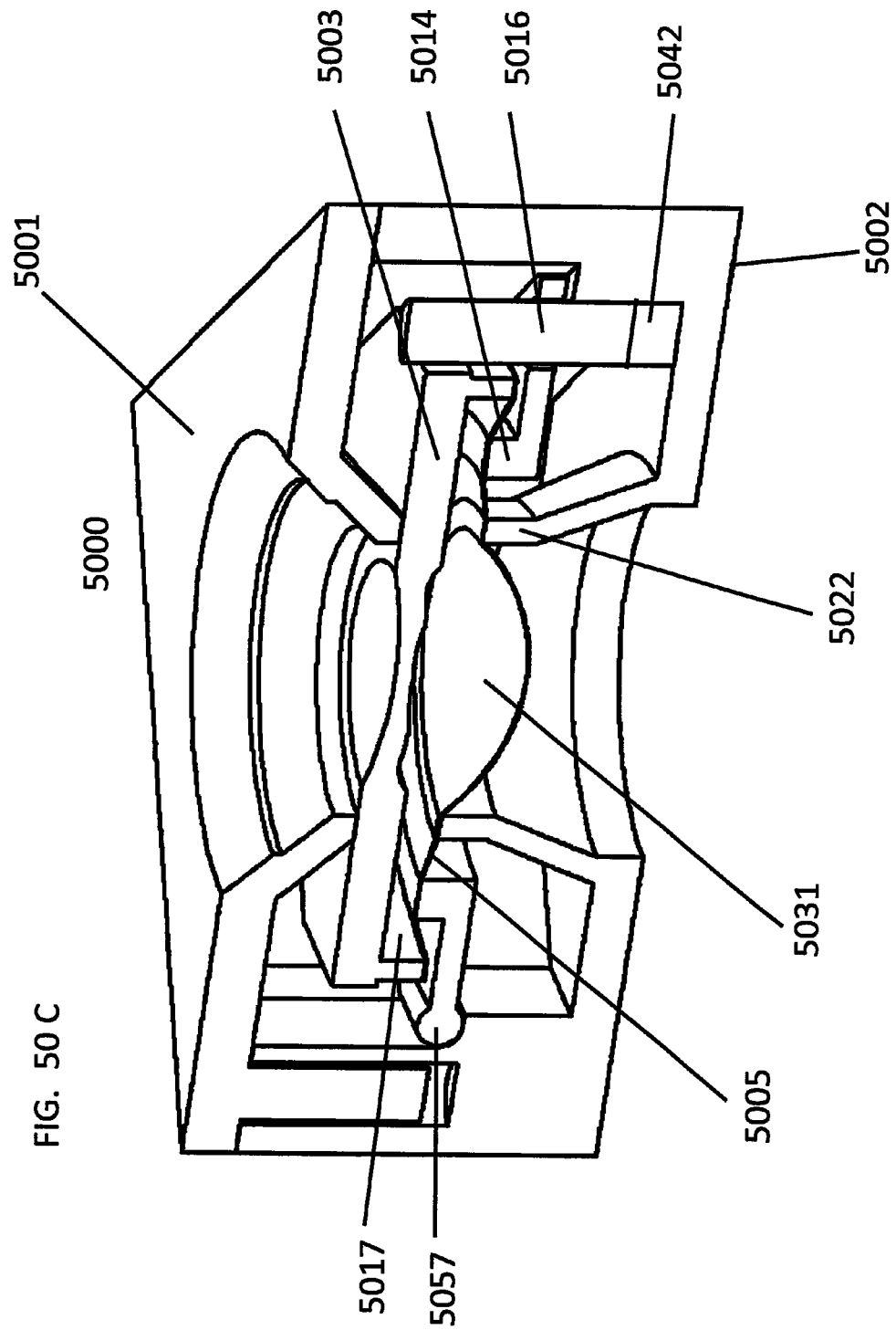
Figure 50:
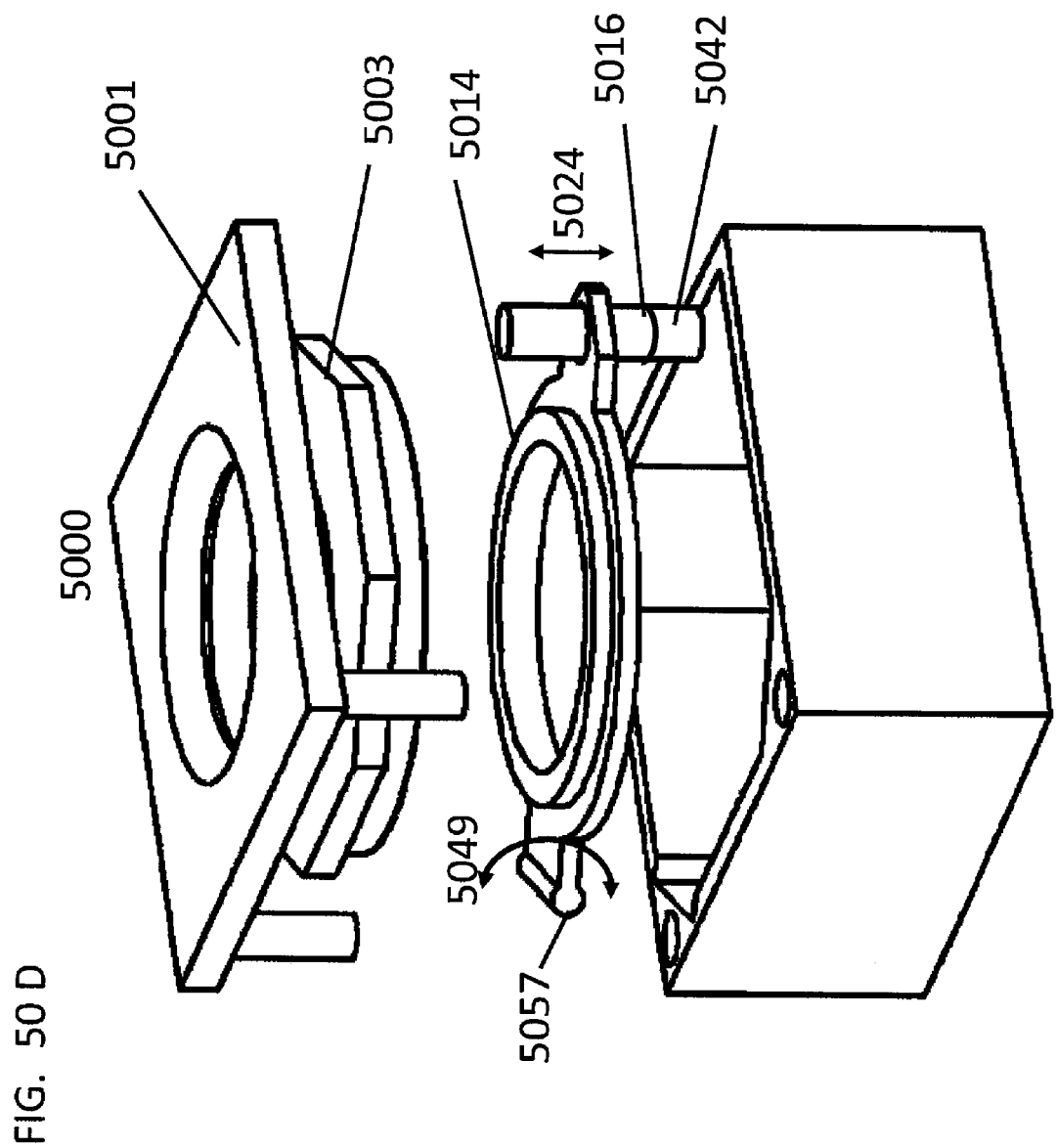
Figure 55:
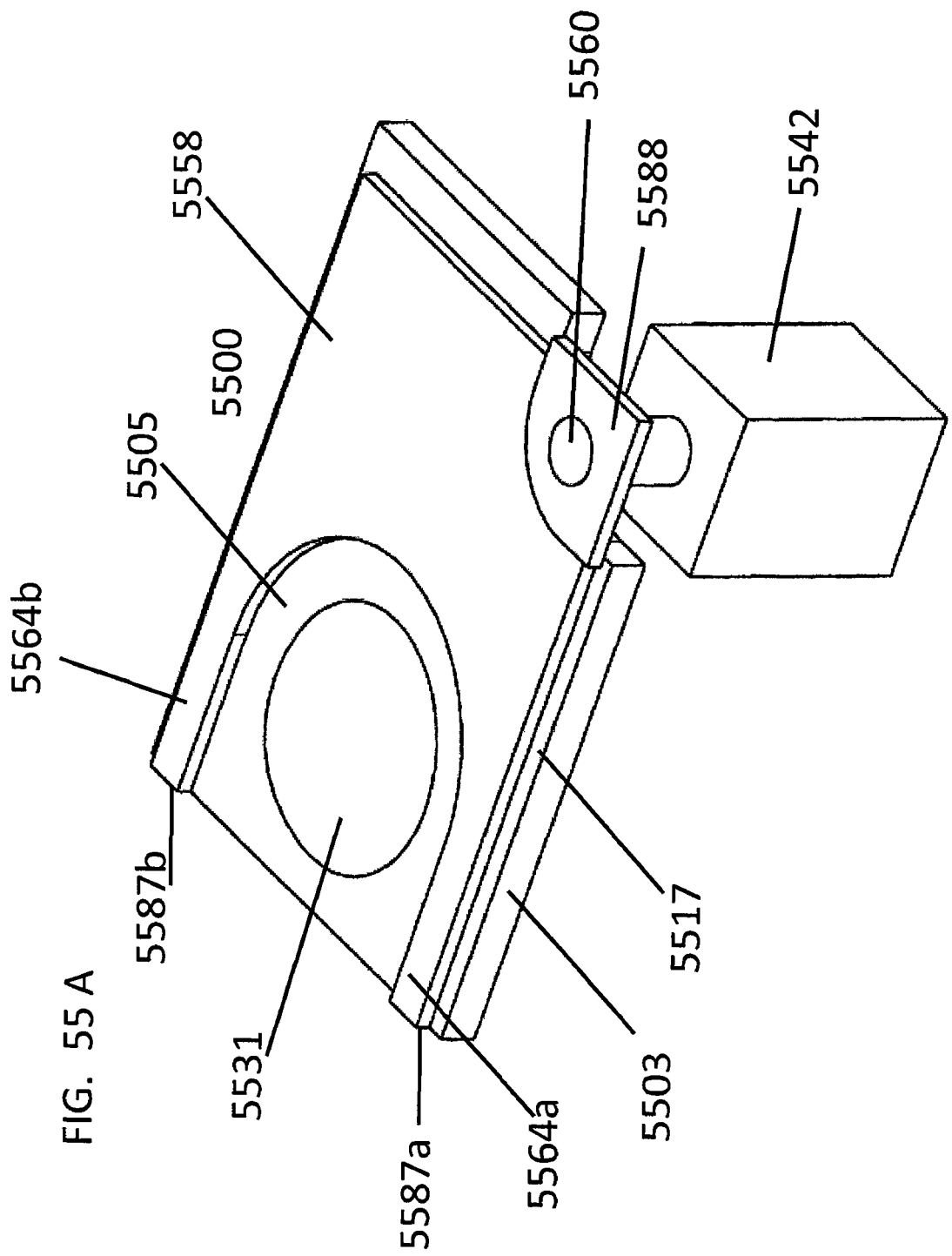
FIGS. 55A-B comprise various perspective diagrams of mechanical linkages according to various embodiments of the present invention FIGS. 56A and 56B comprise diagrams of a lens assembly according to various embodiments of the present invention.
Figure 55:
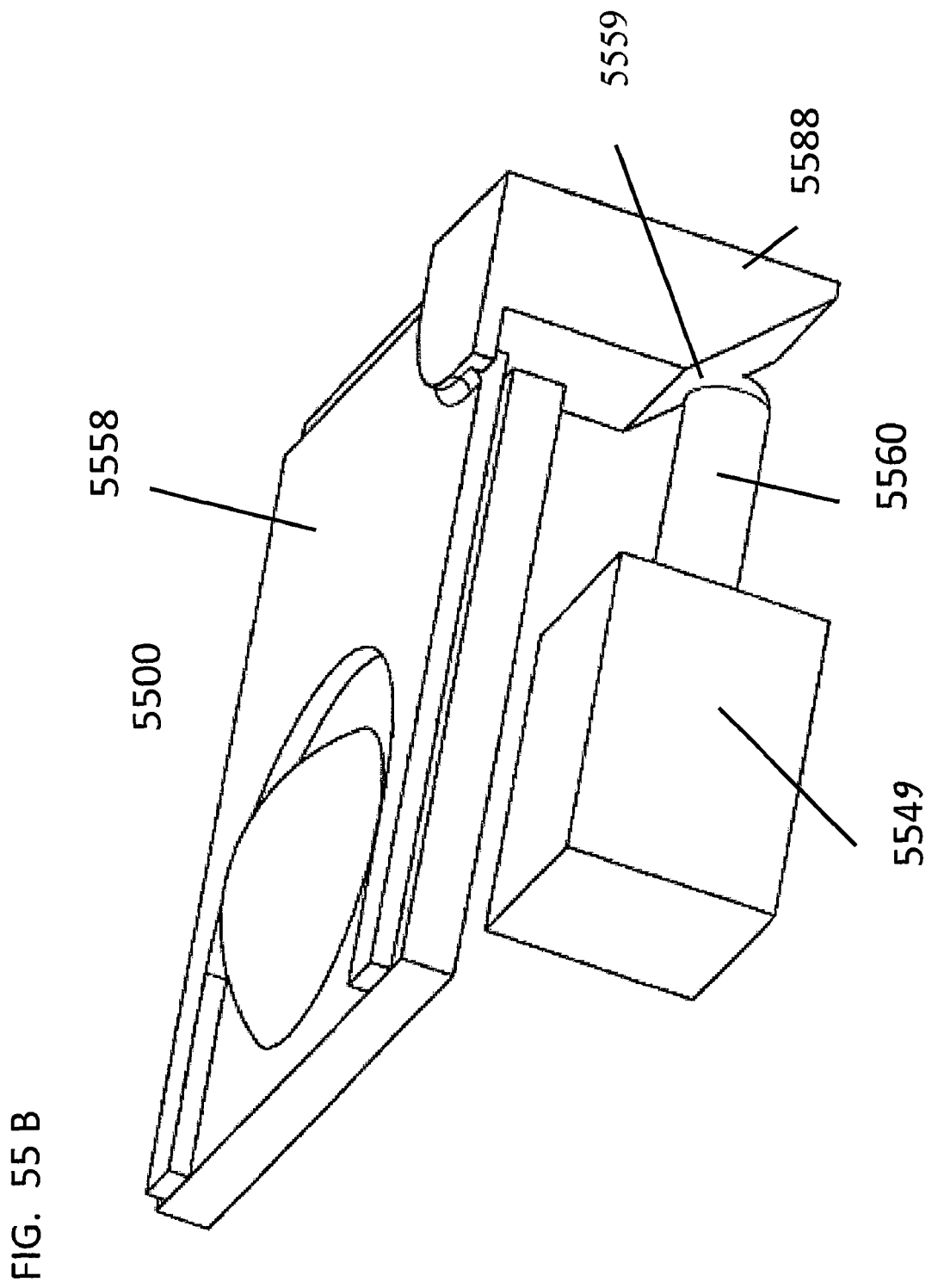

The piezoelectric motors 4642 or 4643 can be shear, stack or rotating piezoelectric motors to name a few examples. For example, the piezoelectric motor in FIGS. 46A and 46B is a shear piezo block that is fixed on the housing 4602 of the lens assembly. Alternatively, the piezoelectric motors 4642 and 4643 may be connected to a metal, plastic or ceramic pin that rotates due to deformation of the piezoelectric material located within these devices (e.g., see the example of FIGS. 50 and 55). This rotation is translated in an axial movement of the containers, which are interconnected to the optical membrane. In general, it is advantageous to position the piezoelectric motors 4642 or 4643 in or at a non-moving part with respect to the housing 4602, such that it is easier to connect the piezoelectric motor 4642 or 4643 with an electrical power supply.

In an embodiment, to allow for efficient functioning of the device, an air exchange between the optical opening in the housing and the section with the motor pushing onto the membrane is required. This can either be achieved through venting holes 4651 or small slits in the housing. Venting holes 4651 are placed so that the air displaced by fluid movement in the lens and the reservoir can equalize with the outside air. Alternatively, the exchange could occur between the air over the reservoir and the air over the lens. If desired, an air spring could be used to slow air movement and the vents could be removed.

The assembly 4600 may be combined with other focus tunable and non-focus tunable lenses, filters and any other combination of optical systems, including mirrors, gratings, prisms, shutters, image stabilizers and apertures. The assembly 4600 can be used with or include other elements as well.

The amount and direction of piezoelectric motor movement may be controlled by any number of devices or approaches. For example, a user may manually press a switch, button, or other control device to control the voltage. In another examples, the applied voltage may be controlled by a program or algorithm (e.g., an autofocus or zoom program or algorithm), which adjusts automatically the voltage applied to the motors.

Referring now to FIGS. 47A-D, another example of a lens assembly 4700 is described. The lens assembly 4700 includes a top housing 4701, a bottom housing 4702, a top lens shaper 4722, a bottom lens shaper 4723, a top and a bottom container 4703 and 4704, four piezoelectric motors 4742, 4743, 4744, and 4753, four electric cushions 4710, 4777, 4778, and 4779, a top ring 4714 and bottom ring 4715, and a top and bottom membrane 4705 and 4706, respectively. The top membrane 4705 and top container 4703 form a top filler volume 4717 and the bottom membrane 4706 and bottom container 4704 form a bottom filler volume 4718. The filler volumes 4717, 4718 include all of the three dimension space between the membrane and containers. Each of the filler volumes 4717 and 4718 are filled with a filler material such as a liquid, ionic liquid, gel, or some other filler material. Vents 4751 allow air to flow in and out of the non-filled regions in the lens assembly 4700. The various elements are constructed according to the approaches described elsewhere herein and this construction will not be repeated here.

A central opening 4730 extends in an axial direction (in the direction of the z-axis) through the assembly 4700. Light rays 4750 project through the central opening 4730 in the lens structure in the axial direction. Once acted on by the tunable lenses and other optical components not shown in the drawing of the lens structure, a sensor 4752 (e.g., a capacitive charged device (CCD)) may receive and sense the image. The sensor 4752 may communicate with other processing elements that further process and/or store the obtained image.

In this example, the rings 4714 and 4715 are attached to the membranes 4705 and 4706, respectively. Attachment may be made by any adhesive or fastener arrangement (e.g., glue). This allows, for example, an operation that requires pushing and pulling on the membrane 4705 and 4706, to thereby shift or tune the lens from a convex shape to a concave shape. To prevent gravitational effects, both sides of the reservoirs 4712 and 4713 may, in an embodiment, be filled with a filler material (e.g., liquids) having similar densities, but with different indices of refraction.

In the example of FIGS. 47A-47D, the optical membrane 4705 is made of flexible material. The inner section of the membranes 4705 and 4706 and the outer section may be made of one membrane material. However, in other examples the outer section of the membrane and the inner section are constructed of different membrane materials. The membrane or the filler material (e.g., an optical fluid) can combine to provide various reflective, refractive, diffractive, and absorptive, or color filtering properties for the system. Other properties may also be provided.

The piezoelectric motors 4742, 4743, 4744, and 4753 are made of any type of bending, shear, stack or rotating, or multi-modal piezoelectric actuator. The electrical cushions 4710, 4777, 4778, and 4779 can be made of conducting and non-conducting polymers (e.g., foam) and may be used to fill out the structure to prevent component movement, allow for assembly tolerances, and/or slippage.

The rings 4714 and 4715 may be made of material(s) contemplated by those of skill in the art. In one example, the rings 4714 and 4715 are constructed from a plastic material. To improve the stick-slip interaction with the piezoelectric motors 4742, 4743, 4744, and 4753, the rings 4714 and 4715 may be made of metal or may incorporate a metal pin that is in direct contact with the piezoelectric motors 4742, 4743, 4744, and 4753. During stick-slip operation, the piezoelectric motor moves the rings 4714 and 4715 via contact with the rings 4714 and 4715. Eventually, contact may be lost (e.g., as the piezoelectric motor rotates or a portion thereof rotates off or away from the ring 4714 or 4715) and the piezoelectric motor 4742, 4743, 4744, and 4753 and the ring slide against each other (i.e., slipping occurs). For example, the piezoelectric motors 4742, 4743, 4744, and 4753 may have or drive a rotating cylindrical portion that at one time contacts the ring 4714 or 4715 and through friction with the ring sticks or adheres to (due to friction) the ring. During this time, the ring 4714 or 4715 is moved. At other times, the friction is not strong enough to engage/move the ring 4714 or 4715 and the ring and cylindrical element of the piezoelectric motor 4742 or 4743 slide against/relative to each other. In this way, the rings 4714 or 4715 are moved by the piezoelectric motors 4742, 4743, 4744, and 4753. It will be appreciated however, that other actuating approaches and techniques besides the stick-slip approach can be used to move the rings 4714 or 4715.

By using stick-slip or other approaches to move mechanical parts, the piezoelectric motor is moving the lens rings 4714 or 4715 in axial direction either upward or downward generally in directions indicated by the arrow labeled 4724. The rings 4714 and 4715 push or pull onto or into the membrane, resulting in a deformation of the membranes 4705 and 4706, respectively. This deformation results in movement of the filler material and, a change in the shape of the lens, and consequently a change of the optical properties of the lens. One advantage of this approach is that the fixed position of the lens shapers act to reduce tolerance requirements on the movement. To further reduce the lateral dimension of the lens assembly it is also possible to use the ring, which is pushing onto the membrane as a lens defining ring as described elsewhere herein. Such an approach may save space for the lens shaper.

The inner portions of the reservoirs (i.e. the volume defined by the inner perimeter of the lens shapers projected toward the base of their respective containers) define lenses 4731 and 4735 and the three-dimensional shape of the lenses 4731 and 4735 can be varied. For example, spherical lenses (e.g., convex and concave), aspherical lenses (e.g., convex and concave), cylindrical lenses (e.g., defined by a square lens shaper instead of round), flat lenses, and any micro lenses (e.g., a micro lens array or a diffraction grating), and nano lens structures (e.g. including antireflection coating), which can be integrated or attached to the optically active section of the lens can be created. Other examples of lens shapes can be created. Inhomogeneous material thickness, hardness or prestretching of the membranes may also be used to alter the optical properties of the lens.

The assembly 4700 may be combined with other focus tunable and non-focus tunable lenses, filters and any other combination of optical systems, including mirrors, gratings, prisms, and apertures. The assembly 4700 can be used with other elements as well.

Figure 47A:
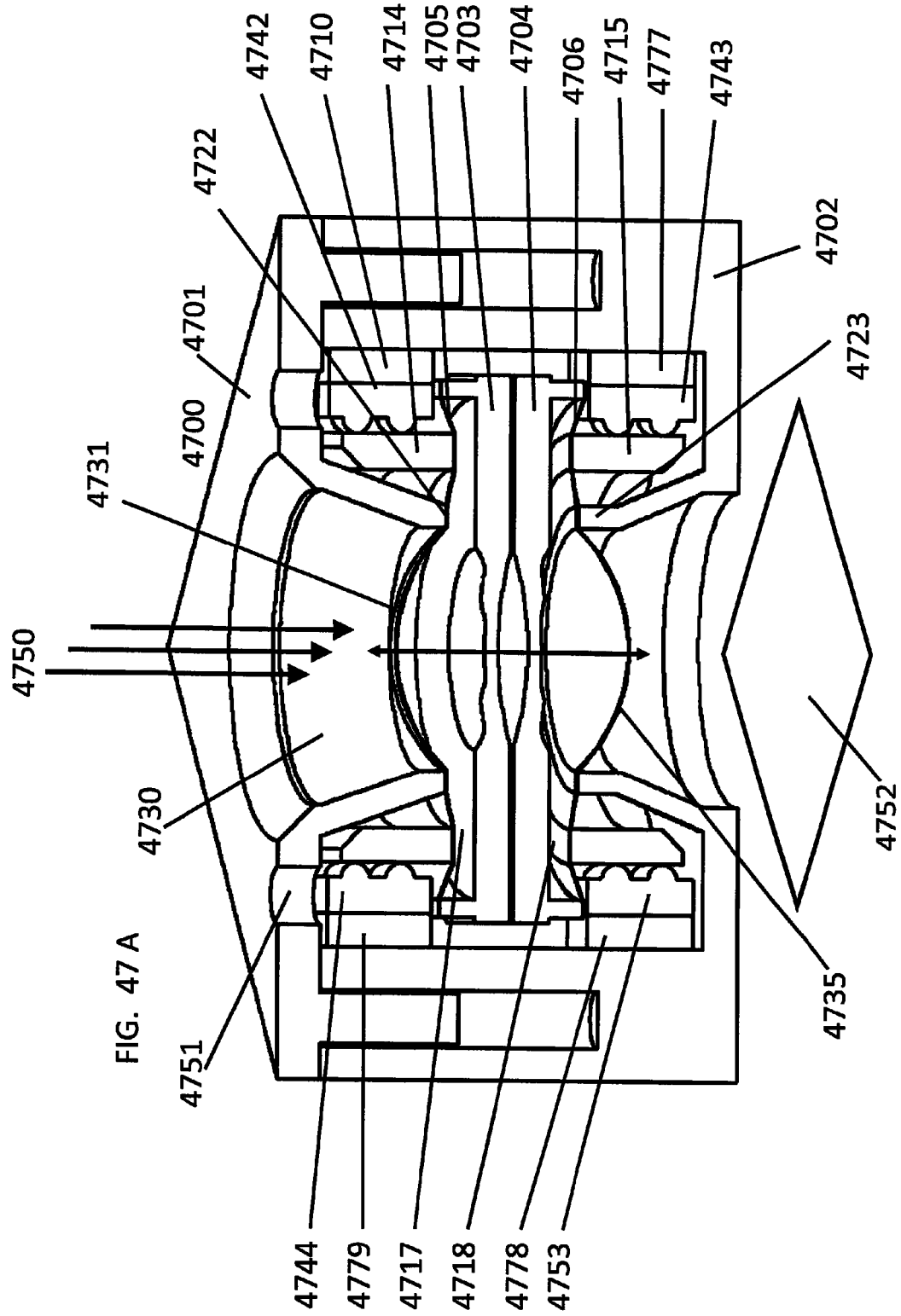
FIGS. 47A-47D comprise perspective cross-sectional and exploded views of a lens assembly according to various embodiments of the present invention in which a plurality of one or more motors are positioned to deform a plurality of membranes.
Figure 47:
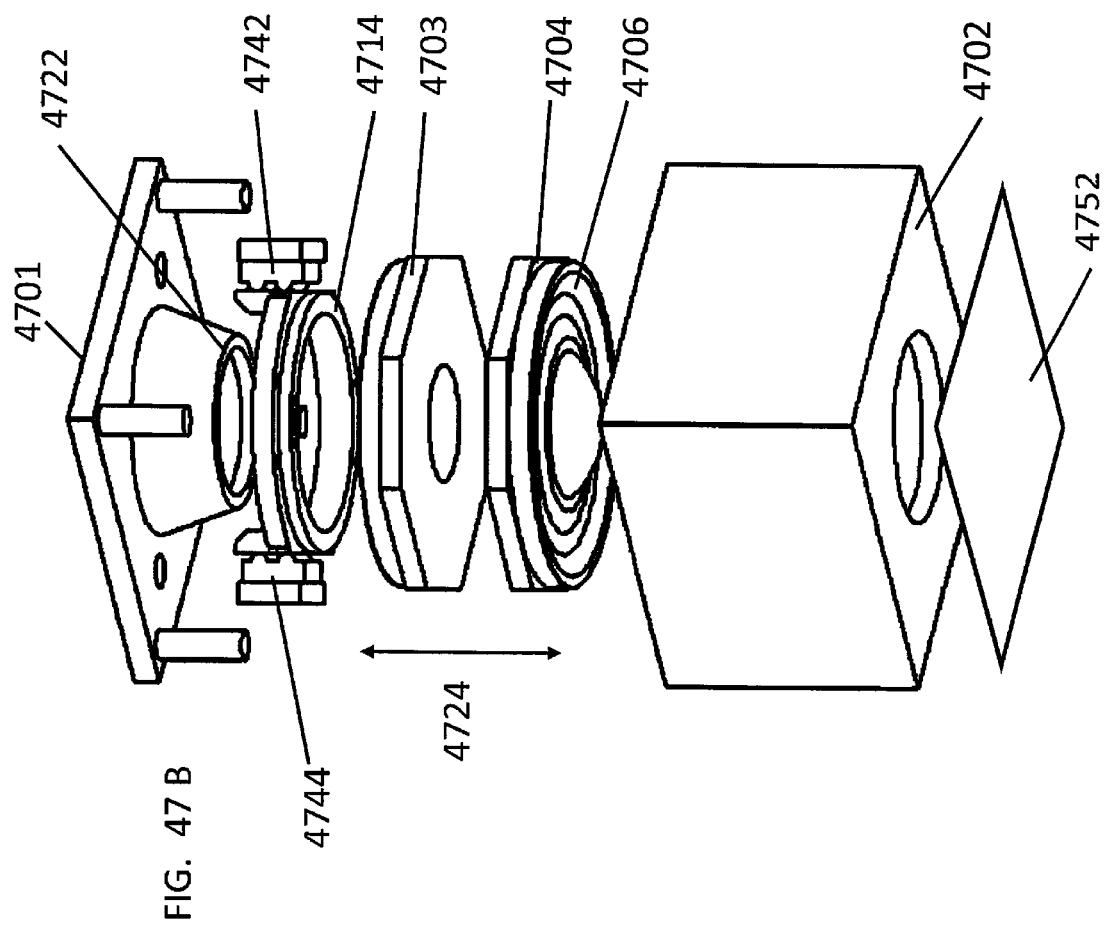
Figure 47:
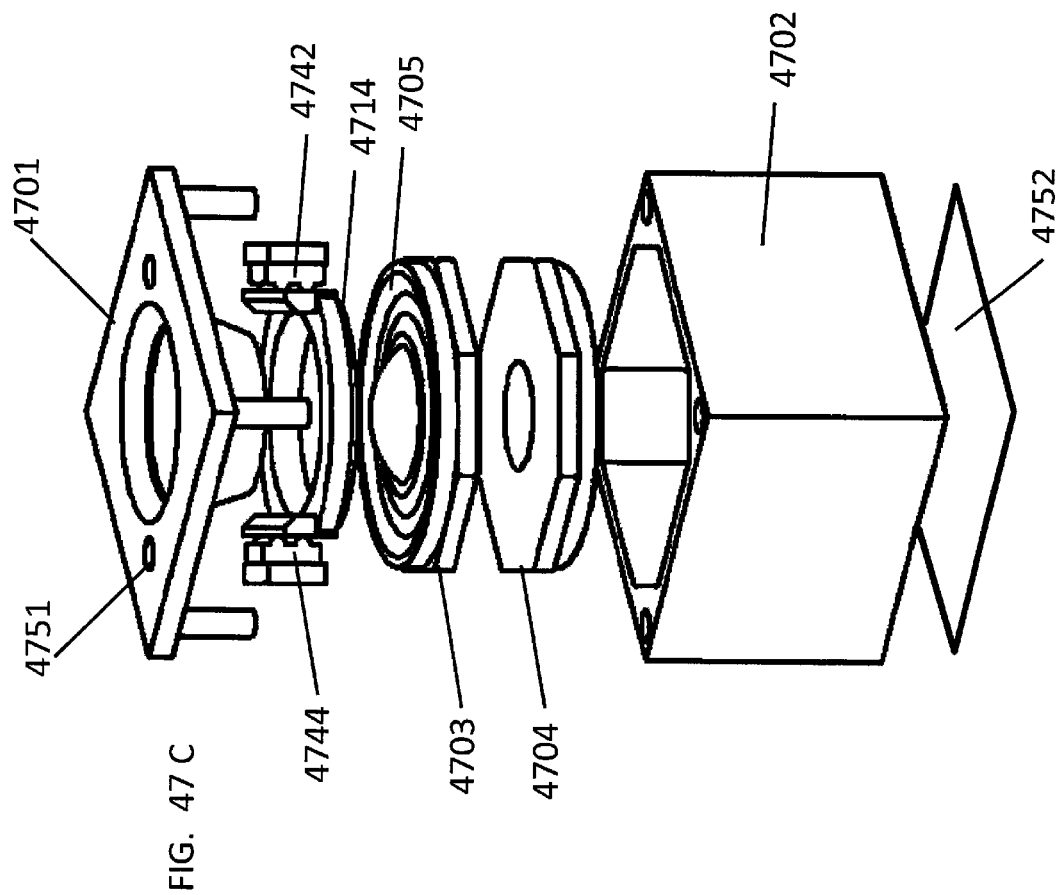
Figure 47:
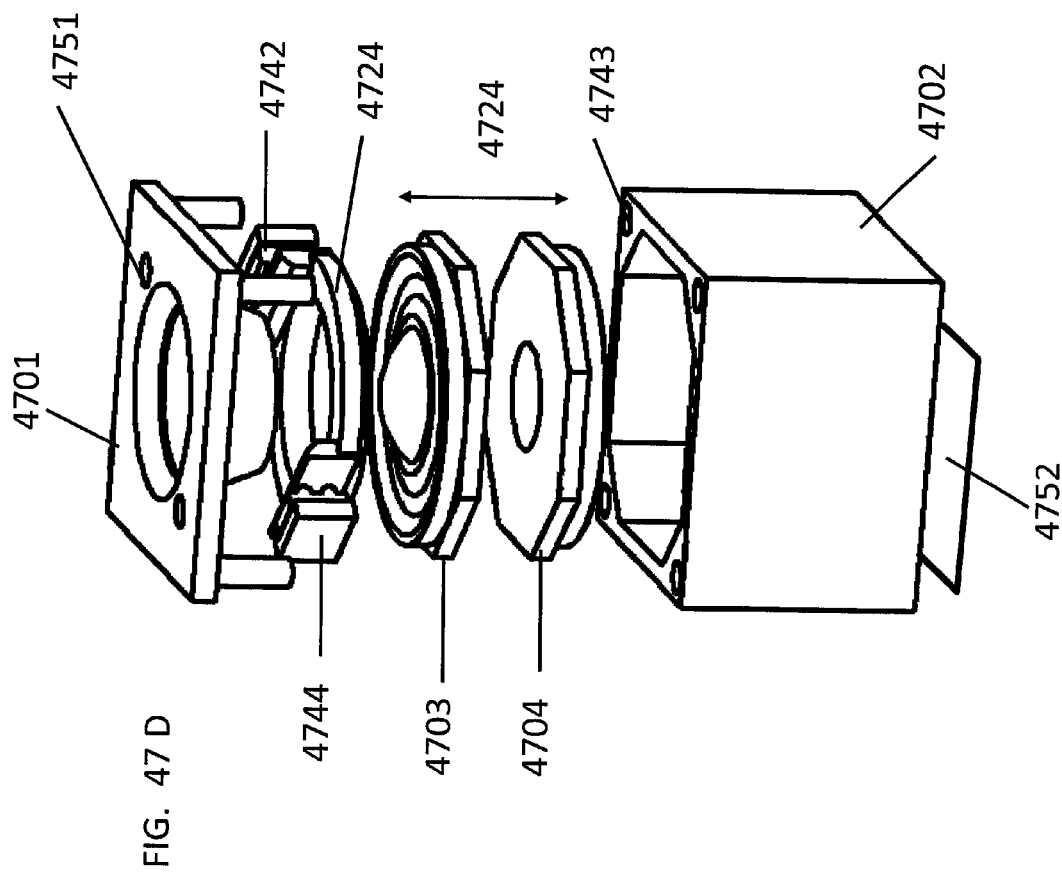

In one example of the operation of the system of FIGS. 47A-4D, application of a driving signal voltage to the piezoelectric motors 4742, 4743, 4744, and 4753 results in a movement of the rings 4714 and 4715 (e.g., upward or downward, depending on the shape, timing, frequency and/or other characteristic of the applied electrical signal). The shape and other characteristics of the electrical control signal may be controlled and provided to the motor by any number of devices or approaches. For example, a user may manually press a switch, button, or other control device or interface to control the voltage. In another example, voltage may be controlled by a program or algorithm (e.g., an autofocus or zoom program or algorithm).

Figure 53:
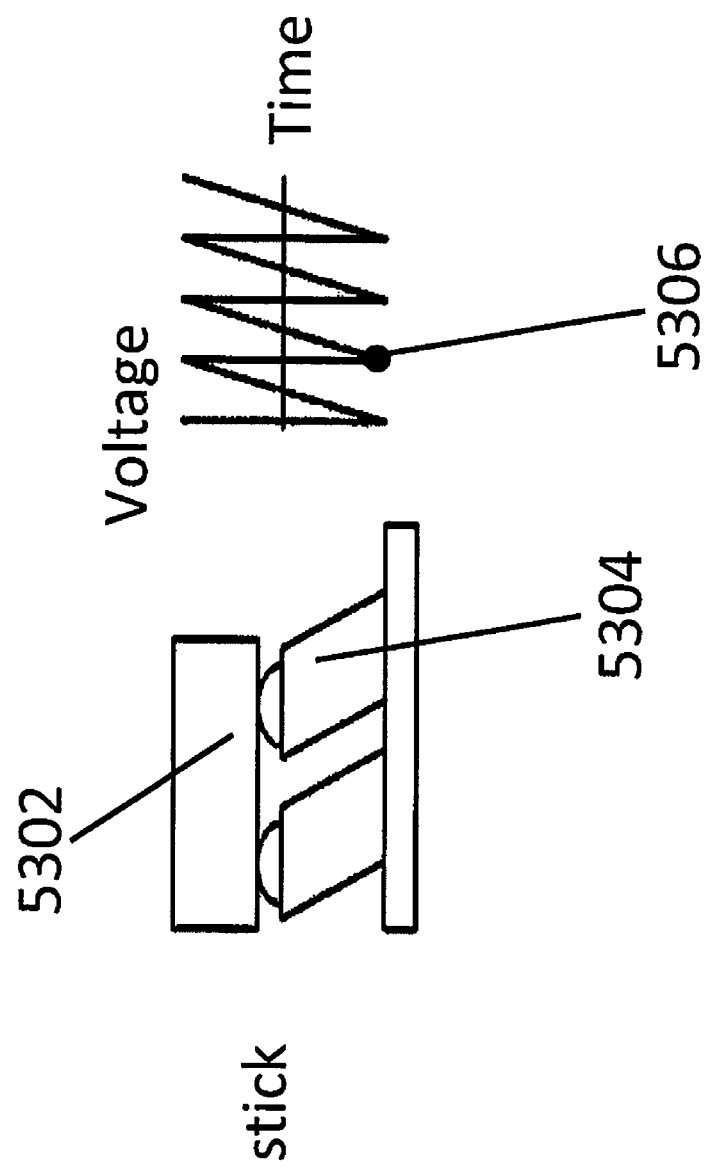
FIGS. 53A-53D is one example of a voltage waveform applied to a piezoelectric motor according to various embodiments of the present invention.
Figure 53:
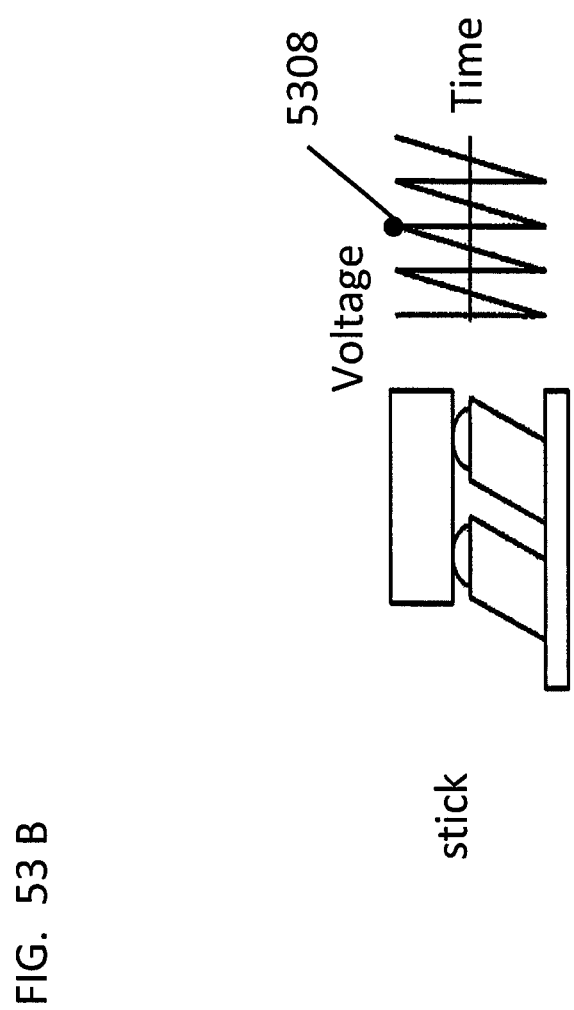
Figure 53:
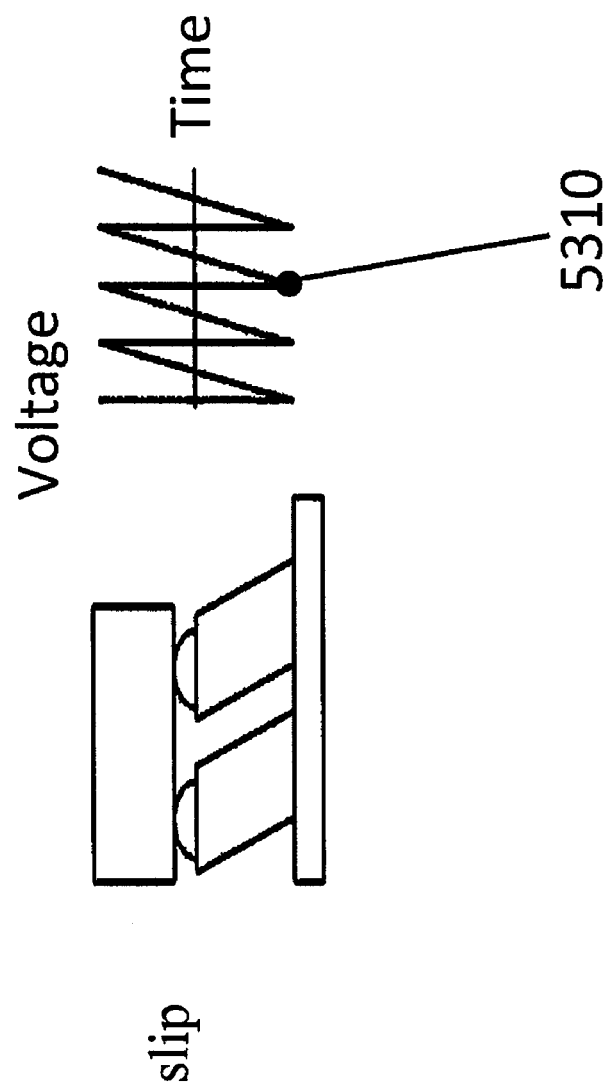
Figure 53:
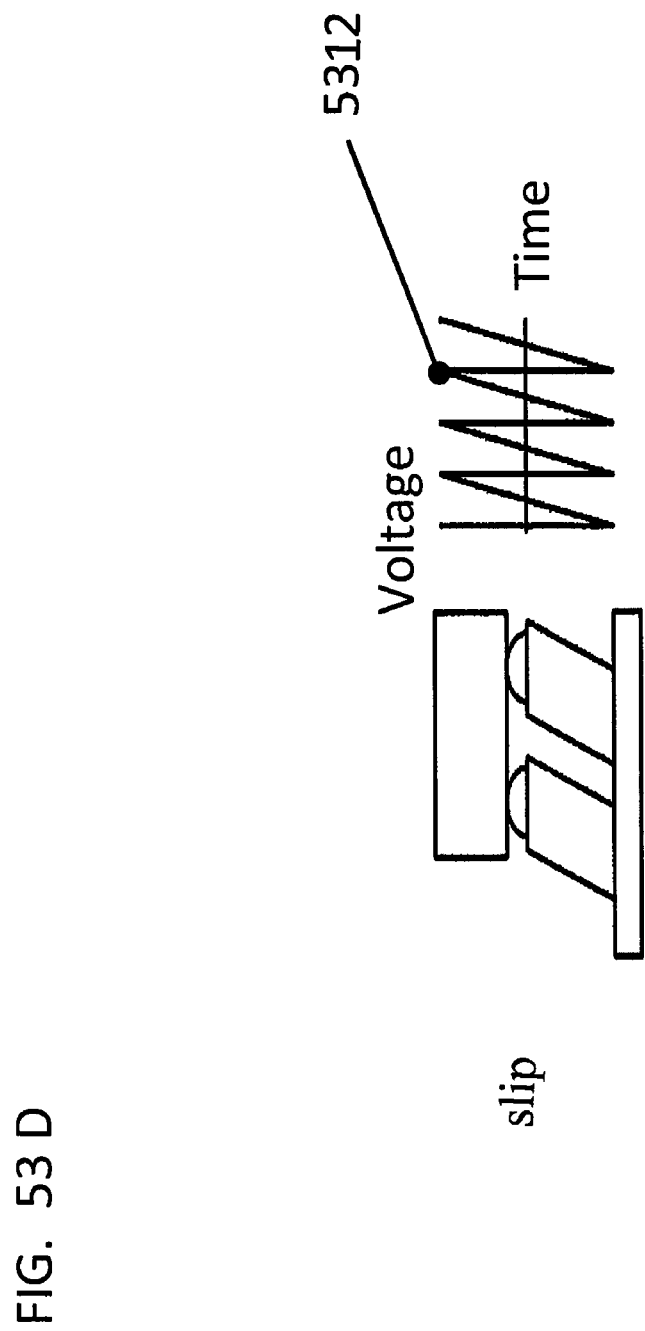

Referring now to FIGS. 53A-D, the waveform applied to the stick-slip motor may be a sawtooth waveform. As shown in FIG. 53A, the linkage element 5302 may be pushed by the motor leg 5304 during the slow-rising portion of the waveform (as it is applied to the motor at point 5306) and sticks when the waveform drops. At point 5308, sticking is still occurring (See FIG. 53B), but slipping occurs at point 5310 (see FIG. 53C). Sticking occurs at point 5312 (see FIG. 53D). Applied waveforms may be high frequency waveforms (e.g., 320 kHz) and different resonant frequency modes of the piezoelectric motor are actuated to accomplish movement in a preferred direction.

Figure 48:
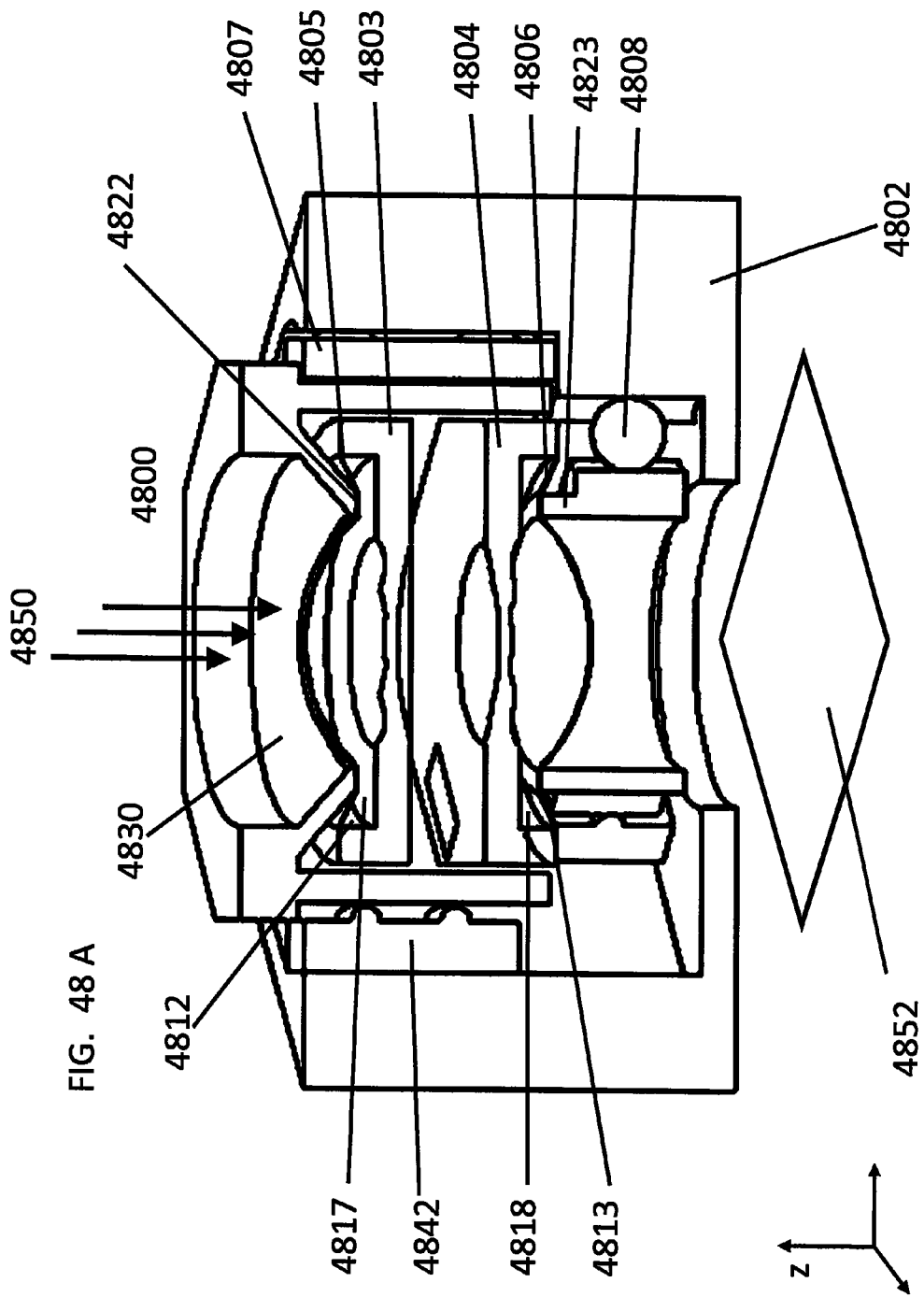
FIGS. 48A-48C comprise perspective cross-sectional and exploded views of a lens assembly having tiltable lens according to various embodiments of the present invention.
Figure 48:
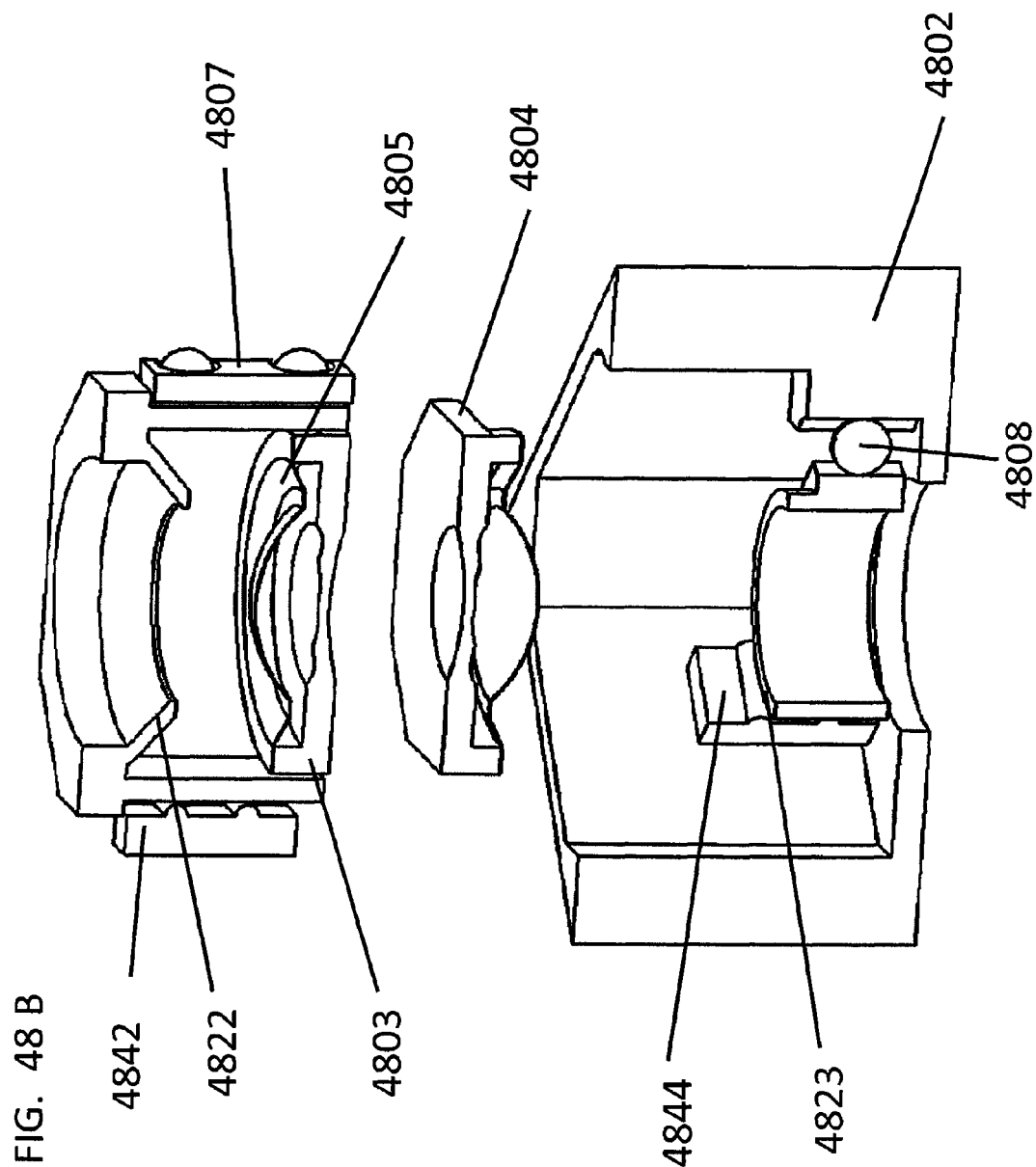
Figure 48:
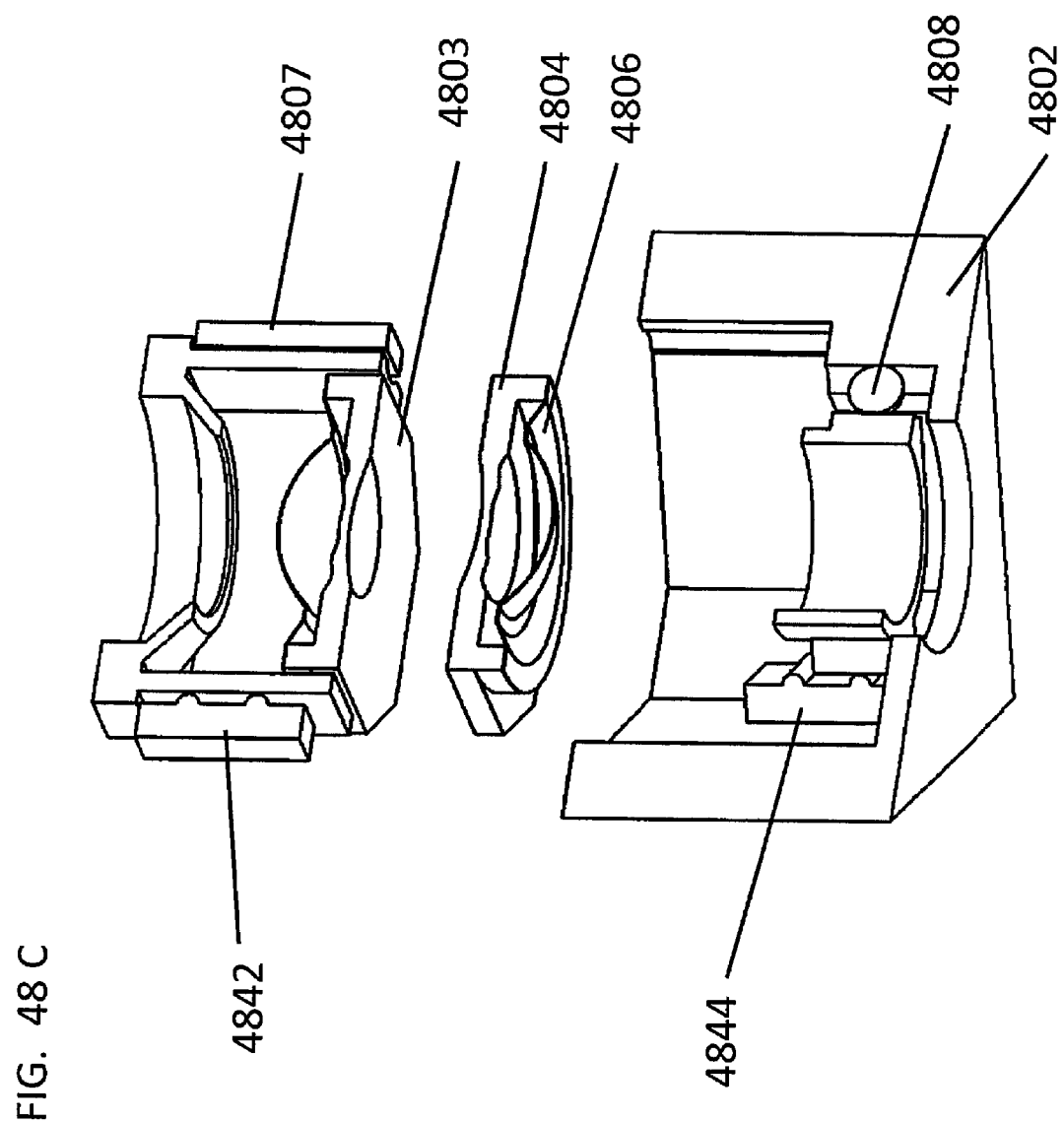

Referring now to FIGS. 48A-C, still another example of a lens assembly 4800 is described. The lens assembly 4800 includes a housing 4802, a top and bottom lens shaper 4822 and 4823, respectively, a top and a bottom container 4803 and 4804, respectively, a piezoelectric motor 4842 and a ball bearing with balls 4808 and fixtures 4807, a top membrane 4805 and a bottom membrane 4806. A top filler volume 4817 is formed between the top container 4803 (e.g., a glass plate) and the first membrane 4805. A bottom filler volume 4818 is formed between the bottom liquid container 4804 and the second membrane 4806 and is filled with a filler material. A central opening 4830 extends in an axial direction (in the direction of the z-axis) through the assembly 4800. Light rays 4850 are representative of an image move through the central opening 4830 in the lens structure in the axial direction. Once acted on by the components of the lens structure, a sensor 4852 (e.g., a capacitive charged device (CCD)) receives and senses the image conveyed by the light rays 4850.

In this example, three piezoelectric motors are used. More specifically, the top lens shaper is moved by a first piezoelectric motor 4842. The bottom lens shaper is moved by second piezo motor (not shown) and a third piezoelectric motor 4844 and guided by a ball bearing 4808. The second and third piezoelectric motors 4844 can be controlled individually (and also separately from the first piezoelectric motor 4842), resulting in the ability to not only axially move the lens shaper, but also tilt the lens shaper. This technique can be used to achieve image stabilization and also to compensate for assembly tolerances.

The inner section of the membrane and the outer section may be made of one type of membrane material. However, in other examples the outer section of the membrane and the inner section are constructed of different membrane materials. The membranes 4805 and 4806, the reservoirs 4812 and 4813, and the top and bottom containers 4803 and 4804 can provide various reflective, refractive, diffractive, and absorptive, or color filtering functions for the overall system. Other examples of functions may be provided by the membranes/reservoirs.

The shape of the lens can be varied to produce various types of lenses. For example, spherical lenses (e.g., convex and concave), aspherical lenses (e.g., convex and concave), cylindrical lenses (e.g., defined by a square housing instead of round), flat lenses, micro lenses (e.g. micro lens array, diffraction grating), and nano lens structures (e.g. including antireflection coatings) that can be integrated or attached to the optically active section of the lens can be created. Other examples of lens structures are possible. Inhomogeneous material thickness or hardness for the membranes 4805 and 4806 may also be used to alter the optical properties of the lens.

The assembly 4800 may be stacked in any combination with the above-described focus tunable lens, such as, for example, with other focus tunable and non-focus tunable lenses, filters and any other combination of optical systems, including mirrors, gratings, prisms, shutters, image stabilizers, and apertures. The assembly 4800 may be configured with other elements as well.

In one example of the operation of the system of FIGS. 48A-C, an electric signal can be applied to one or all of the piezoelectric motors. The electrical signal provided may be controlled by any number of devices or approaches. For example, a user may manually press a switch, button, or other actuator to control the applied voltage. In another example, voltage may be controlled by a program or algorithm (e.g., an autofocus program), which adjusts automatically the voltage supplied to the piezoelectric motor. The direct interaction of the piezoelectric motor with the lens shaper results in an axial movement of the lens shaper 4822 or 4823 along the z-axis. Movement of the lens shapers 4822 and 4823 displaces the filler material (e.g., optical fluid) in the filler volumes, thereby altering the overall lens shape and the optical properties of the lens.

As mentioned, the membranes as described herein can be produced by using various methods and manufacturing techniques. For example, the membranes can be formed using knife coating, calendaring, water-casting, injection molding, nano-imprinting, sputtering, hot embossing, casting, spin-coating, spraying, curtain coating, and/or chemical self-assembly techniques. Other examples are possible.

The membranes can also be constructed from various materials. For example, the membranes can be constructed from gels (for example, Optical Gel OG-1001 by Litway); polymers (e.g., PDMS Sylgard 186 by Dow Corning, or Neukasil RTV 25); acrylic materials (e.g. VHB 4910 by the 3M Company); polyurethane; and/or elastomers to name a few examples. In many of these examples, the membranes are constructed from a material through which air (but not liquids or gels) can pass. Other examples are also possible.

Additionally, in some examples, the membranes are pre-stretched. This technique may provide an improved optical quality and faster response in movement or deformation of the membrane. For example, the membrane may be mounted in a prestretched manner under elastic tension. The membrane may be stretched in stages such that the elastic tension of the inner area of the membrane is less than the tension in the outer area of the membrane. In other embodiments, pre-stretching is not used.

Figure 49:
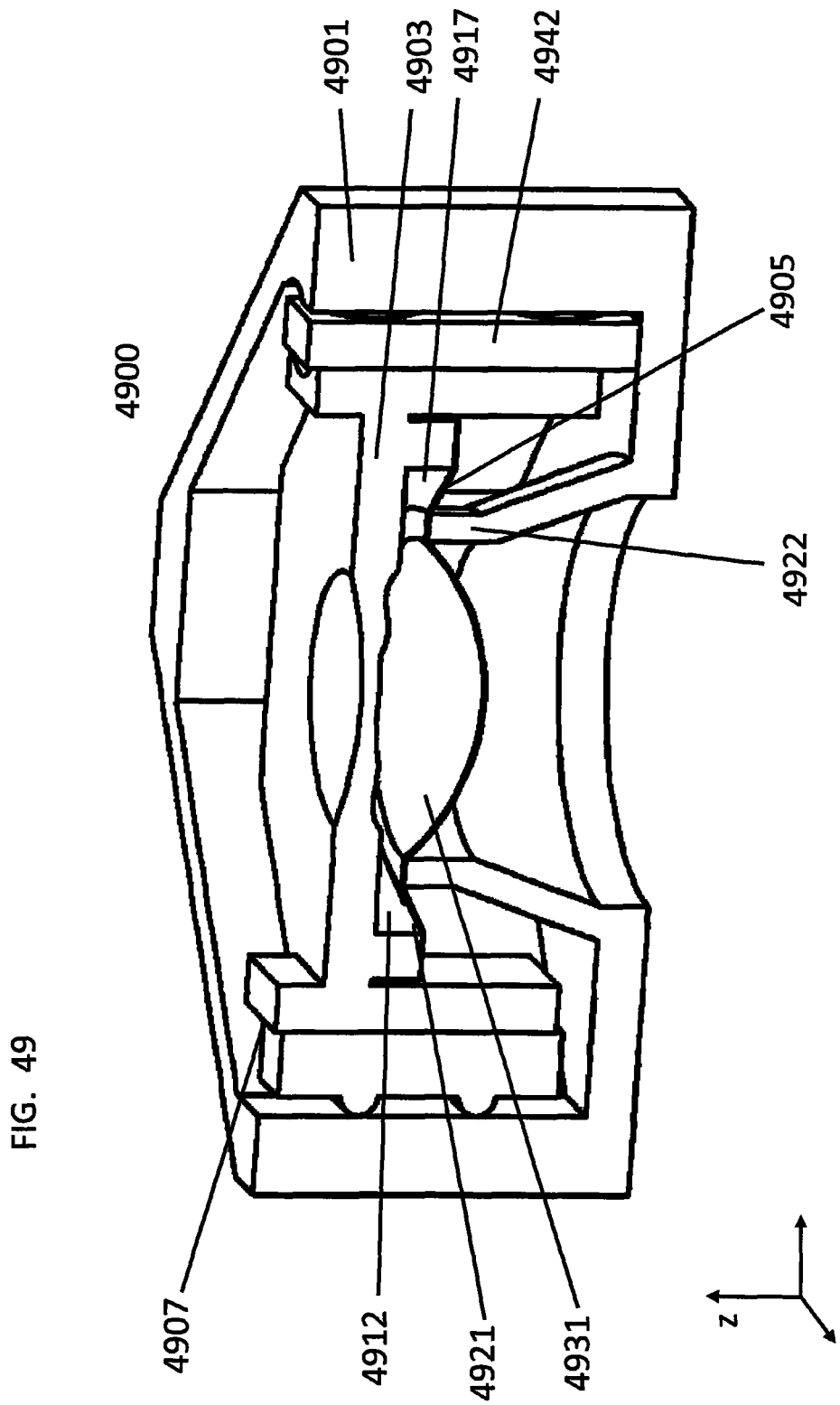
FIG. 49 comprises a perspective cross-sectional view of a lens assembly according to various embodiments of the present invention.

Referring now to FIG. 49, another example of a lens assembly 4900 is described. A housing 4901 encloses a container 4903 and a portion of the housing 4901 also functions as a lens shaper 4922. A piezoelectric motor 4942 is coupled to the container 4903. A membrane 4905 holds filler material 4912 in a filler volume 4917 between the membrane 4905 and the container 4903. The filler volume 4917 has an inner section or lens portion 4931 and an outer section or reservoir portion 4921. Ball bearings 4907 are used to reduce frictional forces and prevent the tilting between the housing 4901 and the container 4903. The detailed construction and placement of the above-mentioned elements have been described elsewhere herein and will not be repeated here.

The piezoelectric motor 4942 is coupled to the container 4903. The coupling may be by glue or any other suitable fastener mechanism or fastening approach. The housing 4901 has an integrated lens shaper 4922 and the housing 4901 is moved by the piezoelectric motor (e.g., with a stick-slip motion) between the piezoelectric motor 4942 and the housing. The movement of the housing 4901 results in movement of the filler material 4912 within the filler volume 4917 and the deformation of the membrane 4905. Consequently, the optical properties of the inner section 4931 changes.

Referring now to FIGS. 50A-B, another example of a lens assembly 5000 is described. The assembly 5000 includes housings 5001, 5002 that enclose a lens shaper 5022, a container 5003, a membrane 5005, filler material 5012, a filler volume 5017 (formed between the membrane 5005 and the container 5003), a ring 5014, and a piezoelectric motor 5042. The construction and placement of these elements have been described previously and will not be described again here. In this example, the piezoelectric motor 5024 and pin 5016 act as a screw-drive motor. The piezoelectric motor 5042 is coupled by a pin 5016 and engaged in a hole in ring 5014. Rotation of the pin 5016 pushes or pulls the ring 5014 at the area of engagement in the direction indicated by the arrow 5024. The ring 5014 is coupled to/is incorporated with a flexible hinge 5028 that allows bending of the ring along the hinge 5028.

In this example and as compared to some other examples described herein, the use of ball bearings is eliminated thereby reducing the part count. The membrane 5005 is deformed by moving the ring 5014 on one side (with an upward and downward movement indicated generally by an arrow labeled 5024) using the piezoelectric motor 5042. On the opposite side, the ring 5014 is attached to the housing 5002. As mentioned, the ring includes a flexible hinge 5028 that allows bending to occur. When the ring is moved by the piezoelectric motor, it is tilted (with respect to the z-axis) and pushes and pulls the outer section of the membrane 5005 and this, in turn deforms the outer section of the filler volume 5017 and changes the shape of the inner section or lens portion 5031 of the filler volume 5017. Movement may be accomplished along the arrows labeled 5049 and 5024.

The tilting of the ring 5014 does not affect the optical qualities of the lens portion 5031, because the lens portion shaper 5022 defines the deformable lens 5031. Instead of utilizing the hinge 5028, the apparatus of FIGS. 50A-B may also allow the fixed side of the tilting ring to rotate about a point as shown in FIGS. 50C-D. Referring now specifically to FIGS. 50C-D, The ring 5014 may be fixed at point 5057 and as pin 5014 moves upward and downward in the direction indicated by the arrow labeled 5024, the ring rotates in the direction indicated by the arrow labeled 5049.

The piezoelectric motor 5042 turns a pin 5016 and the pin is engaged to a hole in the ring 5014. The turning of the pin 5016 caused by a stick-slip or multi-modal vibration in the piezoelectric motor 5042 pushes or pulls the ring 5014 in an upward or downward direction generally as indicated by the arrow indicated by the label 5024. Alternatively, the pin 5016 and the piezoelectric motor 5042 may be a single element and connected directly to the ring 5014. It will be appreciated that the examples of FIG. 50A-D are particularly advantageous for focusing lenses that require less tuning than zoom lenses.

Figure 51:
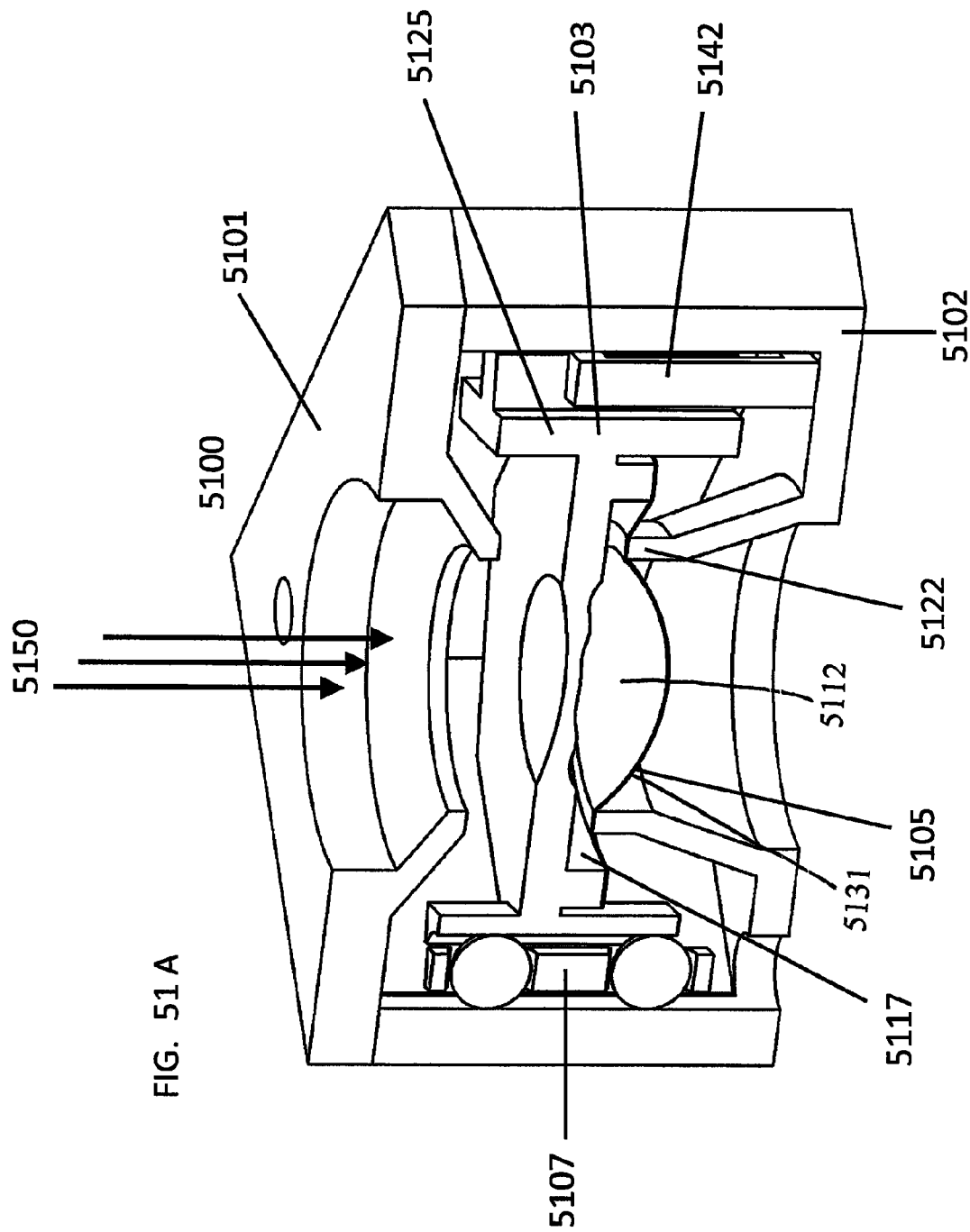
FIGS. 51A-51B comprise perspective cross-sectional and exploded views of a lens assembly according to various embodiments of the present invention.
Figure 51B:
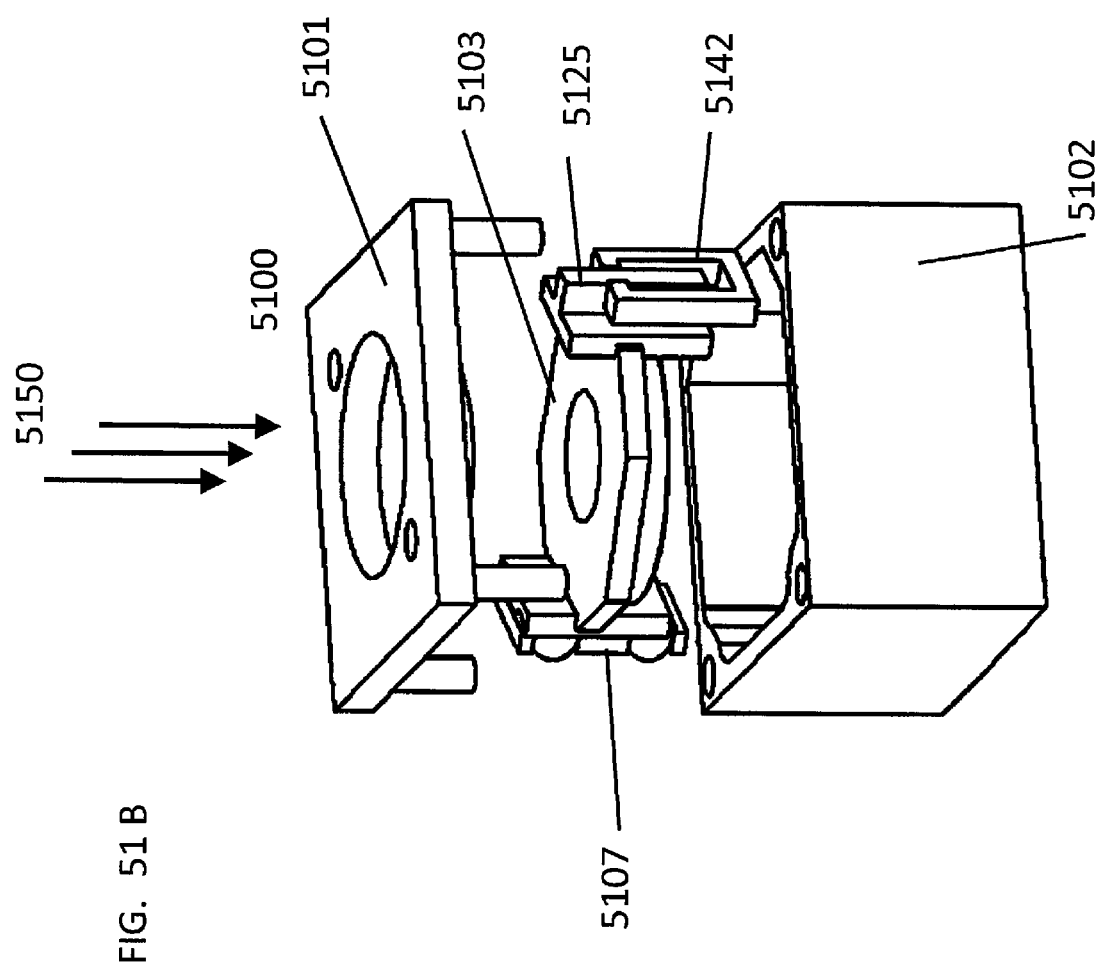

Referring now to FIGS. 51A-B, another example of a lens assembly 5100 is described. The assembly 5100 includes housings 5101, 5102 that enclose a lens shaper 5122, a container 5103, a membrane 5105, filler material 5112, a filler volume 5117 (formed between the membrane 5105 and the container 5103), ball bearings 5107 and a piezoelectric motor

5142. These elements have been described previously (e.g., with respect to FIGS. 45 and 46) and will not be described again here.

In this example, the shape of the piezoelectric motor 5142 is configured so as to grip or clamp the container 5103 (e.g., in a U-shape). More specifically, an extension member 5125 of the container 5103 is clamped by the piezoelectric motor 5142. When actuated, the piezoelectric motor 5142 moves the extension member 5125 (and hence the entire container 5103) upward and downward (e.g., according to stick-slip motion). As described, this motion of the extension member 5125 impacts the filler volume 5117 to move the membrane 5105 and alter the shape of the inner section or lens portion 5131. This, in turn, changes the optical properties of the lens portion 5131 (the portion that optically acts on light rays 5150 passing through the lens assembly 5100).

Figure 52:
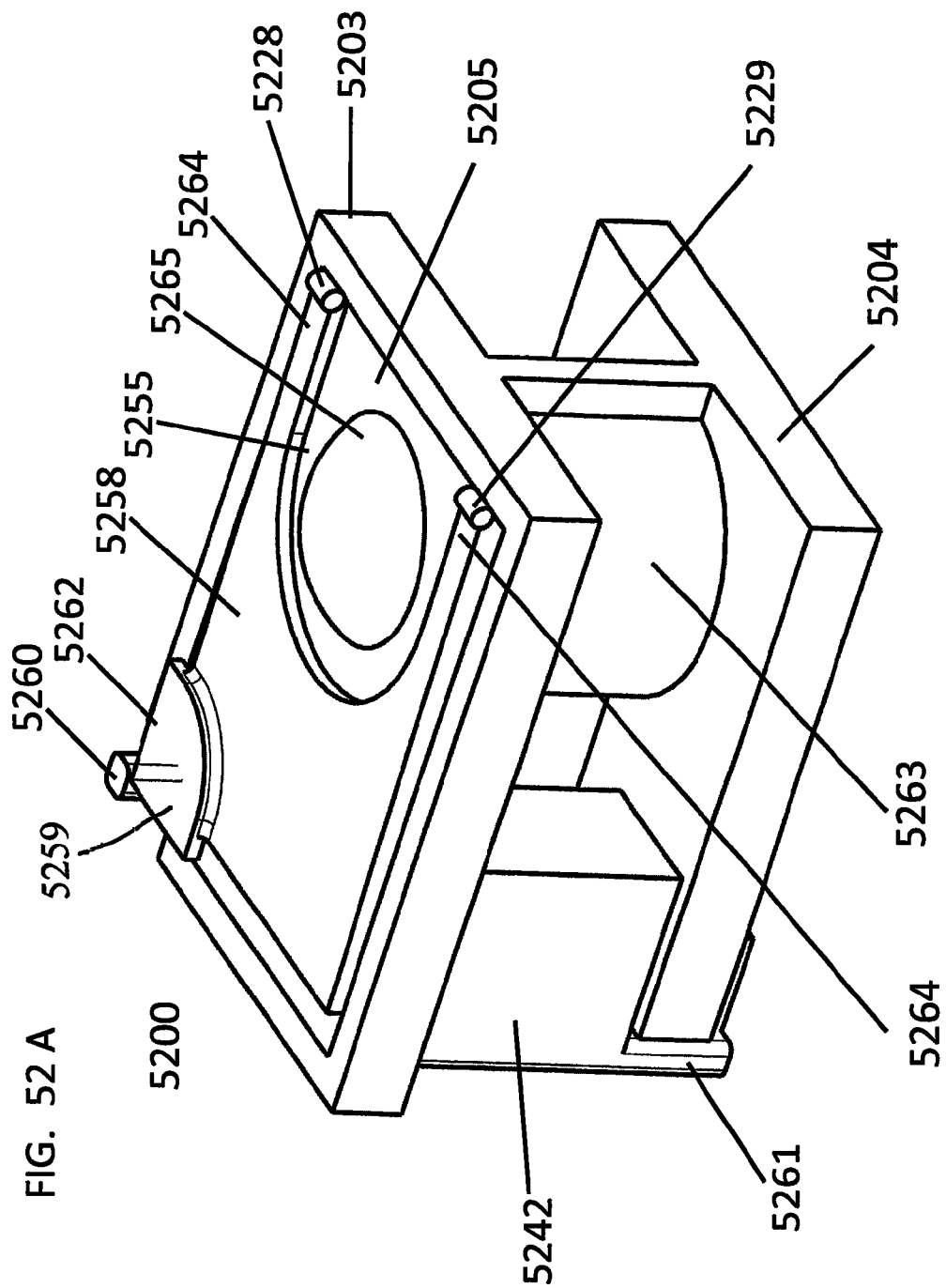
FIGS. 52A-52C comprise perspective and cross-sectional views of a lens assembly according to various embodiments of the present invention in which various types of linkage structures are used to effectuate lens movement.
Figure 52:
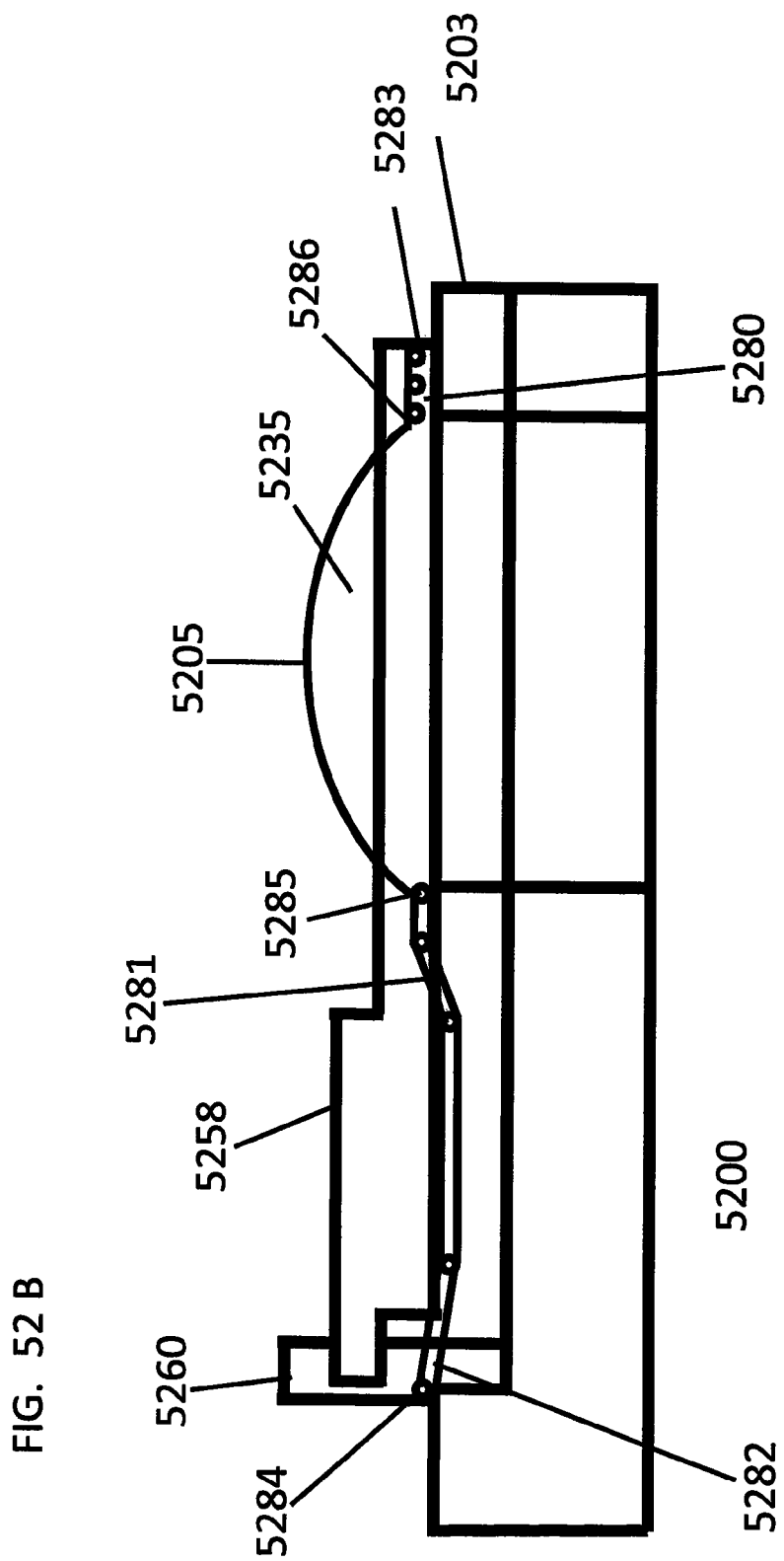
Figure 52:
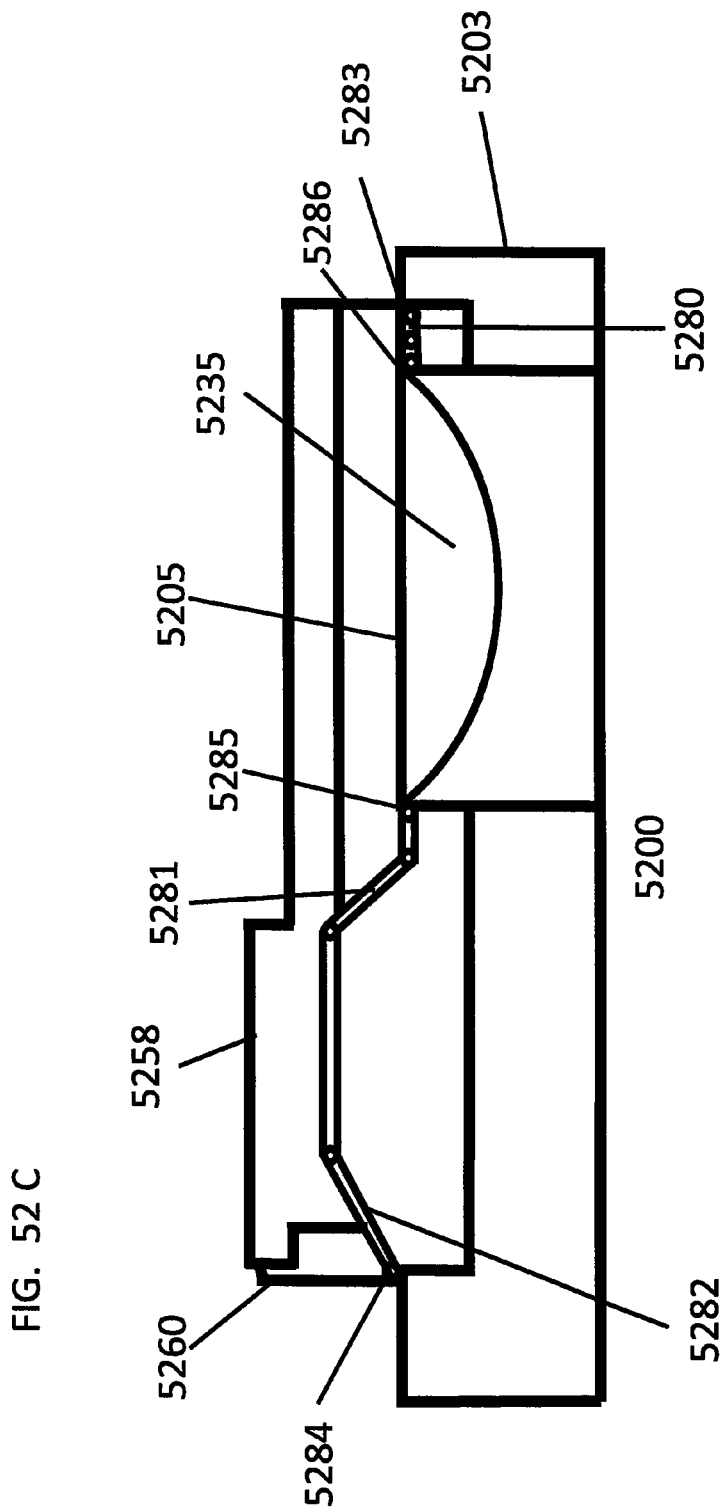

Referring now to FIG. 52A, one example of an asymmetrically designed lens module 5200 (e.g., such as that used with a camera) is described. A first connector linkage 5259 (and a step element 5262) and a second connector linkage 5261 connect a paddle 5258 to a piezoelectric motor 5242. Linkages 5259 and 5261 can be part of the paddle 5258, the piezoelectric motor 5242, or independent parts. The linkages 5259 and 5261 function to transmit force from the piezoelectric motor 5242 to the paddle 5258. The step element 5262 is inserted into or coupled to the paddle 5258 so that the connection can be made without contacting the outer portion 5255 of a membrane 5205 or the container 5203. A membrane 5255 is disposed between the paddle 5258 and top container 5203. The container 5203 may be a plastic part or a glass plate to name two examples of container configuration. A bottom container 5204 is also disposed within the assembly 5200. It will be appreciated that a second membrane/paddle arrangement including the bottom container may also be used but is for simplicity not shown in FIG. 52A. A corrective lens barrel housing 5263 houses the above-mentioned elements. In this configuration, it is shown as integral portion of the top container 5203 and the bottom container 5204. The lens barrel housing 5263 also includes fixturing for corrective optical elements and corrective optical elements (not shown). In one example, the aperture is molded as an integral part of the lens barrel but this is not required.

The paddle 5258 is mechanically interconnected or coupled to both the motor and the fluid. In one example, the paddle 5258 is flat and may include stiffening ribs. The shape and size of the paddle 5258 can be optimized to communicate forces (e.g., push) on the filler material efficiently. In this example, the paddle includes legs 5264. The legs 5264 allow paddle-to-filler interaction to be low when the movement of the paddle is slow and allow the paddle-to-filler interaction is high when the movement is faster.

The membrane 5205 is divided by a lens shaper (not shown) into an inner section 5265 and an outer section 5255. The edge of the inner section of the membrane which contacts the lens shaper constrains the membrane by defining the outer shape of the lens. Hinges 5228 and 5229 are coupled to the paddle 5258 and the top container 5203. In this example, the hinges are disposed at a discrete point at the end of the legs 5264. The hinges 5228 and 5229 could be made from a variety of different materials such as glue, membrane material, and may be disposed at a pocket in the container 5203. The hinges 5228 and 5229 could be made from the legs 5264 and extend upward into the leg 5264 by making the leg 5264 flexible. The hinges 5228 and 5229 could be part of the container 5203.

Referring now to FIG. 52B, the apparatus of FIG. 52A is shown with the apparatus pushing the lens outward and increasing its curvature. More particularly, the piezoelectric motor pushes on a linkage 5259 that is mechanically connected to the paddle 5258, which pushes into the container 5203 and pushes fluid into the lens 5235 changing its shape. The membrane 5205 containing the filler stretches at points labeled as 5280, 5281 and 5282. The membrane 5205 is held in place at the outer edge at the points labeled as 5283 and 5284.

The membrane 5205 is held in place at the points labeled as 5285 and 5286 and these are also the locations that define the outer edge of the lens shape. As shown, the membrane 5205 is disposed between the paddle 5258 and the container 5203. This positioning is advantageous during manufacturing since it allows for ease of construction of the assembly 5200.

In another example, the paddle 5258 pushes directly on the container 5203.

Referring now to FIG. 52C, the apparatus of FIGS. 52A and 52B is shown pushing the lens inward producing a lens shape that is concave in shape instead of convex in shape. It will be appreciated that bi-directional movement of the filler material within the reservoir formed between the membrane 5205 and the container 5203 may be employed but is not required. For instance, depending on the amount of initial filling of the reservoir, the lens could change curvature rather than allow for movement. It is shown here in this example as changing from a convex shape to a concave shape.

The motor pushes on a linkage 5259 that is mechanically connected to the paddle 5258 pushes into a container 5203 and pushes filler (e.g., optical fluid) into the lens 5235 changing its shape. The membrane 5205 containing the fluid stretches at 5280, 5281, and 5282. The membrane 5205 is held in place at the outer edge at points labeled as 5283 and 5284. The membrane 5205 is held in place at the points labeled as 5285 and 5286 and this is also the location that defines the outer edge of the lens shape.

Referring now to FIGS. 54A-D, another example of a mechanical linkage for moving the liquid containers axially with respect to the lens shapers is described. It will be appreciated that some elements of the lens assembly already discussed herein are omitted from FIGS. 54A-D for clarity. In this example, an electrical-to-mechanical actuation device 5467 capable of independently and simultaneously deforming in two dimensions is disposed on one wall of the lens assembly housing (not shown for clarity.) For example, this actuation device may comprise an electroactive polymer which deforms in the horizontal direction when a voltage is applied across a set of electrodes 5468 and in the vertical direction when a voltage is applied across a second set of electrodes 5469.

The actuation device 5467 is affixed to a bottom ring 5415 at drive point 5470. A mechanical linkage 5471 having an articulated member 5472, a rigid member 5473, and a pivot 5474 couples vertical motion of the actuator 5467 at the drive point 5470 to vertical movement of the bottom ring 5415 and horizontal actuation to vertical movement of the top ring 5414. Articulation in the linkage 5471 and guide brackets 5475 and 5476 are used so as to not over constrain the mechanical system and bind all intended motion.

The articulated member 5472 is coupled to the bottom ring 5415 via a guide bracket 5476 affixed to the bottom ring 5415. The rigid member 5473 is similarly connected to the top ring 5414 via a top guide bracket 5475 affixed to the top ring 5414.

Upon actuation in the vertical direction, the bottom ring 5415 is moved in a vertical direction. The articulated member 5472 is free to move horizontally within the bottom guide bracket 5476 so as to couple this motion into the rigid member 5473. Upon actuation in the horizontal direction, the articulated member 5472 slides freely through the bottom guide bracket 5476 and rotates the rigid member 5473 about the pivot 5474, thus causing a vertical motion of the rigid member 5473 at the top guide bracket 5475. The top guide bracket 5475 permits the rigid member 5473 to rotate freely. The vertical motion of the rigid member 5473 at the top guide bracket 5475 is coupled to the top ring 5414.

Figure 54:
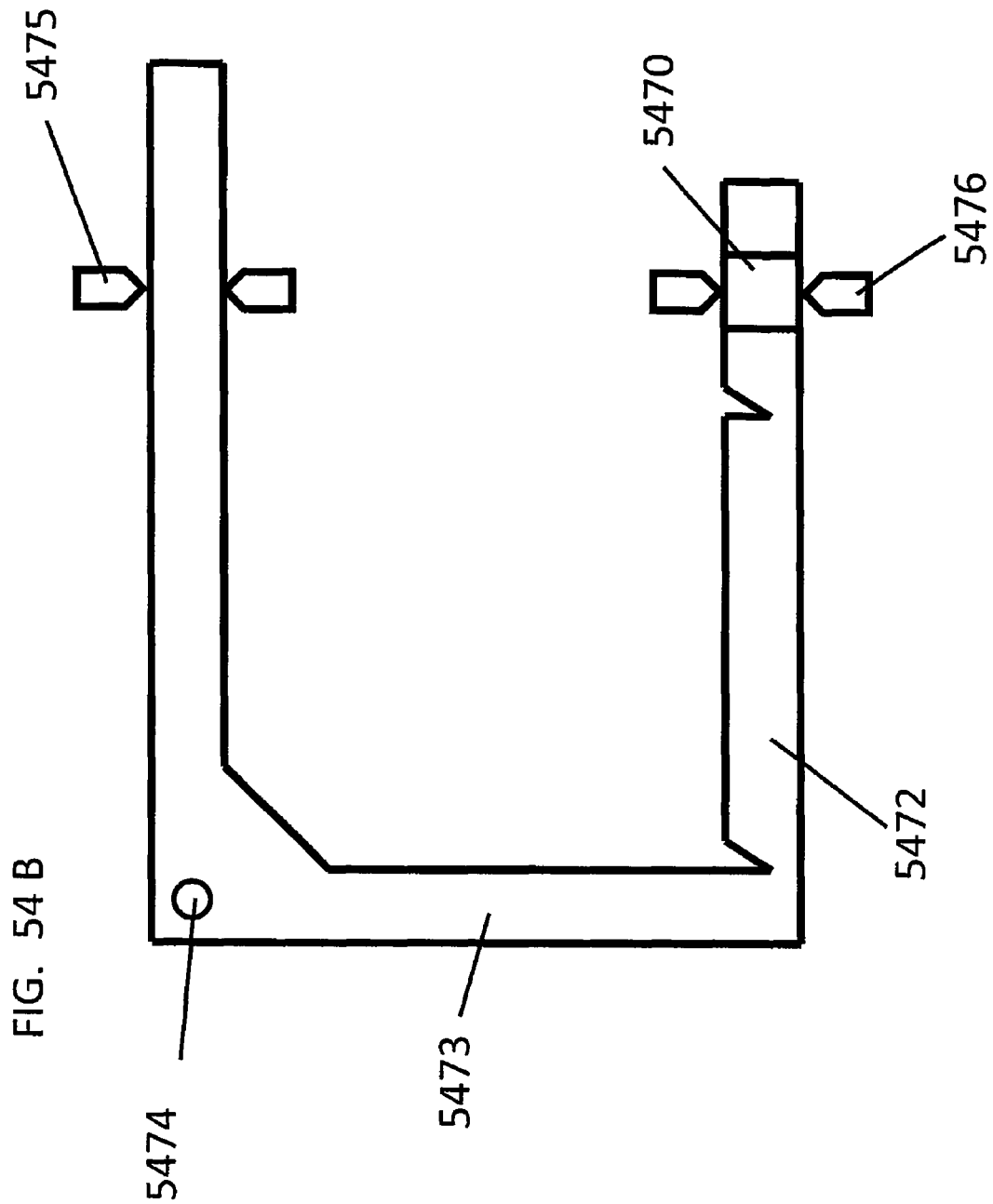
FIGS. 54A-D comprise various diagrams of a mechanical linkage structure and operation and movement of the linkage structure according to various embodiments of the present invention.
Figure 54:
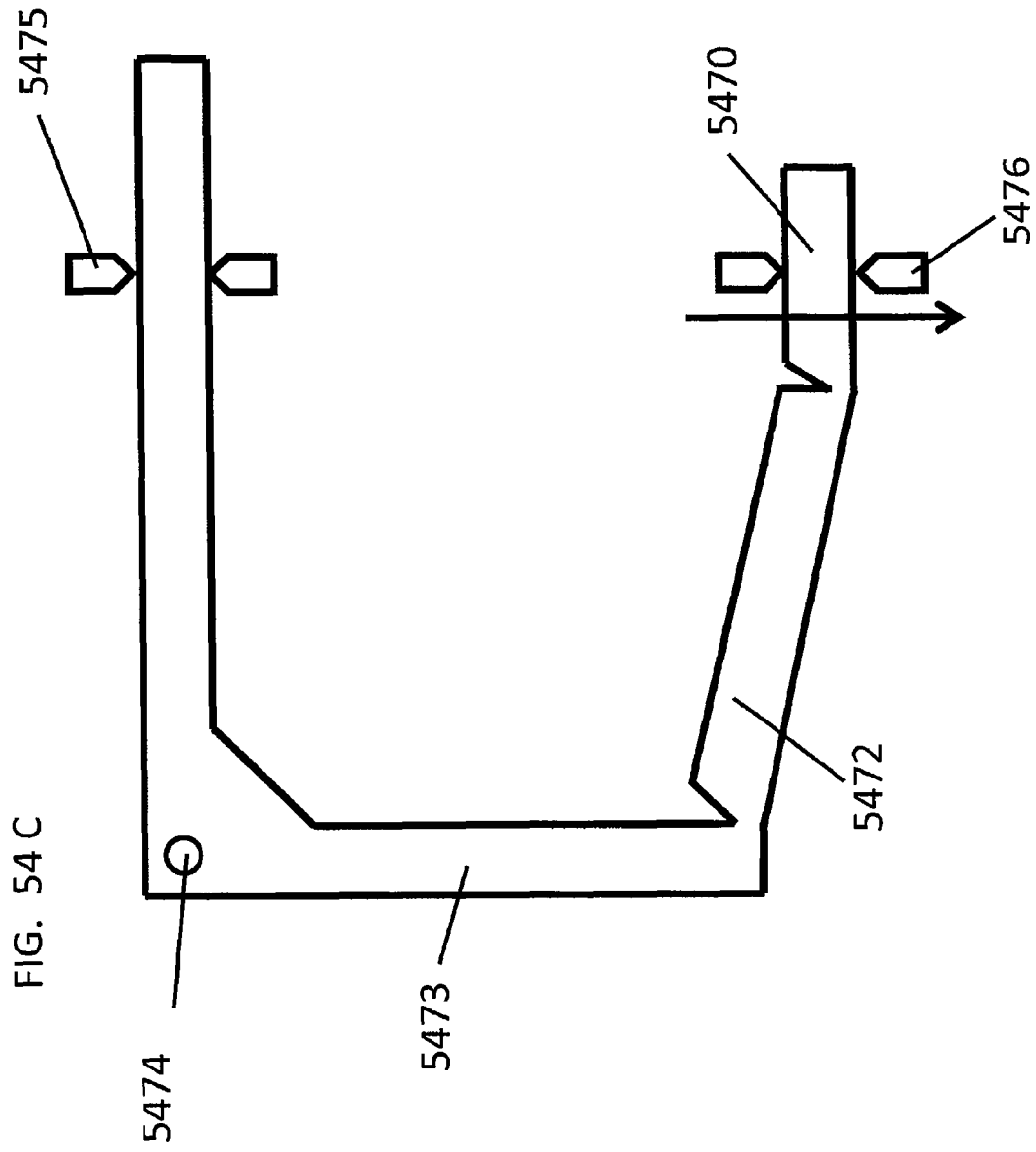
Figure 54:
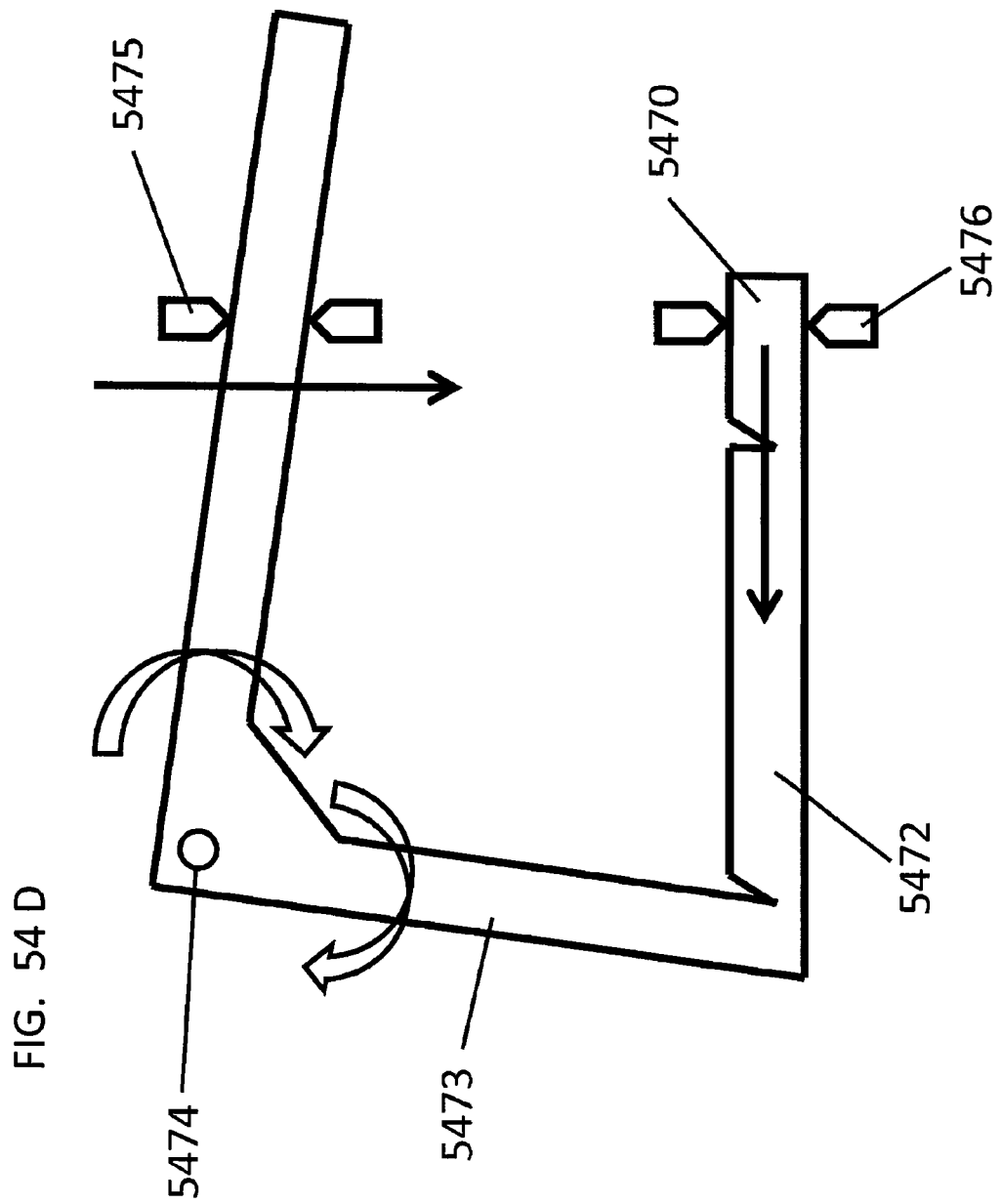

The operation of the mechanical linkage 5471 is further illustrated in FIG. 54B-D. In the unactuated state of the actuation device in FIG. 54B, the mechanical linkage holds the rings in a rest position. Upon vertical actuation at the drive point 5470, shown in FIG. 54C, the articulated member 5472 moves with the bottom ring 5415 with minimal coupling to the rigid member 5473. Upon horizontal actuation at the drive point 5470, shown in FIG. 54D, the articulated member 5472 pushes horizontally on the rigid member 5473, which rotates about the pivot 5474 and results in a vertical motion at the top guide bracket 5475.

Those skilled in the art will recognize that this example linkage will only approximately allow independent motion of the top and bottom rings 5414 and 5415. Some motion of the bottom ring 5415 is likely to couple to motion of the top ring 5414 and vice-versa. The linkage 5471 is intended to minimize this effect. Alternative mechanisms are contemplated for independently, or approximately independently, coupling a two-degree-of-freedom actuation device to two members moving along a common axis.

FIG. 55A shows a portion of a lens module 5500 having a variable optical lens 5531. The module 5500 has an electrical to mechanical actuation mechanism utilizing linkages to a fluid system and the variable optical lens 5531. Housings and connections are not shown in whole in FIG. 55A; only the connection points are provided in order to isolate this description to the actuation mechanism.

A connection 5587 is provided between the housing (not shown) and a paddle 5558. The paddle 5558 may have a substantial "U" shape, although other shapes are contemplated. The legs 5564 may be spaced apart to fit around the lens 5531. The connection 5587 may be, for example, in a form of a ball bearing structure or mechanical guide which could allow for a vertical movement of the paddle 5558. The connection 5587, in another embodiment, could also be a hinge. More specifically, the hinge may be a living hinge made from the same material used to construct the paddle. In an embodiment, the hinge is constructed from a different material, such as, for example, an additional portion of plastic. In yet another embodiment, the material could be elastomeric, an adhesive, or other like material capable of providing the desired properties of a hinge. This type of connection 5587 or joining may lead to generally rotational movement of the paddle 5558 about the connection 5587. In another embodiment, the connection 5587 could be a pocket or groove into which the legs 5564 of the paddle 5507 could fit. This embodiment may reduce or eliminate the need for an adhesive or additional connection structure. It could be a connection 5587 to which, for example, a damping compound is added. This will lead to generally rotational movement; however, the pockets or grooves could be designed for other types of movement. The connection 5587, in yet another embodiment, could be a hinge or round portion positioned into a round slot to allow for convenient rotation.

A filler volume 5517 may be formed between the paddle 5558 and the container 5503. The filler may be displaced towards or away from the lens 5531 as a result of movement of the paddle 5558. A drive linkage 5559 may be provided which connects the motion of a transducer or motor (electrical to mechanical) 5542 to the paddle 5558. The linkage 5559 may be, for example, a shaft, threaded rod, or other type of linkage. The motor 5542 may be, for example, a miniature stepper motor, brushless motor, piezoelectric motor, electroactive polymer motor, or any other type of transducer capable of providing the desired function. In the embodiment illustrated in FIG. 55A, the motor 5542 turns or pushes a linkage 5559. In an embodiment, the motor 5542 could be a screw drive turning linkage 5559, and linkage 5559 could be a threaded rod engaged in a threaded section 5588 of paddle 5558. In another embodiment, this area 5588 of the paddle 5558 may have or form a pocket or groove to allow the linkage 5559, which could be contoured or rounded to fit within the engagement area 5588, to push or pull the paddle 5558.

Location of the engagement feature 5588 on the paddle 5558 may affect the leverage that is obtained when the motor 5542 is actuated. For example, a motor 5542 capable of delivering high force over a small displacement may be used optimally when the engagement feature 5588 is close to the connection 5587, where a motor 5542 capable of delivering low force over larger displacement may be used optimally with the engagement feature 5588 is more distant from the connection 5588. The shape of the paddle 5558 may be designed to distribute the pushing or pulling force over the membrane 5505 to increase the mechanical efficiency of the structure.

FIG. 55B illustrates another embodiment in which the paddle 5558 is actuated by the motor 5549. In this embodiment, the paddle 5558 has an extension 5589 which extends substantially non-parallel to a plane defined by the body of the paddle 5558. The extension 5589 may have an engagement feature 5588 which is pushed or pulled by the linkage 5559. The linkage 5559 connected to the motor 5542 may have a contoured or rounded end to mate with the engagement feature 5588. By providing this type of interface, movement of a transducer is not in the same plane as the movement of the paddle 5558. This changes the leverage and provides potential space optimization. Other linkages and/or interfaces are possible, including, but not limited to, simple frictional attachments. It is further appreciated that any combination of single, dual, or multiple lens assemblies, utilizing single, dual, or multiple motors are contemplated as necessary for a given application, such as, for example, a single lens assembly (i.e., a single variable lens) being used for focusing and/or zooming. In other embodiments, two or more assemblies, in combination, may be used for carrying out these functions.

Figure 56A:
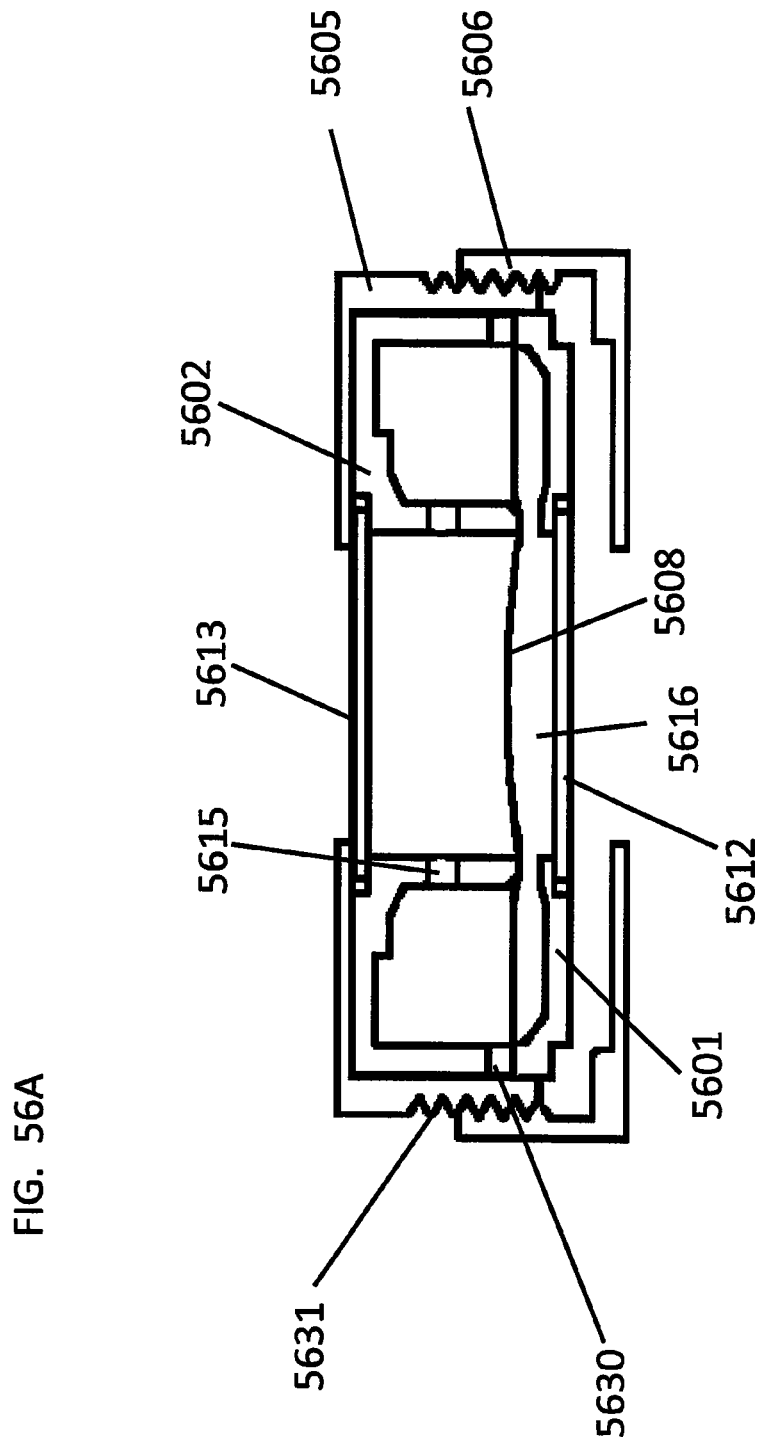
Figure 56B:
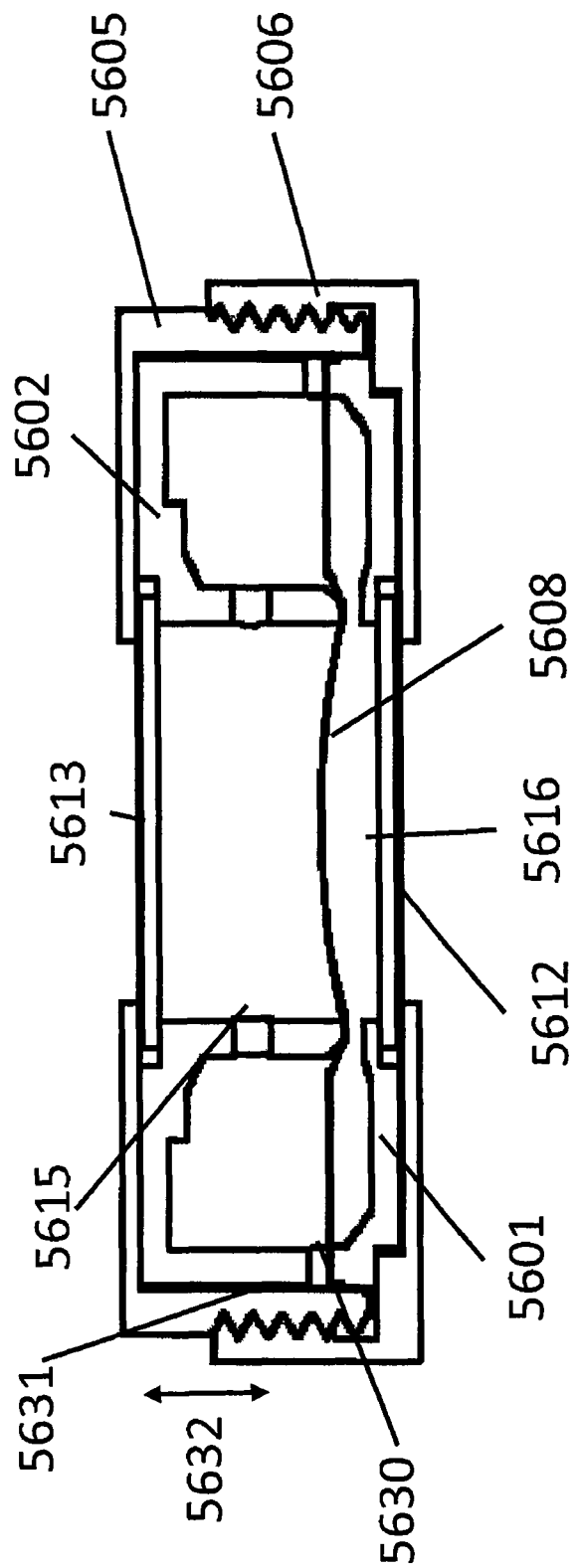

Referring now to FIGS. 56A and 56B another example of a lens assembly is described. The lens assembly includes a container that has a first section 5601, an optically transparent section 5612, an optical fluid 5616, a membrane 5608, a lens shaper 5602 having gas exchange hole 5615, a cover plate 5613 (e.g., constructed of glass), a bottom housing 5606, a top housing 5605 connected by a thread 5631 and a tolerance absorbing ring 5630. The absorbing ring 5630 may be a ring approximately 0.2 mm in thickness and constructed from silicone, polyurethane or acrylic material. Other dimensions and materials can also be used to constrict the ring 5630. The other elements of the figure have been discussed above and function generally in the same way as described previously.

By adjusting the distance between the first section 5601 and the lens shaper 5602 using the screwing mechanism between bottom housing 5606 and the top housing 5605 and the soft tolerance absorbing ring 5630, which is compressible (and decompressable) in the direction indicated by the arrow labeled 5632, production tolerances in the fill volume of the fluid 5616 and the container volume can be compensated. The adjustment occurs by mechanical adjustment that may be made manually or by an automated device. Other adjustment approaches may also be used. In these approaches, easy adjustment of the initial focal length of the lens system after filling is accomplished by making the above-mentioned adjustment along the direction indicated by the arrow labeled 5632.

Figure 57A:
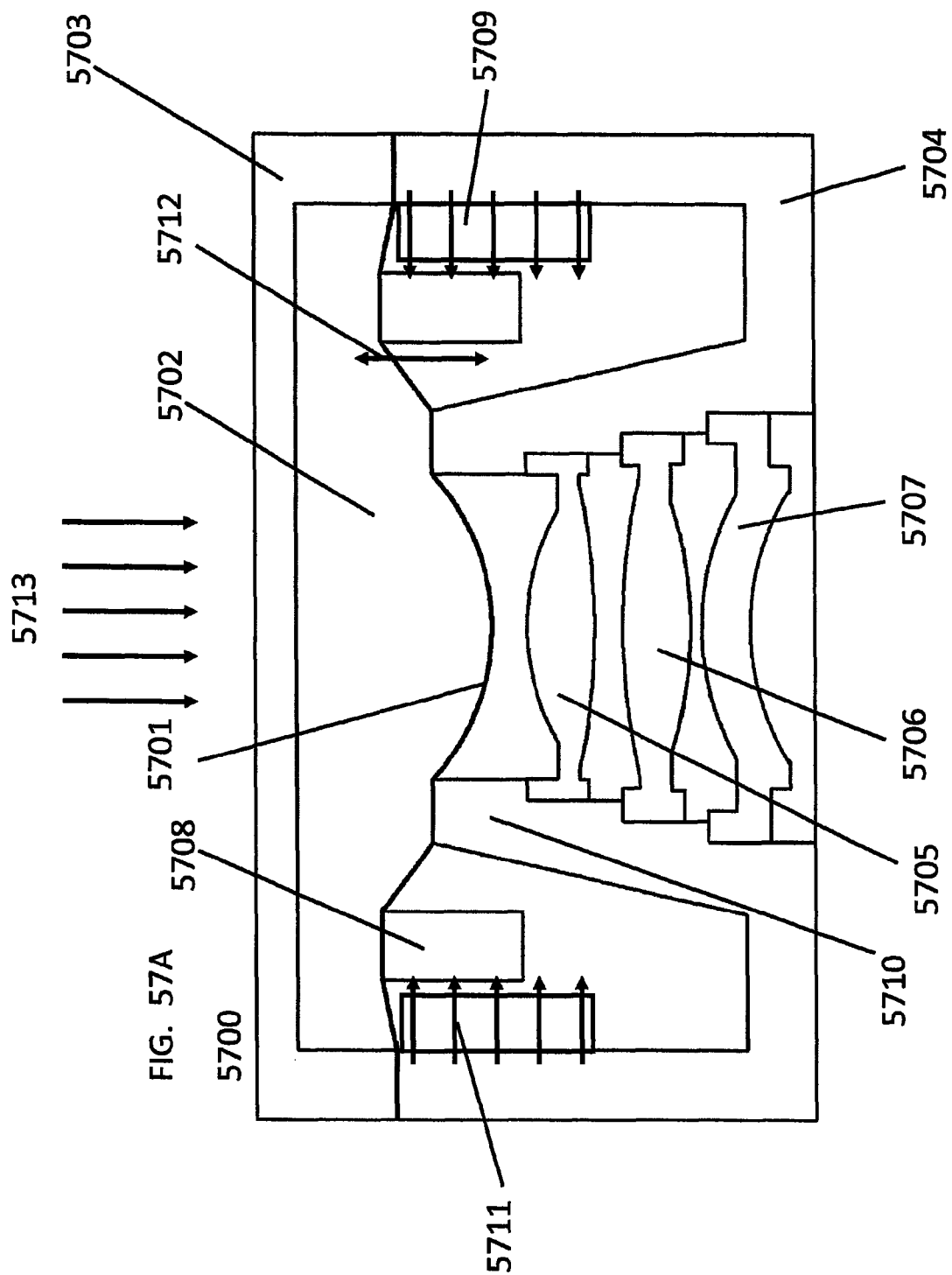
FIGS. 57A and 57B comprise perspective views of a lens assembly according to various embodiments of the present invention.
Figure 57B:
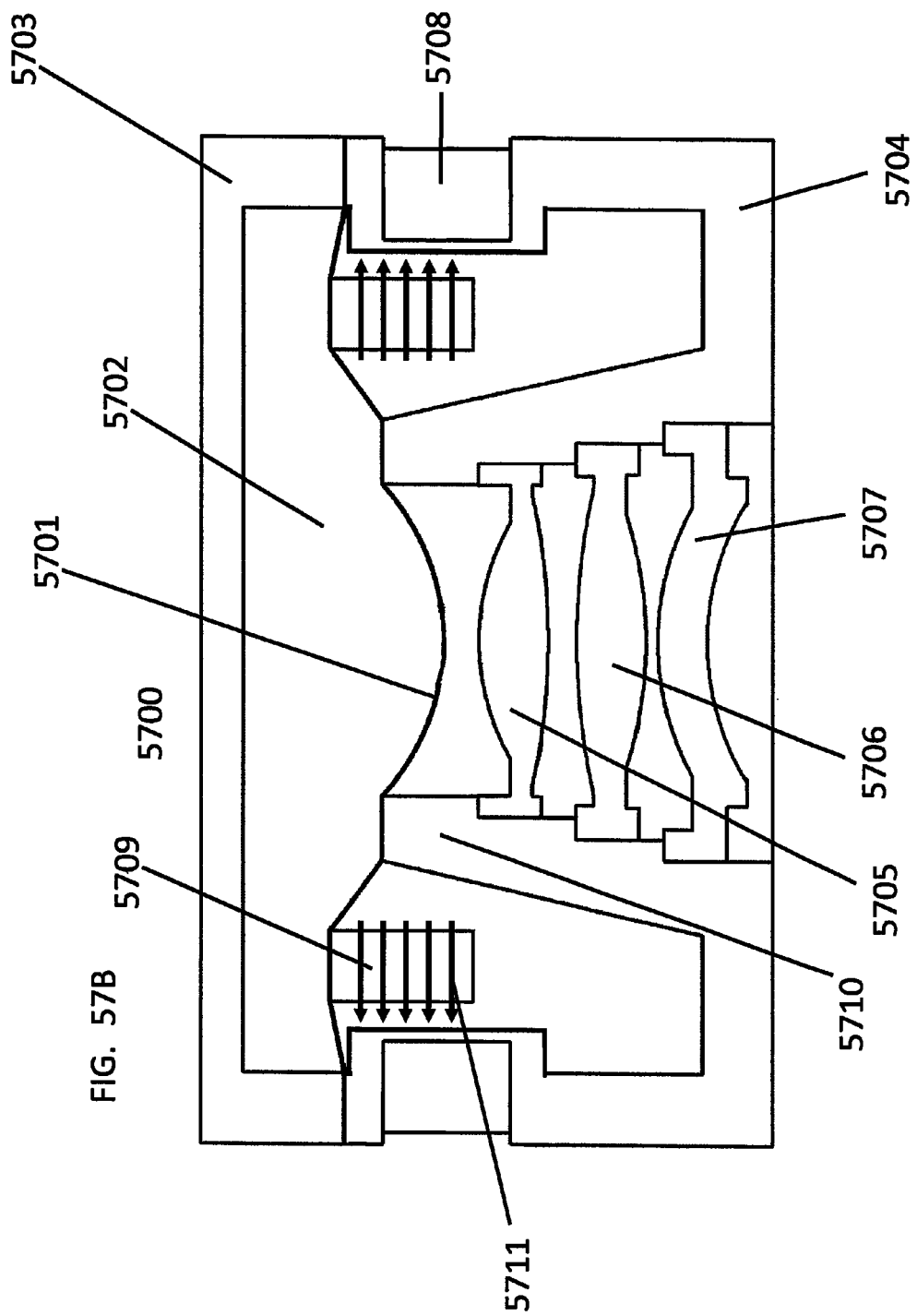

Referring now to FIG. 57A and FIG. 57B another example of a lens assembly 5700 is described. As shown in FIG. 57A, the lens assembly 5700 consists of a lens barrel housing 5704 which contains a number of lenses 5705, 5706 and 5707, which are used for image correction purpose. These lenses can be constructed from a plastic such as Polycarbonate, Polystyrene or other optically clear plastic materials. Other examples of materials can also be used. An optically clear liquid 5702 (or other filler material) is enclosed by a deformable membrane 5701 and an optically transparent container 5703. The container 5703 and the housing 5704 are interconnected to each other via mechanical interlocking or gluing. The central part of the housing 5710 is in contact with the deformable membrane 5701 and defines the shape of the membrane. A coil 5708 is connected to the deformable membrane 5701. The magnetic field indicated by the label 5711 of magnet 5709 interacts with the electrical current flowing through the coil 5708 resulting in an axial force on the coil in the direction of the arrow labeled 5712. This force translates in deformation of the membrane 5701 and thus changing the shape of central, optically active part of the deformable membrane 5701 acting on the light rays 5713. This embodiment requires only a very small number of parts, enabling a very cost efficient autofocus module. Additionally, it is very tolerance insensitive.

FIG. 57B describes a similar embodiment with one difference being that the magnet 5709 is moving and the coil 5708 is fixed on the lens barrel housing 5704. All the other elements shown in FIG. 57B are the same as FIG. 57A and perform similar functions.

Figure 58A:
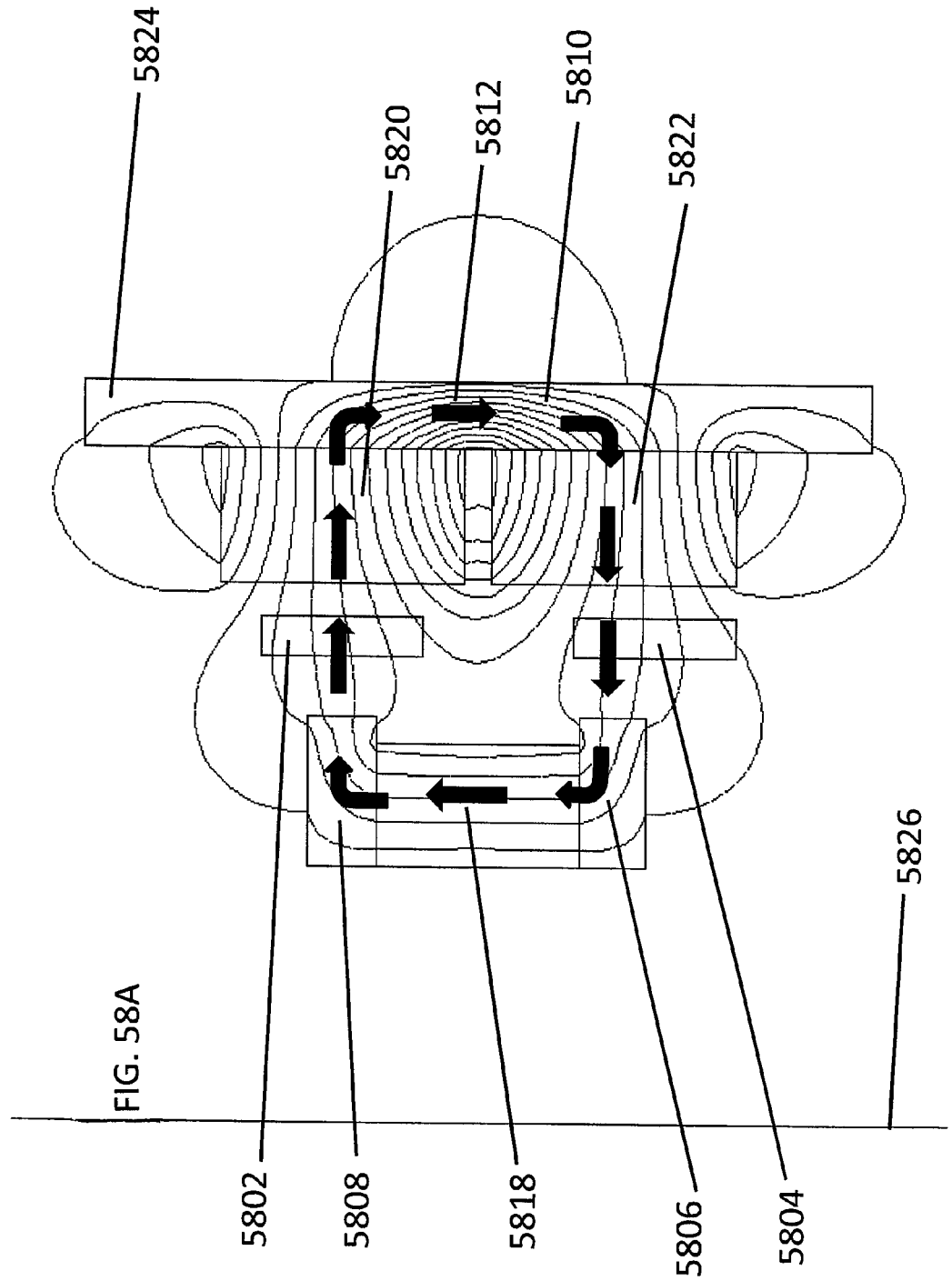
FIGS. 58A, 58B, 58C, and 58D comprise views of actuators in lens assemblies according to various embodiments of the present invention.

Referring now to FIG. 58A, one example of a symmetrical actuator is described. The structure surrounds the central axis 5826. The structure includes a first coil 5802, a second coil 5804, a first magnet 5818, a second magnet 5820, and a third magnet 5822. When wires in the coils 5802 and 5804 are excited by an electrical current, the coils 5802 and 5804 interact with a magnetic flux as shown that is directed by a bottom return flux guiding structure 5806, a top return flux guiding structure 5808, a side return flux guiding structure 5810 in a direction indicated by the arrows labeled 5812. By reversing the polarization of all the magnets the flow, would be equivalent but reversed. The side return magnetic flux guiding structure 5810 includes a side return overhang portion 5824 to help absorb the manufacturing tolerances associated by the parts and/or control stray fields More or less overhang would not change the basic principal of operation of this example. The magnets, coils, and magnetic flux return structures can be implemented as described elsewhere herein.

In the example of FIG. 58A, a significant portion of the flux lines flow through the coils 5802 and 5804 substantially perpendicular to the direction of the current flow. In other words, a structure is created that contains stray field and focuses field at the coil with the appropriate angular relationship and thus generates an optimized amount of force for the given space. The flux is concentrated in the path indicated by the arrows labeled 5812. As a result, the coils 5802 and 5804 receive a sufficient force to be moved and/or move other elements that adjust characteristics of the lens as has been described previously herein.

Figure 58B:
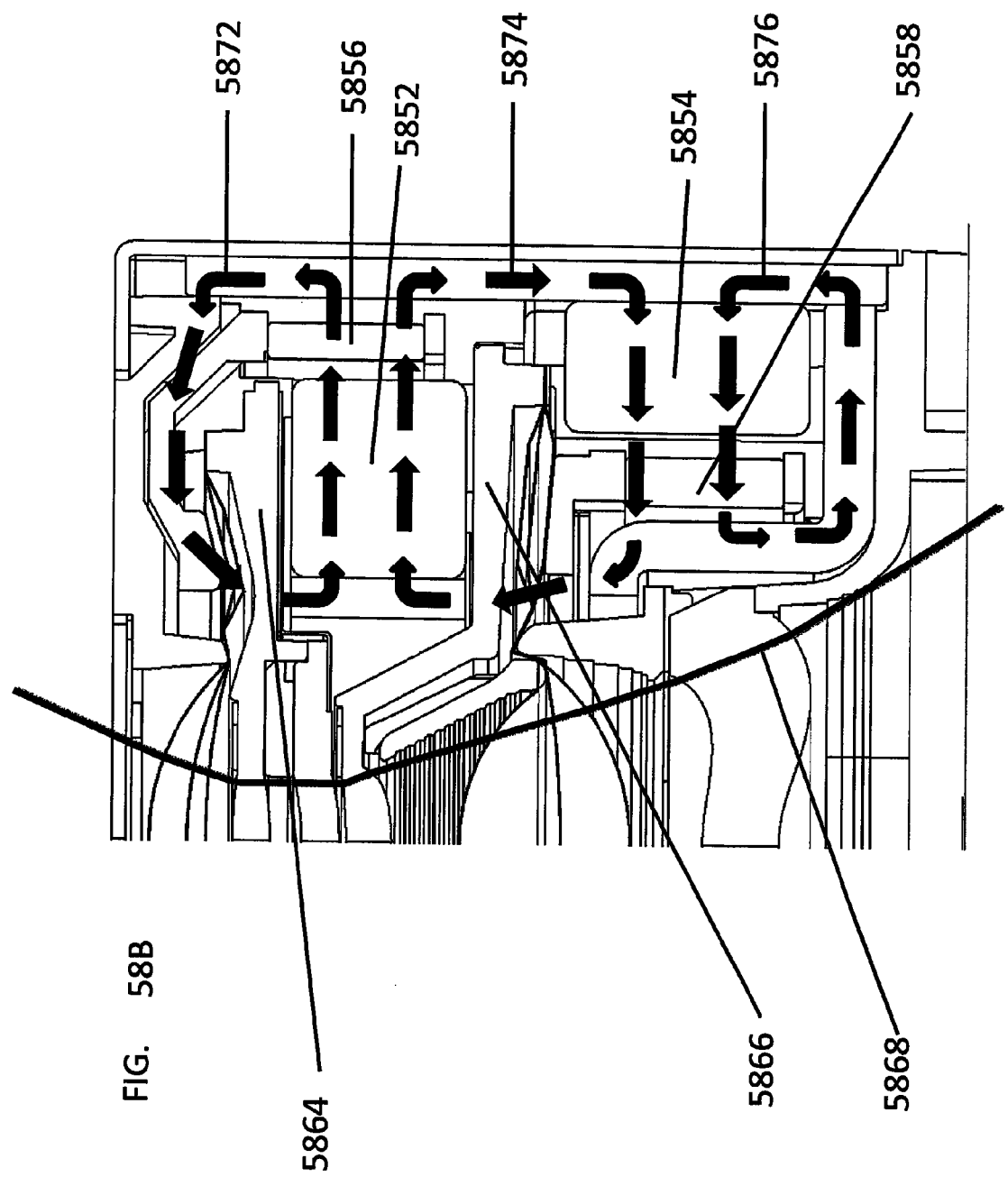
Figure 58C:
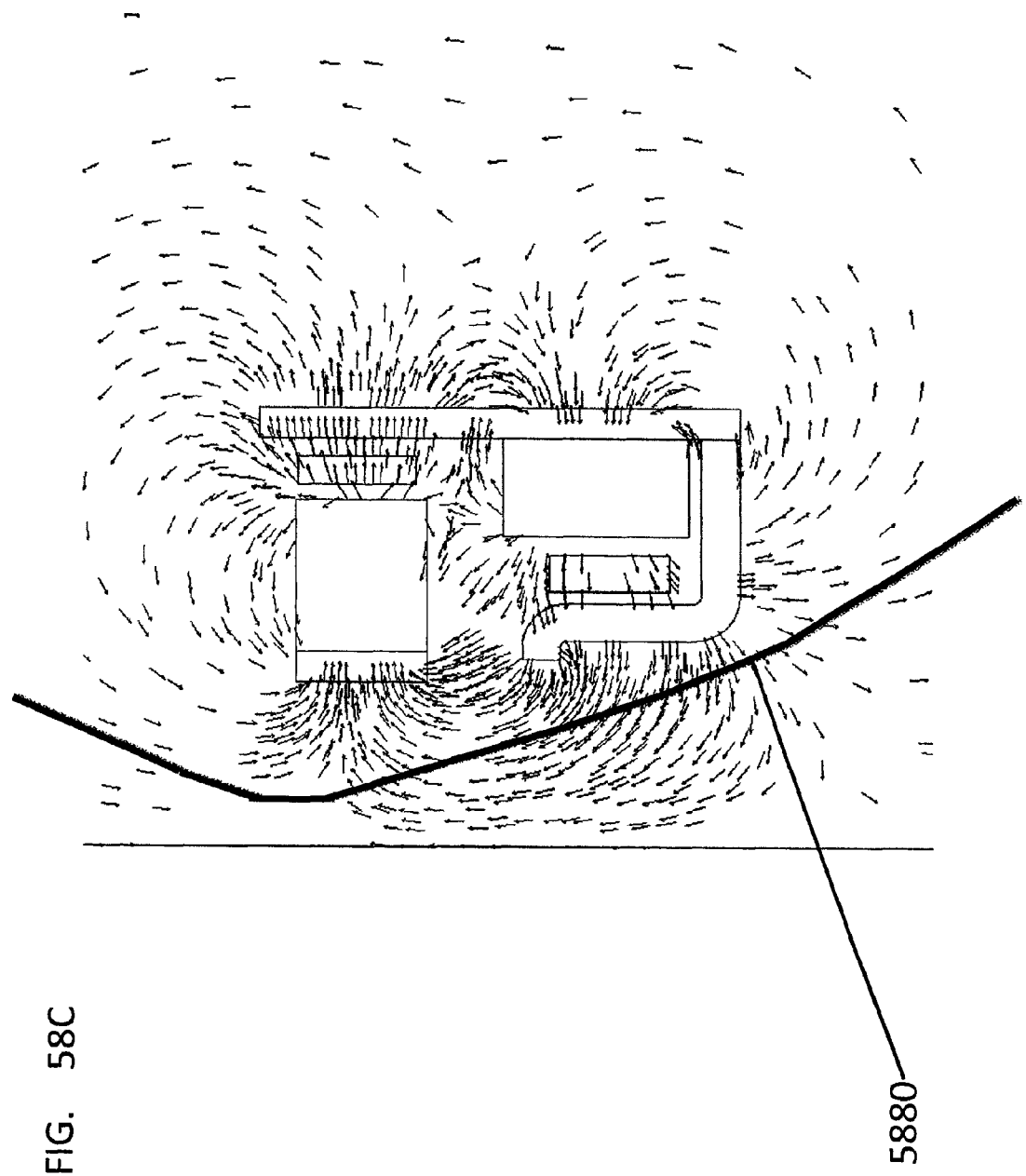

Referring now to FIGS. 58B and 58C, another actuator is described. The actuator includes a first coil 5856, a first magnet 5852, a second coil 5858 and a second magnet 5854. The actuator is disposed in close proximity to containers 5864 and 5866 (described elsewhere herein) and near outer light rays within the primary optical path 5868 in 58B and 5880 in 58C. The interaction of the magnets 5852 and 5854 and the electric current as it is applied to the wires in the coils 5856 and 5858 interacts with first, second, and third magnetic flux lines that flow in the directions indicated by the arrows labeled 5872, 5874, and 5876, respectively. The flux lines flow through the optical structure of the lens that may include the containers 5864 and 5866 and some lines of the flux will cross into the primary optical path 5868. FIG. 58B shows the primary flux paths 5872, 5874, 5876 and FIG. 58C shows the vector plot of the flux described in FIG. 58B. The magnets, coils, and magnetic flux return structures can be implemented as described elsewhere herein.

A first (top) portion of the bottom magnet 5854 share flux lines created by a second (bottom) portion of the top magnet 5852. As shown, flux lines are reused and reinforced as between the magnets 5852 and 5854 and become part of the same magnetic circuit. The bottom magnet 5454 provides a path with less magnetic reluctance for the top magnet 5852 than would be provided without the bottom magnet 5854. As a consequence, an efficient actuator structure is provided that produces sufficient force to move the coils 5856 and 5858 (that directly or indirectly move the membranes as described elsewhere in this application) and, at the same time, is small enough to fit into extremely confined and discontinuous spaces remaining after placement of the optics within the assembly.

It will be appreciated that although the actuators described in FIGS. 58A and 58B (as well as elsewhere herein) are shown as being part of a lens assembly, the actuators can be used with respect to other types of devices and with a wide variety of other applications. For example, the actuators may be used in conjunction with speakers (e.g., to move tweeter and woofer speakers to mention one example). Other examples are possible. In fact, the actuators described herein can be used to supply force to any suitable component of any type of system or any type of application.

Figure 58D:
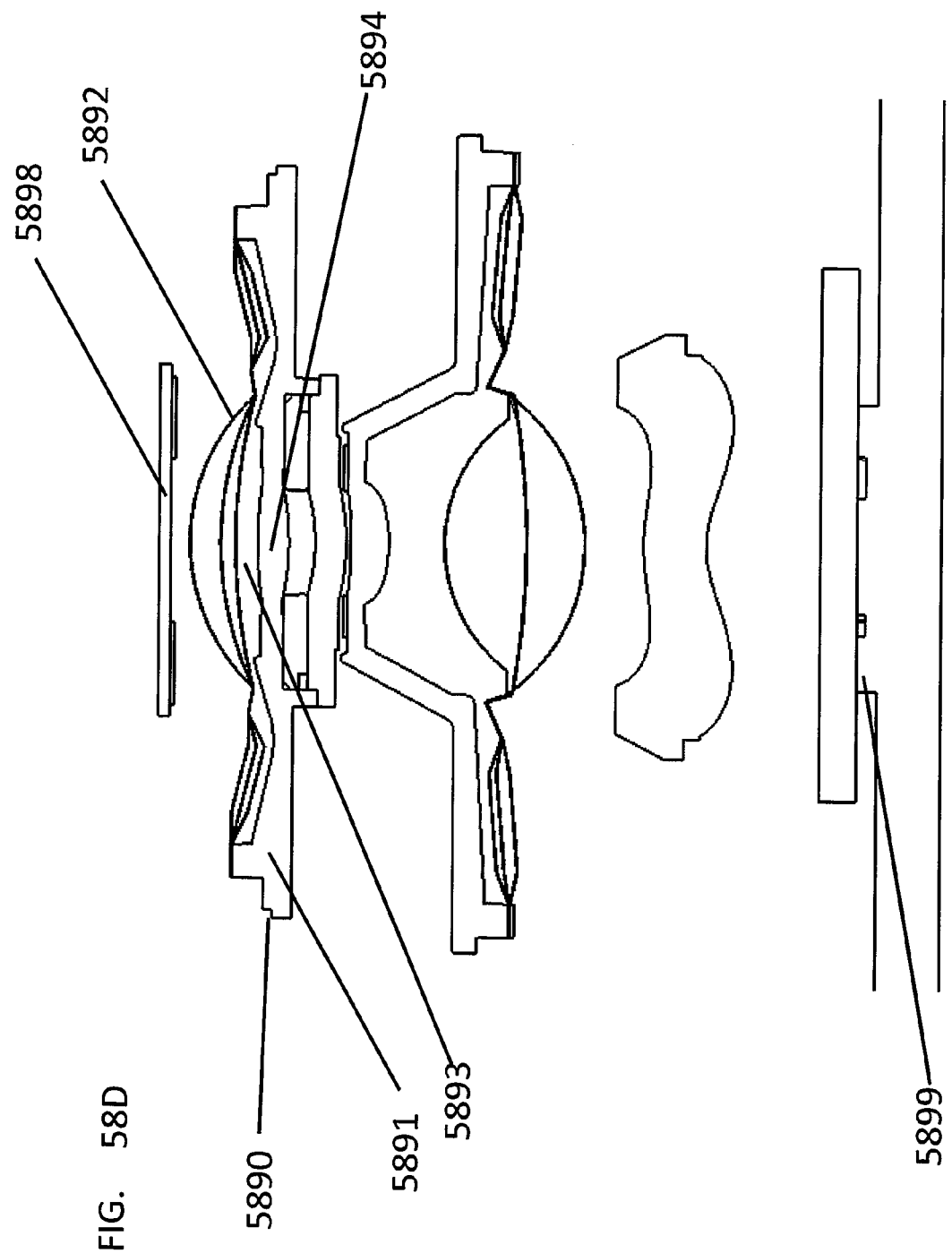

FIG. 58D shows an example of the optical portion of the assembly. This example includes a top variable optical assembly 5890 which contains a membrane 5892, optical filler material 5893, container 5891 and a corrective lens 5894 embedded in the container 5894. This assembly 5890 is the farthest optical component away from the sensor 5899. This approach allows for an assembly that will maximize performance while minimizing height from sensor 5899 to cover 5898 (e.g., cover glass). A further aspect is having optical elements 5894 imbedded into the container 5891. In this example, the second lens is a push-pull (convex-concave) lens allowing a very compact optics design.

In the examples of FIGS. 58A-58D, the magnetic structures are coupled together and also coupled through one or more optical elements of the system (e.g., through the lens, containers, or membranes). Very small air gaps in both motor structures. The side return structures may be self-attaching to the housing thereby providing easy assembly with no adhesive (e.g., glue) required. These approaches are also fault tolerant from an assembly point of view, since a loose positioning of the magnetic structure will only minimally reduce the magnetic force generated by the coils. Additionally, the magnets are well defined and the posts in the housing define the location of the magnets.

Figure 59:
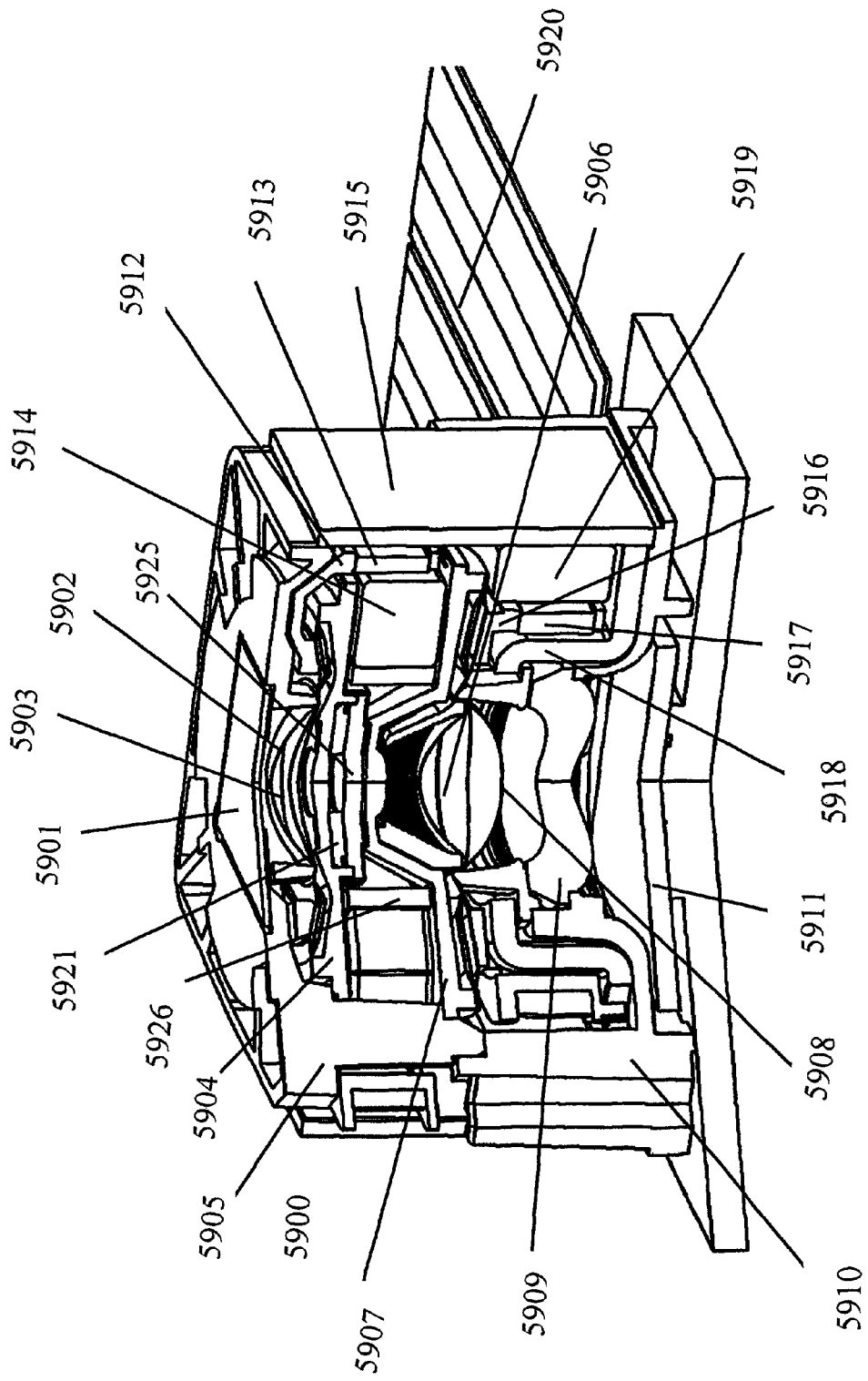
FIGS. 59A and 59B comprise views of a lens assembly according to various embodiments of the present invention.
Figure 59B:
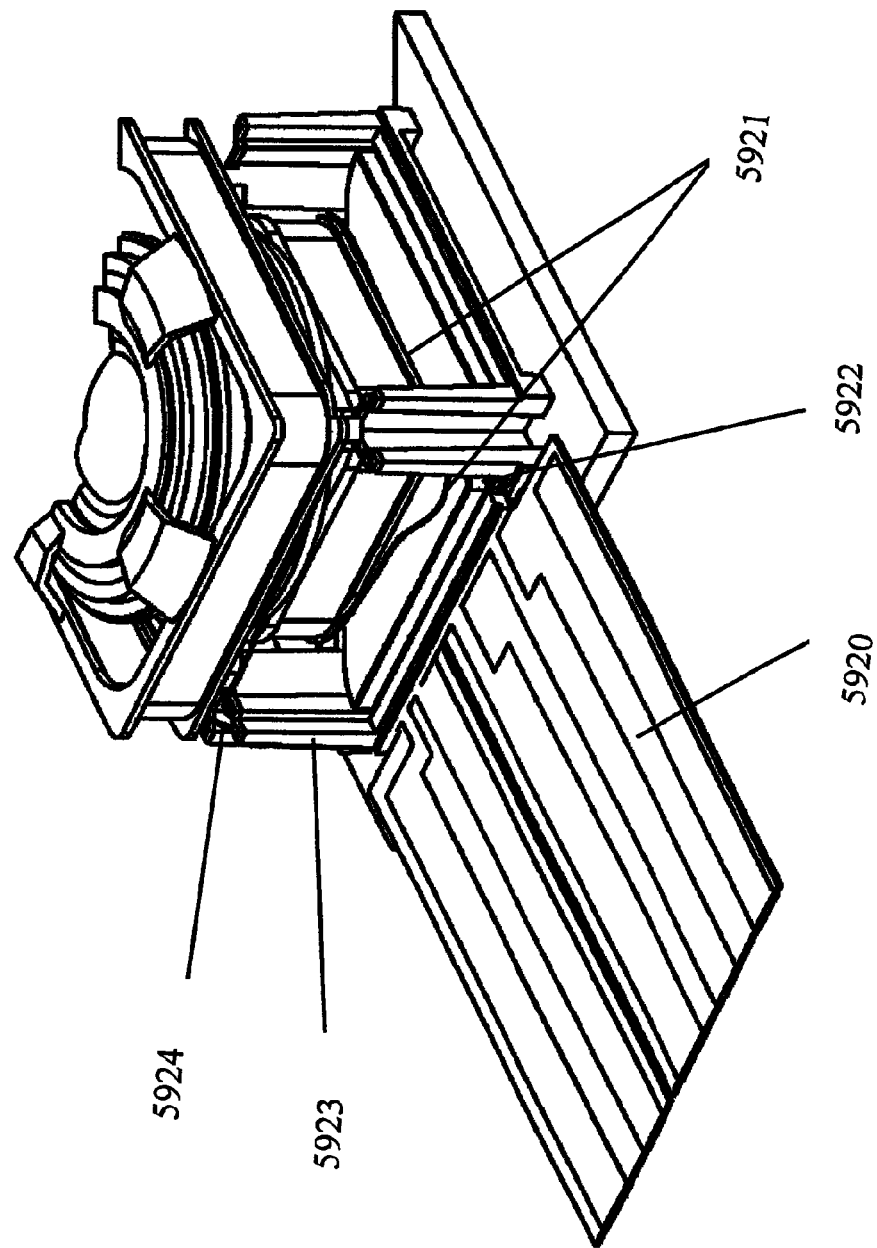

Referring now to FIGS. 59A and 59B, an example of a lens assembly 5900 is described. The lens assembly includes a top housing 5905, a top container 5904, a top magnetic return structure 5926, an aperture 5921, a cover plate 5901, filler material 5903, a membrane 5902, a corrective lens 5925, a magnet 5914, a top bobbin 5912, a top coil 5913, a return structure 5915, a flex circuit conduit 5920, filler material 5906, a magnet 5919, a bottom bobbin 5916, a bottom coil 5917, a magnetic flux return structure 5918, a sensor cover 5911 (e.g., a glass plate), a membrane 5908, a bottom housing 5910, a meniscus lens 5909, and a bottom container 5907.

The construction, operation, and interaction of these components have generally been described elsewhere herein and will not be described again here. Additionally, it will be appreciated that one example of the operation and actuation has been described above with respect to FIG. 58B.

As shown in FIG. 59B, the flex circuit 5920 is coupled to a connector 5922. A flexible electrical connector 5921 (e.g., a wire) extends from the connector 5922 and is wound around the bobbin 5916 to form the coil 5917. Thus, current flows from an outside current source (not shown), to the flex circuit 5920, through the connector 5922, through the conductor 5921, around the coil (surrounding the bobbin), and back out through the flex circuit 5920. The wire connection for coil 5913 is through the flex and the connector 5924 guided down to the flex through the post 5923.

The conductors 5921 are free moving and absorb only little force while moving. The conductors 5921 are disposed so as to provide for space-saving capabilities with respect to the top coil and also provide for safety because the conductors 5921 pass through a protection channel to guide them to the external source or connection.

Bottom conductors on the bottom coil 5917 slide under the magnet 5919 and reside a substantial distance away from the membrane 5908. A gap in the bottom housing 5910 allows easy guiding of the conductors to the external source.

As shown, the top bobbin 5912 includes four finger elements to hold the top coil 5913. This construction approach provides for a shock absorption capability and a space saving property allowing for a smaller assembly to be constructed than would be the case if the top bobbin were not so constructed. This bobbin configuration also enables the optics to be positioned closer to the top cover 5901. Generally speaking, the earlier (i.e., closer to the top) the first tunable lens is located in the optical path, the shorter the module can be constructed because the light can be reshaped at the earliest possible position.

Temperature improvement is provided because the coil 5913 is positioned a substantial distance away from the membrane and filler material but close to heat conducting external metal. The square shape of the bobbin 5912 maximizes length of wire in magnetic field. Corners of square-shaped bobbins are not generally flux efficient and therefore this approach provides for posts in the corner to improve efficiency. Post configuration with square bobbin 5912 also minimizes the space between magnet 5914 and the flux guiding structure 5915 and reduces costs because the wires does not need to be glued or attached with some other adhesive. The spider-like fingers of the bobbin 5912 provide for the shortest distance between membrane pushing ring and coil holding structure.

The bottom bobbin 5916 is mechanically interconnected to the membrane 5908. The bobbin 5916 has a large travel range and has almost same force due in part to long magnet 5919 and relatively straight field lines created.

The top housing 5905 is a barrel design and includes all lenses except the meniscus lens 5909. The top housing 5905 additionally provides lens shaper functions. One side of housing references most of the optical components (e.g., providing parallel referencing) enabling a single pin-mold and thus providing better concentricity and tolerances The top housing 5905 protects the coil 5913 from mechanical shock (i.e., the coil 5913 is mechanically constrained). Additionally, the top housing has holes enabling air flow from the optical section into the motor section and thus providing integral barometrical relief function. The bottom tunable lens is a push-pull lens (as has been described elsewhere herein) using the lens shaper and retainer mechanism/support member as shown in FIGS. 41A and B. The variable radius of lens not only changes the shape of the lens but mechanical clamping structures may also provide this function. When deforming the lens, not only the shape of the lens changes but also its axial position as well as the radius.

The meniscus lens 5909 is disposed tightly to the housing 5910 that is directly connected to the image sensor making it cost efficient and tolerance insensitive. The corrective lens 5925 (which may be any corrective optical element constructed of any material) is disposed in the container 5904. In this respect, the corrective lens 5925 is integral with the filler-filled lens structures described herein.

So assembled, the assembly 5900 includes first tunable lens (including elements 5903, 5902, 5904, 5912, and 5913) for focusing of light rays that enter through cover 5901. A second tunable lens (including elements 5906, 5908, 5907, 5916, and 5917) is also provided and is for zooming. Consequently, two different tunable systems are provided which can be optimized for different functions, constraints. The corrective lens 5925 corrects optical error such as spherical aberrations. The meniscus lens 5909 helps to achieve chief ray angle requirements. In many of these examples, all optical components described above are circular or generally circular in shape. However, as required, other shapes may also be used.

In these examples, the amount of filler material that causes deformation of the membrane is constant (however, its relative displacement within a particular lens changes). The magnets 5914 and 5919 may be polarized providing a field perpendicular to the coils 5913 and 5917 and the coils 5913 and 5917 and magnets 5914 and 5919 are displaced relative to each other.

Figure 60:
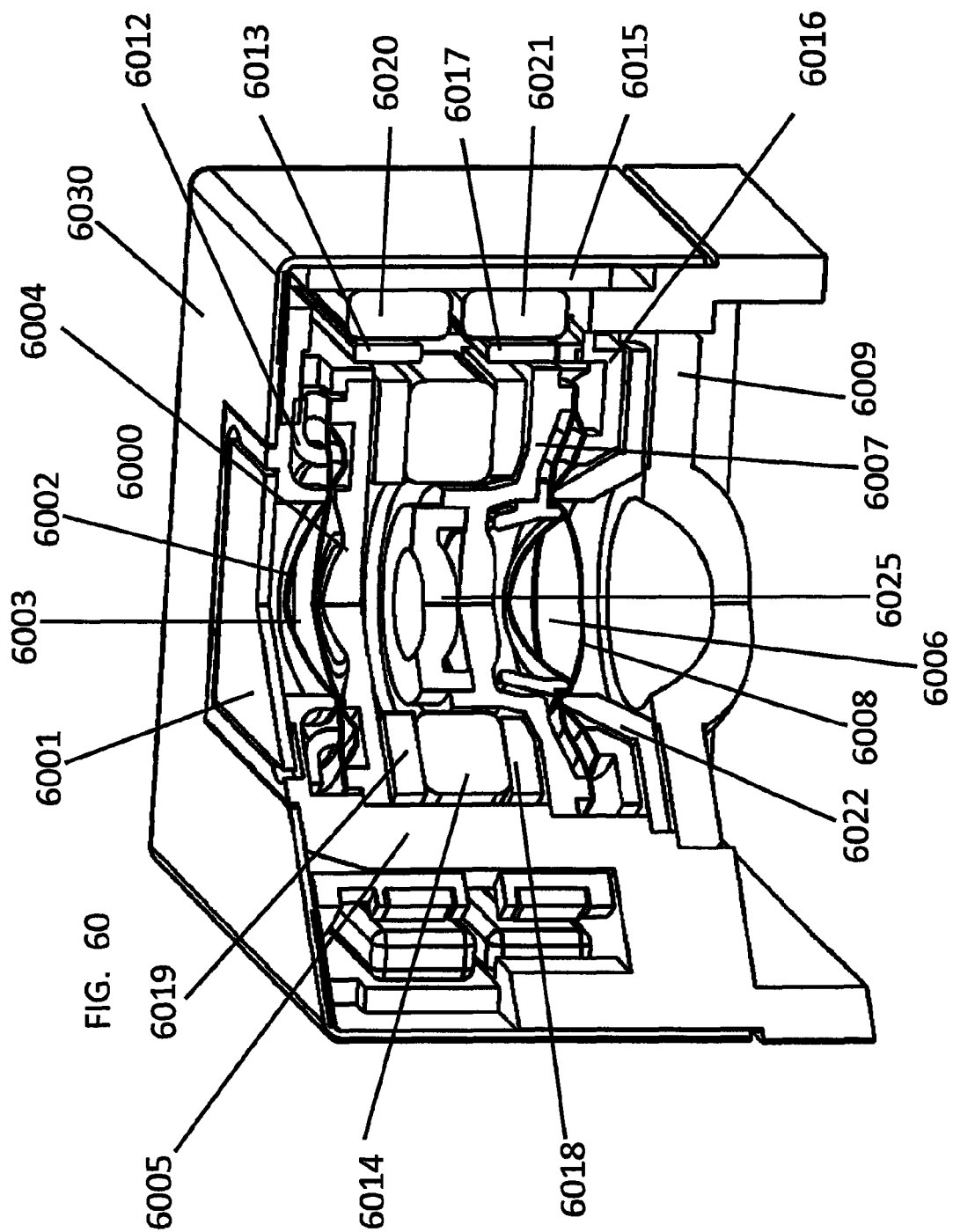
FIG. 60 comprises a view of a lens assembly according to various embodiments of the present invention.

Referring now to FIG. 60, another example of a lens assembly 6000 is described. The assembly 6000 is similar to that described in FIGS. 59A and 59B and like numbers refer to the same elements. It will be appreciated that actuation of the actuators of FIG. 60 operates in the manner described above with respect to the actuators of FIG. 58A. More specifically, the assembly 6000 includes a top housing 6005, a top flux guiding structure 6019, a cover 6001 (e.g., constructed of glass), filler material 6003, a membrane 6002, a top container 6004, an outer shield or housing 6030, a pusher 6012, a coil 6013, a magnet 6020, a bottom coil 6017, a bottom magnet 6021, a outer return structure 6015, a bottom bobbin 6016, a meniscus lens 6009, a bottom container 6007, a corrective lens 6025, filler material 6006, a membrane 6008, a lens shaper 6022, a bottom return structure 6018, and a magnet 6014.

In the example of FIG. 60, interconnections between optical lenses are minimized because of the lens barrel design meaning that a majority of the optical elements are referenced to one side of the housing 6005, minimizing assembly and part tolerance. The bottom bobbin 6016 is split into two sections, so that the coil 6017 can be added after the stacking of the lens.

Figure 61:
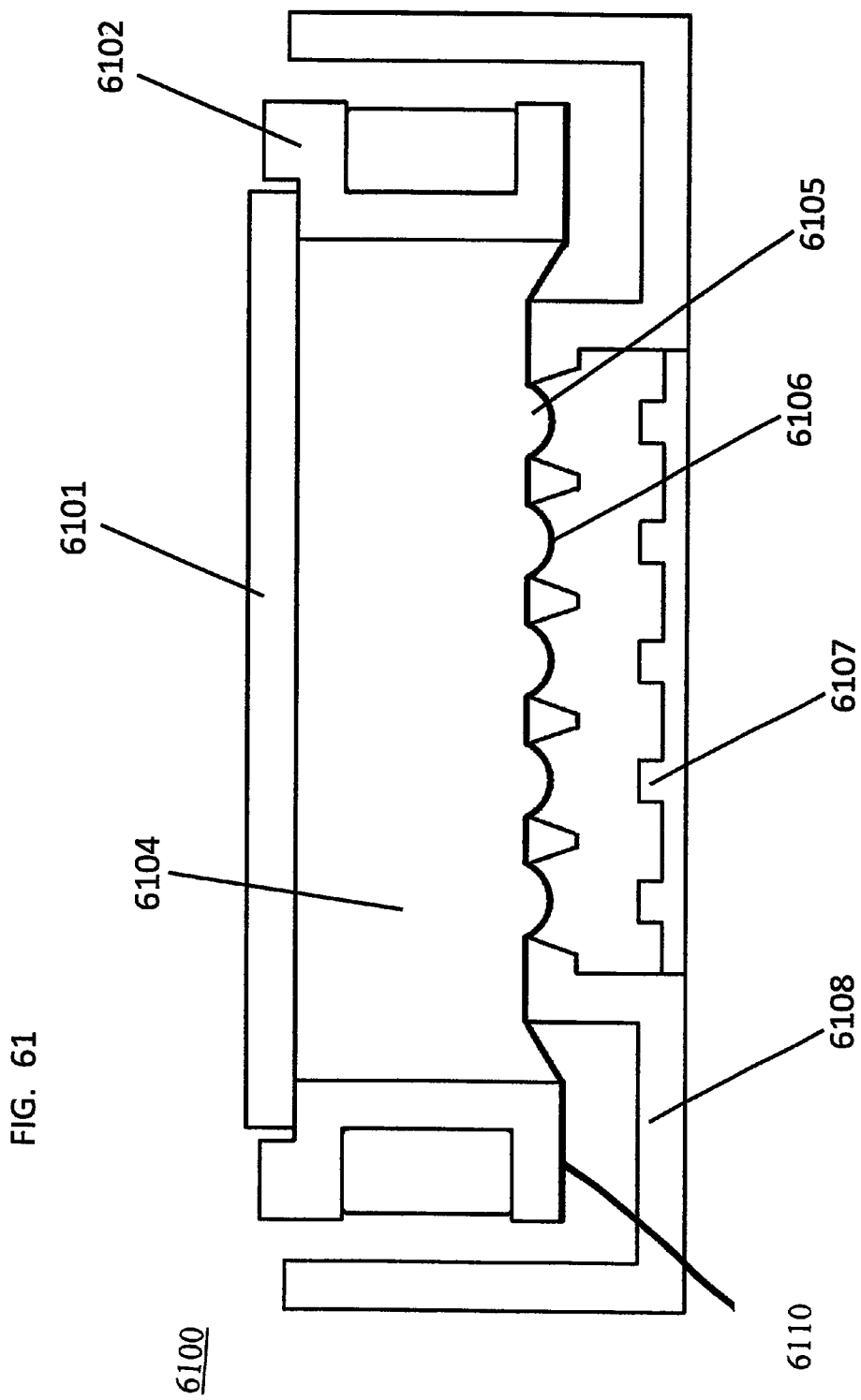
FIG. 61 comprises a perspective view of a lens array assembly according to various embodiments of the present invention.

Referring now to FIG. 61, one example of a lens array 6100 is described. The lens array 6100 includes a transparent optical plate 6101, a container element 6102, a housing 6108, light sources (e.g., emitting diodes (LEDs)) 6107, lens areas 6106, filler material 6104 that includes displaced filler material within a region 6105. In operation, the container 6102 is displacing the filler material by pushing on this through optical plate 6101. This creates a pressure to move the filler material 6104 selectively to and from the regions 6105. In this respect, the regions 6105 (and shapes of the lenses there-defined) may be the same or different. Consequently, light transmitted from the light sources 6107 can have one or more of its properties altered as it travels through the filler material 6104 and through the plate 6101. The properties affected may include light distribution, brightness, and color, to name a few examples. Other examples are possible. The assembly 6100 may be used to provide light in any environment or any context such as within buildings, outdoors, and within vehicles. The light sources 6107 may be any light emitting device such as LEDs. The filler material 6104 may be any type of liquid, gel, polymer, gaseous or any other deformable filler materials that has already been mentioned herein. Other actuations approaches (e.g., using piezo electric elements or mechanical pushing of 6101) as described herein may also be used in place of the container 6102. The filler material can be made of one material or a membrane and a liquid material.

Referring now to FIGS. 62A and 62B, another example of a lens assembly 6200 is described. The assembly 6200 includes a light source 6201 (e.g., a LED), a first optical media 6202 (e.g. gas, liquid polymer, or glass), a rigid optical element 6203 (e.g., a lens, diffuser, filter, or grating), a second optical media 6208 (e.g., a gas, liquid polymer, or glass), a reflector 6204 (e.g., freeform mirror), a deformable filler material 6205 (e.g., a liquid, gel, or polymer), and a rigid corrective optical element 6206 (e.g., a lens, diffuser, filter, or grating). When the corrective optical element 6206 is mechanically or electrically displaced in axial direction 6209, the filler material 6205 is deformed, resulting in a deformation at the interface of 6210 thereby changing the direction of the light rays 6207.

An interface 6210 separating the second optical media 6208 and the filler material 6205 can be a deformable membrane made of the same or a different material than the second optical media 6208 or the deformable filler material 6205. The assembly of 6200 can be used for light steering applications such as illumination system. The assembly of 6200 can be a standalone unit, part of an array or part of larger optical system.

Referring now to FIGS. 63A and 63B, another example of a lens assembly is described. The assembly 6300 includes a light source 6301 (e.g., a LED), a reflector 6202 (e.g., a freeform mirror), a deformable filler material 6203 (e.g., a liquid, gel, or polymer), and a lens shaper 6304. When the lens shaper 6304 is mechanically or electrically displaced in axial direction 6306, the filler material 6303 is deformed, resulting in a deformation of the interface of 6307 and thus change of the light rays 6305.

An interface 6307 separates the deformable filler material 6303 and the optical media 6308 and the interface 6307 can be a deformable membrane made of the same or a different material than the optical media 6308 or the deformable filler material 6303. The assembly of 6300 can be used for light steering applications such as illumination system. The assembly of 6300 can be a standalone unit, part of an array or part of a larger optical system.

Figures 64A, 64B:
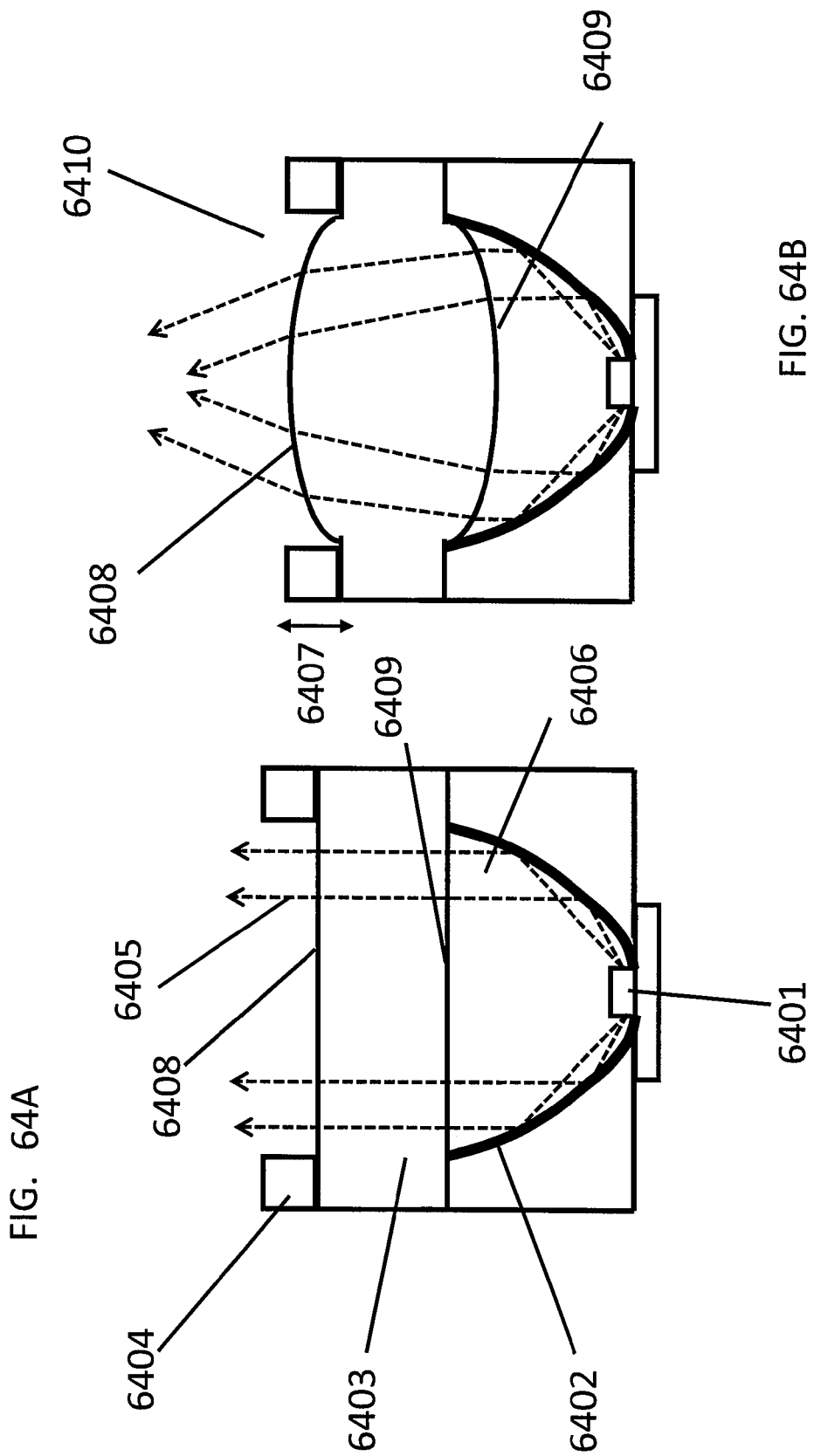
FIG. 64A and FIG. 64B comprise views of a lens assembly according to various embodiments of the present invention.

Referring now to FIGS. 64A and 64B, another example of a lens assembly is described. The assembly 6400 includes a light source 6401 (e.g. LED), a reflector 6402 (e.g. freeform mirror), a first optical media 6406 (e.g. gas, liquid polymer, or glass), a deformable filler material 6403 (e.g., liquid, gel, or polymer), and a lens shaper 6404. When the lens shaper 6404 is mechanically or electrically displaced in axial direction 6407, the filler material 6403 is deformed, resulting in a deformation of the interfaces 6408 and 6409 and thus the direction of the light rays 6405 changes.

The interfaces 6408 and 6409 separating the deformable filler material 6403 and the optical media 6406 and 6410 respectively can be a deformable membrane constructed of the same or a different material than the optical media 6406, 6403, and 6410. The assembly of 6400 can be used for light steering applications such as illumination system. The assembly of 6400 can be a standalone unit, part of an array or part of a larger optical system.

Referring now to FIG. 65A, one example of a lens shaper 6500 that can be used with the embodiments herein described. The lens shaper 6500 includes a first surface 6511 extending from a first face 6521 having a first perimeter 6501 with a first shape, to a second face 6522 having a second perimeter 6502 with a second shape. The first shape and the second shape are different. The membrane shape is defined the lens shaper. When the lens is changed from a convex state to a concave state, different perimeters of the lens shapers define the shape of the membrane and thus the shape of the deformable lens. The lens shaper 6500 transforms the shape of the membrane/deformable lens from a large elliptical lens defined by the perimeter 6501, into a small elliptical lens defined by the perimeter 6502. Referring now to FIG. 65B another of lens shaper 6510 for use with the examples described herein is described. In this example, the lens shaper 6510 includes a rectangular first perimeter 6511 and a circular second perimeter 6512. Depending on the deformation of the membrane, the membrane shape is defined by different parts of the lens shaper and thus the shape of the deformable lens changes from a substantially rectangular lens to a circular lens.

While the present disclosure is susceptible to various modifications and alternative forms, certain embodiments are shown by way of example in the drawings and these embodiments were described in detail herein. It will be understood, however, that this disclosure is not intended to limit the invention to the particular forms described, but to the contrary, the invention is intended to cover all modifications, alternatives, and equivalents falling within the spirit and scope of the invention.

Preferred embodiments of this invention are described herein, including the best mode known to the inventors for carrying out the invention. It should be understood that the illustrated embodiments are exemplary only, and should not be taken as limiting the scope of the invention.

What is claimed is:

1. An optical apparatus comprising
a first flexible membrane comprising an optically active area used to form images;
a fixed lens;
an optical axis extending through a center of the fixed lens and a center of the first flexible membrane
a second flexible membrane having a non-moving periphery and not having an optically active area;
wherein the first flexible membrane and the second membrane are coupled by a filler material;
at least one electromagnetically displaceable component coupled to the filler material via at least a portion of the second flexible membrane, such that a displacement of the at least one electromagnetically displaceable component is operative to cause a deformation of the optically active area of the first flexible membrane by movement of the filler material;
a lens shaper adjacent to the optically active area and being fixed in space longitudinally and radially with respect to the fixed lens and the optical axis, the lens shaper being separate and distinct from the at least one electromagnetically displaceable component;

wherein the first membrane has a radial perimeter defined by the non-moving lens shaper;

wherein the second flexible membrane is in contact with the at least one electromagnetically displaceable component and wherein the periphery of the second membrane is fixed in space with respect to the fixed lens.

2. The optical apparatus of claim 1, wherein the filler material is a material selected from the group consisting of a liquid, an ionic liquid, a gel, a gas, and a polymer.

3. The optical apparatus of claim 1, wherein the electromagnetically displaceable component comprises a coil.

4. The optical apparatus of claim 3 wherein applying a current to the electrical coil is operative with a magnetic field to create an electromotive force and to move the electrical coil in a generally axial direction with respect to an optical axis of the apparatus.

5. The optical apparatus of claim 3, wherein the coil comprises a bobbin which is attached to the second membrane and an electrically conductive wire which is arranged on the bobbin.

6. The optical apparatus according to claim 5, wherein the bobbin is constructed from a rigid material.

7. The optical apparatus of claim 1, wherein the electromagnetically displaceable component comprises at least one magnet.

8. The optical apparatus of claim 7 wherein a coil is stationary with respect to a container and the at least one magnet is movable with respect to the coil.

9. The optical apparatus of claim 1, wherein the electromagnetically displaceable component is constructed from a magnetically soft material.

10. The optical apparatus of claim 1 wherein the filler material and the membrane comprise the same material.

11. The optical apparatus of claim 1, wherein, the electromagnetically displaceable component is mechanically coupled to the second membrane, such that a deformation of the second membrane results in a deformation of the first membrane by movement of the filler material.

12. The optical apparatus of claim 1, wherein the electromagnetically displaceable component is attached to the second membrane section by an attachment mechanism selected from the group consisting of a mechanical adhesion, chemical adhesion, dispersive adhesion, electrostatic adhesion and diffusive adhesion.

13. The optical apparatus of claim 1, wherein the first membrane and the second membrane are delimited from each other by the lens shaper.

14. The optical apparatus of claim 13, wherein the lens shaper comprises a circular opening which defines the shape of the optically active area of the first membrane.

15. The optical apparatus of claim 1, wherein the at least one electromagnetically displaceable component is positioned on either side of the second membrane.

16. The optical apparatus of claim 1, wherein the second membrane laterally surrounds the first membrane.

17. The optical apparatus of claim 1, wherein the electromagnetically displaceable component laterally surrounds the first membrane.

18. The optical apparatus of claim 1, wherein at least one of the first membrane or the second membrane is arranged in a pre-stretched manner.

19. The optical apparatus of claim 1, wherein the first or second membrane is at least partially constructed from at least one material selected from the group consisting of: gels, elastomers, thermoplast, and duroplast.

20. The optical apparatus of claim 1, wherein a coil operates to interact with a magnetized structure.

21. The optical apparatus of claim 20, wherein the magnetized structure comprises at least one magnet.

22. The optical apparatus of claim 20, wherein the magnetized structure comprises a flux guiding structure.

23. The optical apparatus of claim 22 wherein the flux guiding structure is constructed from a magnetically soft material.

24. The optical apparatus of claim 20, wherein a periphery of the magnetized structure is substantially rectangular in shape.

25. The optical apparatus of claim 1 wherein the apparatus is at least part of one of an optical focusing, zoom system, and illumination system.

26. An optical apparatus comprising:
at least one electromagnetically displaceable component;
a continuous flexible membrane, the membrane having a first membrane section and a second membrane section, the second membrane section extending from the first membrane section, wherein the first membrane section comprises an optically active area used to form images;
a fixed lens;
an optical axis extending through a center of the fixed lens and a center of the first membrane section;
wherein the first membrane section and the second membrane section are coupled via a filler material;
wherein a displacement of the at least one electromagnetically displaceable component causes movement of the second membrane section, thereby causing movement of the filler material that deforms at least a part of the first membrane section;
a lens shaper adjacent to the optically active area that delimits between the first membrane section and the second membrane section, the lens shaper being fixed with respect to the fixed lens and the optical axis, the lens shaper being separate and distinct from the at least one electromagnetically displaceable component;
wherein the first membrane section has a radial perimeter defined by the non-moving lens shaper;
wherein the second membrane section is in contact with the at least one electromagnetically displaceable component and wherein the periphery of the second membrane is fixed in space with respect to the fixed lens.

27. The optical apparatus of claim 26, wherein the filler material is a deformable material.

28. The optical apparatus of claim 26, wherein the electromagnetically displaceable component comprises a coil.

29. The optical apparatus of claim 28, wherein the coil is coupled to a bobbin which is attached to the second membrane and the bobbin is not part of the lens shaper.

30. The optical apparatus according to claim 29, wherein the bobbin is constructed from a rigid material.

31. The optical apparatus of claim 28, wherein the coil operates to interact with a magnetized structure.

32. The optical apparatus of claim 31, wherein the magnetized structure comprises at least one magnet.

33. The optical apparatus of claim 31, wherein the magnetized structure comprises a flux guiding structure.

34. The optical apparatus of claim 33 wherein the flux guiding structure is constructed from a magnetically soft material.

35. The optical apparatus of claim 26, wherein the electromagnetically displaceable component comprises a magnet.

36. The optical apparatus of claim 26, wherein the electromagnetically displaceable component is constructed from a magnetically soft material.

37. The optical apparatus of claim 26, wherein the electromagnetically displaceable component is attached to the second membrane section by an attachment mechanism selected from the group consisting of a mechanical adhesion, chemical adhesion, dispersive adhesion, electrostatic adhesion and diffusive adhesion.

38. The optical apparatus of claim 26, wherein, the electromagnetically displaceable component delimits at least one of the first membrane section and the second membrane section.

39. The optical apparatus of claim 26, wherein the lens shaper comprises a circular opening which defines the shape of the optically active area of the first membrane section.

40. The optical apparatus of claim 26, wherein the at least one electromagnetically displaceable component at least partially surrounds the first membrane section.

41. The optical apparatus of claim 26, wherein at least one of the first membrane section and the second membrane section is arranged in a pre-stretched manner.

42. The optical apparatus of claim 26, wherein the first or second membrane section is at least partially constructed from at least one material selected from the group consisting of: gels, elastomers, thermoplast, and duroplast.

43. The optical apparatus of claim 26 wherein the electromagnetically displaceable component is part of a motor system.

44. The optical apparatus of claim 43 wherein a periphery of the motor system is substantially rectangular in shape.

45. The optical apparatus of claim 26 wherein the apparatus is at least part of one of an optical focusing, zoom system, and illumination system.

46. A motor comprising:
a first magnet;
a first coil placed proximate to the first magnet;
a second magnet;
a second coil placed proximate to the second magnet;
a first flux which is generated by the first magnet, a second flux generated by the second magnet, and a third flux which is generated by both the first and second magnet;
wherein a current excitation of the first coil is operative with the first and third flux to create a sufficient force to displace the first coil with respect to the first magnet and excitation of the second coil is operative with the second and third flux to create a sufficient force to displace the second coil with respect to the second magnet;
wherein at least some of the first flux, the second flux, or the third flux passes through a deformable optical element;
wherein the first coil and first magnet are effective to cause a deformation of a first deformable membrane and wherein a first lens shaper delimits portions of the first membrane, the first lens shaper being fixed with respect to a first container, the first lens shaper being separate and distinct from the motor;
wherein the first lens shaper is adjacent to an optically active area of the first membrane and is fixed in space longitudinally and radially with respect to an optical axis, the optical axis extending through a center of the first membrane;
wherein the second coil and second magnet are effective to cause a deformation of a second deformable membrane and wherein a second lens shaper delimits portions of the second membrane, the second lens shaper being fixed with respect to a second container, the second lens shaper being separate and distinct from the motor;
wherein the second lens shaper is adjacent to an optically active area of the second membrane and is fixed in space longitudinally and radially with respect to an optical axis, the optical axis extending through a center of the second membrane.

47. The motor of claim 46 wherein a flux guiding structure is arranged such that the flux guiding structure increases the flux density at the first coil and the second coil and wherein the flux guiding structure optimizes the force.

48. The motor of claim 46 wherein the third flux is a significant portion of the total flux and increases the flux density at the coils.

49. The motor of claim 46 wherein the first coil is mechanically coupled to an optical element.

50. The motor of claim 46 further comprising at least one additional magnet configured to increase the flux density at the coils.

51. An optical apparatus comprising:
a deformable membrane;
a first reservoir that communicates with the deformable lens;
an optical sensor which receives light which passes through the deformable membrane; and
a motor comprising:
a first magnet;
a first coil placed proximate to the first magnet; and
a first flux which is generated by the first magnet wherein the first flux flows through said first coil and interacts with current in the first coil to create a force;
wherein a portion of the motor is positioned between the first reservoir and the optical sensor;
wherein the motor is effective to cause a deformation of the deformable membrane and wherein a lens shaper delimits portions of the membrane, the lens shaper being fixed with respect to a container, the lens shaper being separate and distinct from the motor;
wherein the lens shaper is adjacent to an optically active area of the membrane and is fixed in space longitudinally and radially with respect to a fixed lens and an optical axis, the optical axis extending through a center of the fixed lens and a center of the membrane.

52. The optical apparatus of claim 51 further comprising:
a second reservoir wherein a portion of the motor is positioned between the first reservoir and the second reservoir.

53. An optical apparatus comprising:
a first deformable lens;
a first reservoir in communication with the first deformable lens by means of a first filler material;
a first container at least partially enclosing the filler material within the first deformable lens and the first reservoir;
a second deformable lens;
a second reservoir in communication with the second deformable lens by means of a second filler material;
a second container at least partially enclosing the filler material within the second deformable lens and the second reservoir;
an electromechanical actuation device operative in a plurality of directions wherein at least one direction of the electromechanical actuation device is operative to change one optical property of the first deformable lens;
and wherein a second direction of the electromechanical actuation device is operative to change one optical property of the second deformable lens;
wherein the electromechanical actuation device is effective to cause a deformation of the first deformable lens or the second deformable lens and wherein a lens shaper delimits portions of the first deformable lens or the second deformable lens, the lens shaper being fixed with respect to a container, the lens shaper being separate and distinct from the electromechanical actuation device wherein the lens shaper is adjacent to a first optically active area of the first deformable lens and a second optically active area of the second deformable lens and is fixed in space longitudinally and radially with respect to a fixed lens and an optical axis, the optical axis extending through a center of the fixed lens and a center of the first deformable lens and the second deformable lens.

* * * * *